United States Patent [19]
Fujimura

[11] Patent Number: 5,905,767
[45] Date of Patent: May 18, 1999

[54] TIMING RECOVERY APPARATUS AND A DIVERSITY COMMUNICATION APPARATUS USING THE SAME

[75] Inventor: Akinori Fujimura, Tokyo, Japan

[73] Assignee: Mitsubishi Denki Kabushiki Kaisha, Tokyo, Japan

[21] Appl. No.: 08/742,136

[22] Filed: Oct. 31, 1996

[30] Foreign Application Priority Data

Nov. 7, 1995 [JP] Japan ................................. 7-288772

[51] Int. Cl.$^6$ .......................................................... H04L 7/00
[52] U.S. Cl. .......................................... 375/355; 375/371
[58] Field of Search ................................... 375/355, 354, 375/371, 373, 377

[56] References Cited

U.S. PATENT DOCUMENTS

| | | | |
|---|---|---|---|
| 4,010,323 | 3/1977 | Peck .......................................... | 178/88 |
| 4,015,083 | 3/1977 | Bellisio .................................... | 178/69.1 |
| 4,344,179 | 8/1982 | Ryan . | |
| 4,412,299 | 10/1983 | Huffman ................................. | 364/570 |
| 4,811,363 | 3/1989 | Hoffmann ................................ | 375/83 |
| 4,866,739 | 9/1989 | Agazzi et al. ........................... | 375/106 |
| 5,235,622 | 8/1993 | Yoshida ................................... | 375/106 |
| 5,285,482 | 2/1994 | Sehier et al. . | |
| 5,491,729 | 2/1996 | Co et al. ................................. | 375/376 |
| 5,654,987 | 8/1997 | Nakamura ............................... | 375/355 |
| 5,671,257 | 9/1997 | Cochran et al. ........................ | 375/355 |
| 5,719,907 | 2/1998 | Kaku et al. .............................. | 375/371 |

FOREIGN PATENT DOCUMENTS

| | | |
|---|---|---|
| 0488624 | 6/1992 | European Pat. Off. . |
| 6252965 | 9/1994 | Japan . |
| WO 9526601 | 10/1995 | WIPO . |
| WO 9607255 | 3/1996 | WIPO . |

*Primary Examiner*—Stephen Chin
*Assistant Examiner*—Mohammad Ghayour

[57] ABSTRACT

The timing recovery apparatus and the diversity communication apparatus using the same realizes a high-speed timing phase pull-in characteristic and a low-jitter characteristic at the time of power-on sequence, recovery from line disconnection and the like. The apparatuses also prevent the bit error rate characteristic and synchronization characteristic from being deteriorated by signal delay time difference. A received PSK signal is X-times oversampled. From received phase data sequences $Y_i$ obtained by the X-times oversampling, a data sequence including j symbol frequency components not affected by carrier frequency deviation is extracted by signal processing including simple adding and subtracting operations. The data sequence including j symbol frequency components is synthesized to provide two data sequences including symbol frequency components having a good S/N ratio with $\pi/4$ phase difference in radian and not affected by carrier frequency deviation. Further, a data sequence including two symbol frequency components is used for timing regeneration.

14 Claims, 66 Drawing Sheets

| DIFFER-ENTIAL DATA | ABSOLUTE JITTER VALUE | DIFFER-ENTIAL DATA | ABSOLUTE JITTER VALUE |
|---|---|---|---|
| 7 | 1 | −1 | 1 |
| 6 | 2 | −2 | 2 |
| 5 | 3 | −3 | 3 |
| 4 | 4 | −4 | 4 |
| 3 | 3 | −5 | 3 |
| 2 | 2 | −6 | 2 |
| 1 | 1 | −7 | 1 |
| 0 | 0 | −8 | 0 |

| mod $(\Delta\theta T, \pi/2)$ | SELECTING SECTION 102 OUTPUT | WEIGHT VALUE $\beta$ |
|---|---|---|
| 0 | A | 1 |
| 1 | A×COS($\pi/16$) | 1/COS($\pi/16$) |
| 2 | A×COS($\pi/8$) | 1/COS($\pi/8$) |
| 3 | A×COS($3\pi/16$) | 1/COS($3\pi/16$) |
| 4 | A×COS($\pi/4$) | 1/COS($\pi/4$) |
| 5 | A×COS($3\pi/16$) | 1/COS($3\pi/16$) |
| 6 | A×COS($\pi/8$) | 1/COS($\pi/8$) |
| 7 | A×COS($\pi/16$) | 1/COS($\pi/16$) |

FIG. 22

| INPUT DATA | OUTPUT DATA |
|---|---|
| 0 | 0 |
| 1 | 1 |
| 2 | 1 |
| 3 | 1 |
| 4 | 2 |
| 5 | 2 |
| 6 | 3 |
| 7 | 4 |
| 8 | 4 |
| 9 | 5 |
| 10 | 6 |
| 11 | 6 |
| 12 | 7 |
| 13 | 7 |
| 14 | 7 |
| 15 | 8 |

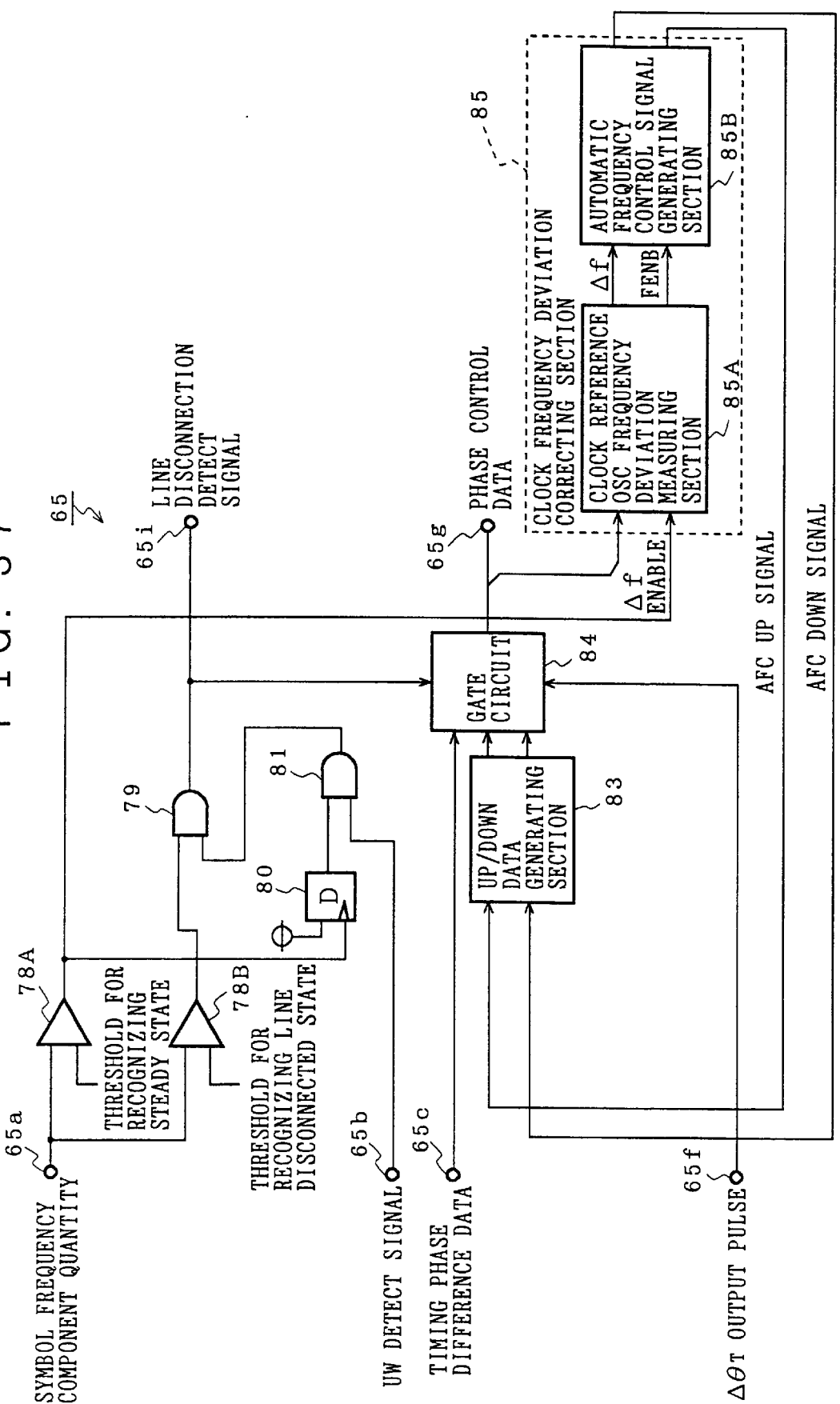

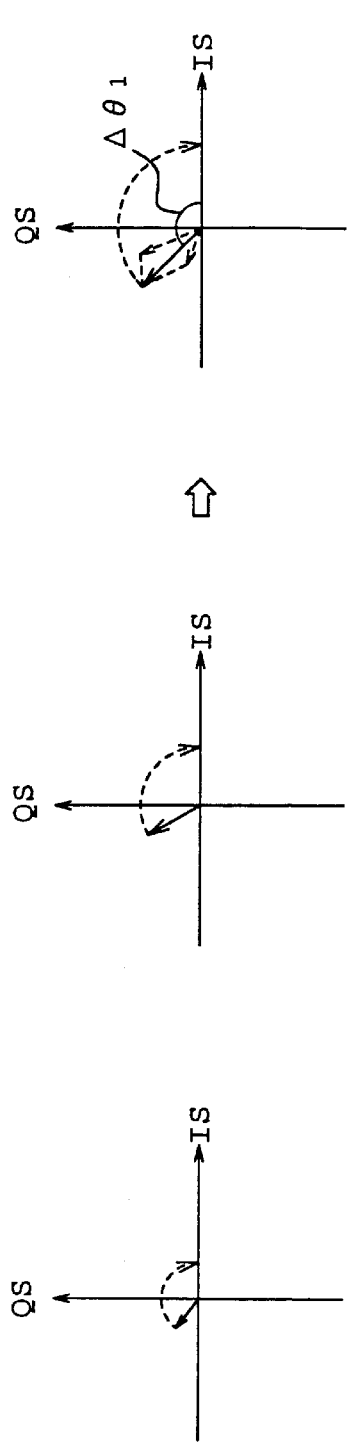
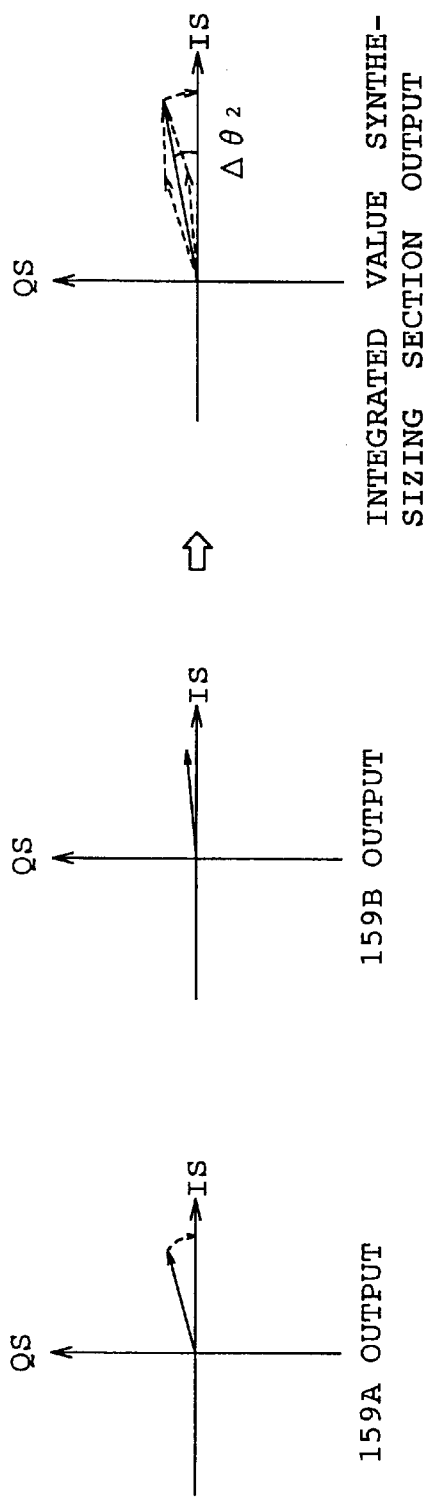
FIG. 38(A) 159A OUTPUT
FIG. 38(B) 159B OUTPUT
FIG. 38(C) INTEGRATED VALUE SYNTHE-SIZING SECTION OUTPUT
FIG. 38(D) 159A OUTPUT
FIG. 38(E) 159B OUTPUT
FIG. 38(F) INTEGRATED VALUE SYNTHE-SIZING SECTION OUTPUT

FIG. 48

| mod $(\Delta\theta T, \pi/2)$ | FILTERING SECTION OPERATION STOP DATA | SELECTING SECTION 102 OUTPUT | FILTERING SECTION OPERATION STOP TIME [SYMBOLS] | TW[SYMBOLS] WHEN $\alpha=0.98$ |
|---|---|---|---|---|
| 0 | 0 | A | 0 | 0 |
| 1 | 1 | A×COS($\pi/16$) | log$\alpha$COS($\pi/16$) | 1 |
| 2 | 2 | A×COS($\pi/8$) | log$\alpha$COS($\pi/8$) | 4 |
| 3 | 3 | A×COS($3\pi/16$) | log$\alpha$COS($3\pi/16$) | 9 |
| 4 | 4 | A×COS($\pi/4$) | log$\alpha$COS($\pi/4$) | 17 |
| 5 | 3 | A×COS($3\pi/16$) | log$\alpha$COS($3\pi/16$) | 9 |
| 6 | 2 | A×COS($\pi/8$) | log$\alpha$COS($\pi/8$) | 4 |
| 7 | 1 | A×COS($\pi/16$) | log$\alpha$COS($\pi/16$) | 1 |

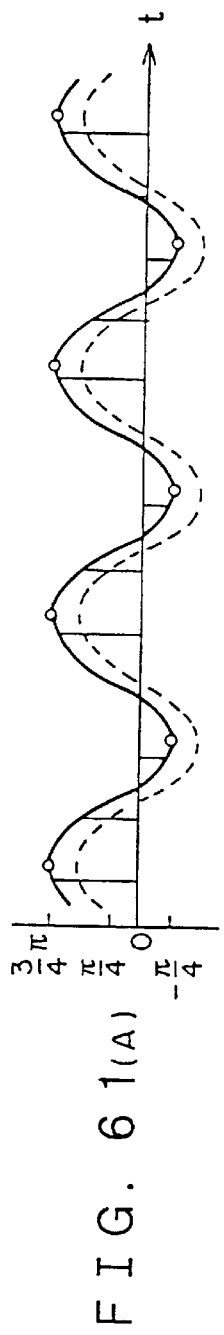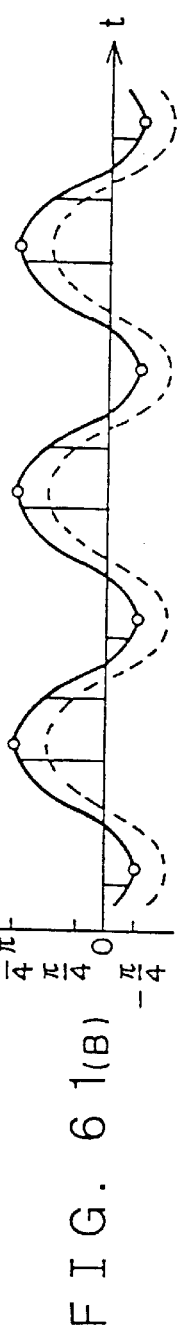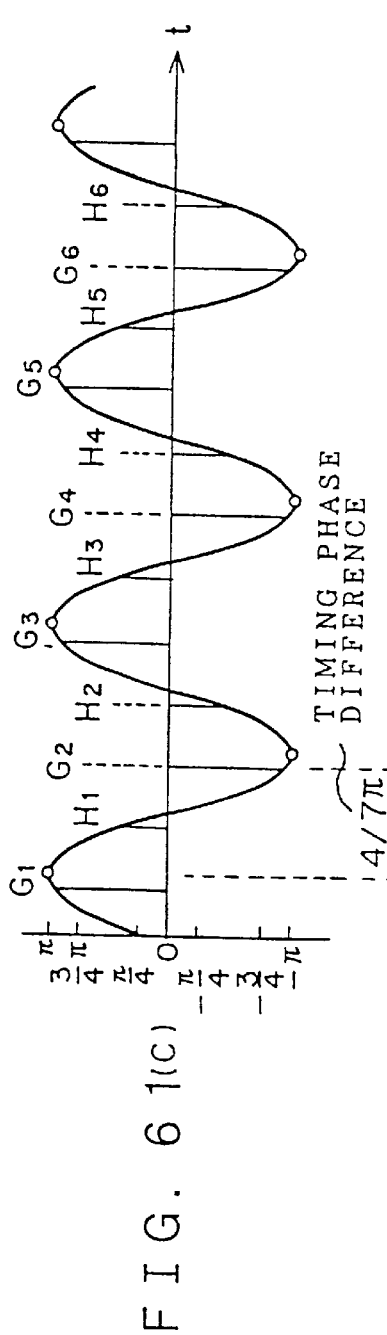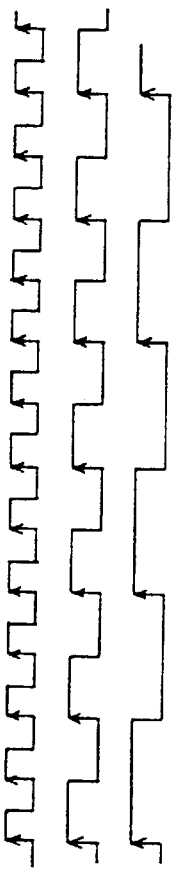
FIG. 61(A)
FIG. 61(B)
FIG. 61(C)
FIG. 61(D)
FIG. 61(E)
FIG. 61(F)

FIG. 64

| INPUT | | | | OUTPUT | |
|---|---|---|---|---|---|
| ILEAD | ICROSS | QLEAD | QCROSS | LEAD | CROSS |
| 0 | 0 | 0 | 0 | 0 | 0 |
| 0 | 0 | 0 | 1 | 0 | 1 |
| 0 | 0 | 1 | 0 | 1 | 0 |
| 0 | 0 | 1 | 1 | 1 | 1 |
| 0 | 1 | 0 | 0 | 0 | 1 |
| 0 | 1 | 0 | 1 | 0 | 1 |
| 0 | 1 | 1 | 0 | 1 | 1 |
| 0 | 1 | 1 | 1 | 1 | 0 |
| 1 | 0 | 0 | 0 | 1 | 0 |
| 1 | 0 | 0 | 1 | 1 | 1 |
| 1 | 0 | 1 | 0 | 1 | 0 |
| 1 | 0 | 1 | 1 | 1 | 1 |
| 1 | 1 | 0 | 0 | 1 | 1 |
| 1 | 1 | 0 | 1 | 1 | 0 |
| 1 | 1 | 1 | 0 | 1 | 1 |
| 1 | 1 | 1 | 1 | 1 | 1 |

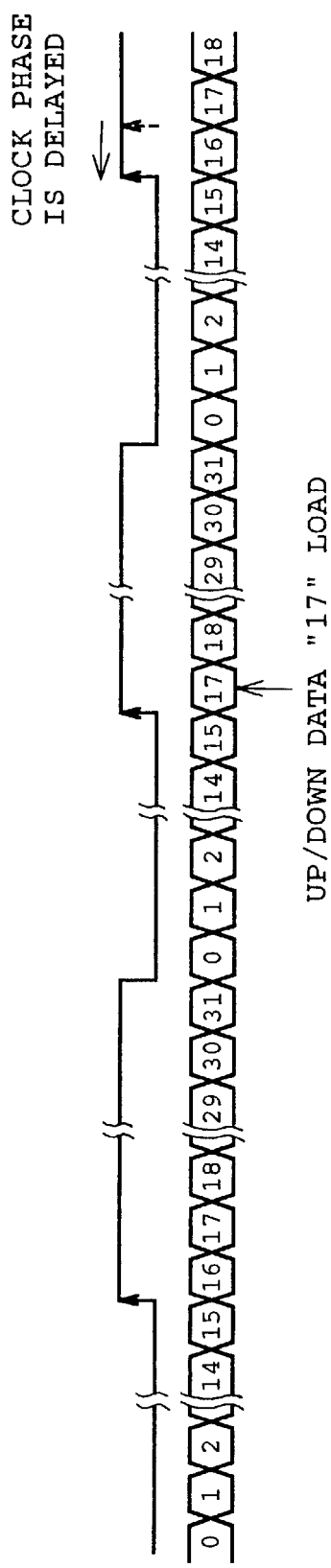
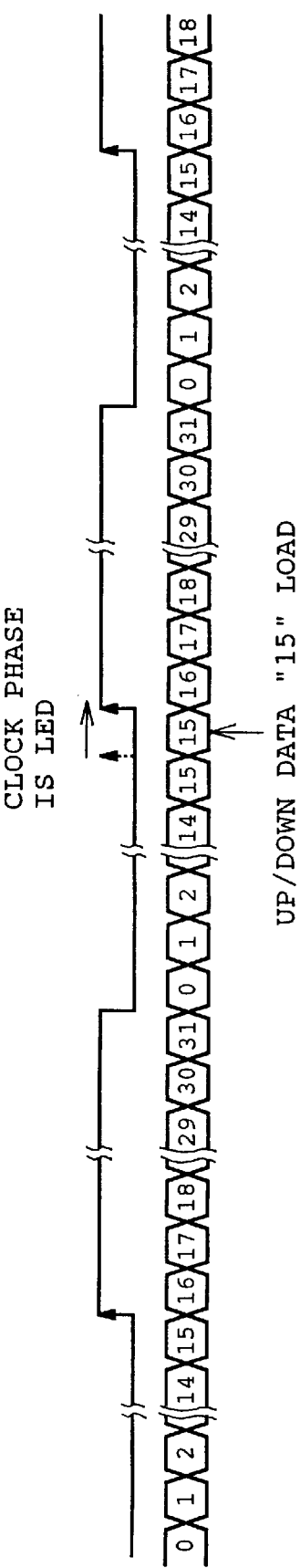
FIG. 66 (A)
FIG. 66 (B)

TIMING RECOVERY APPARATUS AND A DIVERSITY COMMUNICATION APPARATUS USING THE SAME

BACKGROUND OF THE INVENTION

1. Field of the Invention

The present invention relates to a timing recovery apparatus and a diversity communication apparatus using the timing recovery apparatus and, more particularly, the present invention is applicable to a demodulator for use in a digital wireless communication apparatus based on PSK (Phase Shift Keying).

2. Description of Prior Art

A timing recovery apparatus for a demodulator of a digital wireless communication apparatus based on PSK is disclosed on JP-A 6/252965. The disclosed timing recovery apparatus uses a phase detecting section for initial pull-in that detects a clock phase by using a preamble pattern and a phase detecting section for steady state based on zero cross detecting that detects lead or lag of a clock phase. Various schemes for conventional diversity communication apparatuses are described in "Basics of Mobile Communication," Chapter 7, edited by Institute of Electronics, Information and Communication Engineers of Japan, published by Corona Publishing, for example.

FIG. 50 shows a conventional diversity receiving apparatus including the above-mentioned timing recovery apparatus. For simplicity of description, let the number of branches K of the diversity of this diversity receiving apparatus be 2. In the figure, reference numerals 1A and 1B indicate antennas, 2A and 2B indicate detecting sections, 3A and 3B indicate sampling sections, 4 indicates a diversity section, 5 indicates a timing recovery section, 6 indicates a Nyquist point extracting section, 7a indicates a Nyquist point data output terminal, 7b indicates a burst gate input terminal, 7c indicates a frame synchronization signal input terminal. In the timing recovery section 5, reference numeral 10 indicates phase detecting section for initial pull-in (hereinafter, it is called as an initial pull-in phase detecting section), 11 indicates a phase detecting section for steady state (hereinafter, it is called as a steady state phase detecting section), 12 indicates a filtering section for initial pull-in (hereinafter, it is called as an initial pull-in filtering section), 13 indicates a filtering section for steady state (hereinafter, it is called as a steady state filtering section), 14 indicates a phase control selecting section, and 15 indicates a phase controlling section.

FIG. 51 shows a constitution of the initial pull-in phase detecting section 10, in which reference numerals 16 and 17 indicate registers, 18 indicates a subtractor, 10a indicates a received phase data input terminal, 10b indicates a regenerated double frequency clock input terminal, and 10c indicates a differential data output terminal. FIG. 52 shows a constitution of the initial pull-in filtering section 12, in which reference numeral 20 indicates a serial-parallel converter, 21 indicates an integrator, 22 indicates integration controlling section, 23 indicates a ROM, 24 indicates a register, 12a indicates a differential data input terminal, 12b indicates a regenerated ½ frequency clock input terminal, 12c indicates a regenerated clock input terminal, 12d indicates a burst gate input terminal, 12e indicates a timing phase difference data output terminal, and 12f indicates a timing phase difference data calculation complete signal output terminal. In the integrator 21, reference numerals 26A and 26B indicates multiplier, 27A and 27B indicate adders, 28A and 28B indicate registers, 29A and 29B indicate dividers. In the integration controlling section 22, reference numeral 30 indicates an AND gate, 31 indicates an inverter, 32 indicates an up counter, and 33 indicates a comparator.

FIG. 53 shows a constitution of the steady state phase detecting section 11, in which reference numeral 11a indicates a received phase data input terminal, 34 indicates a polar-coordinate converter, 35A and 35B indicate zero-cross detectors, 36 indicates a zero-cross signal synthesizing section, 11b indicates a LEAD signal output terminal, and 11c indicates CROSS signal output terminal. FIG. 54 shows a constitution of the zero-cross detectors 35A and 35B, in which reference numeral 35a indicates a data input terminal, 35b indicates a regenerated clock input terminal, 37A, 37B, 37C and 37D indicate registers, 38 indicates an inverter, 39A and 39B indicate exclusive OR gates, 35c indicates an LEAD signal output terminal, and 35d indicates a QCROSS signal output terminal.

FIG. 55 shows a constitution of the steady state filtering section 13, in which a reference numeral 13a indicates frame synchronization signal input terminal, 13b indicates a phase control complete signal input terminal, 13c indicates a LEAD signal input terminal, 13d indicates a CROSS signal input terminal, 13e indicates a burst gate input terminal, 13f indicates a regenerated clock input terminal, 40 indicates a selector, 41 indicates a 1-bit shifter, 42 indicates an UP/DOWN counter, 43A and 43B indicate comparators, 44 indicates an OR gate, 13g indicates an UP signal output terminal, and 13h indicates a DOWN signal output terminal.

FIG. 56 shows a constitution of the phase control selecting section 14, in which reference numeral 14a indicates a timing phase difference data calculation complete signal input terminal, 14b indicates an UP signal input terminal, 14c indicates a DOWN signal input terminal, 14d indicates a timing phase difference data input terminal, 45 indicates an UP/DOWN data generating section, 46 indicates a gate circuit, and 14e indicates a phase control data output terminal. FIG. 57 indicates a constitution of the phase controlling section 15, in which reference numeral 15a indicates a phase control data input terminal, 15b indicates a regenerated $2^m$ times (for example 32 times) frequency clock input terminal, 47A and 47B indicate comparators, 48 indicates an AND gate, 49 indicates an m-bit up counter, 50 indicates a ½ divider, 51A and 51B indicate inverters, 15c indicates a regenerated ½-times frequency clock output terminal, 15d indicates a regenerated clock output terminal, 15e indicates a regenerated double frequency clock output terminal, 15f indicates a regenerated 16-times frequency clock output terminal, and 15g indicates a phase control complete signal output terminal.

The operations of the above-mentioned conventional diversity receiving apparatus will be described. First, the operations of the diversity receiving apparatus in its entirety will be described. In this example, for reduction in size and power consumption, the demodulator of the receiving apparatus for digital mobile communication operates by using only phase information, discarding amplitude information. That is, the demodulator operates by using only a baseband receive phase signal obtained by detecting the carrier signal that passed the limiter. Also, in this example, delay detecting based on π/4 shift QPSK (Quadrature PSK) is used for demodulation. In the conventional diversity receiving apparatus, two antennas 1A and 1B receive a PSK signal. Two detecting sections 2A and 2B detect the received signal to output an analog baseband receive phase signal and a receive signal power. The detecting sections 2A and 2B are each composed of a limiter, a bandpass filtering section, mixer, and other analog devices.

The sampling sections 3A and 3B each oversample each analog baseband receive phase signal at a double frequency double of a symbol frequency to output quantized baseband receive phase data. Here, it is assumed that the phase resolution of the baseband receive phase data be 5 bits. The diversity section 4 delay-detects the baseband phase signals outputted from the sampling sections 3A and 3B. An automatic frequency controlling section in the diversity section 4 removes a carrier frequency deviation from each baseband phase signal. Then, the diversity section 4 performs signal synthesis such as selective synthesis, equivalent gain synthesis or maximum ratio synthesis described in the above-mentioned document "Basics of Mobile Communication" by using the received signal power and the two pieces of delay-detected baseband receive phase data outputted from the detecting sections 2A and 2B to output the synthesized baseband receive phase data to the timing recovery section 5 and the Nyquist point extracting section 6.

The timing recovery section 5 outputs a regenerated double frequency clock to be used by the sampling sections 3A and 3B. The timing recovery section 5 controls the clock phase such that the double regenerated clock samples Nyquist points of the baseband receive phase data every two samples. Consequently, the Nyquist point of the baseband receive phase data after delay detection also appears, every two samples, in the baseband receive phase data after synthesis outputted from the diversity section 4. The Nyquist point extracting section 6 extracts the Nyquist point coming from the baseband receive phase data from the synthesized baseband receive phase data outputted from the diversity section 4. Further, the extracting section polar-coordinate converts the extracted phase data to output in-phase Nyquist point data and orthogonal Nyquist point data.

The following describes the above-mentioned operations with reference to the timing chart of FIG. 58. The curves of (A) and (C) of FIG. 58 indicate the baseband receive phase data detected by the detecting sections 2A and 2B. The baseband receive phase data are the data obtained by performing $\pi/4$ shift QPSK on the data pattern in which "00" and "10" repeat by the mapping shown in FIG. 59. For simplicity of description, no carrier frequency deviation is given to the baseband receive phase data. When the data pattern in which "00" and "01" repeat is modulated by $\pi/4$ shift QPSK, the phase fluctuates from 0 to $\pi/4$ or from $\pi/4$ to 0 at a symbol interval. However, the baseband receive phase data indicating this phase jitter is distorted by the influence of noise or phasing as indicated by the curves of (A) and (C) of FIG. 58. A tiny circle in the figure shows a Nyquist point, of which phase originally indicates 0 and $\pi/4$. However, by the influence of noise and phasing, the phase at Nyquist point takes a different value at a position at which the received signal power outputted from the detecting sections 2A and 2B drops. The received signal power outputted from the detecting sections 2A and 2B are shown in (B) and (D) of FIG. 58.

The sampling sections 3A and 3B sample the baseband receive phase data (A) and (C) respectively by the regenerated double frequency clock outputted from the timing recovery section 5 shown in (F) of FIG. 58. The sampled data are indicated by vertical lines in (A) and (C) of FIG. 58. The diversity section 4 delay-detects the sampled baseband receive phase data shown in (A) and (C) of FIG. 58. If not affected by noise or phasing, the delay-detected Nyquist point phase data show $\pi/4$ and $-\pi/4$ alternately. Then, the diversity section 4 performs signal synthesis by selective synthesis, equivalent gain synthesis or maximum ratio synthesis by using two pieces of delay-detected baseband receive phase data and the received signal power (B) and (D), outputting the delay-detected baseband receive phase data after synthesis indicated by vertical lines in (E) of FIG. 58.

The timing recovery section 5 uses the synthesized delay-detected baseband receive phase data (E) to control the clock phases of the regenerated double frequency clock (F) of FIG. 28 and the regenerated clock (G) such that the rise position of each of these clocks comes to a Nyquist point. In the example of FIG. 58, the phase difference between the rise of the Nyquist point and the regenerated clock is $\pi/2$ initially, but as time goes by, this phase difference converges to zero gradually. The Nyquist point extracting section 6 extracts the delay-detected base band receive phase data (E) at the rise of the regenerated clock (G) as Nyquist point data to output the same as in-phase and orthogonal Nyquist point data shown in (H) and (I) of FIG. 58. Consequently, in the first half of the timing chart, the Nyquist point extracting section 6 outputs the data that are deviated from the Nyquist point by $\pi/2$ as the Nyquist point data; in the last half of the timing chart, the extracting section 6 can output the inherent Nyquist point data by the clock phase control performed by the timing recovery section 5.

The operation of the timing recovery section 5 will be described. The present diversity apparatus receives burst data as shown in FIG. 60. The timing recovery section 5 uses a data pattern that repeats "01" and "10" called a preamble pattern in the head of the burst data to calculate a timing phase difference and, at the same time, performs the clock phase initial pull-in controlling. The calculation of the timing phase difference is performed by the initial pull-in phase detecting section 10 and the initial pull-in filtering section 12. After the clock phase initial pull-in controlling, the timing recovery section 5 performs a timing phase following operation by using a random pattern (including a unique word pattern for frame synchronization) shown in FIG. 60. The timing phase following operation is performed by the steady state phase detecting section 11 and the steady state filtering section 13.

First, the clock phase initial pull-in control operation will be described. The initial pull-in phase detecting section 10 uses the synthesized delay-detected baseband receive phase data outputted from the diversity section 4 to output differential data that provides a phase detection signal. The initial pull-in filtering section 12 integrates the differential data. The initial pull-in filtering section 12 outputs the timing phase difference data indicating the phase difference between Nyquist point and regenerated clock and the timing phase difference data calculation complete signal indicating the completion of the timing phase difference data calculation. The initial pull-in phase detecting section 10 and the initial pull-in filtering section 12 calculate the timing phase difference by using the preamble pattern. It should be noted that the timing phase difference cannot be calculated from a random pattern in which data changes irregularly.

The operations of the initial pull-in phase detecting section 10 and the initial pull-in filtering section 12 will be described with reference to the timing chart of FIG. 61. In the baseband receive phase data having the preamble pattern entered from the input terminal 10a of the initial pull-in phase detecting section 10, the Nyquist points indicated by a tiny circle take values of $3\pi/4$ and $-\pi/4$ alternately unless unless affected by noise or the like as shown in (A) of FIG. 61. The registers 16 and 17 that operate on the regenerated double frequency clock entered from the input terminal 10b perform re-timing on the baseband receive phase data to delay the same by one symbol as shown in (B) of FIG. 61.

The subtractor 18 subtracts the baseband receive phase data delayed by one symbol from the baseband receive phase data to generate differential data as shown in (C) of FIG. 61 and output the same from the output terminal 10c. Therefore, the differential data at the Nyquist points indicate the $\pi$ and $-\pi$ values alternately. It is assumed here that the phase difference between Nyquist point and regenerated clock be $7\pi/4$ as shown in (E) of FIG. 61. In this case, the vertical line in (C) of FIG. 61 provides the data sampled by the regenerated double frequency clock.

The differential data entered from the input terminal 12a are serial-parallel converted by the serial-parallel converter 20 into data of two sequences in which even-number data and odd-number data are separated from each other. The multipliers 26A and 26B the data of two sequences by 1 when the regenerated ½ frequency clock coming from the input terminal 12b is logic "1" or −1 when the same is logic "0" shown in (F) of FIG. 61. Then, the data of two sequences are converted to data indicated by vertical dotted lines shown in (C) of FIG. 61. As shown in (C) of FIG. 61, let the even-number data sequence after multiplication be $G_i$ (i=1, 2, 3, ...) and the odd-number data sequence after multiplication be $H_i$ (i=1, 2, 3, ...) as shown in (C) of FIG. 61. The two data sequence $G_i$ and $H_i$ are accumulated by J times (J≧2) by two accumulators composed of adders 27A and 27B and registers 28A and 28B respectively.

The clock to operate the two accumulators by J times is realized by performing a logical product operation by the AND gate 30 between the regenerated clock and the gate signal that indicates logic "1" during J symbol period at input of the preamble pattern. The comparator 33 indicates logic "0" when the output of the up counter 32 is less than J. The up counter 32 starts counting at the rise of the burst gate signal entered from the input terminal 12d in the timing shown in FIG. 60. The gate signal is generated by inverting the output of the comparator 33 that compares the output of the up counter 32 with J.

The two data sequence $G_i$ and $H_i$ accumulated by J times are divided by J in the dividers 29A and 29B respectively. Therefore, mean value GA of $G_1$ through $G_J$ and mean value HA of $H_1$ through $H_J$ are obtained. The GA and HA are entered in ROM 23, from which the timing phase difference is outputted based on the input-output relationship shown in FIG. 62. As described above, the output of the comparator 33 rises from logic "0" to "1" when the output of the up counter 32 exceeds J. The timing phase difference can be obtained at this point of time, the output of the comparator 33 is outputted from the output terminal 12f as the timing phase difference data calculation complete signal. In addition, the output of the ROM 23 is latched in the register 24 by the output of the comparator 33. The latched data are outputted from the output terminal 12e as the timing phase difference data.

The following describes the timing phase following operation to be performed by the steady state phase detecting section 11 and the steady state filtering section 13 after the clock phase initial pull-in control. Following the initial pull-in control, the steady state phase detecting section 11 and the steady state filtering section 13 perform phase control. The steady state phase detecting section 11 uses the synthesized delay-detected baseband receive phase data outputted from the diversity section 4 and generates a LEAD signal that indicates whether the current timing phase is advancing or lagging and a CROSS signal that indicates that the LEAD signal is valid. In what follows, the operation of the steady state phase detecting section 11 will be described. The delay-detected baseband receive phase data coming from the input terminal 11a is converted by the polar-coordinate converter into IDATA that indicates an in-phase component and QDATA that indicates an orthogonal component. The IDATA and the QDATA are entered in the zero-cross detectors 35A and 35B respectively.

The registers 37A and 37B in the zero-cross detector 35A of FIG. 54 sample the IDATA entered from the input terminal 35a at the rising and falling of the regenerated clock. Here, let sample data of the IDATA at the falling edge of the regenerated clock obtained by the inverter 38 and the register 37A be $Z_n$ (n=1, 2, 3, ...), sample data of the IDATA at the rising edge obtained by the register 37B be $N_n$ (n=1, 2, 3, ...), and sample data of the IDATA at the rising edge delayed by one symbol obtained by the register 37C be $N_{(n-1)}$ (n=1, 2, 3, ...), then the zero cross of the data occurs when the following relation is established as shown in FIGS. 63(A) and 63(B):

$$N_n \times N_{(n-1)} < 0 \qquad (1)$$

In this case, if $$N_n \times Z_n > 0 \qquad (2)$$

indicating that the clock phase is advancing before the Nyquist point as shown in FIG. 63(A).

$$If\ N_n \times Z_n < 0 \qquad (3)$$

indicating that the clock phase is lagging behind the Nyquist point as shown in FIG. 63(B).

In the above-mentioned example, DPLL (Digital Phase Locked Loop) is used for clock phase control. Sample data is used as one-bit decision data. The exclusive OR gate performs an exclusive OR operation between the data $N_n$ and the data $N_{(n-1)}$ which is one symbol before the data $N_n$ to output a signal that indicates the detection of data zero cross. When the zero cross is detected, an ICROSS signal of logic "1" is outputted from the output terminal 35d. The ILEAD signal that indicates the lead or lag of the clock phase is obtained by performing an exclusive OR operation between the data $Z_n$ (n=1, 2, 3, ...) re-timed at the rising of the regenerated clock by the register 37C and $N_n$ (n=1, 2, 3, ...) outputted from the register 37B. Namely, the output of the exclusive OR gate 39A indicates the ILEAD signal. If the clock phase is advancing, the ILEAD signal of logic "0" is outputted from the output terminal 35c; if the clock phase is lagging, the ILEAD signal of logic "1" is outputted from the output terminal 35c.

The operation of the zero-cross detector 35B with QDATA inputted is generally the same as that of the zero-cross detector 35A. The zero-cross detector 35B outputs the QCROSS signal that indicates whether QDATA zero cross occurred or not and the QLEAD signal that indicates whether the clock phase is advancing or lagging. The zero-cross signal synthesizing section 36 generates the LEAD signal and the CROSS signal from the ILEAD, ICROSS, QLEAD, and QCROSS signals to output the LEAD signal from the output terminal 11b and the CROSS signal from the output terminal 11c. The LEAD signal and the CROSS signal are outputted according to the condition of FIG. 64. The LEAD signal is obtained by a logical OR operation between the ILEAD signal and the QLEAD signal. The CROSS signal is also basically obtained by a logical OR operation between the ICROSS signal and the QCROSS signal; however, if the ICROSS signal and the QCROSS signal are both logic "1's" and the ILEAD signal and the QLEAD signal have different values, then the CROSS signal is set to logic "0".

The steady state filtering section 13 of FIG. 55 averages the LEAD signal coming from the input terminal 13c if the CROSS signal coming from the input terminal 13d is logic "1". Then, if the filtering section 13 determines that the timing phase is lagging, the filtering section 13 outputs an UP signal that leads the timing phase from the output terminal 13g; if the filtering section 13 determines that the timing phase is advancing, the filtering section 13 outputs a DOWN signal that delays the timing phase from the output terminal 13h. The averaging is implemented by the UP/DOWN counter 42. The UP/DOWN counter 42 operates in the period of the regenerated clock entered from the input terminal 13f. The UP/DOWN counter 42 is enabled when the burst gate signal of FIG. 60 is entered as logic "1" from the input terminal 13e and the CROSS signal that indicates the detection of zero cross is logic "1".

FIG. 65 shows the timing chart of the operation of the steady state filtering section 13. The UP/DOWN counter is initially set to a value Nx. Then, the UP/DOWN counter down-counts if the LEAD signal indicates a phase lead or up-counts if the LEAD signal indicates a phase lag. The output of the UP/DOWN counter 42 is compared with 2Nx in the comparator 43A and with 0 in the comparator 43B. Detecting a match, these comparators each output logic "1" each. Value 2Nx is generated by one-bit shifting Nx by the bit shifter 41. When the counter value reaches 2Nx as shown in (a) of FIG. 65, the UP signal of logic "1" is outputted from the comparator 43A to the output terminal 13g. When the count value reaches 0 as shown in (b) of FIG. 65, the DOWN signal of logic "1" is outputted from the comparator 43B to the output terminal 13h.

The signal of logic "1" coming from the comparator 43A or 43B is also a load signal to the UP/DOWN counter 42. Therefore, when the signal of logic "1" is outputted from the comparator 43A or 43B, Nx is set again to the UP/DOWN counter. The first loading of Nx is performed by the phase control complete signal entered from the phase controlling section 15 to the input terminal 13b, this signal indicating that the timing phase control has been completed. The filtering section for steady state 13 uses the frame synchronization signal entered from the input terminal 13a to determine whether the current point is in phase pull-in state or steady state. In the phase pull-in state, high-speed pull-in is required, so that, in the phase pull-in state, the selecting section (SEL) 40 sets Nx to a relatively small value $N_1$ and, in the steady state, a low jitter is required, so that the selecting section sets Nx to a relatively large value $N_2$.

The phase control selecting section 14 shown in FIG. 56 outputs the phase control data that indicates a controlled quantity from the output terminal 14e. In this example, the resolution of the phase control is 1/32 symbol. Therefore, the timing phase data of 0 to 2π and the phase control data of 0 to 2π outputted from the initial pull-in phase filtering section 12 are both represented in 0 to 31. The phase control by the UP signal and the DOWN signal is performed at every 1/32 symbol. The UP signal entered from the input terminal 14b and the DOWN signal entered from the input terminal 14c are entered in the UP/DOWN data generating section 45.

The UP/DOWN data generating section 45 outputs "15" when the UP signal is logic "1", outputs "17" when the DOWN signal is logic "1", and outputs "16" otherwise. The gate circuit 46 holds the phase control data to "16" until the calculation of the timing phase data by the initial phase pull-in operation is completed. When the timing phase data is entered from the input terminal 14d upon completion of the calculation of the timing phase data, the gate circuit 46 converts the timing phase data "0 to 15, 16 to 31" to "16 to 31, 0 to 15" to output the result as the phase control data. After completion of the timing phase data calculation, the gate circuit 46 outputs the data outputted from the UP/DOWN data generating section 45 as the phase control data. The completion of the timing phase data calculation can be known by the timing phase data calculation complete signal entered from the input terminal 14a.

In the phase controlling section 15 of FIG. 57, the UP/DOWN counter 49 up-counts by a fixed clock that is 32 times the symbol frequency entered from the input terminal 15b. The UP counter 49 outputs a count value in 5 bits, the most significant bit being outputted from the output terminal 15d as the regenerated clock. The counter outputs of the remaining 4 bits except for the most significant bit are inverted by the inverter 51A through 51B to be a regenerated double frequency clock through regenerated 16-times frequency clock. These clocks are outputted from the output terminals 15e through 15f respectively. The ½ divider divides the regenerated clock by 2 to generate a regenerated ½ frequency clock, which is outputted from the output terminal 15c.

The 5-bit output value of the UP counter 49 is compared with "16" in the comparator 47A. The comparator 47A outputs logic "1" if the counter output value matches "16". The output of the comparator 47A is used as a load signal to the UP counter 49. When the load signal is logic "1", the UP counter 49 loads the phase control data entered from the input terminal 15a. If the phase control data takes the value of "16" that indicates that the phase control data is in the uncontrolled state, "16" is loaded when the count value of the UP counter 49 is "16", so that the count value does not become discontinuous. Consequently, the phase change of the regenerated clock does not occur.

If the clock phase is advancing, the phase control data becomes "17" by the DOWN signal. Therefore, as shown in FIG. 66(A), when the count value of the UP counter 49 reaches "16", "17" is loaded in the UP counter 49. As a result, the clock phase is delayed. If the clock phase is lagging, the phase control data becomes "17" by the UP signal. Therefore, as shown in FIG. 66(B), the count value of the UP counter 49 reaches "16" "15" is loaded in the UP counter. As a result, the clock phase is led.

At the time of initial phase pull-in, the phase control data take a value 0 to 31, so that, when the count value of the UP counter reaches "16", a value 0 to 31 is loaded. As a result, clock phase pull-in is realized. FIG. 67 shows an example in which clock phase pull-in is performed when the initial phase difference is 3π/2. By the initial pull-in detecting section 10 and the initial pull-in filtering section 12, the phase difference 3β/2 is outputted as timing phase difference data "24". The timing phase difference data "24" is converted to phase control data "8". Then, when the count value of the UP counter 49 reaches "16", "8" is loaded.

When the phase control has been completed, the phase control complete signal for instructing the setting of the value of the UP/DOWN counter 42 to Nx is outputted from the output terminal 15g. The comparator 47B compares the phase control data with "16". If a match found, the comparator 47B outputs logic "1". The AND gate 48 performs a logical AND operation between the output of the comparator 47B and the load signal. The output of the AND gate becomes the phase control complete signal. Thus, the timing phase synchronization by the timing recovery section 5 is performed.

The conventional timing recovery section 5 calculates the timing phase difference by using 10 to 20 symbols of the preamble data located in the head of burst data to perform initial phase control. The time required for the initial phase control is a time from starting the signal entry to the calculation of the timing phase difference. After the initial phase control, the timing recovery section 5 performs a phase following operation by using a random pattern. Therefore, the initial phase control cannot be performed if the position of the preamble pattern is not known when a portable radio terminal is powered on in which the timing when burst data come has not yet been established, or at the time of recovery from such line disconnection as blockage, for example. In this case, the phase detecting section for steady state 11 and the filtering section for steady state 13 which use a random pattern perform timing phase pull-in. However, the phase pull-in using the random pattern performed by the steady state phase detecting section 11 and the steady state filtering section 13 is performed based on the lead or lag of the timing phase. Consequently, even if a noiseless transmission path is assumed and Nx in the steady state filtering section 13 is set to "2", it takes as long a time as equivalent to about 100 symbols until completion of the timing phase pull-in.

In the conventional diversity receiving apparatus, the outputs of the detecting sections 2A and 2B are sampled by the sampling sections 3A and 3B, the results being synthesized by the diversity section 4. Because the detecting sections 2A and 2B are implemented by analog devices, a difference occurs between the signal delay time in the detecting section 2A and that in the detecting section 2B. Depending on analog devices used, a delay time difference of about $\pi/2$ in terms of phase may occur. If there is a delay time difference between the two detecting sections 2A and 2B, selective synthesis, equivalent gain synthesis or maximum ratio synthesis is performed in the diversity section 4 with the Nyquist point positions of the two signals offset from each other. If equivalent gain synthesis or maximum ratio synthesis is performed on the two signals in a phase relationship in which the Nyquist point positions are largely offset, the synthesized signals are distorted, deteriorating bit error rate characteristic and synchronization characteristic. As for selective synthesis performed in the similar condition, the Nyquist point positions are offset at signal switching, thereby temporarily causing a timing phase difference, resulting in deteriorated bit error rate characteristic and synchronization characteristic.

SUMMARY OF THE INVENTION

It is therefore an object of the present invention to provide a timing recovery means for realizing a high-speed timing phase pull-in characteristic and a low-jitter characteristic in steady state at the time of powering on or recovery form line disconnection, thereby solving the above-mentioned problems. It is another object of the present invention is provide a diversity communication apparatus that absorbs a time delay difference in each of detecting means to prevent the deterioration in bit error rate and synchronization characteristics otherwise caused by the time delay difference.

In carrying out the invention and according to one aspect thereof, there is provided a timing recovery apparatus comprises: phase difference means for generating, based on received phase data sequence $Y_i$ (i being natural number 2 or higher) obtained by sampling a received signal by an X-times (X being natural number 4 or higher) oversampling clock, j differential data sequences including from $Z_{i1}$ (=$Y_i$-$Y_{i-1}$) composed of differential data representing differences between pieces of received phase data separated from each other by a sample to $Z_{ij}$ (=$Y_i$-$Y_{i-j}$) composed of differential data which represents differences between pieces of received phase data separated from each other by j samples (j being natural number 1 or higher); phase jitter quantity calculating means for converting a differential data range of j differential data sequence $Z_{i1}$ to $Z_{ij}$ to a range of $\pm 2\pi$ to $\pm \pi$ in radian notation to obtain an absolute value thereof and output at least one of phase jitter data sequence $W_{i1}$ to $W_{ij}$ including j symbol frequency components; and phase detecting means having an even-number sample synthesizing section in which each of phase jitter data sequence from the phase jitter quantity calculating means is entered, even-number phase jitter data sequence are delayed for synthesis such that phases of symbol frequency components included in the even-number phase jitter data sequence are matched to each other, and a synthesized signal is outputted as even-number sequence synthesized symbol frequency component data and an odd-number sample synthesizing section in which each of phase jitter data sequence is entered from the phase jitter quantity calculation means, odd-number phase jitter data sequence is delayed for synthesis such that phases of symbol frequency components included in the odd-number phase jitter data sequence are matched to each other, and a synthesized signal is outputted as odd-number sequence synthesized symbol frequency component data.

In carrying out the invention and according to another aspect thereof, there is provided a timing recovery apparatus comprises: frequency converting means for adding a value obtained by multiplying the even-number sequence synthesized symbol frequency component data by a complex symbol frequency component on the receiving side to a value obtained by multiplying the odd-number sequence synthesized symbol frequency component data by a complex symbol frequency component on the receiving side delayed by $\beta/4$ in radian to generate a complex direct-current component; symbol synthesizing means for synthesizing an orthogonal component and in-phase component of the complex direct-current component for one symbol each to generate a symbol orthogonal component signal and a symbol in-phase component signal for each symbol; integral filtering means for filtering the symbol orthogonal component signal and the symbol in-phase component signal to output integrated orthogonal data and integrated in-phase data; phase difference calculating means for calculating a timing phase difference between a Nyquist point and a symbol clock by use of the integrated orthogonal data and the integrated in-phase data to output a calculated phase difference as timing phase difference data; filtering means including symbol frequency component quantity calculating means for calculating the symbol frequency component quantity accumulated by the integral filtering means; timing phase control interval setting means for outputting a signal of U (being natural number 1 or higher) symbol period as a timing phase control interval setting signal; phase control quantity determining means for latching the timing phase difference data outputted from the filtering means in the period of the timing phase control interval setting signal; and phase control means for dividing a base oscillation clock of a receiving apparatus to output the symbol clock and the x-times oversample clock and, if the phase control data has been entered, controlling phase of the symbol clock and phase of the x-times oversample clock phase by the phase control data, resetting the integrated orthogonal data in the integral filtering means to zero, and setting the symbol frequency component quantity to the integrated in-phase data.

In carrying out the invention and according to still another aspect thereof, there is provided a timing recovery apparatus wherein the integrating filtering means comprises: limiter accumulating means for, if the symbol frequency component quantity is below an accumulation threshold value, accumulating the symbol orthogonal component signal and the symbol in-phase component signal to generate integrated orthogonal data and integrated in-phase data and, if the symbol frequency component quantity exceeds the accumulation threshold value, dividing accumulated values of the symbol orthogonal component signal and the symbol in-phase component signal by D (D being natural number 2 or higher) to generate the integrated orthogonal data and the integrated in-phase data.

In carrying out the invention and according to yet another aspect thereof, there is provided a timing recovery apparatus wherein the integral filtering means further comprises: accumulating means for, if the symbol frequency component quantity is below an infinite impulse response switching threshold value, accumulating the symbol orthogonal component signal and the symbol in-phase component signal to generate integrated orthogonal data and integrated in-phase data; and infinite impulse filtering means for, if the symbol frequency component quantity exceeds the infinite impulse response switching threshold value, filtering the symbol orthogonal component signal and the symbol in-phase component signal through an infinite impulse response filter.

In carrying out the invention and according to a further aspect thereof, there is provided a timing recovery apparatus wherein the phase difference calculating means comprises: integrated data absolute value converting means for outputting an absolute value of the integrated orthogonal data and an absolute value of the integrated in-phase data as orthogonal integrated absolute value data and integrated in-phase absolute value data respectively; compared data calculating means for, if an exclusive-OR operation performed between a most significant bit of the integrated orthogonal data and a most significant bit of the integrated in-phase data results in logic "0", multiplying the orthogonal integrated absolute value data by x (x being natural number 1 or higher) and, if the exclusive disjunction operation resulted in logic "1", multiplying the integrated in-phase absolute value data by x (x being natural number 1 or higher) to generate a phase difference calculation threshold value, and adding the integrated in-phase absolute value data to the orthogonal integrated absolute value data to generate total absolute value data; in-first-quadrant-range phase data calculating means for accumulating the total absolute value data and, if a result of the accumulation exceeds the phase difference calculation threshold value, outputting the number of times the accumulation of the total absolute value data was made at that moment as in-first-quadrant-range phase data; and quadrant indication bit adding means for generating data indicating a quadrant from the most significant bit of the integrated orthogonal data and the most significant bit of the integrated in-phase data and adding the quadrant indicating data thus generated to the highest position of the in-first-quadrant-range phase data to generate the timing phase difference data.

In carrying out the invention and according to a still further aspect thereof, there is provided a timing recovery apparatus wherein the in-first-quadrant-range phase data calculating means comprises: phase data non-linearly converting means for performing non-linear conversion on the number of additions at a time when the number of additions of the total absolute value data exceeded the phase difference calculation threshold value to output non-linearly converted data as the in-first-quadrant-range phase data.

In carrying out the invention and according to yet further aspect thereof, there is provided a timing recovery apparatus wherein the symbol frequency component quantity calculating means comprises: absolute value comparing means for outputting the larger one of an absolute value of the integrated orthogonal data and an absolute value of the integrated in-phase data as the symbol frequency component quantity.

In carrying out the invention and according to a separate aspect thereof, there is provided a timing recovery apparatus wherein the symbol frequency component quantity calculating means comprises: absolute value comparing means for outputting the larger one of an absolute value of the integrated orthogonal data and an absolute value of the integrated in-phase data as compared integrated absolute value data; quadrant bit deleting means for outputting the timing phase difference data in which most significant two bits indicated a quadrant of the timing phase difference data are deleted as phase data without quadrant bits; weighting data calculating means for, if the phase data without quadrant bits is below a value equivalent to $\pi/4$ in radian, outputting the phase data without quadrant bits as weighting data and, if the phase data without quadrant bits is greater than the value equivalent to $\pi/4$ in radian, outputting a value obtained by subtracting the phase data without quadrant bits from a value equivalent to $\pi/2$ in radian as weighting data; and weighting means for multiplying the compared integrated absolute value data by a value equivalent to a cosine value obtained when the weighing data is indicated in radian and outputting a multiplied value as the symbol frequency component quantity.

In carrying out the invention and according to a still separate aspect thereof, there is provided a timing recovery apparatus wherein the symbol frequency component quantity calculating means further comprises: absolute value comparing means for outputting the larger one of an absolute value of the integrated orthogonal data and an absolute value of the in-phase integral data as the symbol frequency component quantity; quadrant bit deleting means for outputting the timing phase difference data in which most significant two bits indicated a quadrant of the timing phase difference data are deleted as phase data without quadrant bits; and filter operation stop data calculating means for, if the phase data without quadrant bits is below a value equivalent to 62 /4 in radian, outputting the phase data without quadrant bits as filter operation stop data and, if the phase data without quadrant bits is greater than a value equivalent to $\pi/4$ in radian, outputting a value obtained by subtracting the phase data without quadrant bits from a value equivalent to $\pi/2$ in radian as filter operation stop data; and wherein the filtering means comprises: filter operation stopping means for, if timing phase control has been performed, stopping an infinite impulse filtering operation for a time set based on the filter operation stop data to perform an accumulating operation.

In carrying out the invention and according to a yet separate aspect thereof, there is provided a timing recovery apparatus wherein the filtering means comprises: random walk filtering means for, if the symbol frequency component quantity exceeds a threshold value for recognizing steady state, operates an up/down counter set to filter constant N by using a sign bit of the symbol orthogonal component signal to output an up signal for advancing the symbol clock phase when the up/down counter reaches 2N or a down signal for delaying the symbol clock phase when the up/down counter reaches 0 and, after outputting the up signal or the down signal, sets the up/down counter to the filter constant N again; and wherein the phase control quantity determining means comprises: steady-state time phase control means that, when the symbol frequency component quantity exceeds the threshold value for recognizing steady state, does not use the timing phase difference data coming from the filtering means for phase control data, when an instruction for advancing the symbol clock phase by the up signal is generated, outputs phase control data for advancing the symbol clock phase, and, when an instruction for delaying the symbol clock phase by the down signal is generated, outputs phase control data for delaying the symbol clock phase.

In carrying out the invention and according to a difference aspect thereof, there is provided a timing recovery apparatus wherein the phase control means comprises: integrated data resetting means for, when the symbol frequency component quantity exceeds the threshold value for recognizing steady state, resetting the integrated orthogonal data and integrated in-phase data of the integral filtering means to zero when controlling the symbol clock phase and the X-times oversample clock phase.

In carrying out the invention and according to a still difference aspect thereof, there is provided a timing recovery apparatus wherein the phase control quantity determining means comprises: clock base oscillation frequency deviation measuring means for, when the symbol frequency component quantity exceeds a threshold value for recognizing steady state, measuring a send/receive clock base oscillation frequency deviation by using the phase control data and, when the measurement frequency plate, outputting a frequency deviation measurement complete signal indicating measurement completion and a symbol time until occurrence of a deviation in the clock phase for ±1 digit by clock frequency deviation as frequency deviation corrected data; automatic frequency control signal generating means for generating, by use of the frequency deviation corrected data, an AFC up signal for advancing the symbol clock phase and an AFC down signal for delaying the symbol clock signal; and signal off-time phase control means for outputting the phase control data for advancing the symbol clock phase by the AFC up signal if an instruction for advancing the symbol clock phase is generated when the symbol frequency component quantity goes below a threshold value for recognizing line disconnection state and the frequency deviation measurement complete signal indicates measurement completion and outputting the phase control data for delaying the symbol clock phase if an instruction for delaying the symbol clock phase by the AFC down signal is generated.

In carrying out the invention and according to a yet difference aspect thereof, there is provided a timing recovery apparatus wherein the clock base oscillation frequency deviation measuring means comprises: measuring time display means for operating an up counter by symbol clock to output an up counter value as measuring time data; phase control data accumulating means for accumulating phase control data to output an accumulated value as accumulated phase control data; frequency deviation measurement dividing means for dividing the measuring time data by the accumulated phase control data; corrected data output means for resetting the up counter when the measuring time data exceeds a threshold value for recognizing a frequency deviation measurement and latching the division result outputted from the frequency deviation measurement dividing means to output the latched division result as corrected data; and corrected data averaging means for averaging the corrected data to output the averaging result as frequency deviation corrected data.

In carrying out the invention and according to another aspect thereof, there is provided the timing recovery apparatus wherein the timing phase control interval setting means comprises: control interval setting signal varying means for varying a frequency of the timing phase control interval setting signal between timing pull-in time and steady state time.

In carrying out the invention and according to still another aspect thereof, there is provided a diversity communication apparatus comprises: K (K being natural number 2 or higher) sets of detecting means for converting signals received by K sets of antennas into baseband phase signals to output the same and outputting K sets of received signal powers; K time delay means each for giving a delay indicated by each time delay setting signal to each baseband phase signal to output a time delay baseband phase signal; K sets of sampling means each for X-times oversampling the time delay baseband phase signal to output received phase data sequences $Y_i$ (i being natural number 2 or higher); diversity means for capturing the K sets of received phase data sequences $Y_i$ and the K sets of received signal powers to output a determination data sequence; Nyquist point extracting means for extracting a Nyquist point by use of the symbol clock from the determination data sequence; and timing recovery means for generating the symbol clock for extracting the Nyquist point of a received signal and an X-times oversample clock based on the K sets of received phase data sequences $Y_i$ to output K time delay setting signals for indicating delay time differences of the K sets of baseband phase signals.

In carrying out the invention and according to yet another aspect thereof, there is provided a diversity communication apparatus wherein the timing recovery means comprises: K sets of phase detecting means each for outputting even-number sequence synthesized symbol frequency component data and odd-number sequence synthesized symbol frequency component data by use of the received phase data sequence $Y_i$; K sets of filtering means each having random walk filtering means for outputting timing phase difference data, an up signal, a down signal, and a symbol frequency component quantity by use of the even-number sequence synthesized symbol frequency component data and the odd-number sequence synthesized symbol frequency component data; timing phase control interval setting means for outputting a signal having a U (U being natural number 1 or higher) as a timing phase control interval setting signal; filter output selecting means for selecting the timing phase difference data, the up signal, and the down signal from the filtering means that indicates a maximum value of the symbol frequency component quantities outputted from the K sets of filtering means and outputting the selected timing phase difference data, up signal, and down signal; phase control quantity determining means having steady-state time phase control means for generating the phase control data at a period of the timing phase control interval setting signal by use of the timing phase difference data, up signal, and down signal outputted from the filter output selecting means; phase control means that operates by use of the phase control data and has integrated data resetting means; and time delay difference measuring means for measuring delay time differences of the K sets of baseband phase signals to output K sets of time delay setting signals; the time delay difference measuring means including phase subtracting means for subtracting first timing phase difference data from the K sets of timing phase difference data to calculate K sets of phase subtraction data; time delay difference calculating means for converting a range of the phase subtraction data from ±2π to ±π in radian to output the conversion result as K sets of delay time difference data; valid delay time difference data output means for latching the K sets of time delay difference data as a valid data when the K sets of symbol frequency component quantities all exceed a threshold value for time delay measurement; and delay difference data averaging means for accumulating each of the K sets of valid delay time difference data by S (S being natural number 1 or higher) times and dividing the accumulation result by S to output K sets of division values as the time delay setting signal.

In carrying out the invention and according to a further aspect thereof, there is provided a diversity communication apparatus comprises: K sets of detecting means for converting signals received by K sets of antennas into baseband phase signals to output the same and outputting K sets of received signal powers; K sets of time delay means each for giving a delay indicated by each time delay setting signal to each baseband phase signal to output a time delay baseband phase signal; K sets of sampling means each for X-times oversampling the time delay baseband phase signal to output received phase data sequences $Y_i$ (i being natural number 2 or higher); K sets of asynchronous sampling means each for sampling the time delay baseband phase signal by R-times (R being natural number 4 or higher) asynchronous oversampling clock to output an asynchronous received phase data sequence $Q_i$ (i being natural number 2 or higher); diversity means for capturing the K sets of received phase data sequences $Y_i$ and the K sets of received signal powers to output a determination data sequence; Nyquist point extracting means for extracting a Nyquist point by use of the symbol clock from the determination data sequence; and timing recovery means for generating the symbol clock for extracting the Nyquist point of a received signal and an X-times oversample clock based on the K sets of received phase data sequences $Y_i$ and generating K sets of time delay setting signals for indicating delay time differences of the K sets of baseband phase signals based on the K sets of asynchronous received phase data sequences $Q_i$.

In carrying out the invention and according to a still further aspect thereof, there is provided the diversity communication apparatus wherein the timing recovery means comprises: K sets of phase detecting means for outputting K sets of even-number sequence synthesized symbol frequency component data and K sets of odd-number sequence synthesized symbol frequency component data by use of K sets of received phase data sequences $Y_i$; K sets of frequency converting means each for generating a complex direct-current component from the K sets of even-number sequence synthesized symbol frequency component data and the K sets of odd-number sequence synthesized symbol frequency component data; K sets of symbol synthesizing means each for generating a symbol orthogonal component signal and a symbol in-phase component signal from the K sets of complex direct-current components; K sets of integral filtering means each for outputting integrated orthogonal data and integrated in-phase data by use of the K sets of symbol orthogonal component signals and the K sets of symbol in-phase component signals; integrated value synthesizing means for adding all of the K sets of integrated orthogonal data to output the addition result as synthesized integrated orthogonal data and adding all of the K sets of integrated in-phase data to output the addition result as synthesized integrated in-phase data; timing phase control interval setting means for outputting a signal having U (U being natural number 1 or higher) as a timing phase control interval setting signal; phase difference calculating means for calculating a timing phase difference between Nyquist point and receiving apparatus symbol clock by use of the synthesized integrated in-phase data and the synthesized integrated orthogonal data to output the calculated phase difference as timing phase difference data; K sets of symbol frequency component calculating means each for calculating the symbol frequency component quantity accumulated by the corresponding integral filtering means by use of the K sets of integrated orthogonal data and the K sets of integrated in-phase data; synthesized symbol frequency component quantity calculating means for calculating a synthesized symbol frequency component quantity by use of the synthesized integrated orthogonal data and the synthesized integrated in-phase data; phase control quantity determining means for latching the timing phase difference data in a period of the timing phase control interval setting signal to output the latched timing phase difference data as the phase control data; synthesized phase control means for generating the symbol clock and the X-times oversample clock by dividing a receiving apparatus base oscillation clock to control the symbol clock phase and the X-times oversample clock phase based on the phase control data when the phase control data are entered and resetting each piece of integrated orthogonal data of the K sets of integral filtering means to zero to set each of the symbol frequency components to the K sets of integrated in-phase data; and time delay difference measuring means for measuring delay time differences of the K sets of baseband phase signals to output K sets of time delay setting signals; the time delay difference measuring means having: K sets of asynchronous phase detecting means for outputting asynchronous even-number sequence synthesized symbol frequency component data and asynchronous odd-number sequence synthesized symbol frequency component data by use of each of the K sets of asynchronous received phase data sequences $Q_i$; K sets of asynchronous frequency converting means for generating an asynchronous complex direct-current component from each of the asynchronous even-number sequence synthesized symbol frequency component data and the asynchronous odd-number sequence synthesized symbol frequency component data; K sets of asynchronous symbol synthesizing means for outputting an asynchronous symbol direct-current component signal and an asynchronous symbol in-phase component signal from each of the K sets of asynchronous complex direct-current components; K sets of asynchronous integral filtering means for generating asynchronous integrated orthogonal data and asynchronous integrated in-phase data from each of the K sets of asynchronous symbol orthogonal component signals and the K sets of asynchronous symbol in-phase component signals; K sets of asynchronous phase difference calculating means for asynchronous timing phase difference data from each of the K sets of asynchronous integrated orthogonal data and the K sets of asynchronous in-phase data; K sets of asynchronous symbol frequency component calculating means for calculating each of asynchronous symbol frequency components accumulated by the K sets of asynchronous integral filtering means by use of the K sets of asynchronous integrated orthogonal data and the K sets of asynchronous integrated in-phase data; asynchronous phase subtracting means for subtracting first asynchronous timing phase difference data from the K sets of asynchronous timing phase difference data to output K sets of asynchronous phase subtracted data; asynchronous time delay difference calculating means for converting a range of the K sets of asynchronous phase subtracted data from $\pm 2\pi$ to $\pm \pi$ in radian to output the conversion result as K sets of asynchronous delay time difference data; asynchronous valid delay time difference data output means for, when the K sets of asynchronous symbol frequency component quantities all exceed a threshold value for asynchronous time delay measurement, latching the K sets of asynchronous delay time difference data as a valid value to output the latched valid value as K sets of asynchronous valid delay time difference data; and asynchronous delay difference data averaging means for accumulating each of the K sets of asynchronous valid delay time difference data by S (S being natural number 1 or higher) times and dividing the accumulation result by S to output K sets of division values as the time delay setting signal.

In carrying out the invention and according to yet further aspect thereof, there is provided a diversity communication apparatus wherein the timing recovery means comprises: K sets of phase detecting means each for outputting each piece of even-number sequence synthesized symbol frequency component data and each piece of odd-number sequence synthesized symbol frequency component data by use of each of the received phase data sequences $Y_i$; symbol frequency component totaling means for adding all of the K sets of even-number sequence symbol frequency component data to output the addition result as total even-number sequence symbol frequency component data and adding all of the K sets of odd-number sequence symbol frequency component data to output the addition result as total odd-number sequence symbol frequency component data; frequency converting means for adding a value obtained by multiplying the total even-number sequence symbol frequency component data by a complex symbol frequency component on receiving side to a value obtained by multiplying the total odd-number sequence symbol frequency component data by a value obtained by a complex symbol frequency component on receiving side delayed by $\pi/4$ in radian to generate a complex direct-current component; symbol synthesizing means for generating a symbol orthogonal component signal and a symbol in-phase component signal from the complex direct-current component; integral filtering means for generating integrated orthogonal data and integrated in-phase data by use of the symbol orthogonal component signal and the symbol integrated in-phase data; timing phase control interval setting means for outputting a signal having U (U being natural number 1 or higher) timing phase control interval setting signal; phase difference calculating means for calculating a timing phase difference between Nyquist point and receiving apparatus symbol clock by use of the synthesized integrated in-phase data and the synthesized integrated orthogonal data to output the calculated phase difference as timing phase difference data; symbol frequency component calculating means for calculating the symbol frequency component quantity accumulated by the corresponding integral filtering means by use of the integrated orthogonal data and the integrated in-phase data; phase control quantity determining means for latching the timing phase difference data in a period of the timing phase control interval setting signal to output the latched timing phase difference data as the phase control data; phase control means for dividing a receiving apparatus base oscillation clock to generate a symbol clock and an X-times oversample clock and, when the phase control data has been entered, controlling a phase of the symbol clock and a phase of the X-times oversample clock by the phase control data and, at the same time, resetting the integrated orthogonal data of the integral filtering means to zero to set the symbol frequency component to the integrated in-phase data; and time delay difference measuring means for measuring delay time differences of the K sets of baseband phase signals to output K sets of delay time setting signals.

In carrying out the invention and according to a separate aspect thereof, there is provided a diversity communication apparatus wherein the symbol frequency component totaling means comprises: even-number sequence maximum ratio synthesizing means for multiplying each of K sets of received signal powers by each of the K pieces of even-number sequence symbol frequency component data to add the results together, outputting the added value as even-number sequence total data; and odd-number sequence maximum ratio synthesizing means for multiplying each of K sets of received signal powers by each of the K pieces of odd-number sequence symbol frequency component data to add the results together, outputting the added value as odd-number sequence total data.

In carrying out the invention and according to a still separate aspect thereof, there is provided a diversity communication apparatus comprises: K sets of detecting means for converting signals received by K sets of antennas into baseband phase signals to output the same and outputting K sets of received signal powers; K sets of time delay means each for giving a delay indicated by each time delay setting signal to each baseband phase signal to output a time delay baseband phase signal; K sets of sampling means each for X-times oversampling the time delay baseband phase signal to output received phase data sequences $Y_i$ (i being natural number 2 or higher); selective synthetic diversity means for outputting, of the K sets of received phase data sequences $Y_i$, a received phase data sequence corresponding to a maximum value of K sets of received signal powers as a determination data sequence and, at the same time, outputting a number of the received phase data sequence as a select-after-detect signal; Nyquist point extracting means for extracting a Nyquist point by use of the symbol clock from the determination data sequence; and timing recovery means for generating a symbol clock and an X-times oversample clock for extracting a Nyquist point of a received signal by use of the K sets of received phase data sequences $Y_i$ and, at the same time, outputting K sets of time delay setting signals.

In carrying out the invention and according to a still separate aspect thereof, there is provided a diversity communication apparatus comprising a timing recovery apparatus, the diversity communication apparatus having: phase control accumulating means for accumulating phase control data to output the addition result as phase control accumulated data; frequency deviation eliminating means for subtracting 1 from the phase control accumulated data when a frequency deviation measurement complete signal indicates completion of measurement and an automatic frequency control signal instructing delay of a symbol clock phase comes and adding 1 to the phase control accumulated data when the frequency deviation measurement complete signal indicates completion of measurement and an automatic frequency control signal instructing lead of a symbol clock phase comes to output the subtraction value or the addition value as deviation eliminated accumulated data; and time delay setting signal output means for averaging the deviation eliminated accumulated data for every number (1 to K) indicated by a select-after-detect signal to obtain a difference between K pieces of averaged data, outputting the obtained value as K sets of time delay setting signals.

BRIEF DESCRIPTION OF THE DRAWINGS

FIG. 22 is a diagram indicating contents of phase data non-linear converting processing by the phase difference calculating section in the filtering section of FIG. 3;

FIG. 37 is a block diagram illustrating a constitution of a phase control quantity determining section in the timing recovery section of FIG. 35;

FIGS. 38(A) through 38(F) are characteristics diagrams for describing operations of the integral synthesis filtering section of FIG. 36;

FIG. 48 is a diagram for describing a relationship between data for stopping filtering operation and filtering operation stop time in the integral filtering section of FIG. 46;

FIG. 61 is a timing chart for describing an initial pull-in operation in the diversity communication apparatus of FIG. 50;

FIG. 64 is a diagram indicating an input/output relationship of a zero-cross signal synthesizing section in the phase detecting section for steady state of FIG. 53;

FIGS. 66(A) and 66(B) are timing charts for describing operations of the phase controlling section of FIG. 57 in steady state;

DETAILED DESCRIPTION OF PREFERRED EMBODIMENTS

This invention will be described in further detail by way of example with reference to the accompanying drawings.
Embodiment 1

Figure 1:
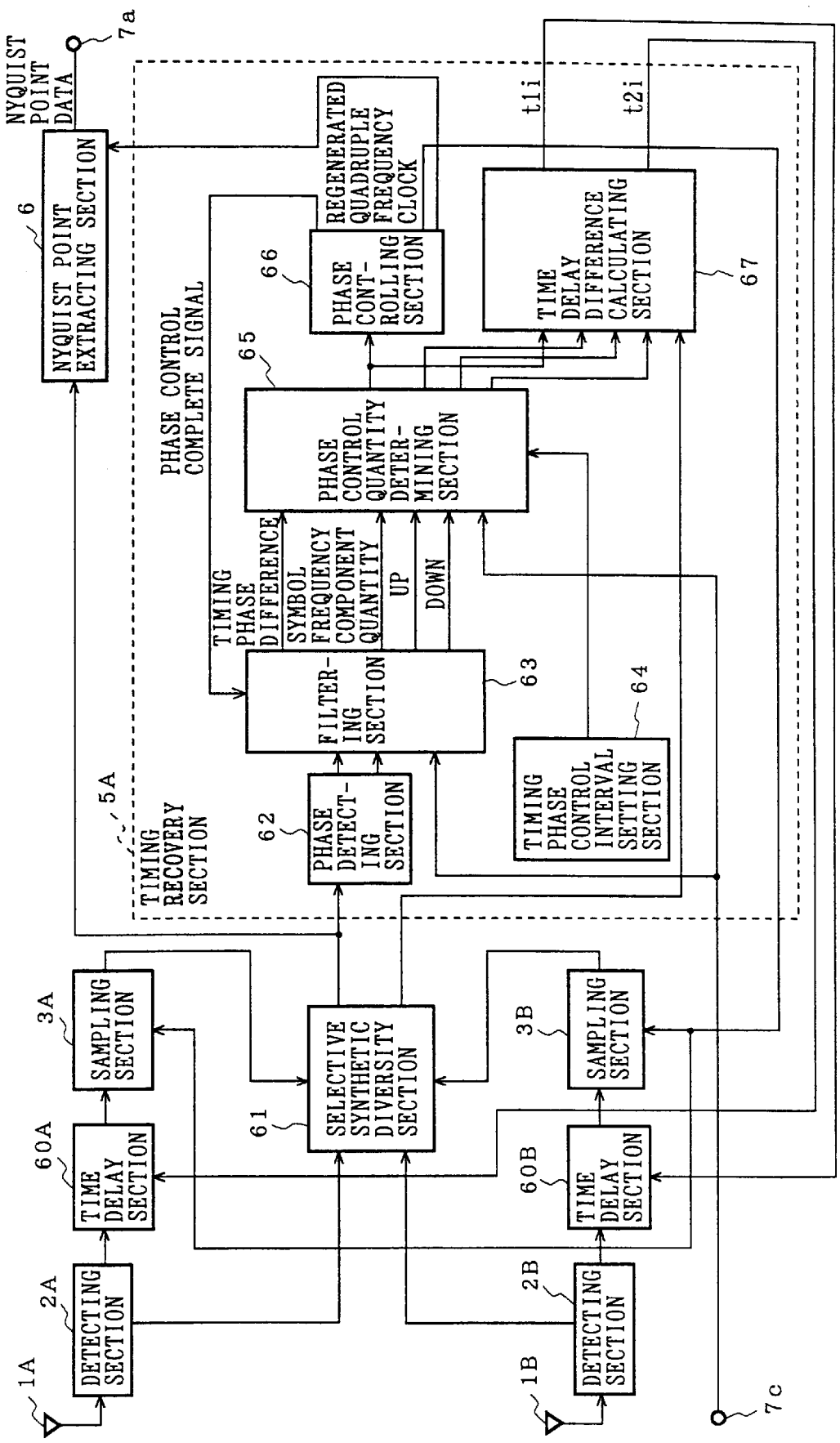
FIG. 1 is a block diagram illustrating a constitution of a diversity communication apparatus practiced as a first preferred embodiment of the present invention.
Figure 50:
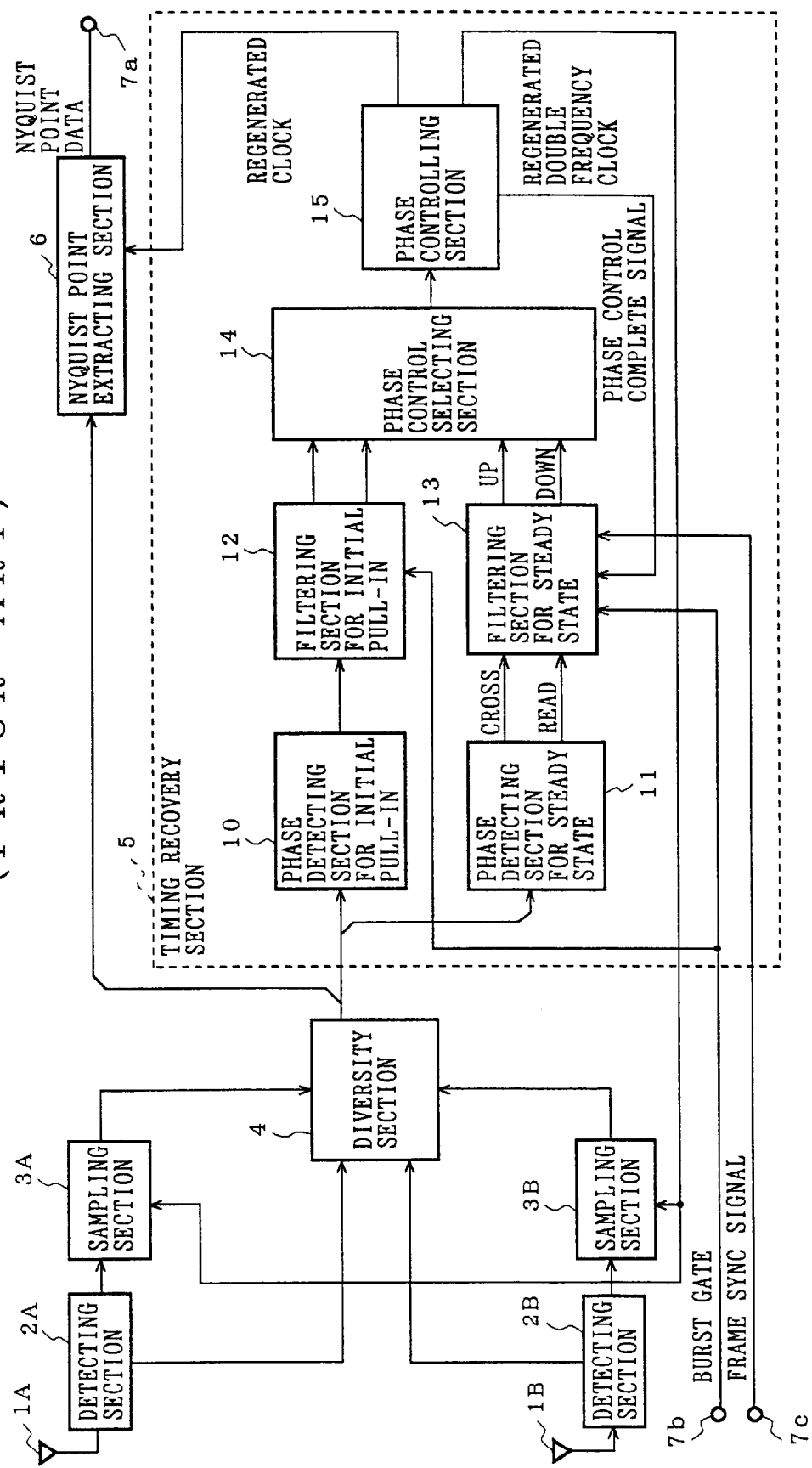
FIG. 50 is a block diagram illustrating a constitution of a prior-art diversity communication apparatus.
Figure 51:
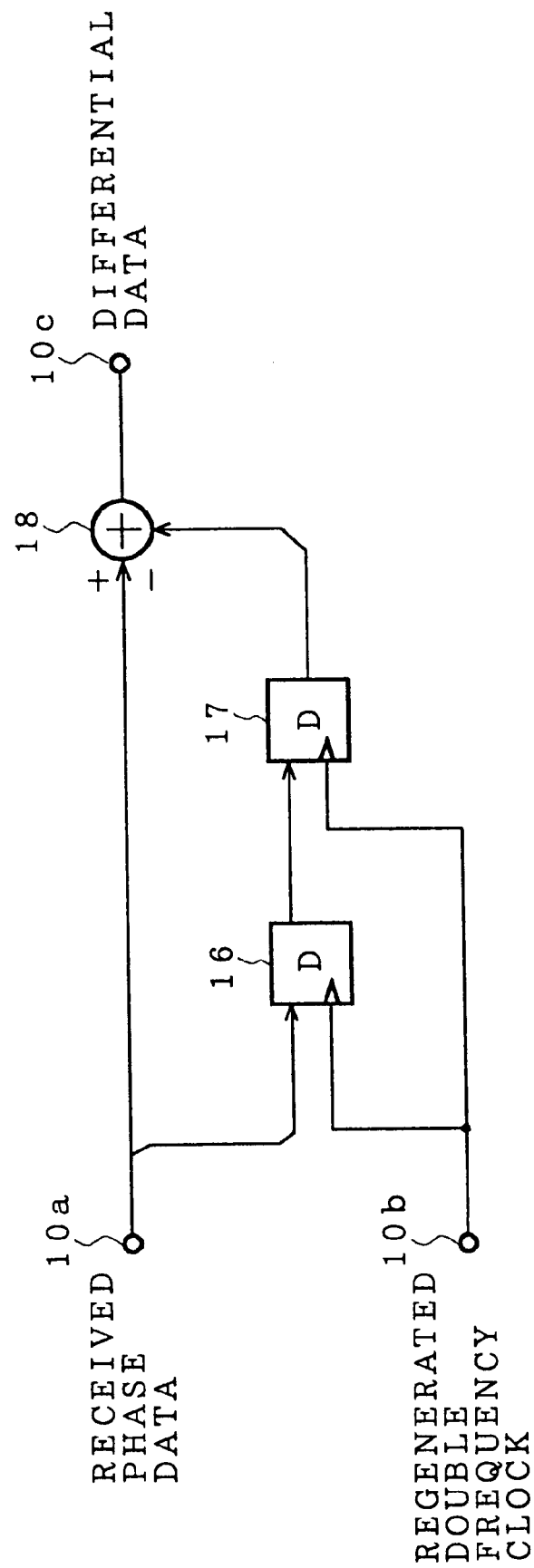
FIG. 51 is a block diagram illustrating a constitution of a phase detecting section for initial pull-in in a timing recovery section of FIG. 50.
Figure 52:
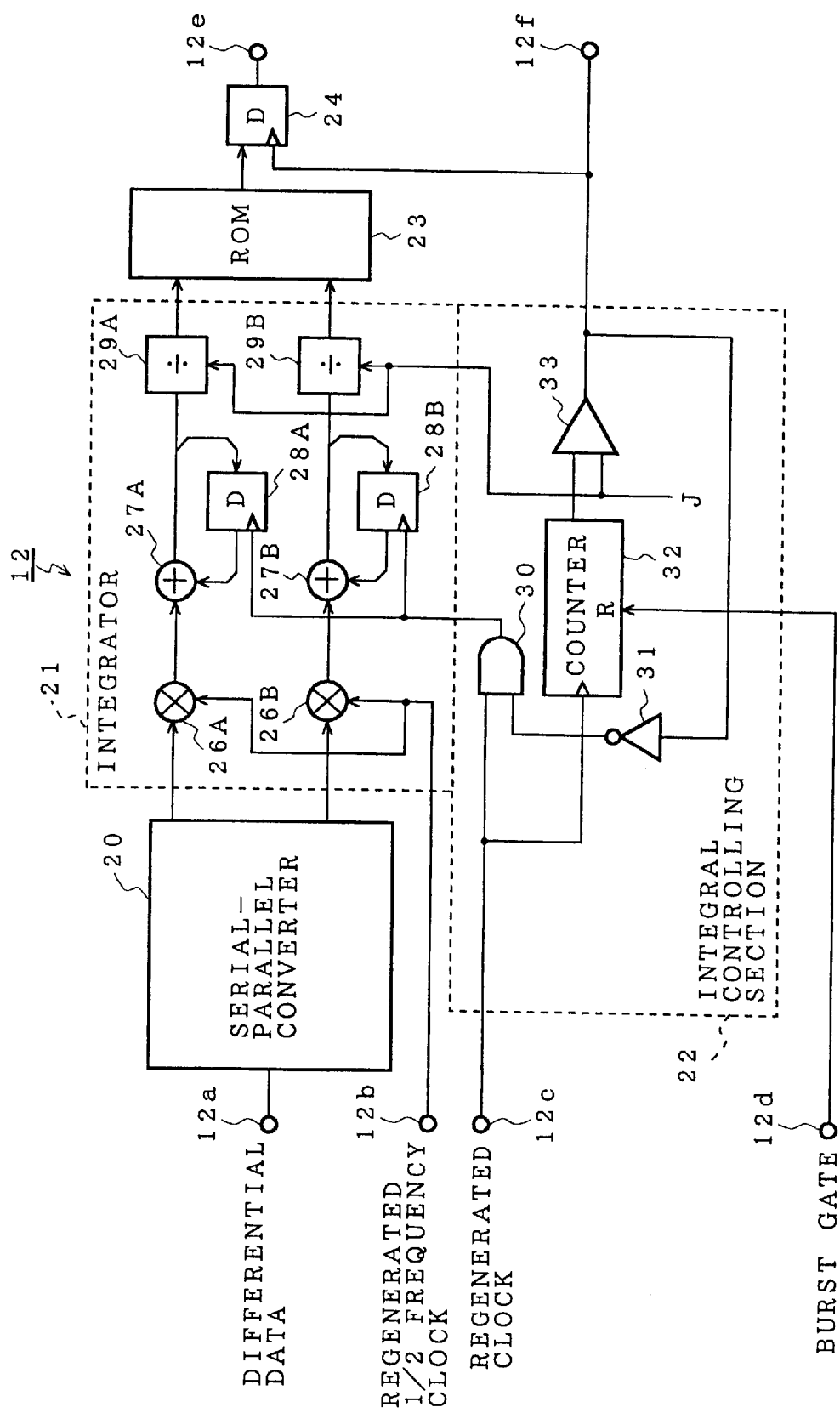
FIG. 52 is a block diagram illustrating a constitution of a filtering section for initial pull-in in the timing recovery section of FIG. 50.
Figure 53:
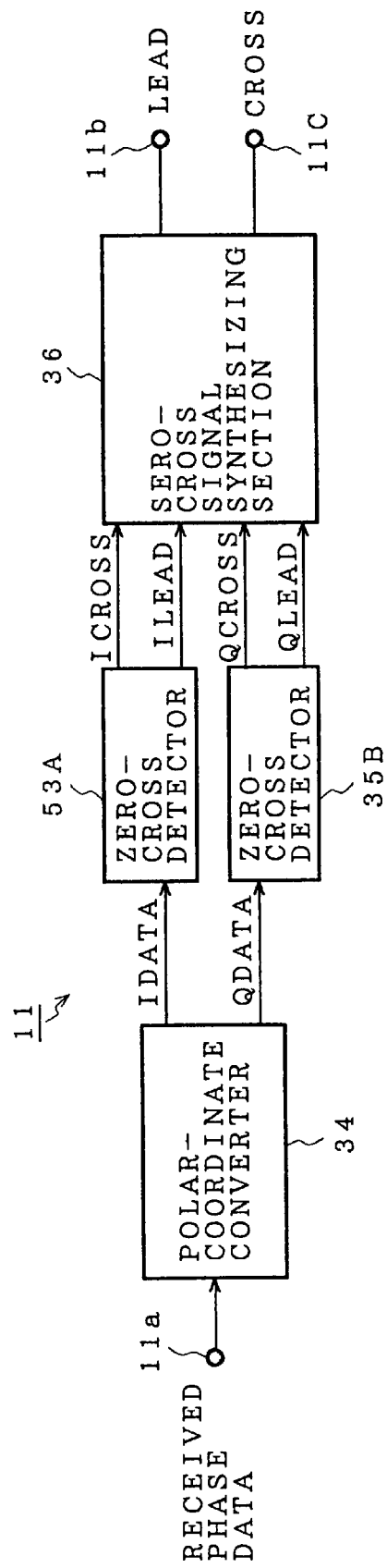
FIG. 53 is a block diagram illustrating a constitution of a phase detecting section for steady state in the timing recovery section of FIG. 50.
Figure 54:
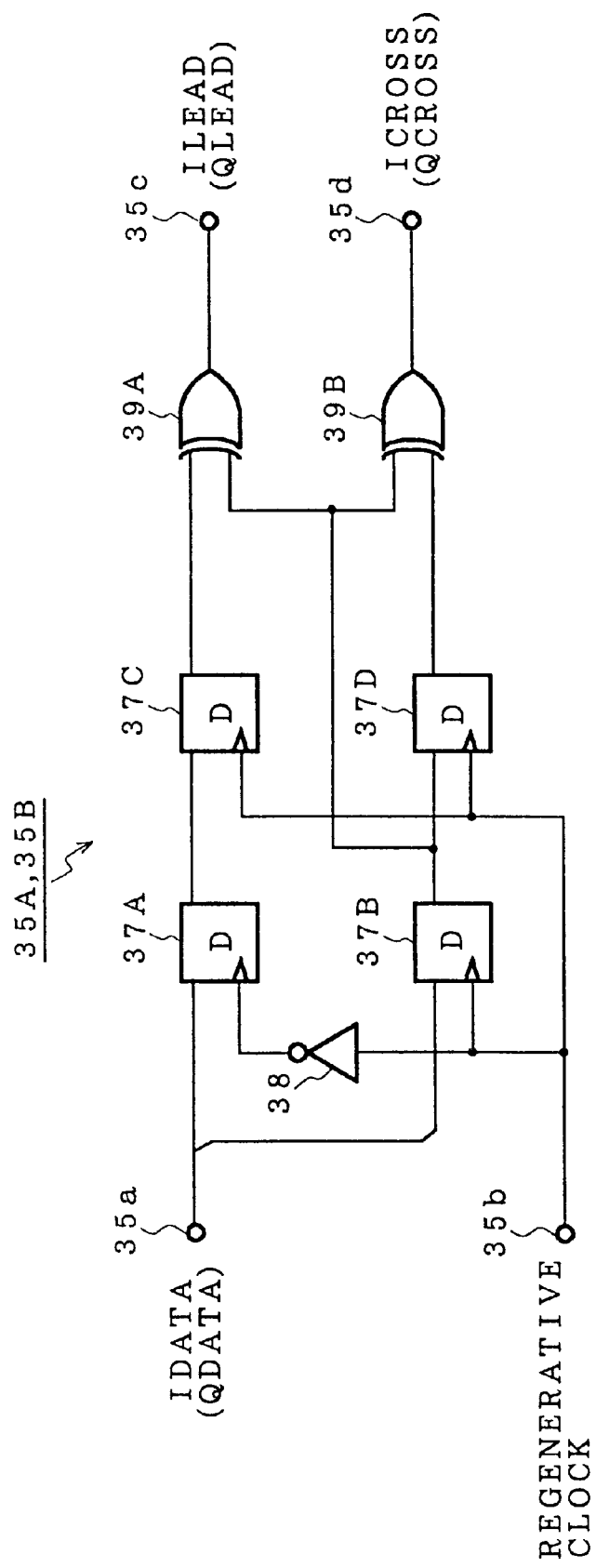
FIG. 54 is a block diagram illustrating a constitution of a zero-cross detector in the phase detecting section for steady state of FIG. 53.

The following describes a diversity communication apparatus of selective synthesis diversity that receives a signal by K=2 antennas. A timing recovery section uses oversampled baseband reception phase data modulated by $\pi/4$ shift QPSK. Referring to FIG. 1, in which components similar to those of FIG. 50 are denoted by the same reference numerals, there is shown a constitution of the diversity communication apparatus including a timing recovery section 5A practiced as the first embodiment of the present invention. In the figure, reference numerals 1A and 1B indicate antennas, 2A and 2B indicate detecting sections, 60A and 60B indicate time delay sections, 3A and 3B indicate sampling sections, 61 indicates a selective synthetic diversity section, 5A indicates a timing recovery section, 6 indicates a Nyquist point extracting section, 7a indicates a Nyquist point output terminal, 7c indicates a frame synchronization signal input terminal. In the timing recovery section 5A, reference numeral 62 indicates a phase detecting section, 63 indicates a filtering section, 64 indicates a timing phase control interval setting circuit, 65 indicates a phase control quantity determining section, 66 indicates a phase controlling section, and 67 indicates a time delay difference calculating section.

Figure 2:
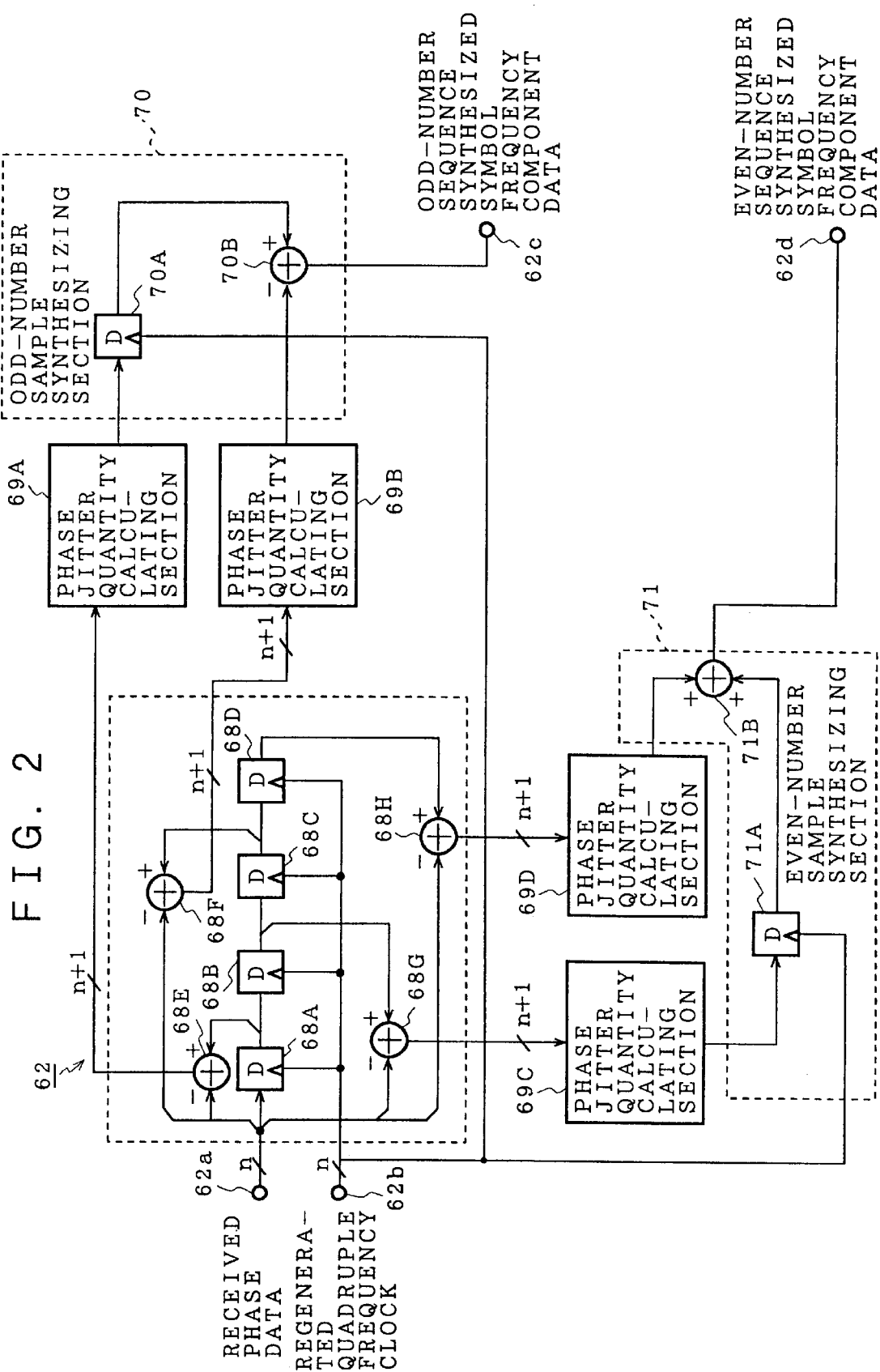
FIG. 2 is a block diagram illustrating a constitution of a phase detecting section in a timing recovery section of FIG. 1.

FIG. 2 is a block diagram illustrating a constitution of the phase detecting section 62 in the present embodiment. In the figure, reference numeral 62a indicates a received phase data input terminal, 62b indicates a regenerated quadruple frequency clock input terminal, 68A, 68B, 68C and 68D indicate registers, 68E, 68F, 68G and 68H indicate subtractors, 69A, 69B, 69C and 69D indicate phase jitter quantity calculating sections, 70 indicates an odd-number sample synthesizing section, 71 indicates an even-number sample synthesizing section, 70A and 71A indicate registers, 70B and 71B indicate adders, 62c indicates a odd-number sequence synthesized symbol frequency component data output terminal, and 62d is an even-number sequence synthesized symbol frequency component data output terminal.

Figure 3:
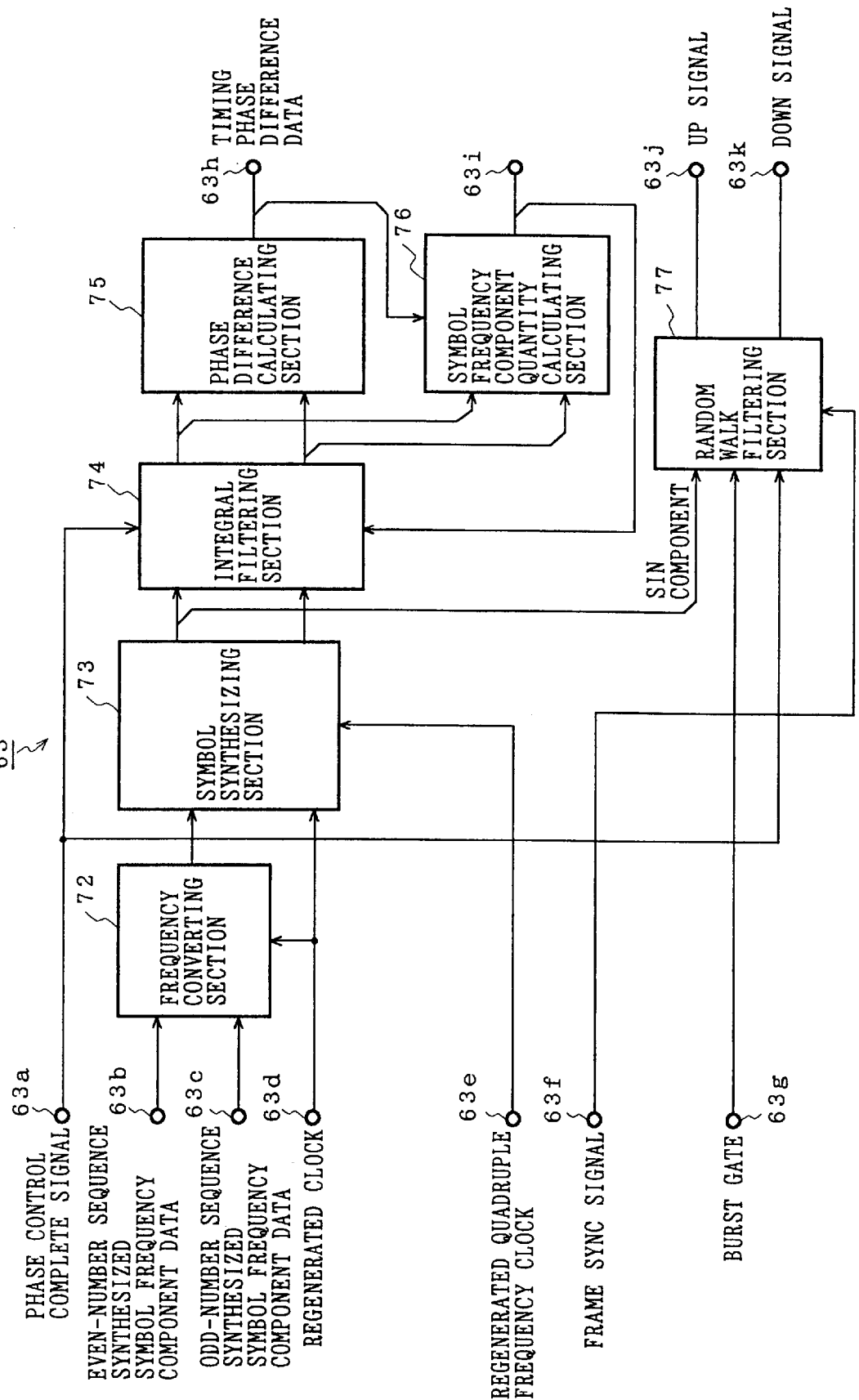
FIG. 3 is a block diagram illustrating a constitution of a filtering section in the timing recovery section of FIG. 1.

FIG. 3 shows a block diagram illustrating a constitution of the filtering section 63 of the present embodiment. In the figure, reference numeral 63a indicates a phase control complete signal input terminal, 63b indicates an even-number sequence synthesized symbol frequency component data input terminal, 63c indicates an odd-number sequence synthesized symbol frequency component data input terminal, 63d indicates a regenerated clock input terminal, 63e indicates a regenerated quadruple frequency clock input terminal, 63f indicates a frame synchronization signal input terminal, 63g indicates a burst gate input terminal, 72 indicates a frequency converting section, 73 indicates a symbol synthesizing section, 74 indicates an integral filtering section, 75 indicates a phase difference calculating section, 76 indicates a symbol frequency component quantity calculating section, 77 indicates a random walk filtering section, 63h indicates a timing phase difference data output terminal, 63i indicates a symbol frequency component quantity output terminal, 63j indicates an UP signal output terminal, and 63k indicates a DOWN signal output terminal.

Figure 4:
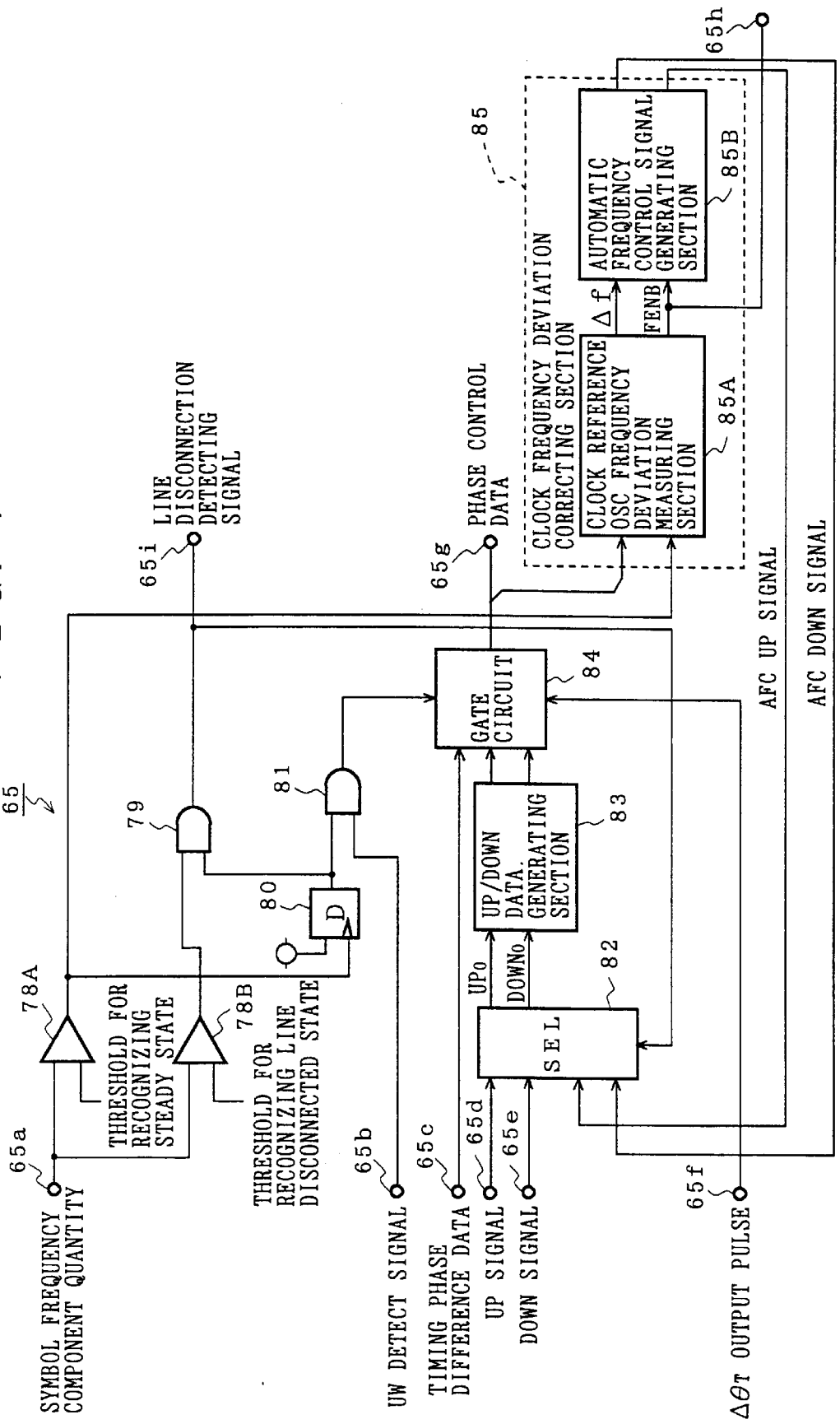
FIG. 4 is a block diagram illustrating a constitution of a phase control quantity determining section in the timing recovery section of FIG. 1.

FIG. 4 is a block diagram illustrating a constitution of the phase control quantity determining section 65 in the present embodiment using the random walk filtering section 77 as the filtering section 63. In the figure, reference numeral 65a indicates a symbol frequency component quantity input terminal, 65b indicates a frame synchronization signal input terminal, 65c indicates a timing phase difference data input terminal, 65d indicates an UP signal input terminal, 65e indicates a DOWN signal input terminal, 65f indicates a timing phase control interval setting signal input terminal, 78A and 78B indicate comparators, 79 and 81 indicate AND gates, 80 indicates a register, 82 indicates a selecting section, 83 indicates an UP/DOWN data generating section, 84 indicates a gate circuit, 85 indicates a clock frequency deviation corrector, 85A indicates a clock base oscillation frequency deviation measuring section, 85B indicates an automatic frequency control signal generating section, 65g indicates a phase control data output terminal, 65h indicates a frequency deviation measurement complete signal output terminal, and 65i indicates a line disconnection detect signal output terminal.

Figure 5:
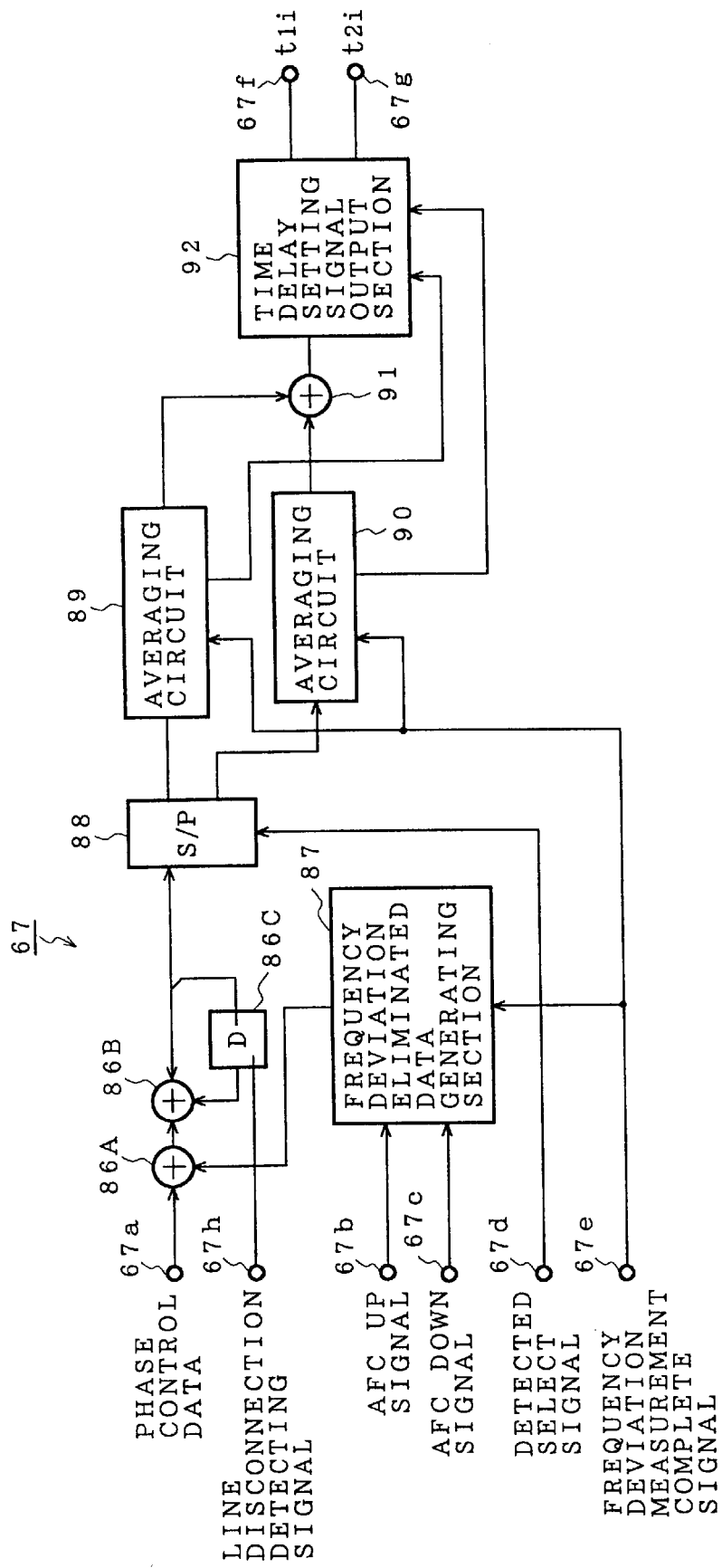
FIG. 5 is a block diagram illustrating a constitution of a time delay difference calculating section in the timing recovery sec on of FIG. 1.

FIG. 5 shows a block diagram illustrating a constitution of the time delay difference calculating section 67 in the present embodiment. In the figure, reference numeral 67a indicates a phase control data input terminal, 67b indicates an AFC UP signal input terminal, 67c indicates an AFC DOWN signal input terminal, 67d indicates a detected select signal input terminal, 67e indicates a frequency deviation measurement complete signal input terminal, 67h indicates a line disconnection detect signal input terminal, 86A and 86B indicate adders, 86C indicates a register, 87 indicates a frequency deviation eliminate data generating section, 88 indicates a serial-parallel converting section, 89 and 90 indicate averaging circuits, 91 indicates an adder, 92 indicates a time delay setting signal output section, 67f indicates a first time delay setting signal output terminal, and 67g indicates a second time delay setting signal output terminal.

Figure 6:
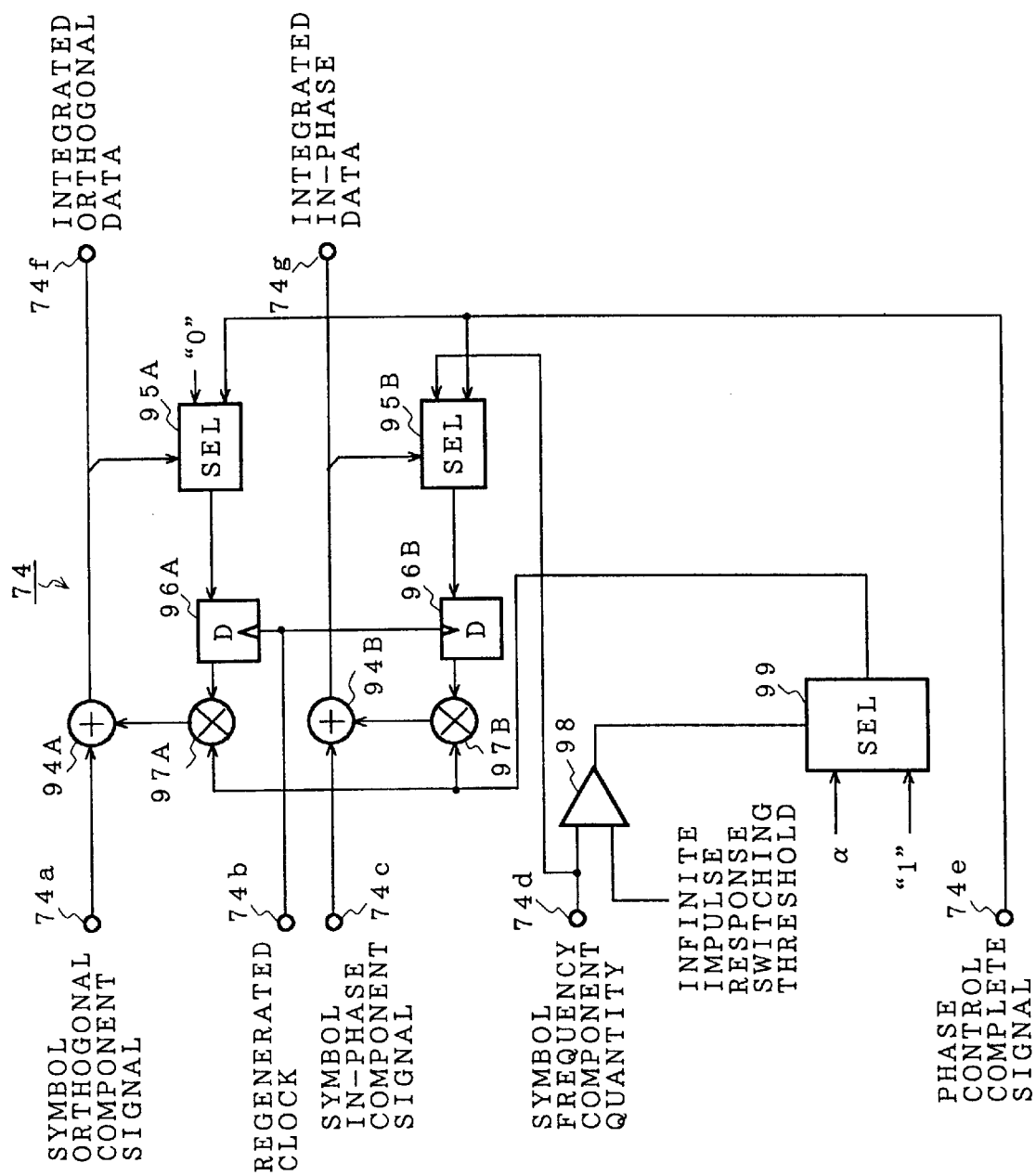
FIG. 6 is a block diagram illustrating a constitution of an integral filtering section in the filtering section of FIG. 3.

FIG. 6 shows a block diagram illustrating a constitution of the integral filtering section 74 for use in the filtering section 63 of FIG. 3. In the figure, reference numeral 74a indicates a symbol orthogonal component signal input terminal, 74b indicates a regenerated clock input terminal, 74c indicates a symbol in-phase component signal input terminal, 74d indicates a symbol frequency component quantity input terminal, 74e indicates a phase control complete signal input terminal, 94A and 94B indicate adders, 97A and 97B indicate multipliers, 96A and 96B indicate registers, 95A and 95B indicate selecting sections, 98 indicates a comparator, 99 indicates a selecting section, 74f indicates an integrated orthogonal data output terminal, and 74g indicates an integrated in-phase data output terminal.

Figure 7:
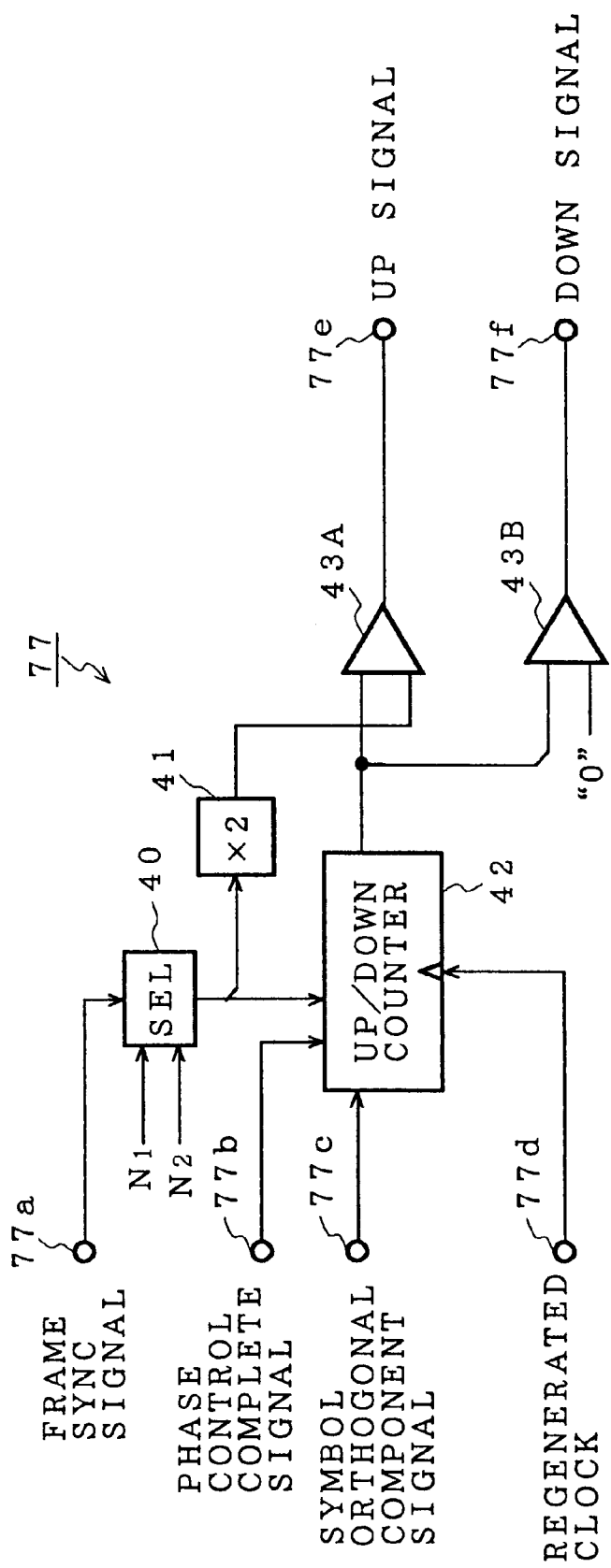
FIG. 7 is a block diagram illustrating a constitution of a random walk filtering section in the filtering section of FIG. 3.
Figure 55:
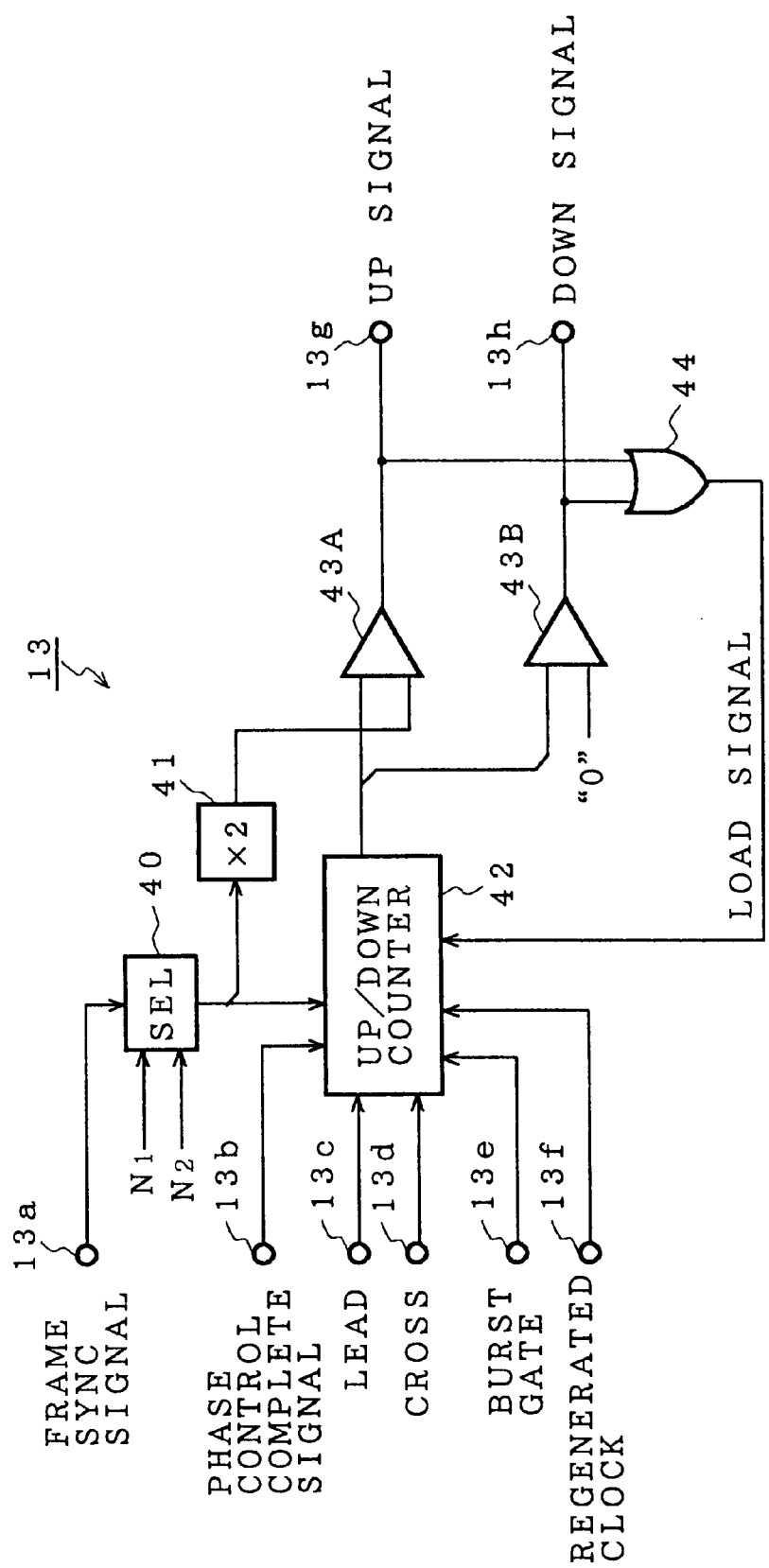
FIG. 55 is a block diagram illustrating a constitution of the filtering section for steady state in the timing recovery section FIG. 50.
Figure 56:
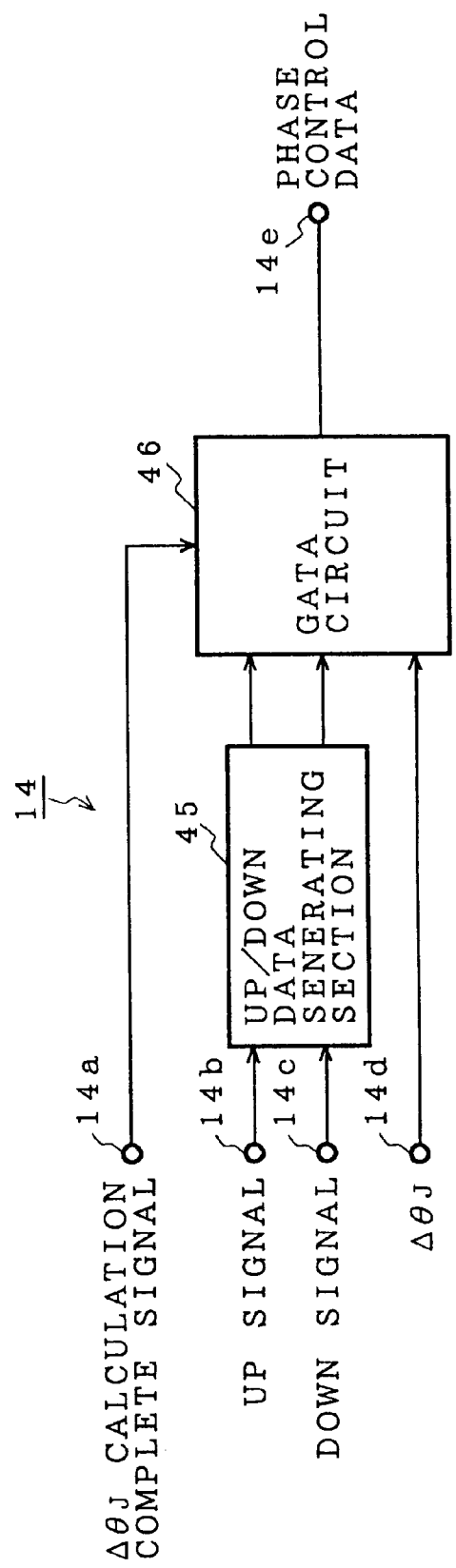
FIG. 56 is a block diagram illustrating a constitution of a phase control selecting section in the timing recovery section of FIG. 50.
Figure 57:
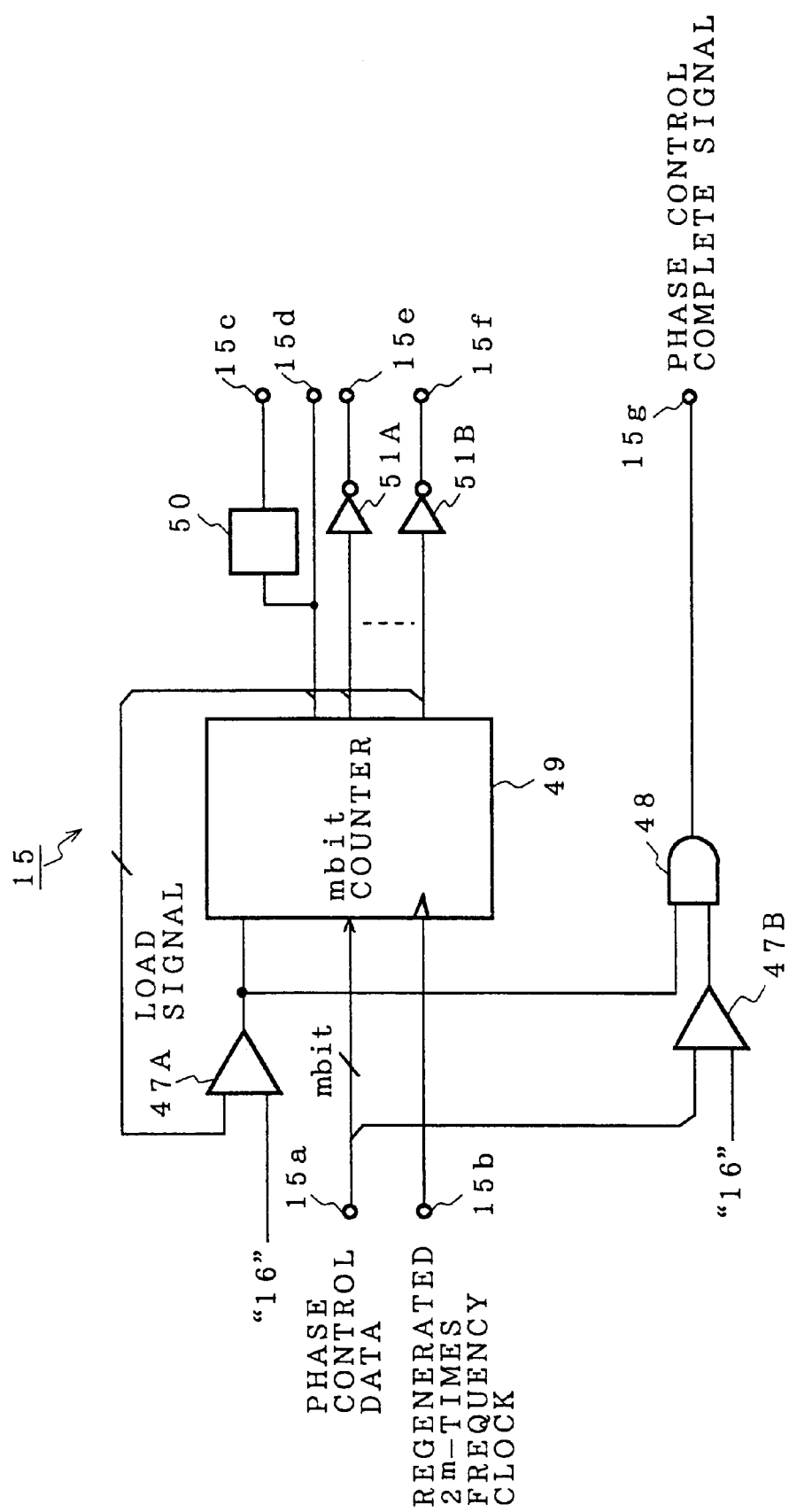
FIG. 57 is a block diagram illustrating a constitution of a phase controlling section in the timing recovery section of FIG. 50.

FIG. 7 shows a block diagram illustrating a constitution of the random walk filtering section 77 for use in the filtering section of FIG. 3. In the figure, the components similar to those of FIG. 55 are denoted by the same reference numerals. Reference numeral 77a indicates a frame synchronization signal input terminal, 77b indicates a phase control complete signal input terminal, 77e indicates an UP signal output terminal, and 77f indicates a DOWN signal output terminal.

Figure 8:
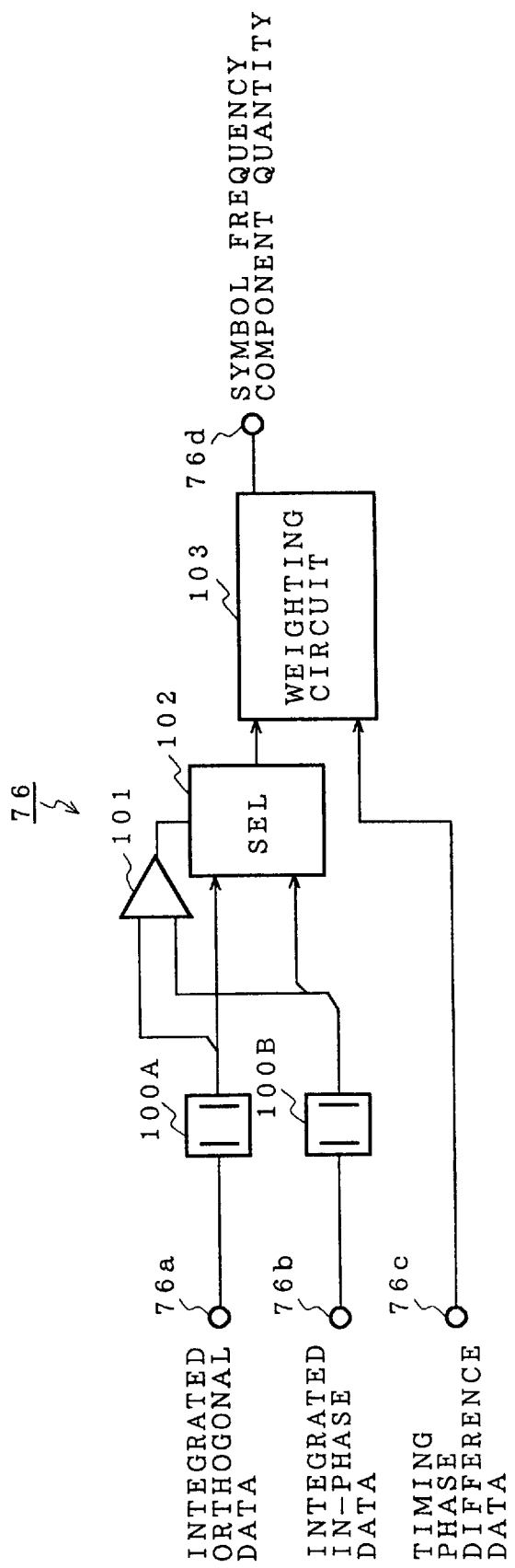
FIG. 8 is a block diagram illustrating a constitution of a symbol frequency component quantity calculating section in the filtering section of FIG. 3.

FIG. 8 shows a block diagram illustrating a constitution of the symbol frequency component quantity calculating section 76 for use in the filtering section of FIG. 3. In the figure, reference numeral 76a indicates an integrated orthogonal data input terminal, 76b indicates an integrated in-phase data input terminal, 76c indicates a timing phase difference data input terminal, 100A and 100B indicate absolute value converting sections, 101 indicates a comparator, 102 indicates a selecting section, 103 indicates a weighting circuit, and 76d indicates a symbol frequency component quantity output terminal.

Figure 9:
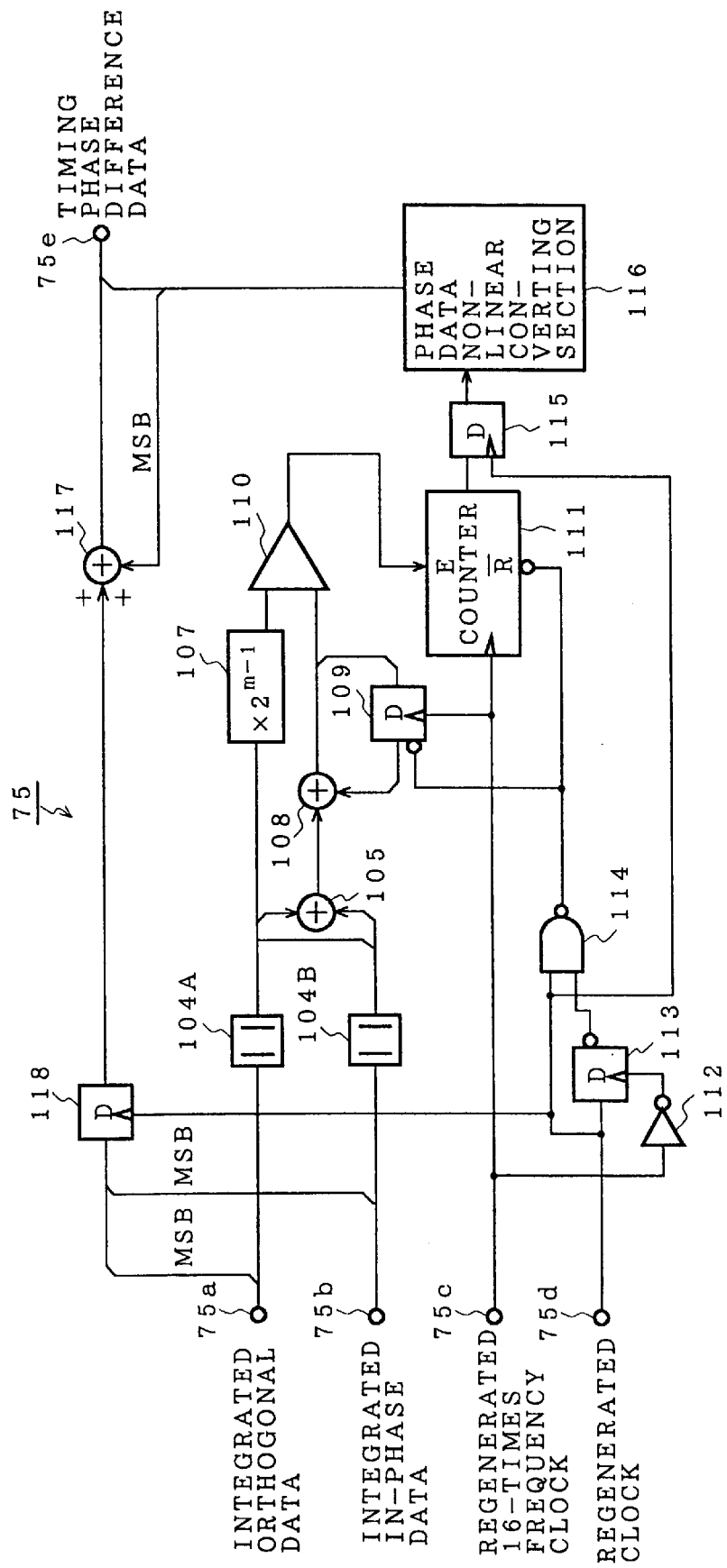
FIG. 9 is a block diagram illustrating a constitution of a phase difference calculating section in the filtering section of FIG. 3.
Figure 10:
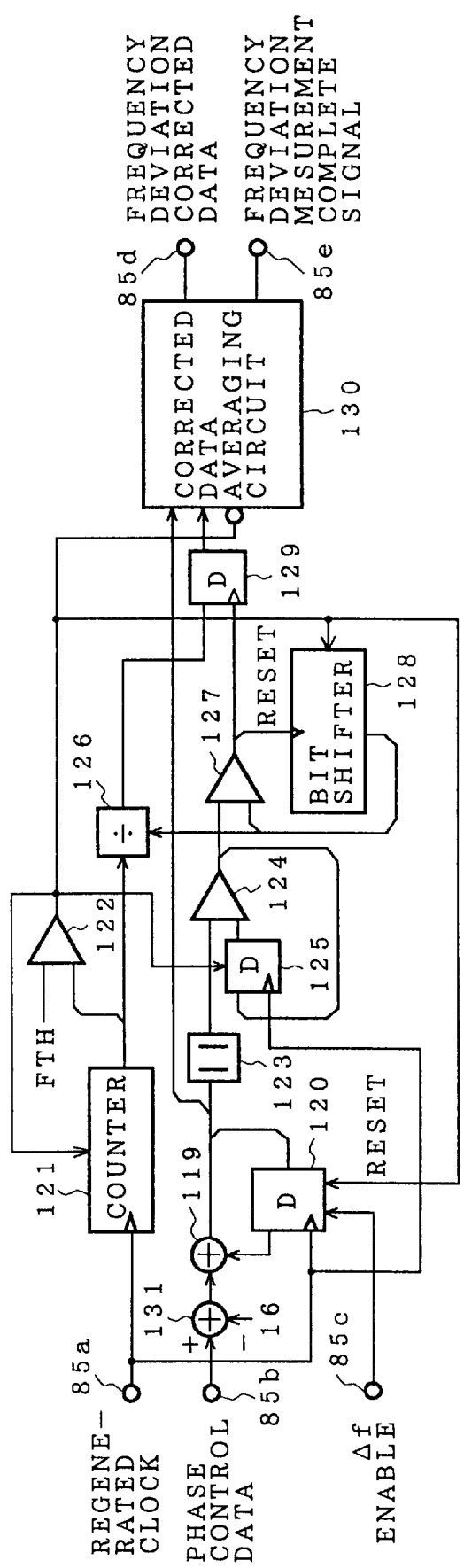
FIG. 10 is a block diagram illustrating a constitution of a clock base oscillation frequency deviation measuring section in the phase control quantity determining section of FIG. 4.

FIG. 9 shows a block diagram illustrating a constitution of the phase difference calculating section 75 for use in the filtering section of FIG. 3. In the figure, reference numeral 75a indicates an integral orthogonal data input terminal, 75b indicates antegral in-phase data input terminal, 75c indicates a regenerated 16-times frequency clock input terminal, 75d indicates a regenerated clock input terminal, 104A and 104B indicate absolute value converters, 105, 108 and 117 indicate adders, 109, 113, 115 and 118 indicates registers, 107 indicate a 4-bit shifter, 110 indicates a comparator, 111 indicates an UP counter, 112 indicates an inverter, 114 indicates a NAND gate, 116 indicates a phase data nonlinear converting section, and 75c indicates a timing phase difference data output terminal. FIG. 10 shows a block diagram illustrating a constitution of the clock base oscillation frequency deviation measuring section 85A for use in the phase control quantity determining section 65 of FIG. 4. In the figure, reference numeral 85a indicates a regenerated clock input terminal, 85b indicates a phase control data input terminal, 85c indicates a $\Delta f$ enable signal input terminal, 119 and 131 indicate adders, 120, 125 and 129 indicate registers, 121 indicates an UP counter, 122 and 124 indicate comparators, 123 indicates an absolute value converting section, 126 indicates a divider, 128 indicates a bit shifter, 130 indicates a corrected data averaging circuit, 85d indicates a frequency deviation corrected data output terminal, and 85e indicates a frequency deviation measurement complete signal output terminal.

Figure 11:
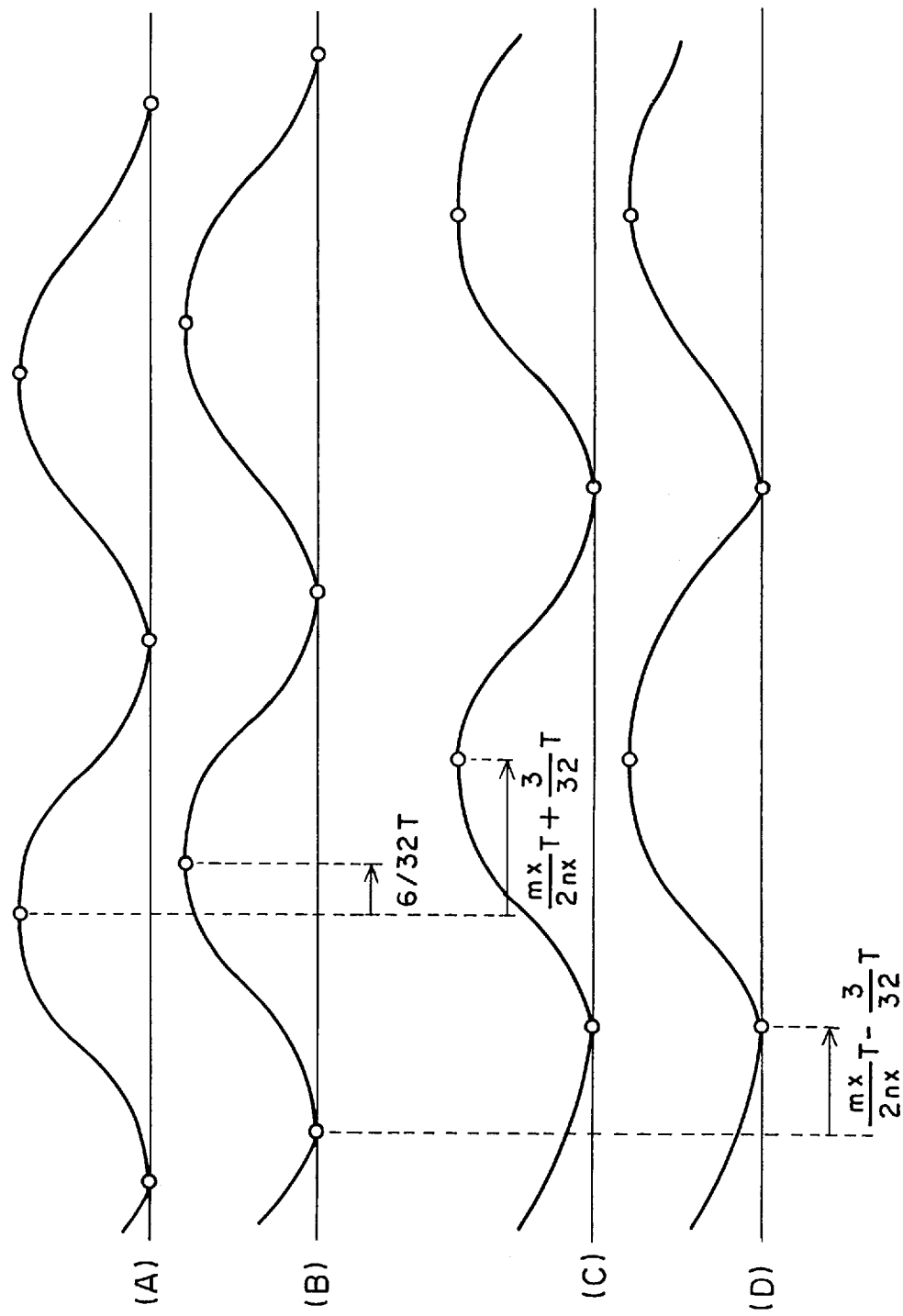
FIG. 11 is a timing chart for describing operations of the diversity communication apparatus of FIG. 1.
Figure 58:
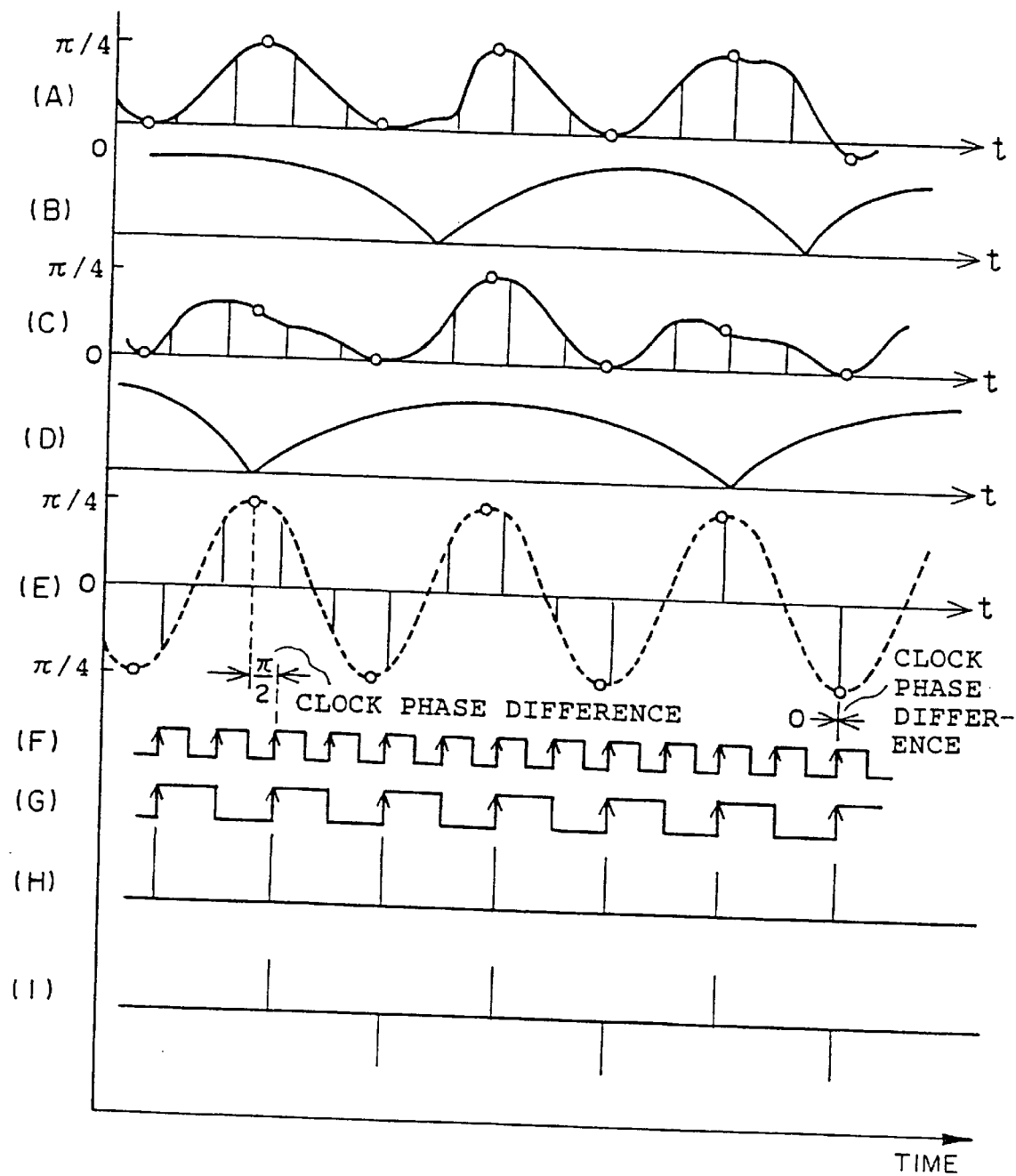
FIG. 58 is a timing chart for describing operations of the diversity communication apparatus of FIG. 50.
Figure 59:
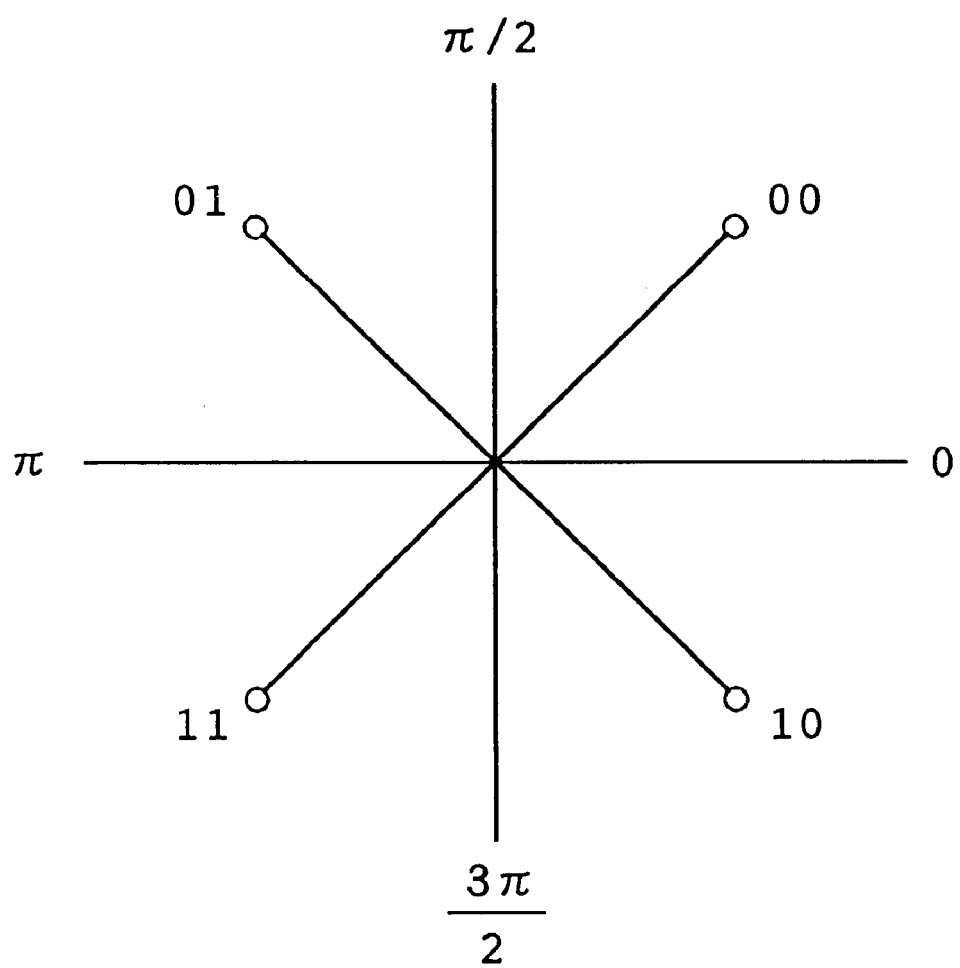
FIG. 59 is a diagram for describing a mapping of transmission data in the diversity communication apparatus of FIG. 50.
Figure 60:
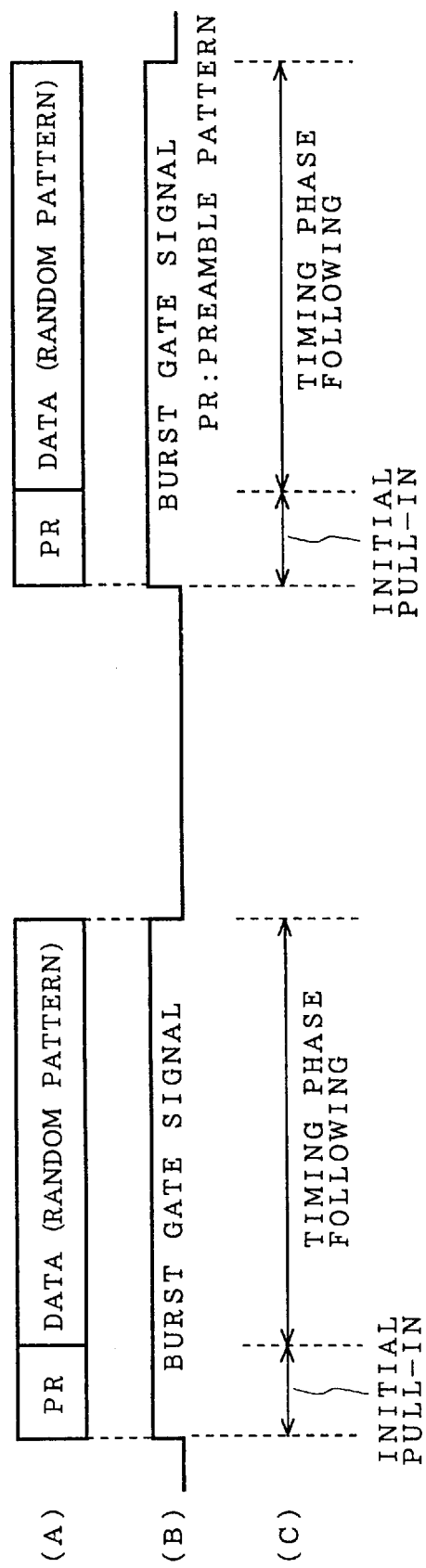
FIG. 60 is a diagram for describing a burst format of transmission data in the diversity communication apparatus of FIG. 50.
Figure 62:
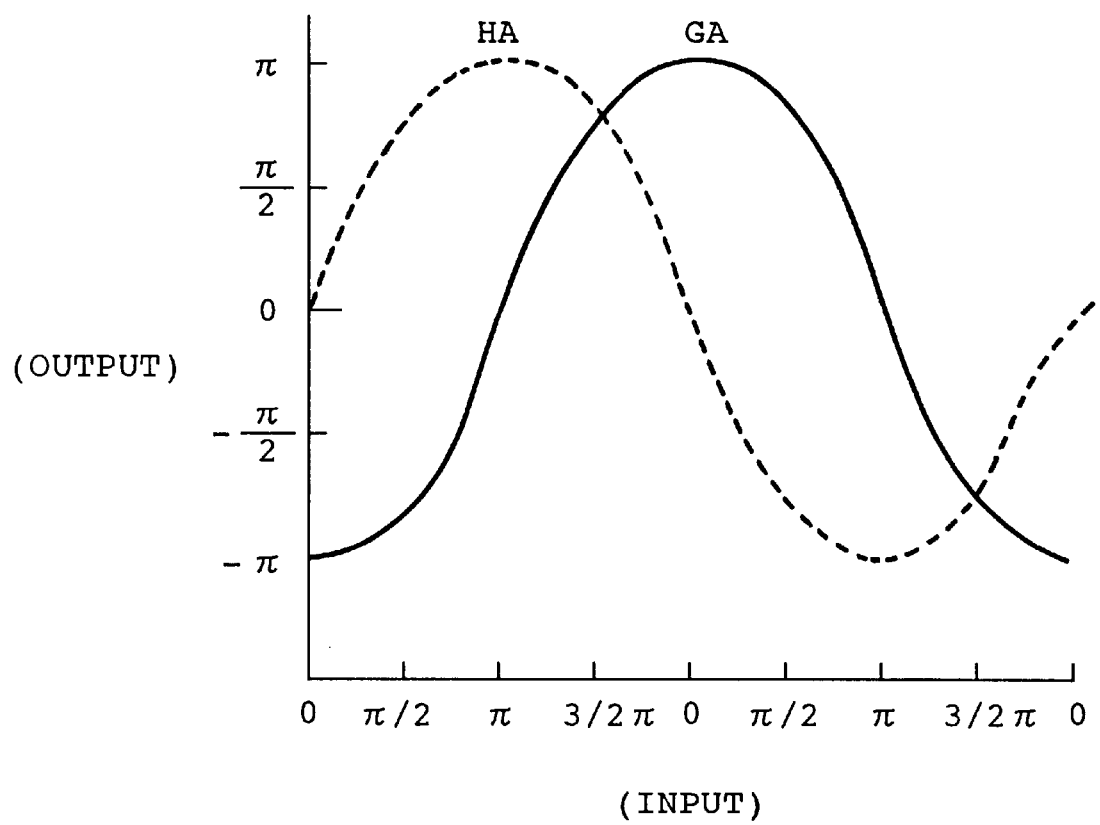
FIG. 62 is a diagram indicating data in a ROM in the filtering section for initial pull-in of FIG. 51.
Figure 63:
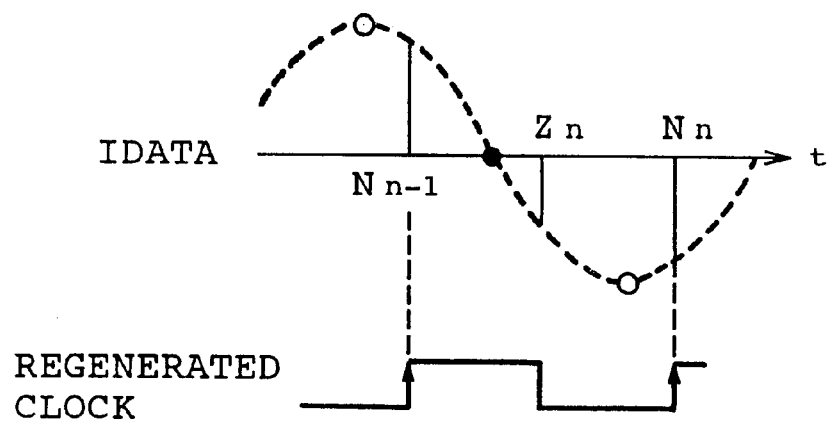
FIGS. 63(A) and 63(B) are diagrams for describing operations of the zero-cross detector in the phase detecting section for steady state of FIG. 53.
Figure 63:
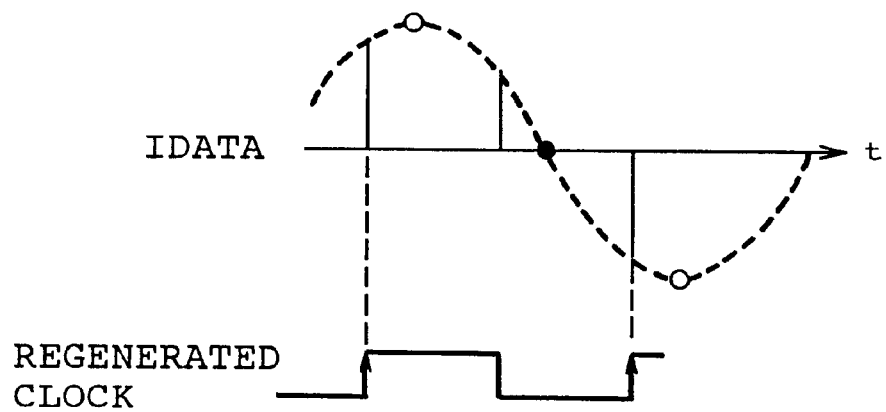

Operations of the diversity communication apparatus of the present embodiment will be described. First, an overall operation will be described. Like the conventional diversity communication apparatus, the detecting section 2A detects a carrier signal entered from the antenna 1A and passed through limiter to output a baseband reception phase signal. The detecting section 2B detects a carrier signal entered from the antenna 1B and passed through limiter to output a baseband reception phase signal. It is assumed here that a delay time difference between the detecting section 2A and the detecting section 2B be a 6/32-symbol time as shown in FIG. 11. It should be noted that each baseband reception phase signal is obtained, as with the conventional example of FIG. 58, by performing $\pi/4$ shift QPSK modulation on a data pattern that repeats "00" and "10".

The time delay sections 60A and 60B are each composed of 1 to mx shift registers to sample the baseband reception signals coming from the detecting sections 2A and 2B at an fixed nx-time frequency clock sufficiently faster than the symbol frequency. The sampled data are entered in the shift registers to be outputted as delayed by the time equivalent to the number of shift registers that the data have passed. When time delay has been calculated, the time delay sections 60A and 60B each set the number of shift registers to 1 to mx registers according to the values of time delay setting signals $t1_i$ and $t1_j$. However, until the time delay is calculated, the number of shift registers is set to mx/2. In the time delay setting circuit operating on the fixed nx-time frequency clock, the relationship between time delay setting signal $t_i$ and the shift register count setting value $n_i$ is expressed in the following equation:

$$m_i = t_i \times nx/32 + (mx/2) \qquad (4)$$

The sampling sections 3A and 3B oversample the nx-time asynchronous data outputted from the time delay sections 60A and 60B at a frequency four times as high as the symbol frequency to generate baseband reception phase data. Resolution of the generated baseband reception phase data is 5 bits like that of the baseband reception phase data used in the conventional apparatus. The selective synthetic diversity section 61 selects baseband reception phase data outputted from the sampling section 3A or 3B corresponding to the detecting section 2A or 2B that outputted a higher received signal power. In addition, the selective synthetic diversity section 61 outputs a signal that indicates the selected branch as a selection signal.

The timing recovery section 5A uses the baseband reception phase data outputted from the selective synthetic diversity section 61 to perform timing regeneration. The timing recovery section 5A also controls the quadruple clock phase such that the sampling sections 3A and 3B sample the baseband reception phase data at a Nyquist point position. Further, the timing recovery section 5A generates a regenerated clock for extracting Nyquist point data from the baseband reception phase data outputted from the selective synthetic diversity section 61. In addition, the timing recovery section 5A calculates the signal delay time difference between the detecting sections 2A and 2B to output the time delay setting signals $t1_i$ and $t2_i$ for absorbing the delay time difference.

In the above-mentioned example, the delay time difference between the delays times of the signals in the detecting section 2A and the detecting section 2B is 6/32-symbol time, so that, if $t1_i=-3$ and $t2_i=3$ are outputted, the delay time difference is absorbed. Namely, if $t1_i=-3$, the time delay section 2A sets the number of shift registers according to the formula (4) such that the delay time (mx/2n×symbol time) derived from the initial number of shift registers mx/2 is shortened by the 3/32-symbol time.

The above-mentioned control of the time delay sections 60A and 60B makes the signal delay time difference between the time delay sections 60A and 60B equal to −6/32 symbol. As a result, as shown in FIG. 11, the difference between the delay time of the signal that passed the detecting section 2A and the time delay section 60A and the delay time of the signal that passed the detecting section 2A and the time delay section 60B becomes 6/32−6/32=0. Like the Nyquist point extracting section in the conventional apparatus, the Nyquist point extracting section 6 extracts Nyquist point data from the baseband reception phase data outputted from the selective synthesis diversity section 61 and outputs the extracted Nyquist point data.

The following describes operations of the timing recovery section 5A. The received phase data quadruple-oversampled are entered in the phase detecting section 62. In the phase detecting section 62 of FIG. 2, the received phase data entered from the input terminal 62a are re-timed by the regenerated quadruple frequency clock coming from the registers 68A, 68B, 68C, 68D, and the input terminal 62D. The subtractor 68E subtracts the input of the register 68A from the output of the register 68A to output one sample differential data sequence. The subtractor 68F subtracts the input of the register 68A from the output of the register 68C to output three sample differential data sequence.

The subtractor 68G subtracts the input of the register 68A from the output of the register 68B to output two sample differential data sequence. The subtracter 68H subtracts the input of the register 68A from the output of the register 68D to output four sample differential data sequence. The one sample differential data sequence, two sample differential data sequence, three sample differential data sequence, and four sample differential data sequence are converted by the phase jitter quantity calculating sections 69A through 69D respectively in the quantities of the received phase data to waveforms represented along the time axis in a range of 0 to (. If differential data sequence $X_i$ is represented in x bits ($-2^{x-1} \leq X_i \leq 2^{x-1}-1$), then the phase jitter data sequence $Y_i$ after conversion are obtained from the following relation if $-2^{x-2} \leq X_i \leq 2^{x-2}$:

$$Y_i = |X_i| \quad (5)$$

If $-2^{x-2}X_i$ or $2^{x-2}$, then $Y_i$ is obtained from the following:

$$Y_i = 2^{x-1} - |X_i| \quad (6)$$

Figures 12, 13:
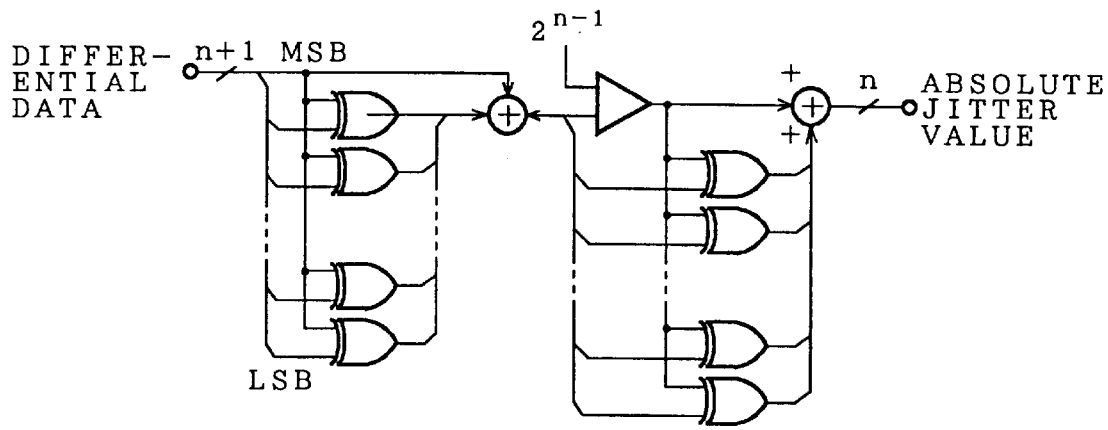
FIG. 12 is a block diagram illustrating a phase jitter quantity calculating section in the phase detecting section of FIG. 2.
FIG. 13 is a diagram for describing a rule of conversion processing performed by a part of the phase jitter quantity calculating section of FIG. 12.

Each of the phase jitter quantity calculating sections 69A through 69D is implemented by a simple circuit composed of exclusive OR gates, a comparator and adders as shown in FIG. 12. If the number of bits of each sample differential data sequence is 4, then each of the phase jitter quantity calculating sections 69A through 69D performs conversion processing according to the conversion rule as shown in FIG. 13 to output each phase jitter data sequence.

The phase jitter data sequence outputted from the phase jitter quantity calculating section 69C in which the two sample differential data sequence is entered is delayed by the register 71 by a time equivalent to one sample to be added by the adder 71B to the phase jitter data sequence outputted from the phase jitter quantity calculating section 69D in which the four sample differential data sequence is entered. The result of this addition is outputted from the output terminal 62d as even-number sequence synthesized symbol frequency component data. The phase jitter data sequence outputted from the phase jitter quantity calculating section 69A in which the one sample differential data sequence is entered is delayed by the register 70A by a time equivalent to one sample to be added by the adder 70B to the phase jitter data sequence outputted from the phase jitter quantity calculating section 69B in which the three sample differential data sequence is entered. The result of this addition is outputted from the output terminal 62c as odd-number sequence synthesized symbol, frequency component data.

Figure 14:
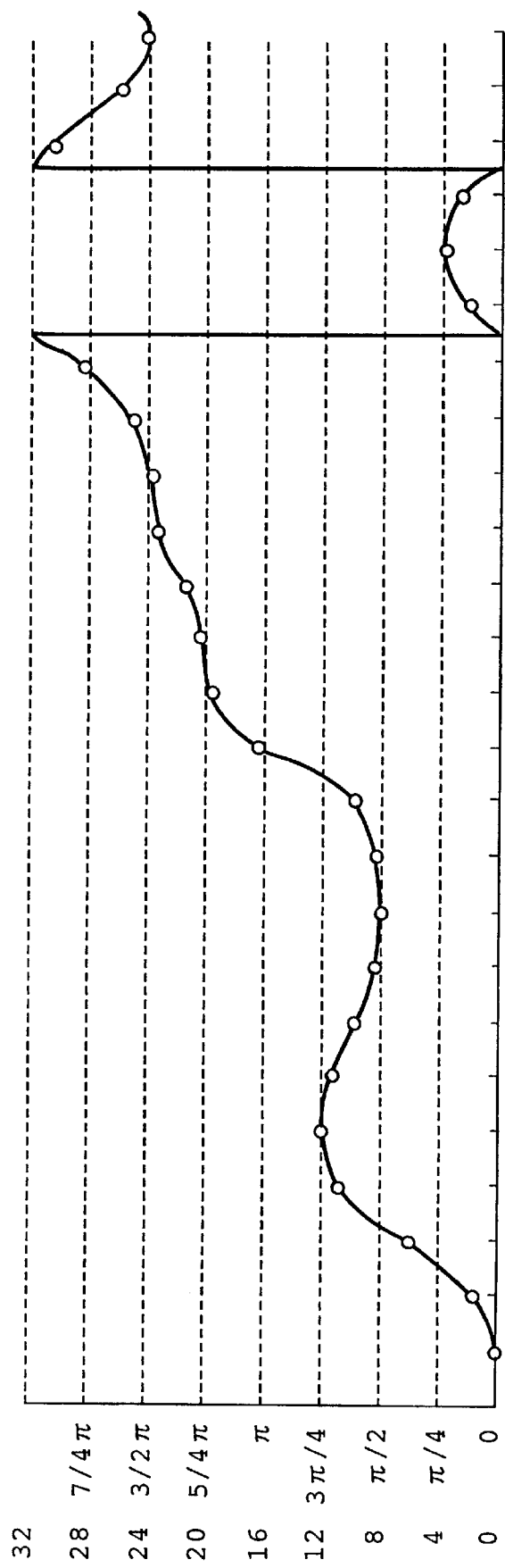
FIG. 14 is a timing chart for describing operations of the phase detecting section of FIG. 2.
Figure 15:
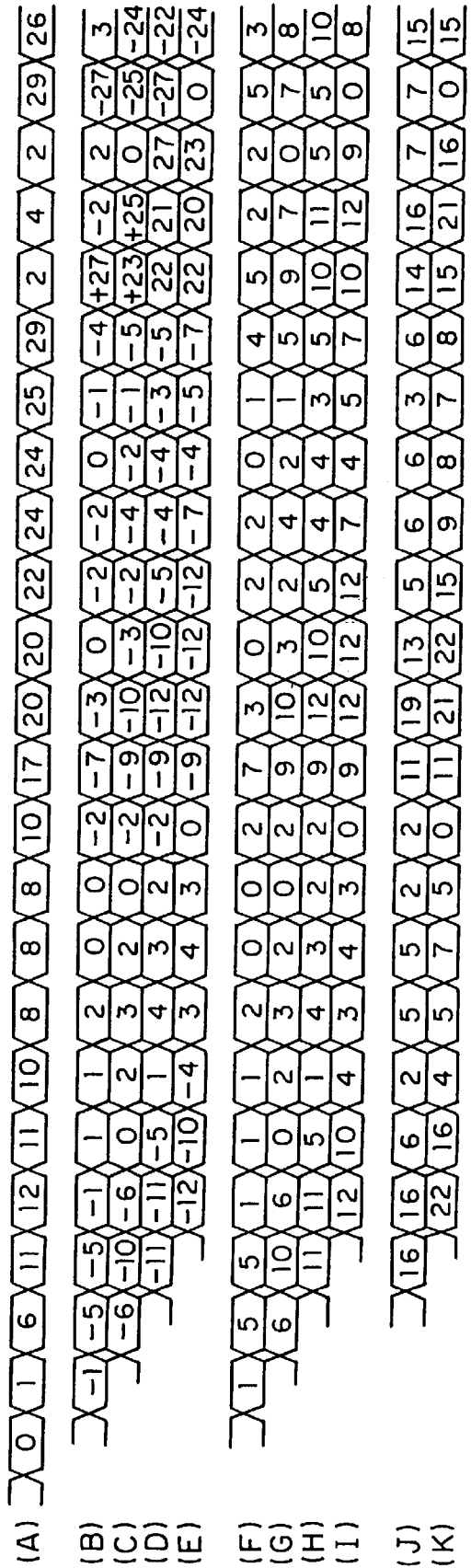
FIG. 15 is a another timing chart for describing operations of the phase detecting section of FIG. 2.
Figure 16:
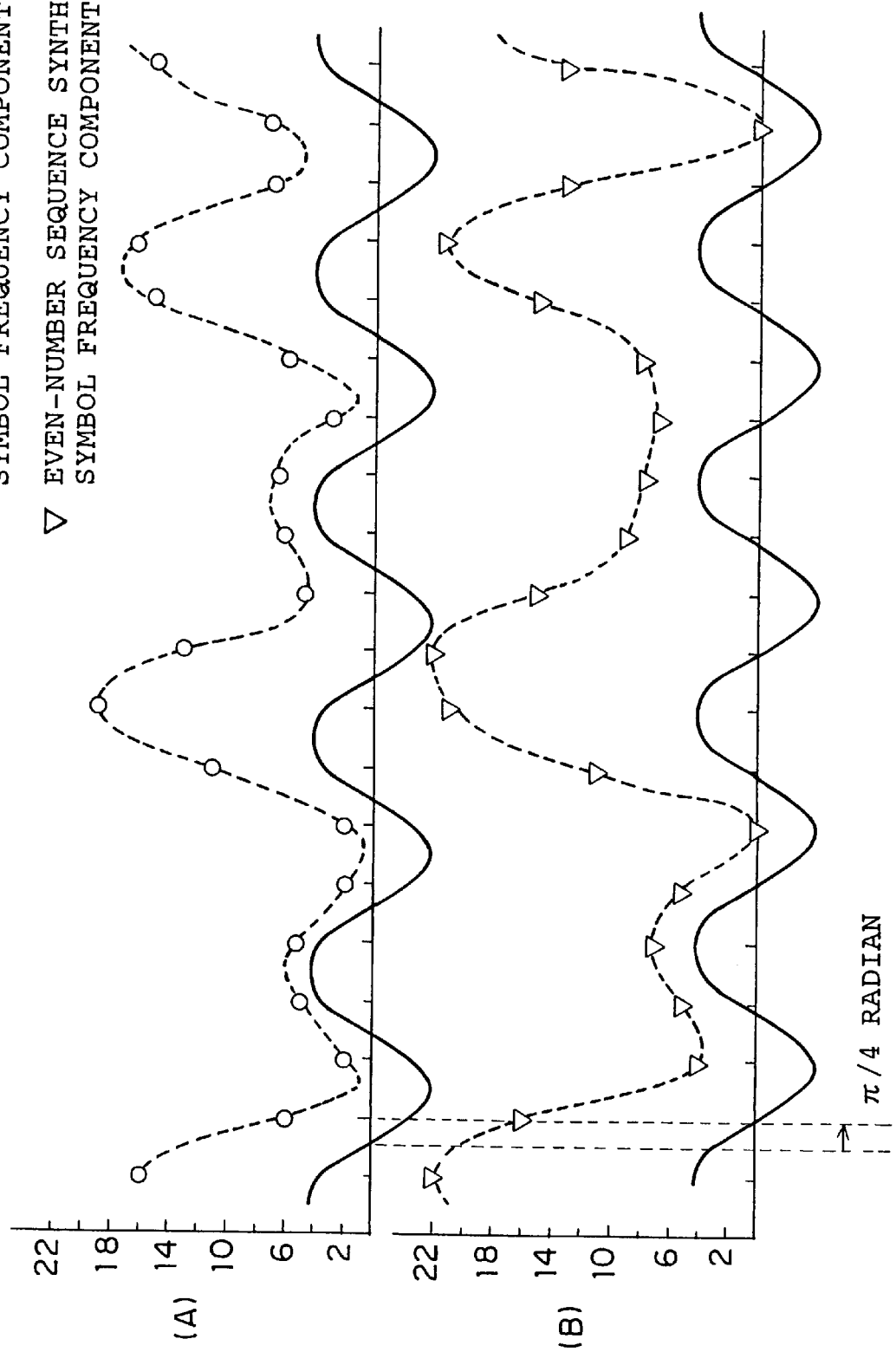
FIG. 16 is a timing chart for describing an output of the phase detecting section of FIG. 2.

The following describes a sequence of operations that takes place in the phase detecting section 62 with reference to FIGS. 14, 15 and 16. The graphs of FIGS. 14 and 15 show the received phase data having a random pattern modulated by β/4 QPSK. Tiny circles in FIG. 14 indicate the data sampled by the regenerated quadruple frequency clock. The data obtained by indicating the phase of the sampled data in 5 bits (0 to 31) are shown in (A) of the timing chart of FIG. 15. Based on the received phase data shown in (A) of FIG. 15, the one:sample differential data sequence, the two sample differential data sequence, the three sample differential data sequence, and the four sample differential data sequence are obtained in a range (6 bits) of −31 to 31 as shown in (B) through (E) of FIG. 15.

Phase jitter data with x=6 substituted in relations (5) and (6) are obtained as shown in (F) through (I) of FIG. 15. Odd-number sequence synthesized symbol frequency component data are obtained by delaying by one sample the phase jitter data sequence based on the one sample differential data sequence and adding the result to the phase jitter data sequence based on the three sample differential data sequence as shown in (J) of FIG. 15. Even-number sequence synthesized symbol frequency component data are obtained by delaying by two sample the phase jitter data sequence based on the one sample differential data sequence and adding the result to the phase jitter data sequence based on the four sample differential data sequence as shown in (K) of FIG. 15.

The data sequence shown in (J) and (K) of FIG. 15 are shown in the graph of FIG. 16. Circles indicate the odd-number sequence synthesized symbol frequency component data shown in (J) of FIG. 15, while triangles show the even-number sequence synthesized symbol frequency component data shown in (K) of FIG. 15. Each data sequence shown in FIG. 16 includes a symbol frequency component as shown in a solid line. As shown in FIG. 16, the symbol frequency component included in the odd-number sequence synthesized symbol frequency component data is lagging behind the symbol frequency component included in the odd-number sequence synthesized symbol frequency component data by π/4 radian.

Thus, the phase detecting section 62 outputs the two data sequence including the two symbol frequency components, namely, the odd-number sequence symbol frequency component data and the even-number sequence symbol frequency component data. It should be noted that the phase detecting section 62 may use the phase jitter data sequence based on the two sample differential data sequence or the phase jitter data sequence based on the four sample differential data sequence as the even-number sequence synthesized symbol frequency component data. Likewise, the phase detecting section 62 may use the phase jitter data sequence based on the one sample differential data sequence or the phase jitter data sequence based on the three sample differential data sequence as the even-number sequence synthesized symbol frequency component data.

The following describes operations of the filtering section 63. The filtering section 63 of FIG. 3 obtains a complex direct current component DC by multiplying, as shown in the following formulas (7) and (8), even-number sequence synthesized symbol frequency component data $DE_i$ (i being the number of samples) coming from the input terminal 63b and odd-number sequence synthesized symbol frequency component data $DO_i$ (i being the number of samples) coming from the input terminal 63c by complex symbol frequency components $\cos 2\pi f_s(T_i/4)$ and $\sin 2\pi f_s(T_i/4)$ of quadruple oversample generated by dividing the base oscillation frequency by the frequency converting section (where, $f_s$ denotes sending-side symbol frequency, T denotes a symbol period, i denotes the number of samples, actually the number of regenerated clocks coming from the input terminal 63d):

$$Re[DC]=DE_i \times \cos(2\pi f_s(T_i/4)-\beta/4)+DO_i \times \cos 2\pi f_s(T_i/4) \quad (7)$$

$$Im[DC]=DE_1 \times \sin(2\pi f_s(T_i/4)-\pi/4)+DO_i \times \sin 2\pi f_s(T_i/4) \quad (8)$$

In this case, the multiplying processing is simple because, for i={0, 1, 2, 3, 4, 5, ... }, $\cos 2\pi f_s(T_i/4)$ takes values of {1, 0, −1, 0, 1, ... }, $\cos(2\pi fs(T_i/4)-\pi/4)$ takes values of {½$^{1/2}$, ½$^{1/2}$, −½$^{1/2}$, −½$^{1/2}$, ½$^{1/2}$, ... }, $\sin 2\pi f_s(T_i/4)$ takes values of {0, 1, 0, −1, 0 ... }, and $\sin(2\pi f_s(T_i/4)-\pi/4)$ takes values of {−½$^{1/2}$, ½$^{1/2}$, −½$^{1/2}$, −½$^{1/2}$, −½$^{1/2}$, ... }.

Thus, the frequency converting section 72 frequency-converts the symbol frequency component included in the even-number sequence synthesized symbol frequency component data and the odd-number sequence synthesized symbol frequency component data into a DC component. It should be noted that only one of the even-number and odd-number sequence synthesized symbol frequency component data may be used. In this case, the scale of circuitry is reduced to a half.

The symbol synthesizing section 73 synthesizes the in-phase component Re [DC] and the orthogonal component Im [DC] of the complex direct current component DC in units of four samples (for one symbol) to output the synthesized signals as a symbol in-phase component signal and a symbol orthogonal component signal outputted in one symbol period.

Averaging the values of the symbol in-phase component signal $Cd_i$ (i being the number of samples) and the symbol orthogonal component signal $Sd_i$ (i being the number of samples) obtains a timing phase difference. The integral filtering section 74 averages the values of the symbol in-phase component signal $Cd_i$ and the symbol orthogonal component signal $Sd_i$ by performing L symbol integration on the values as shown in the formula (9) below for example. Obtaining an arctangent of the average value, the phase difference calculating section 75 can obtain timing phase difference $\Delta\theta_T$.

$$\Delta\theta_T = \tan^{-1}\left(\sum_{i=1}^{L} Sd_i \Big/ \sum_{i=1}^{L} Cd_i\right) \quad (9)$$

Figure 17:
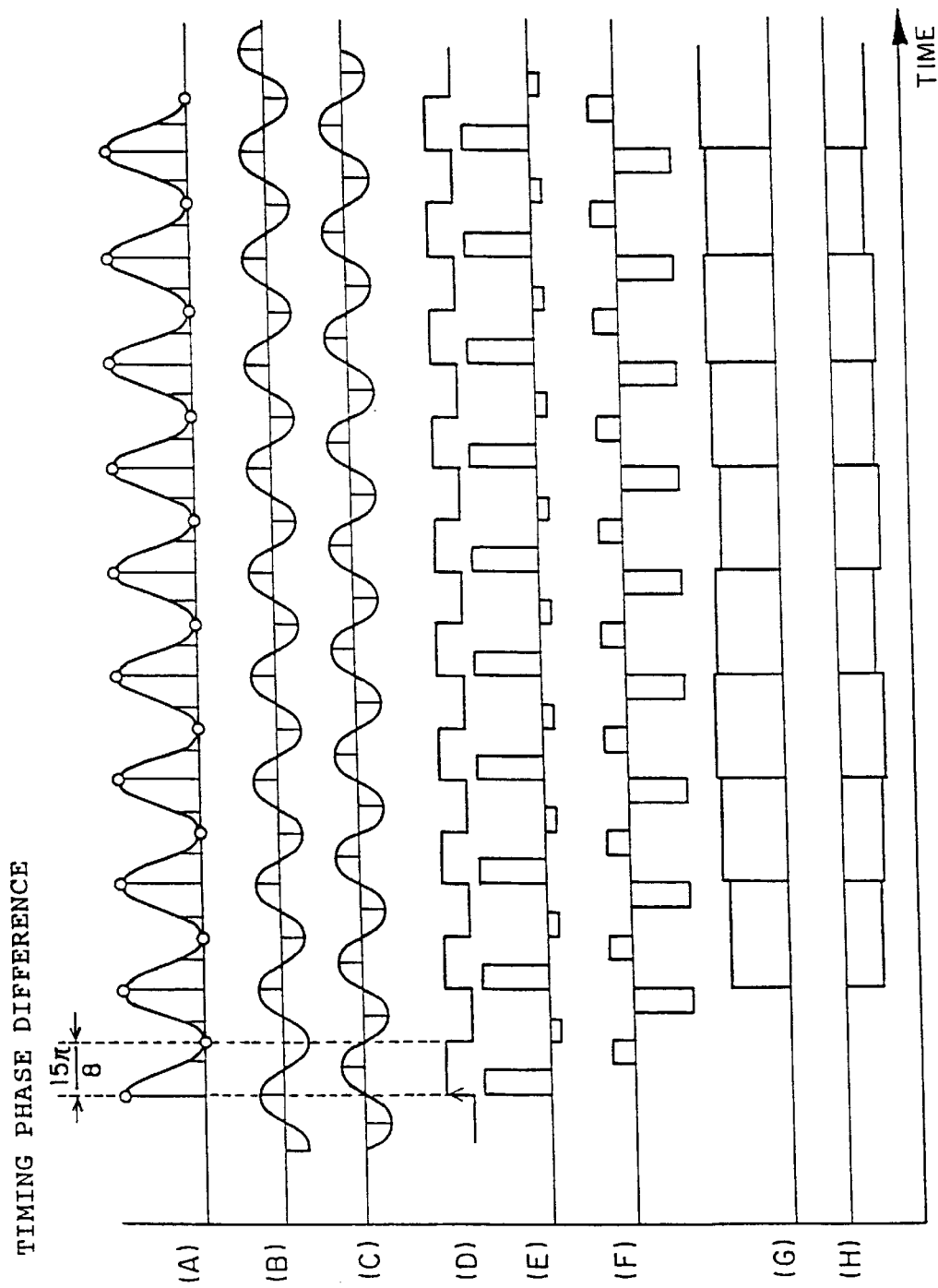
FIG. 17 is a timing chart for describing operations of a frequency converting section and a symbol synthesizing section in the filtering section of FIG. 3.

If the value of the symbol orthogonal component signal $Sd_i$ is negative, it indicates that the timing phase is lagging; if this value is positive, it indicates that the timing phase is leading. Hence, the random walk filtering section 77 uses a sign bit of the symbol orthogonal component signal $Sd_i$ to control clock phase, thereby implementing a timing phase following operation. Waveforms (B) and (C) of FIG. 17 for example indicate the operations of the frequency converting section 72 and the symbol synthesizing section 73 when there is a timing phase difference of $15\pi/8$ radian (the timing phase is lagging) as shown in (A) of FIG. 17. Wave forms (G) and (H) of FIG. 17 indicate the symbol in-phase component signal $Cd_i$ and the symbol orthogonal component signal $Sd_i$. For simplicity of description, FIG. 17 shows the case in which the frequency converting section 72 operates by using the odd-number sequence synthesized symbol frequency component data having only the symbol frequency component. In this case, the symbol in-phase component signal $Cd_i$ indicates a positive value and the symbol orthogonal component signal $Sd_i$ indicates a negative value. The ratio ($Cd_i$:$Sd_i$) indicates a value near $\cos(15\pi/8)$:$\sin(15\pi/8)=0.92$:$-0.38$.

The following describes operations of the integral filtering section 74. At initial pull-in by power-on operation for example, the symbol frequency component quantity takes a value lower than a threshold for infinite impulse response switching. In the integral filtering section 74 of FIG. 6, the symbol orthogonal component signal entered from the input terminal 74a is accumulated by the adder 94A and the register 96A. Likewise, the symbol in-phase component signal entered from the input terminal 74c is accumulated by the adder 94B and the register 96B. At this moment, the multipliers 97A and 97B multiply the values of the registers 96A and 96B by one respectively.

The output value of the adder 94A is outputted from the output terminal 74f as integrated orthogonal data. The output value of the adder 94B is outputted from the output terminal 74g as integrated in-phase data. Using these orthogonal and integrated in-phase data, the symbol frequency component quantity calculating section 76 of FIG. 3 calculates a symbol frequency component quantity. The symbol frequency component quantity SV is obtained from the integrated orthogonal data QS and the integrated in-phase data IS from the formula of (10) below:

$$SV=(QS^2+IS^2)^{1/2} \quad (10)$$

Consequently, if a direct current component is generated in the symbol in-phase component signal $Cd_i$ or the symbol orthogonal component signal $Sd_i$, these signals are accumulated in the integral filtering section 74, so that the integrated in-phase data or the integrated orthogonal data increase, thereby increasing the symbol frequency component quantity SV accordingly.

When the symbol frequency component quantity SV exceeds the threshold for the infinite impulse response switching, the comparator 98 outputs a signal for indicating that the component quantity SV has exceeded the threshold. The selecting section 99 stops selecting "1" and selects $\alpha$ ($0<\alpha<1$) to output the same. Consequently, when the symbol frequency component quantity SV has exceeded the threshold for infinite impulse response switching, the integral filtering section 74 operates as an infinite impulse response filtering section that multiplies the outputs of the registers 96A and 96B by α.

Using the integrated orthogonal data QS and the integrated in-phase data IS outputted from the integral filtering section 74, the phase difference calculating section 75 in rear stage obtains a timing phase difference. The phase difference calculating section 7 can quickly obtain a correct ratio between the integrated orthogonal data QS and the integrated in-phase data IS by this accumulation of the integral filtering section 74 at the initial pull-in. Also, if the symbol frequency components have been accumulated sufficiently, the integral filtering section 74 operates as an infinite impulse response filtering section, so that stable integrated orthogonal data QS and integrated in-phase data IS can be obtained.

When timing phase difference $\Delta\theta$ is obtained by the phase difference calculating section 75 and phase control is performed by the phase controlling section 66 of FIG. 1 such that the timing phase difference $\Delta\theta$ is canceled, a phase control complete signal is entered in the integral filtering section 74 from the input terminal 74e indicating that phase control has been performed. When the phase control complete signal has been entered, the symbol frequency component quantity is entered in the register 96B via the selecting section 95B and "0" is entered in the register 96A via the selecting section 96A. Thus, the accumulation of symbol frequency components is enabled by performing the phase control of the regenerated clock by the above-mentioned operations. Namely, a low jitter characteristic can be realized while the high-speed pull-in of clock phase is achieved.

The operations of the integral filtering section 74 and the symbol frequency component quantity calculating section 76 will be described with reference to FIG. 18. For the symbol in-phase component signal $Cd_i$ and the symbol orthogonal component signal $Sd_i$ which are inputs, values listed in FIG. 17 are used. The operation starts at a point (a) of FIG. 18. Then, the integral filtering section 74 performs an accumulating operation to accumulate the symbol in-phase component signal $Cd_i$ and the symbol orthogonal component signal $Sd_i$ of FIG. 17 respectively. Consequently, as shown in (A) and (B) of FIG. 18, the integrated in-phase data and the integrated orthogonal data increase linearly. The ratio of increase in each data matches the ratio between the symbol in-phase component signal $Cd_i$ and the symbol orthogonal component signal $Sd_i$ shown in FIG. 17. Since the symbol frequency component quantity can be obtained from the formula (10), the component quantity also increases linearly as shown in (C) of FIG. 18.

Figure 18:
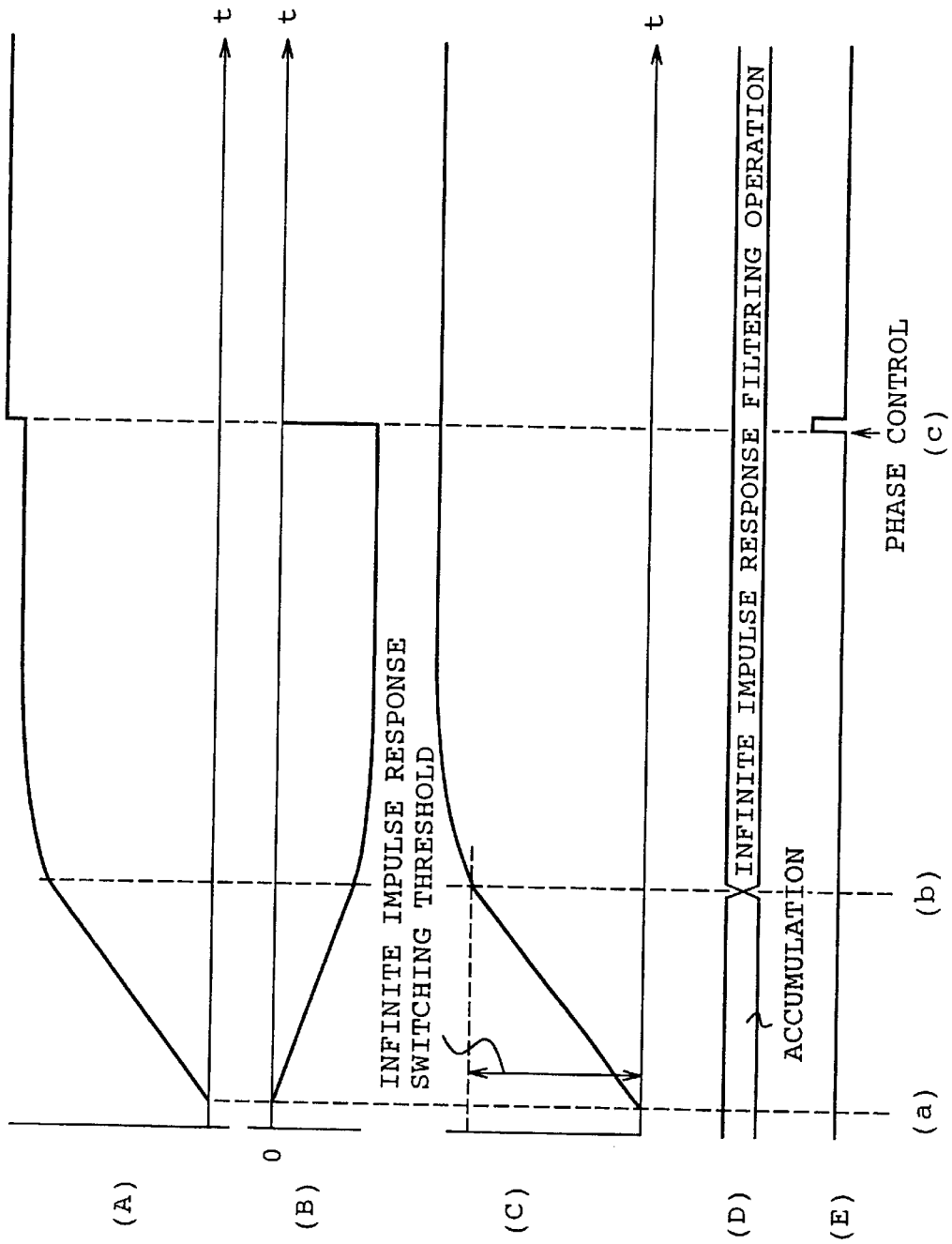
FIG. 18 is a timing chart for describing operations of an integral filtering section in the filtering section of FIG. 3.

At point (b) of FIG. 18, the symbol frequency component quantity exceeds the infinite impulse response switching threshold. Therefore, as shown in (D) of FIG. 18, the integral filtering section 74 stops the accumulating operation, starting infinite impulse response filtering operation. Consequently, following the point (b) of FIG. 18, the integrated in-phase data, the integrated orthogonal data, and the symbol frequency component quantity all converge to certain values in gradual curves. As shown in (E) of FIG. 18, the phase control complete signal rises at point (c) to indicate that phase control has been performed. Then, the symbol frequency component quantity at that point is loaded in the integrated in-phase data and "0" is loaded in the integrated orthogonal data.

An attempt to implement the formula (10) by a hardware circuit increases hardware scale, so that the symbol frequency component quantity calculating section 76 is implemented by a simple circuit as shown in FIG. 8. Namely, in the symbol frequency component quantity calculating section 76, the absolute values of the integrated in-phase data IS coming from the input terminal 76b and the integrated orthogonal data QS coming from the input terminal 76a are obtained by the absolute value converting sections 100B and 100A respectively. The comparator 101 compares the outputs of the absolute value converting sections 100B and 100A and outputs a signal to indicate the greater value to the selecting section 102. The selecting section 102 outputs the greater of the outputs of the absolute value converting sections 100B and 100A. If the output value of the selecting section 102 is outputted without change from the output terminal 76d as the symbol frequency component quantity, a greater error is caused as compared with the output obtained from the formula (10). Therefore, the output of the selecting section 102 is multiplied by a weighting value by the weighting circuit 103.

In the above-mentioned embodiment, timing phase is expressed in five bits of 0 through 31. The error of the output of the selecting section 102 from the value obtained from the formula (10) depends on the value of the timing phase difference obtained from the formula (9). For example, if the timing phase difference is "3" ($3\pi/16$ radian) and the symbol frequency component quantity obtained from the formula (10) is A, then the selecting section 102 selects integrated in-phase data B shown in FIG. 19 (because B>C). Since B=A×cos($3\pi/16$), let B be symbol frequency component quantity, then the symbol frequency component quantity becomes a value smaller than the inherent value by (1−cos ($3\pi/16$))×A. When the timing phase difference is "11", "19" or "27", the same error is caused. When the timing phase difference is "4", "12", "20" or "28", a maximum error is caused. Namely, let B be symbol frequency component quantity, then the symbol frequency component quantity becomes a value smaller than the inherent value by (1−cos ($\pi/4$))×A.

Figures 19, 20:
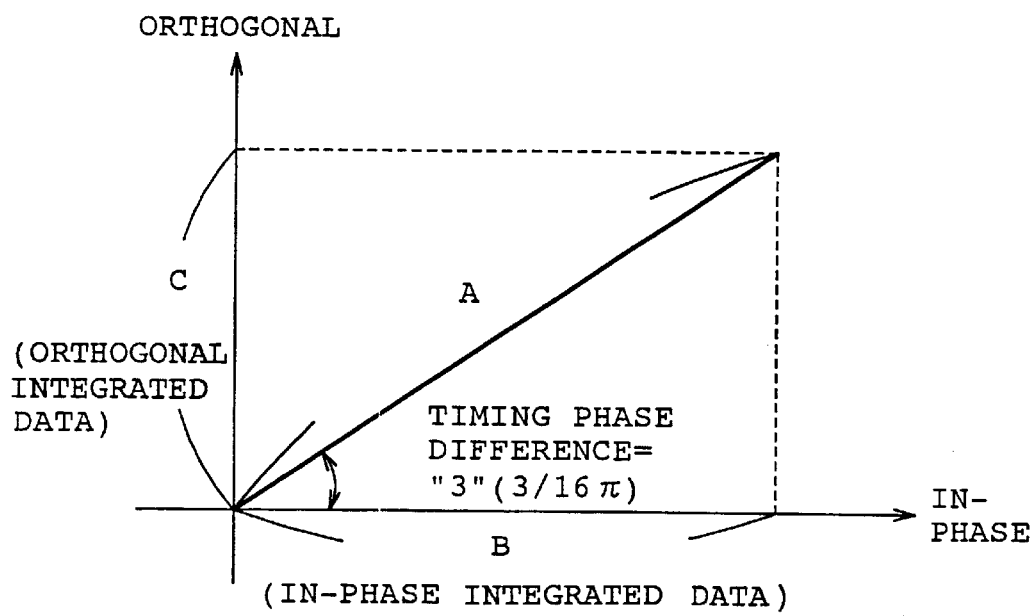
FIG. 19 is a diagram illustrating a relationship between output and timing phase difference of the integral filtering section of the filtering section of FIG. 3.
FIG. 20 is a diagram indicating weight values used by the symbol frequency component quantity calculating section in the filtering section of FIG. 3.

Thus, the relationship between the values on which modulo 8 (corresponding to 8: $\pi m/2$) were performed for timing phase difference (0 through 31) and the output values of the selecting section 102 may be expressed as shown in FIG. 20. It is assumed that the value of the symbol frequency component quantity obtained from the formula (10) be constant value A. Therefore, the weighting circuit 103 selects a weight value β shown in FIG. 20 according to the timing phase difference data coming from the input terminal 76c to multiply the output value of the selecting section 102 by the selected weight value β. Then, the weighting circuit 103 outputs the multiplication result from the output terminal 76d as the symbol frequency component quantity. Thus, the symbol frequency component quantity without error can be outputted.

As described above, the timing phase difference to be calculated by the phase difference calculating section 75 can be obtained by the arctangent of integrated in-phase data and integrated orthogonal data as indicated by the formula (9). However, if the timing phase difference is obtained from the formula (9), hardware scale of the phase difference calculating section 75 increases. In the present embodiment, therefore, the phase difference calculating section 75 is implemented such that timing phase difference is calculated by a simple processing operation as shown below. Timing phase difference $\delta\theta_T$ in itself can be obtained from formula (11) based on a relationship shown in FIG. 19 for example. In the present embodiment, the timing phase difference is obtained from formulas (12a) through (12d). In what follows, B stands for integrated in-phase data while C stands for integrated orthogonal data.

$$\Delta\theta_T = \tan^{-1}(C/B) \quad (11)$$

If $B \geq 0$, $C \geq 0$, $$\Delta\theta_T' = \pi/2 \times |C|/(|B|+|C|) \quad (12a)$$

If $B<0$, $C \geq 0$, $$\Delta\theta_T' = \pi/2 \times |B|/(|B|+|C|)+\pi/2 \quad (12b)$$

If $B<0$, $C<0$, $$\Delta\theta_T' = \pi/2 \times |C|/(|B|+|C|)+\pi \quad (12c)$$

If $B \geq 0$, $C<0$, $$\Delta\theta_T' = \pi/2 \times |B|/(|B|+|C|)+3\pi/2 \quad (12d)$$

Thus, the calculation of $\tan^{-1}$ can be realized by simple addition and subtraction, thereby reducing hardware scale of the phase difference calculating section 75. It should be noted that $\Delta\theta_T$ obtained from the formulas (12a) through (12d) has some error as compared with the value originally obtained from the formula (11). For example, according to the relation shown in FIG. 19, $B=A \times \cos(3\pi/16)$ and $C=A \times \sin(3\pi/16)$ are substituted in the formula (11) to provide $\Delta\theta_T=3\pi/16=0.1875\pi$. However, if the same are substituted in the formula (12), $\Delta\theta_T'=0.2997\pi$ will result, causing some error from the original value.

FIG. 9 shows a circuit constitution of the phase difference calculating section 75 for calculating a timing phase difference according to the formulas (12a) through (12d). In FIG. 9, cases are not classified according to the formulas (12a) through (12d). The absolute value converters 104A and 104B obtain the absolute value of integrated orthogonal data coming from the input terminal 75a and the absolute value of integrated in-phase data coming from the input terminal 75b respectively. From the two absolute values, a remainder Q obtained by dividing the timing phase difference by $\pi/2$ results. The quadrant of the timing phase difference data is determined the most significant bits of the integrated in-phase data and the integrated orthogonal data. If the most significant bit of the integrated in-phase data is "0" and that of the integrated orthogonal data is "0", the timing phase difference data are located in the first quadrant "0". The first quadrant is expressed in "0". If the most significant bit of the integrated in-phase data is "1" and that of the integrated orthogonal data is "0", the timing phase difference data are located in the second quadrant "1". The second quadrant is expressed in "1". If the most significant bit of the integrated in-phase data is "1" and that of the integrated orthogonal data is "1", the timing phase difference data are located in the third quadrant "2". The third quadrant is expressed in "2". If the most significant bit of the integrated in-phase data is "0" and that of the integrated orthogonal data is "1", the timing phase difference data are located in the fourth quadrant "3". The fourth quadrant is expressed in "3".

Thus, let the quadrant obtained by each of the most significant bits be $D=\{0, 1, 2, 3\}$, then the timing phase difference data $\Delta\theta_T$ are obtained from the formula (13) as follows:

$$\Delta\theta_T' = Q+D \times \pi/2 \quad (13)$$

Q is obtained from the formula (14) as follows. This matches the relation when $B \geq 0$ and $C \geq 0$ of the formula (12).

$$Q=\pi/2 \times |E|/(|B| 30 |C|) \quad (14)$$

where, if $D=\{0, 2\}$, then $E=C$; if $D=\{1, 3\}$, $E=B$.

In the present embodiment, Q takes 16 values of $\{0, 1, 2, \ldots, 15\}$. Therefore, the formula (14) may be transformed to the formula (15).

$$Q=\text{INT}[16 \times |E|/(|B|+|C|)] \quad (15)$$

where, INT[a] denotes the integer part of a. Therefore, Q can be calculated as follows.

The adder 105 obtains the denominator $|B|+|C|$ of the formula (15). Then, the selector 118 selects either the output ($|C|$) of the absolute value converter 104A or the output ($|D|$) of the absolute value converter 104B according to a select signal represented by the most significant bit of the integrated in-phase data and the most significant bit of the orthogonal integrated data. The selected value is equivalent to $|E|$. The 4-bit shifter 107 shifts the selected value by 4 bits. The output of the 4-bit shifter 107 is equivalent to the numerator $16 \times |E|$ of the formula (15). The formula (15) represents an integer part obtained by dividing the numerator by the denominator. As a result, the output of the adder 105, which is the denominator, is accumulated via the register 109. When the accumulated value exceeds the output of the bit shift 107, the number of accumulating operations indicates the integer part of value $16 \times |E|/(|B|+|C|)$.

Figure 21:
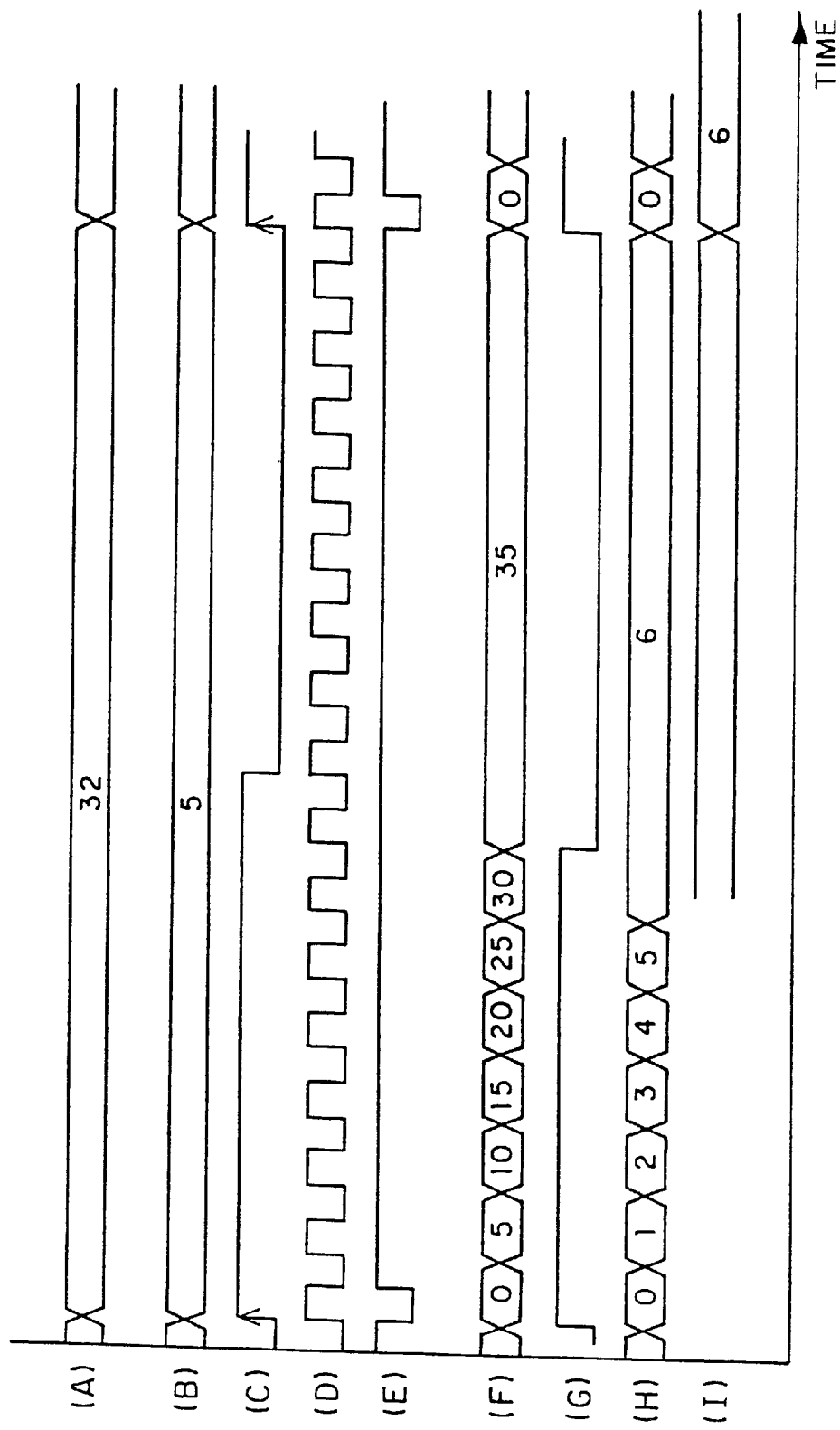
FIG. 21 is a timing chart for describing operations of a phase difference calculating section in the filtering section of FIG. 3.

The following describes an example in which the output of the adder 105 is "5" and the output of the bit shifter 107 is "32", with reference the timing chart of FIG. 21. (B) in FIG. 21 indicates the output of the adder 105 and (A) indicates the output of the bit shifter 107. In this case, $Q=\text{INT}[32/5]=6$ may only be obtained from the formula (15). A signal (E) of FIG. 21 for resetting the UP counter 111 and the register 109 at rising of the regenerated clock is generated by the register 113, NAND gate 114, and the inverter 112 as shown in FIG. 21. When the output value of the adder 108 exceeds the output value "32" of the bit shifter 107, the comparator 110 enters the signal of logic "0" into the UP counter 111 (refer to (C) of FIG. 21) to disable counting.

The output value ((F) of FIG. 21) of the adder 108 increases in the regenerated 16-times frequency clock period such as 5, 10, 15 and so on by an accumulating operation. At the same time, the UP counter 111 performs up-count operation in the regenerated 16-times frequency clock such as 0, 1, 2, 3 and so on as shown in (H) of FIG. 21. When the output value of the adder 108 reaches "35", the UP counter 111 is disabled by the output of the comparator 110, holding count value "6". The counter value "6" is latched in the register 115 by the regenerated clock to be outputted as a Q-value.

In the present embodiment, $\Delta\theta_T'$ is expressed in one of 32 values $\{0, 1, 2, \ldots, 31\}$. If the above-mentioned calculation error is allowed, the linear conversion of the formula (16) is performed on the Q-value outputted from the register 115 to obtain $Q'=\{0, 1, 2, \ldots, 8\}$. The obtained $Q'$ is substituted in the formula (17) to obtain $\Delta\theta_T'$. The processing according to the formula (17) is performed by the adder 117 of FIG. 9.

$$Q'=\text{INT}[(Q+1)/2] \quad (16)$$

$$\Delta\theta_T'=\text{MOD}(Q'+D \times 8, 32) \quad (17)$$

where, MOD(A, B) denotes a remainder obtained by dividing A by B.

Figure 23:
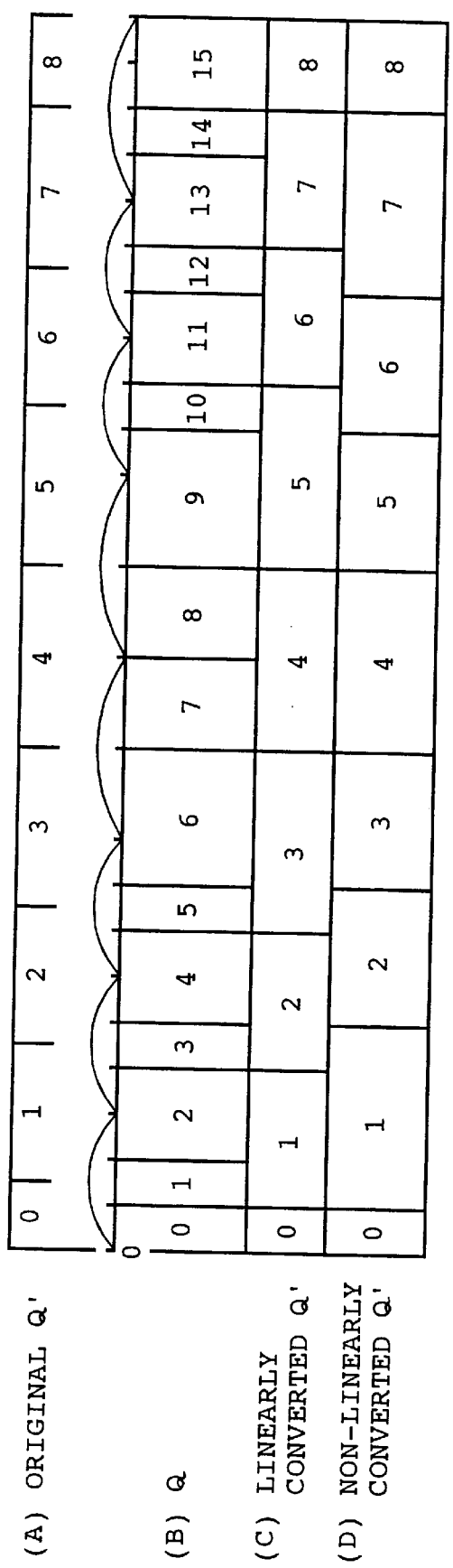
FIG. 23 is a diagram for describing calculation errors in the output of the phase difference calculating section in the filtering section of FIG. 3.

To reduce the calculation error, the phase data non-linear converter 116 performs a non-linear conversion shown in FIG. 22 by using Q as input data. FIG. 23 shows the primary $Q'$ obtained from $\Delta\theta_T'$ according to the formula (16), Q outputted from the register 115, $Q'$ obtained from the formula (16), and $Q'$ on which the non-linear conversion of FIG. 22 is performed. As shown in FIG. 23, the Q' on which the non-linear conversion has been performed shown in FIG. 22 is nearer the primary Q'.

The following describes operations of the random walk filtering section 77 of FIG. 3. The random walk filtering section 77 operates in generally the same manner as the prior-art filtering section 13 for steady state of FIG. 55 does. A difference lies in that the filtering section 13 for steady state operates the UP/DOWN counter 42 by the LEAD signal while the random walk filtering section 77 operates the UP/DOWN counter by the symbol orthogonal component signal $Sd_i$.

In what follows, the operations of the random walk filtering section 77 will be described with reference to FIG. 7 in which components similar to those of FIG. 55 are denoted by the same reference numerals. In described above, whether the clock phase is leading or lagging can be detected by whether the symbol orthogonal component signal $Sd_i$ is positive or negative. If the most significant bit for indicating whether the symbol orthogonal signal $Sd_i$ entered from the input terminal 77c is negative, it indicates that the timing phase is lagging, so that the UP/DOWN counter 42 performs up counting. If the most significant bit is positive, it indicates that the timing phase is leading, so that the UP/DOWN counter 42 performs down counting. The UP/DOWN counter 42 starts counting from the initial value Nx. The UP/DOWN counter 42 operates in the period of the regenerated clock coming from the input terminal 77d.

The Nx value outputted from the selector 40 shifted by the bit shifter 41 by one bit to be 2Nx. The comparator 43A compares the output of the UP/DOWN counter 42 with 2Nx; if a match is found, the comparator outputs an UP signal from the output terminal 77e. The comparator 43B compares the output of the UP/DOWN counter 42 with "0"; if a match is found, the comparator outputs a DOWN signal from the output terminal 77f. When the clock phase control by the UP signal or the DOWN signal has been completed, a phase control complete signal for indicating the completion of phase control is entered from the input terminal 77b. Then, the UP/DOWN counter 42 is reset to Nx.

Figure 65:
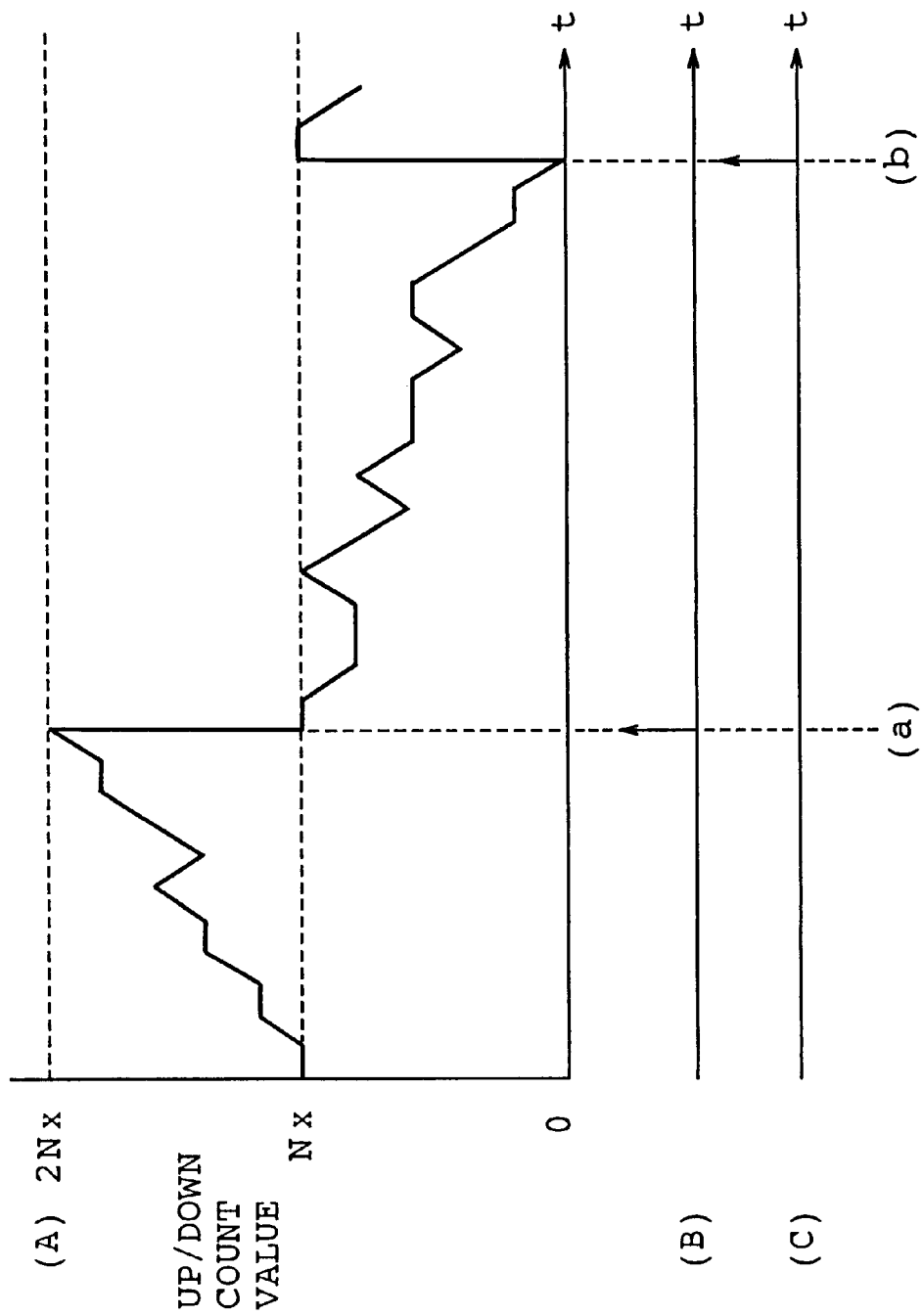
FIG. 65 is a timing chart for describing operations of the filtering section for steady state of FIG. 55.
Figure 67:
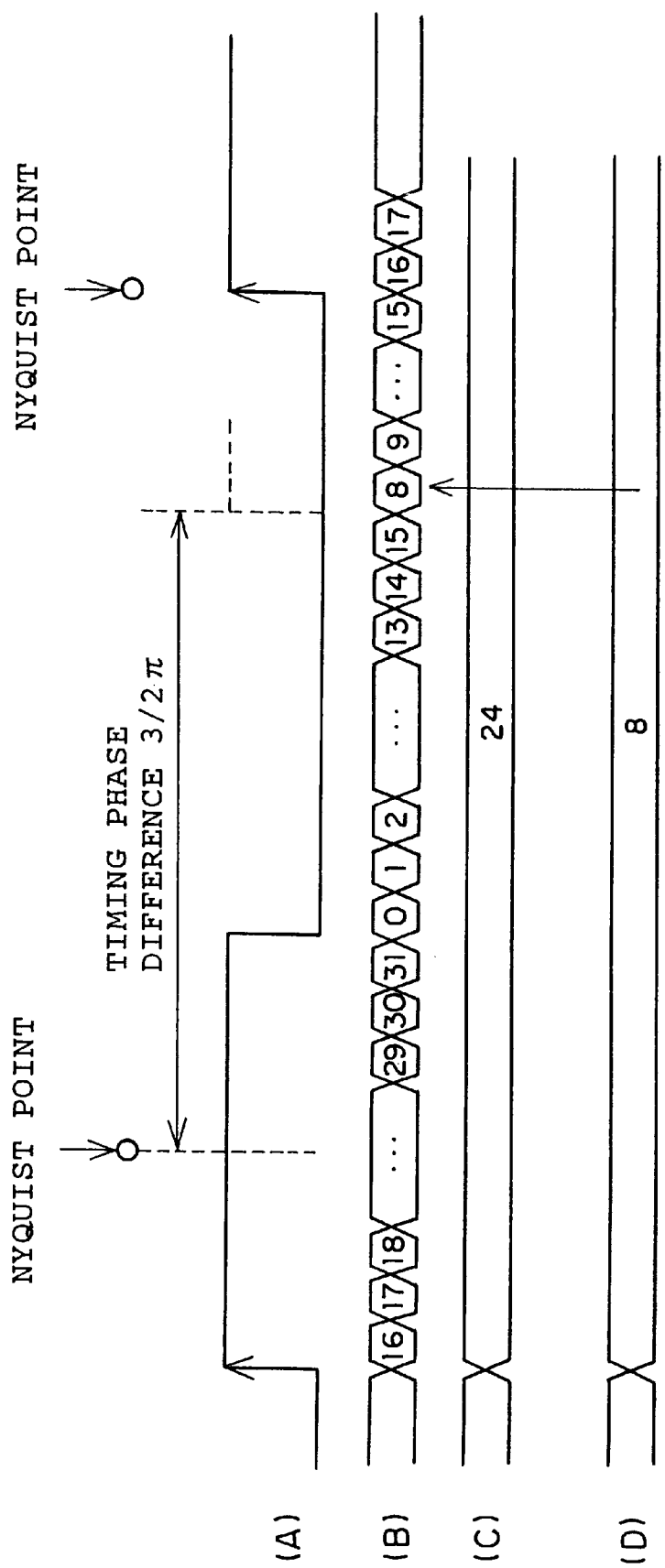
FIG. 67 is a timing chart for describing an operation to be performed at initial pull-in of the phase controlling section of FIG. 57.

The above-mentioned operations provide generally the same effect as that provided by the prior-art filtering section 13 of FIG. 65. Like the prior-art steady state filtering section 13, the value of Nx may be altered by the selector 40 according to the frame synchronization signal. Thus, timing phase difference data $\Delta\theta_T$ are outputted from the output terminal 63h of the filtering section 63, the symbol frequency component quantity is outputted from the output terminal 63i, the UP signal is outputted from the output terminal 63j, and the DOWN signal is outputted from the output terminal 63k.

In what follows, operations of the phase control quantity determining section 65 will be described with reference to FIG. 4. The phase control quantity determining section 65 determines how much timing phase is to be controlled. A phase control quantity is determined by use of the timing phase difference data $\Delta\theta_T'$, the symbol frequency component quantity, the UP signal, and the DOWN signal. The comparator 78A compares the symbol frequency component quantity coming from the input terminal 65a with the threshold value for recognizing steady state. If the symbol frequency component quantity is found greater than the threshold value for recognizing steady state, logic "1" is outputted from the comparator 78A. The rising edge of this output signal sets the output of the register 80 to logic "1".

A frame synchronization signal (a UW detect signal) coming from the input terminal 65b indicates logic "1" at frame synchronization. Therefore, the AND gate 81 outputs logic "1" when the symbol frequency component quantity presents a value greater than the threshold for recognizing steady state and frame synchronization is established. At this moment, transition from pull-in state to steady state is determined. To implement the phase control quantity determining section 65 without using the frame synchronization signal, the input terminal 65c may only be set logic "1" always. The output gate 81 of logic "0" indicates pull-in state. In this case, the gate circuit 84 substitutes timing phase difference $\Delta\theta_T'$ into the formula (18) to generate phase control data PD. It should be noted that $\Delta\theta_T'$ indicates 5-bit data for indicating one of values 0 through 31. At this moment, the two pieces of data coming from the UP/DOWN data generating section 83 are ignored.

When $0 \leq \Delta\theta_T' \leq 16$, PD=16−$\Delta\theta_T'$

When $31 \leq \Delta\theta_T'(17)$, PD=48−$\Delta\theta_T'$ (18)

According to the formula (18), the phase control data PD are latched by a $\Delta\theta_T$ output pulse that repeats, in period TL [symbols], "0" and "1" entered from the timing phase control interval setting section 64 via the input terminal 65f to be outputted from the gate circuit 84. The output of the AND gate 81 of logic "1" indicates steady state. At this moment, the gate circuit 81 does not select the phase control data PD obtained from the timing phase difference data $\Delta\theta_T'$ coming from the input terminal 65c but obtains the phase control data from the two pieces of data coming from the UP/DOWN data generating section 83 to output the obtained phase control data.

The comparator 78B compares the symbol frequency component quantity with the threshold value for recognizing line disconnected state. If the symbol frequency component quantity is found exceeding the threshold value for recognizing line disconnected state, the comparator output logic "0"; otherwise, the comparator outputs logic "1". The AND gate 79 performs a logical AND operation between the output of the comparator 78B and the output of the register 80. Therefore, the output of the AND gate 79 is set to logic "1" if the symbol frequency component quantity becomes greater than the threshold value for recognizing steady state at least once and then smaller than the same. The output of the AND gate 79 of logic "1" indicates that the line has been disconnected.

If the output of AND gate 79 is logic "1", the selector 82 selects an AFC UP signal and an AFC DOWN signal coming from the automatic frequency control signal generating section 85B to output the selected signals as an UP O signal and a DOWN O signal. If the output of the AND gate 79 is logic "0" indicating no line disconnection, the selector 82 selects the UP signal coming from the input terminal 65d and the DOWN signal coming from the input terminal 65e to output the selected signals as the UP O signal and the DOWN O signal. The UP/DOWN data generating section 83 outputs "15" as with the conventional case if the UP O signal for instructing the leading of timing phase is entered or "17" as with the conventional case if the DOWN O signal for instructing the lagging of timing phase is entered.

The clock base oscillation frequency deviation measuring section 85A used the phase control data outputted from the gate circuit 84 to calculate an average fluctuation of the phase control data caused by the difference between the clock base oscillation frequency on the sending side and that on the receiving side. This calculation is performed if the comparator 78A outputs logic "1" that indicates steady state. When the average fluctuation has been obtained, the automatic frequency control signal generating section 85B outputs the AFC UP signal and the AFC DOWN signal for providing predicted control state without causing the timing phase control to erroneously operate if line disconnection takes place.

Thus using the symbol frequency component quantity, the phase control quantity determining section 65 determines whether the current state is pull-in, steady, or line disconnected state. In the pull-in state, the phase control quantity determining section 65 uses the timing phase difference data $\Delta\theta_T'$ as the phase control data to perform control such that the timing phase difference $\Delta\theta_T'$, is canceled, thereby enabling a high-speed pull-in operation. In the steady state, the phase control quantity determining section uses value "15" for leading the timing phase generated by the UP signal and value "17" for lagging the timing phase generated by the DOWN signal to perform phase control, thereby reducing the jitter of the clock phase. In the line disconnected state, the phase control quantity determining section 65 uses "15" for leading the timing phase generated by the AFC UP signal and "17" for lagging the timing phase generated by the AFC DOWN signal to perform predicted control of phase.

Setting the threshold value for recognizing steady state in the phase control quantity determining section 65 to a value greater than a maximum value of the symbol frequency component quantity allows to always use the timing phase difference data $\Delta\theta_T'$ as the phase control data. In this case, both high-speed pull-in operation and a low jitter can be realized. However, as ranges of integrated in-phase data, integrated orthogonal data, and symbol frequency component quantity, a range in which the operation of the integral filtering section 74 become stable and each of these data elements converge to a certain value is used, so that many bits are required to represent these ranges. This makes larger the circuit scales of the integral filtering section 74, the phase difference calculating section 75, and the symbol frequency component quantity calculating section 76 in the filtering section 63. On the other hand, since the UP signal and the DOWN signal are no longer required, the random walk filtering section 77 becomes unnecessary.

In this case, the phase control quantity determining section 65 is constituted as shown in FIG. 37. As shown in the figure, the selector 82 is no longer required and the AFC UP signal is replaced with the UP O signal and the AFC DOWN signal is replaced with the DOWN O signal. Also as shown in FIG. 37, one of the outputs of the AND gate 79 is entered with the output of the AND gate 81 instead of the output of the register 80. For the select signal of the gate circuit 84, the output of the AND gate 79 is entered. Therefore, if the output of the AND gate 79 is logic "1", which indicates that the line has been disconnected, the gate circuit 84 outputs the output of the UP/DOWN data generating section 83 or the timing phase difference data $\Delta\theta_T'$ if the output of the AND gate 79 is logic "0".

As described above, the gate circuit 84 latches the phase control data PD by the $\Delta\theta_T'$ output pulse that repeats "0" and "1" in period $T_L$ [symbols] to output the latched data PD. Namely, the timing phase control is performed in period $T_L$ [symbols]. Therefore, the characteristics of the timing recovery section 5A follow period $T_L$ [symbols]. If period $T_L$ [symbols] is shortened, timing phase control is performed more frequently, so that timing phase pull-in characteristic is enhanced but at the cost of the jitter amount in steady state. On the other hand, if period $T_L$ [symbols] is made longer, timing phase control is performed in a longer time interval, so that the jitter amount in the steady state is reduced but at the cost of deteriorated timing phase pull-in characteristic because $T_L$ [symbols] time uncontrolled state occurs at the initial stage of timing phase pull-in. Hence, in the case where the random walk filtering section 77 is not used, the timing phase control interval setting section 64 is operated as follows to further enhance the characteristics of the timing recovery section 5A.

Namely, for the $\Delta\theta_T$ output pulse coming from the timing phase control interval setting section 64, the $\Delta\theta_T$ output pulse for pull-in of short period $T_{L1}$ [symbols] and the $\Delta\theta_T$ output pulse for steady state of long period $T_{L2}$ [symbols] are prepared. If the output of the AND gate 81 indicates pull-in at logic "0", the timing phase control interval setting section 64 outputs the $\Delta\theta_T$ pulse for pull-in; if the output of the AND gate 81 indicates steady state at logic "1", the interval setting section 64 outputs the $\Delta\theta_T$ output pulse for steady state. In this constitution, the high-speed phase pull-in characteristic and the low-jitter characteristic are enhanced further.

If the difference between the clock base oscillation frequencies on the sending side and the receiving side is small and the deviation of timing phase due to the deviation of timing phase due to the clock base oscillation frequency deviation caused by line disconnection or during no-signal time is at a level not affecting bit error rate characteristic, the clock base oscillation frequency deviation measuring section 85A and the automatic frequency control signal generator 85B are not required. In this case, if the AND gates 79 outputs logic "1" indicating line disconnection, the selector 82 outputs neither the UP O signal for instructing phase leading nor the DOWN O signal for instructing phase lagging. On the other hand, if the timing phase deviation due to the clock base oscillation frequency deviation caused by line disconnection or during no-signal time affects the bit error rate characteristic, then the clock base oscillation frequency deviation measuring section 85A and the automatic frequency control signal generating section 85B are required.

Figure 24:
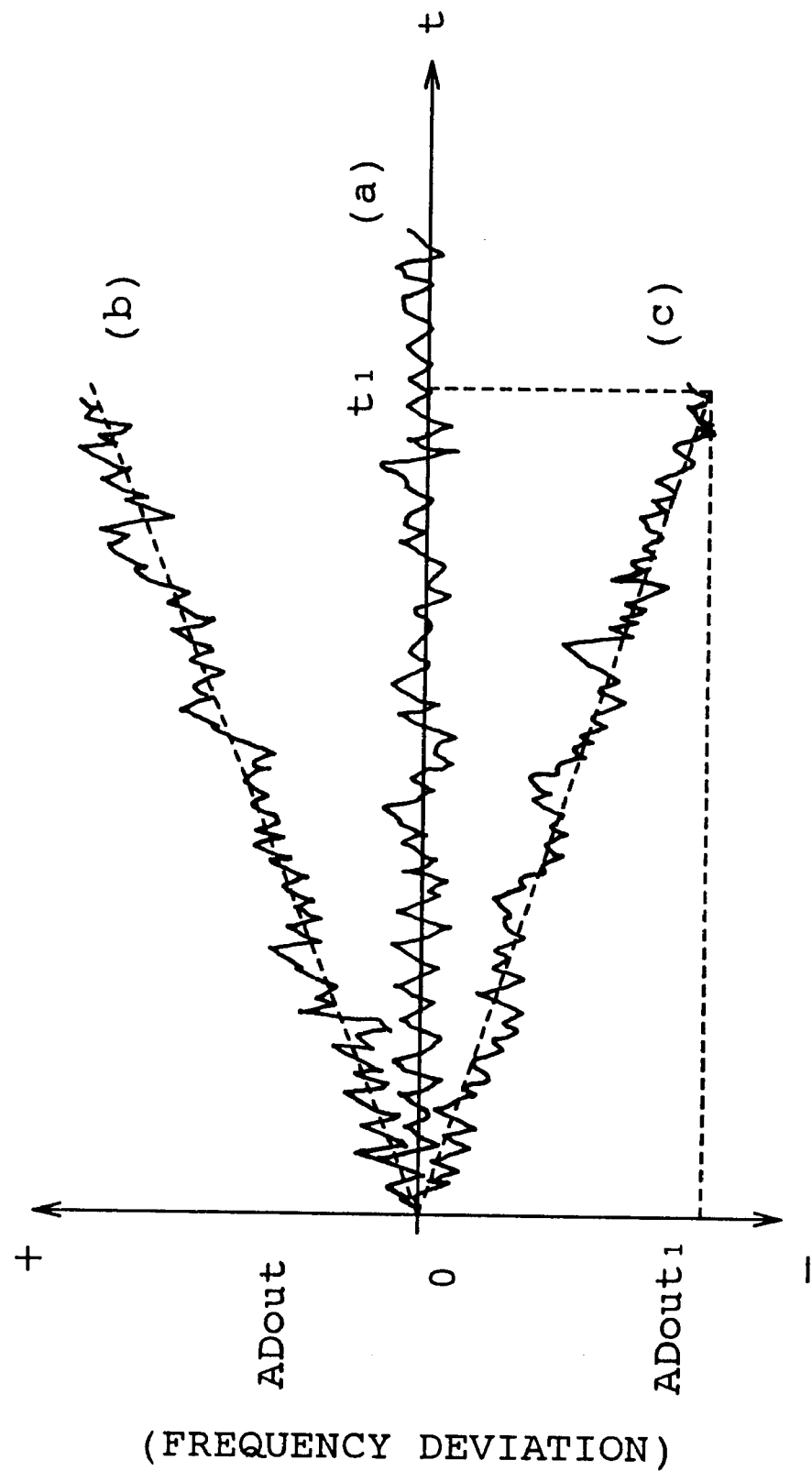
FIG. 24 is a diagram for describing an accumulated output of the clock base oscillation frequency deviation measuring section in the phase control quantity determining section of FIG. 4.

In what follows, operations of the clock base oscillation frequency deviation measuring section 85A will be described with reference to FIG. 10. The subtractor 131 subtracts "16" from the phase control data PD entered from the input terminal 85b. The output of the subtractor 131 is accumulated by the accumulator composed of the adder 119 and the register 120. The accumulating operation is performed in the steady state in which the jitter in the phase control data indicated by the output of the comparator 122 is low. If the clock base oscillation frequency deviation is "0" as shown in (a) of FIG. 24, the output of the adder 119 jitters around "0".

If the clock base oscillation frequency on the receiving side is lower than that of the sending side, the regenerated clock phase is delayed for timing phase following. Therefore, for the phase control, a value over "17" occurs more often than a value below "15". As a result, the output of the adder 119 increases while jittering as shown in (b) of FIG. 24. Conversely, if the clock base oscillation frequency on the receiving side is higher than that on the sending side, the regenerated clock phase is led. Therefore, for the phase control data, a value below "15" occurs more often than a value over "17". As a result, the output of the adder 119 decreases while jittering as shown in (c) of FIG. 24. A temporal fluctuation of output the output $AD_{out}$ of the adder 119 is proportional to the clock frequency deviation quantity.

Therefore, the clock frequency deviation measuring section 85A checks to see if control in positive direction or negative direction for one step (in this case one step=$\pi/16$ radian) of $AD_{out}$ occurs in how much symbol time (TS symbol). At the time of line disconnection, the selector 82 outputs the AFC DOWN signal and the AFC UP signal coming from the automatic frequency control signal generating section 85B. The control in the positive direction or the negative direction is performed in the TS symbol period. As shown in (c) of FIG. 24, the symbol time $TS_1$ required for the control for one step is:

$$TS_1 = t_1/AD_{out1} \qquad (19)$$

where, the unit of $t_1$ is [symbols].

In what follows, an operation for obtaining the symbol time $TS_1$ according to the formula (19) will be described. Time $t_1$ is obtained from a value of the UP counter 121 that up-counts by the regenerated clock entered in the input terminal 85a. $AD_{out}$ is converted by the absolute value converter 123 into an absolute value to be compared by the comparator 124 with the output of the register 125. A value found greater is outputted from the comparator 124 to be written to the register 125. The value outputted from the comparator 124 is a maximum value of ADout absolute values from starting of the circuit operation to the current point of time. Therefore, as shown in (c) of FIG. 24, the value outputted from the comparator 124 increases gradually.

The bit shifter 128 outputs "1" when the operation starts and multiplies this value by 2 to a power every time the output from the comparator 127 rises. Let the number of rising edges of the output of the comparator 127 be RN, then output value $BS_{out}$ of the bit shifter 128 is as follows:

$$BS_{out} = 2^{RN} \qquad (20)$$

The comparator 127 compares $BS_{out}$ and the output of the comparator 124. If the output of the comparator 124 is found greater than $BS_{out}$, the comparator 127 outputs a logic Therefore, the output of the comparator 127 goes logic "1" momentarily. The divider 126 divides the output of the UP counter by the output of the bit shifter 128. Since the output of the bit shifter is 2 to a power, the division can be realized simply. The register 129 latches the result of the division by the divider 126 at the rising of the output of the comparator 127. Thus, the symbol time TS required for the control for one step can be obtained.

Further, upon detection that the output of the UP counter 121 is found greater than the threshold value for frequency deviation measurement, the comparator 122 outputs logic "1". When the output of the comparator 122 becomes logic "1", the outputs of the registers 120 and 125, the UP counter 121, and the bit shifter 128 are all reset to "0". At the same time, the output (TS) of the register 129 is captured in the corrected data averaging circuit 130 at the rising of the output of the comparator 122. The correct data averaging circuit 130 averages TS. In addition, the corrected data averaging circuit 130 also captures the most significant bit of the adder 119 that indicates whether the clock frequency deviation is positive or negative, averaging the captured most significant bit. When the averaging is complete, the corrected data averaging circuit 130 outputs a frequency deviation measurement complete signal from the output terminal 85e. The circuit 130 also outputs the average value of the TS with an averaged sign signal attached to the most significant bit from the output terminal 85d as frequency deviation corrected data.

Figure 25:
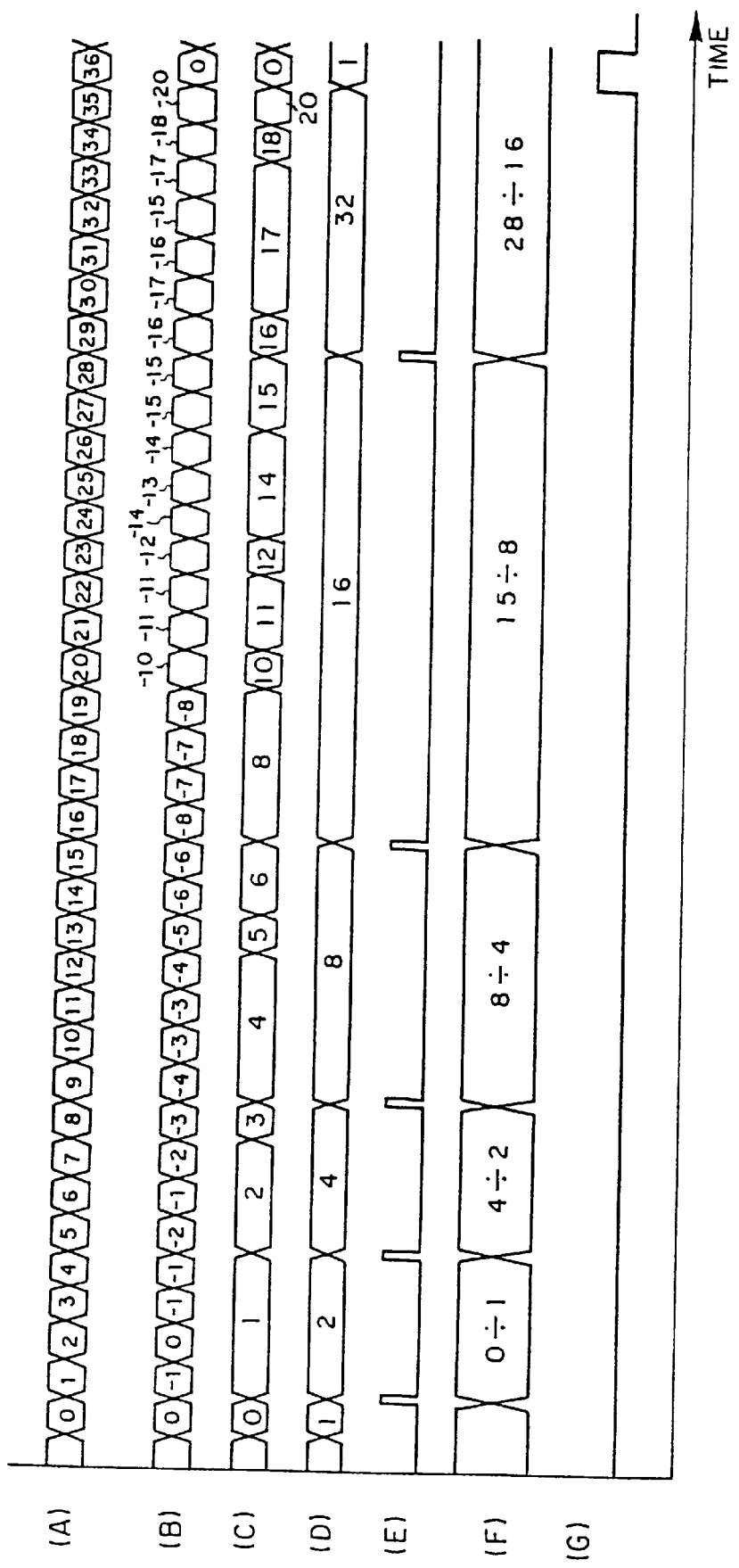
FIG. 25 is a timing chart for describing operations of the clock base oscillation frequency deviation measuring section in the phase control quantity determining section of FIG. 4.

The following describes the above-mentioned operations by using an example in which the output values of the adder 119 are averaged in a jittering manner to be reduced to two symbols by one step as shown in FIG. 25. At this moment, the threshold for frequency deviation measurement of "35" is assumed. (D), (E), and (F) of FIG. 25 show output value $BS_{out}$ of the bit shifter 128, the output of the comparator 127, and the output TS of the register 129 respectively. Therefore, value (28/16) is captured in the corrected data averaging circuit 130 at the rising of the output of the comparator 122 shown in (G) of FIG. 25. Thus, the phase control data outputted from the phase control quantity determining section 65 is entered in the phase control section 66. The phase control section 66 operates in generally the same manner as the conventional case to control the regenerated clock phase and the regenerated quadruple frequency clock phase such that the timing phase difference becomes "0" and, upon completion of the control, outputs the phase control complete signal.

The following describes operations of the time delay difference calculating section 67. First, principles of operation will be described. The time delay difference calculating section 67 is applied when the selective synthetic diversity section 61 is used as with the present embodiment. Let a delay time difference obtained by subtracting signal delay time $T_{B2}$ in the detecting section 2B from signal delay time $T_{B1}$ in the detecting section 2A be τ, then the Nyquist point is deviated by τ time every time branch switching takes place. Consequently, the phase of the regenerated clock outputted from the timing recovery section 5A is controlled such that a phase difference equivalent to the delay time difference τ, namely $2\pi \times (\tau/T)$ [radian] is set to "0" every time branch switching takes place.

The time delay difference calculating section 67 obtains the delay time difference τ by using the phase control data outputted from the phase control quantity determining section 65. If the timing phase difference is "0", average value "16" is outputted as the phase control data PD. For example, when the branch has been switched from 1 to 2 and the Nyquist point is led by $2\beta \times (\tau/T)$ [radian], phase control works such that the timing phase is led. Namely, a value smaller than "16" is outputted as the phase control data PD until the timing phase difference becomes "0" again. When the branch has been switched from 2 to 1 and the Nyquist point is delayed by $2\pi \times (\tau/T)$ [radian], phase control works such that the timing phase is delayed. Namely, a value greater than "16" is outputted as the phase control data PD until the timing phase difference becomes "0" again. Consequently, the delay time difference τ is expressed in the formula (21) below. In the formula, Mz(A) denotes an average value of the accumulated value of A at the time when branch z is selected and the unit of τ is π/16 [radian] in the present embodiment.

$$\tau = M_2(PD-16) - M_1(PD-16) \qquad (21)$$

The following describes operations of the time delay difference calculating section 67 with reference to FIG. 5. As mentioned above, if the timing phase difference is "0", the average value of "16" is outputted as the phase control data PD from the input terminal 67a. If the clock base oscillation frequency sent or received has a deviation, the average of PD deviates from "16", so that the delay time difference τ cannot be calculated normally. For this reason, the AFC UP signal and the AFC DOWN signal outputted from the automatic frequency control signal generating section 85B and the frequency deviation measurement complete signal outputted from the clock base oscillation frequency deviation measuring section 85A are entered in the frequency deviation eliminated data generating section 87 from the input terminals 67b, 67c, and 67e respectively. The frequency deviation eliminated data generating section 87 subtracts the output of the frequency deviation eliminated data generating section 87 from the phase control data to obtain a signal that outputs "0" on average without being affected by the clock base oscillation frequency deviation.

The above-mentioned operations will be described in more detail. The frequency deviation eliminated data generating section 87 starts operating when the frequency deviation measurement complete signal coming from the input terminal 67e indicates the completion of frequency deviation measurement. At this moment, if an instruction for advancing the clock phase by the AFC UP signal is entered, the frequency deviation eliminated data generating section 87 outputs "15". Conversely, if an instruction for delaying the clock phase by the AFC DOWN signal is entered, the frequency deviation eliminated data generating section 87 outputs "17". In other cases, the section 87 outputs "16". The subtractor 86A subtracts the output of the frequency deviation eliminated data generating section 87 from the phase control data.

If the base oscillation frequency on the sending side is higher than that of the receiving side, phase control is performed to delay the timing phase, so that the average of the phase control data with a jitter indicates a value higher than "16". In this case, the AFC DOWN signal is entered to instruct the delaying of the timing phase. Therefore, "17" is periodically outputted among "16" from the frequency deviation eliminated data generating section 87. If the automatic frequency control signal generating section 85B operates normally, the average value of the output of the frequency deviation eliminated data generating section 87 matches the average value of the phase control data. Consequently, the value obtained by subtracting by the subtractor 86A the AFC DOWN signal from the phase control data jitters around "0".

If the base oscillation frequency on the sending side is lower than that of the receiving side, phase control is performed to lead the timing phase, so that the average of the phase control data with a jitter indicates a value lower than "16". In this case, the AFC UP signal is entered to instruct the advancing of the timing phase. Therefore, "15" is periodically outputted among "16" from the frequency deviation eliminated data generating section 87. If the automatic frequency control signal generating section 85B operates normally, the average value of the output of the frequency deviation eliminated data generating section 87 matches the average value of the phase control data. Consequently, the value obtained by subtracting by the subtractor 86A the AFC UP signal from the phase control data also jitters around "0".

As mentioned above, the subtractor 86A outputs the signal that jitters around "0" without being affected by clock base oscillation frequency deviation. If the delay time difference τ occurs and branch switching takes place, a change occurs in the output of the subtractor 86A. Namely, when the branch has been switched from 1 to 2 and the Nyquist point leads by $2\pi \times (\tau/T)$ [radian], phase control works to lead the timing phase, so that the subtractor 86A temporarily outputs a negative value until the timing phase difference becomes "0". When the branch has been switched from 2 to 1 and the Nyquist point lags by $2\pi \times (\tau/T)$ [radian], phase control works to delay the timing phase , so that the subtractor 86A temporarily outputs a positive value until the timing phase difference becomes "0".

The output of the subtractor 86A is accumulated by the register 86C and the adder 86B. Based on a detected select signal coming from the input terminal 67d, the serial-parallel converter 88 divides the result of the accumulation into accumulated value SU1 when branch 1 is selected and accumulated value SU2 when branch 2 is selected. The averaging circuit 89 averages the accumulated value SU1 and the averaging circuit 90 averages the accumulated value SU2. The subtractor 91 subtracts the output of the averaging circuit 89 from the output of the averaging circuit 90 to obtain the delay time difference τ. The averaging circuits 89 and 90 start operating when the frequency deviation measurement complete signal indicates the completion of measurement. When the averaging has been performed sufficiently, the circuits 89 and 90 each output a signal that indicates the completion of averaging along with the average value. The time delay setting output section 67 obtains $t1_i$ and $t2_i$ from the delay time difference τ according to formulas (22) and (23) when the signal indicating the completion of averaging has been outputted from both the averaging circuits 89 and 90.

$$t1_i = \text{INT}[\pi/2] \tag{22}$$

$$t2_i = \text{INT}[\pi/2] - \tau \tag{23}$$

where INT[A} denotes the integer part of A.

Figure 26:
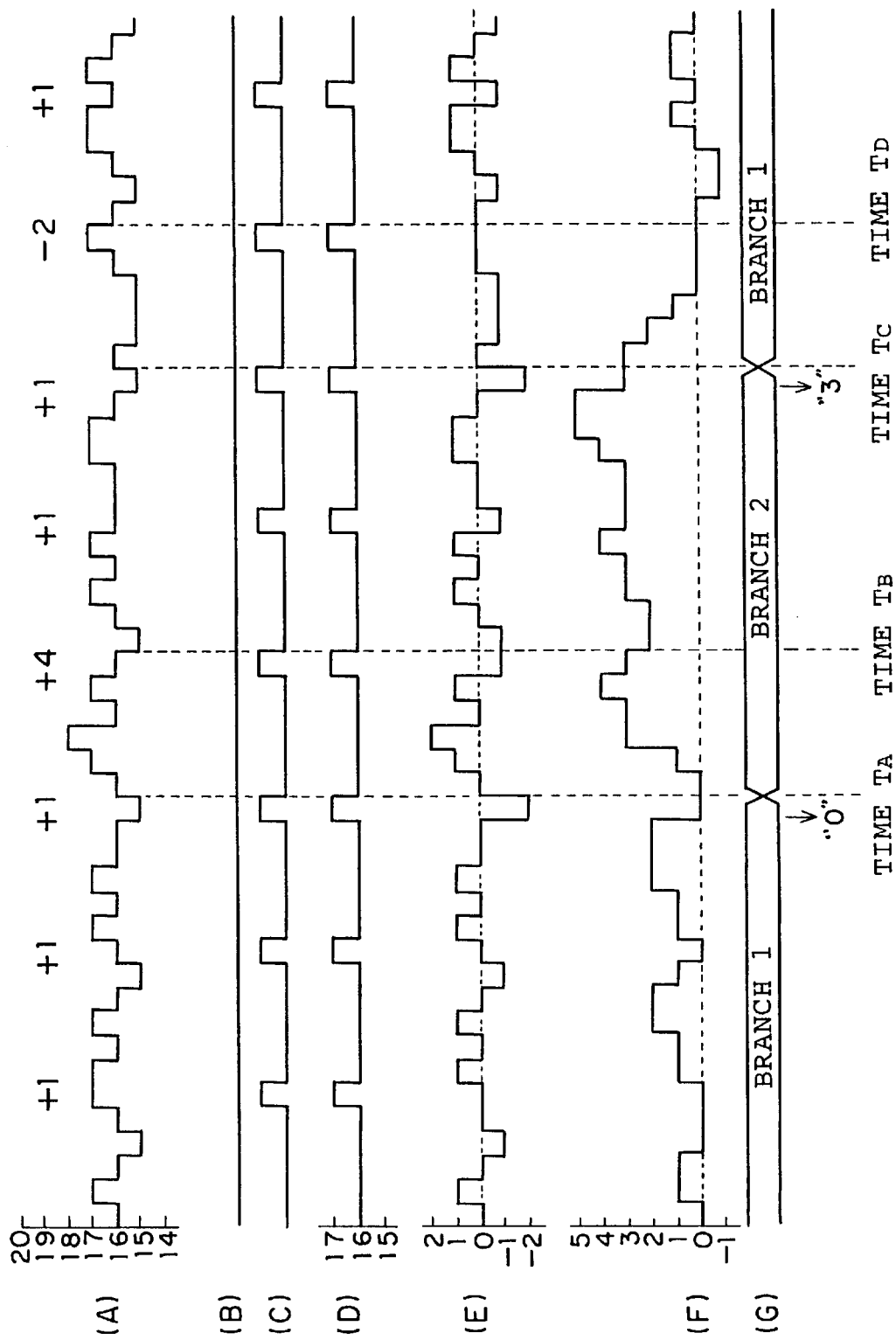
FIG. 26 is a timing chart for describing operations of a time delay difference calculating section in the timing recovery section of FIG. 1.

FIG. 26 shows an example in which $\tau = 3[\pi/16$ radian] is occurring. (A) in FIG. 26 indicates the phase control data entered from the input terminal 67a. In this example, the phase control data coming from the input terminal 67a are initially obtained from the data coming from branch 1. Since the base oscillation frequency on the sending side is higher than that on the receiving side, "17" is outputted as the phase control data more than "15" by one every 6 symbols so that phase control is performed to delay the timing phase. The average value is 16.17, which is higher than "16" although involving a jitter. It is assumed that, at time TA, the branch used is switched from branch 1 to branch 2. Immediately after the switching, the Nyquist point lags by $\tau = 3[\pi/16$ radian]. Consequently, the timing recovery section 5A performs control such that the timing phase difference minus $3[\pi/16$ radian] becomes "0" from the time TA. As a result, a value (16.67) greater than "16" on average is outputted from the time TA to time TB at which the timing phase difference becomes "0", as the phase control data as shown in (A) of FIG. 26.

From the time TB to time TC at which the branch is switched from 2 to 1, the phase control data are outputted with "17" outputted more than "15" by one every 6 symbols again (the average value 16.17). At the time TC, the Nyquist point leads by $\tau = 3[\pi/16$ radian]. Because the timing recovery section performs control such that the timing phase difference $3[\pi/16$ radian] becomes "0" from the time TC, a value (average value 15.67) smaller than "16" on average is outputted as the phase control data from the time TC to time TD at which the timing phase difference becomes "0" as shown in (A) of FIG. 26. Subsequent to the time TD, "17" is outputted more than "15" by one every 6 symbols again (the average value 16.17).

Because the phase control data are affected by clock base oscillation frequency deviation as mentioned above, a 1-symbol width pulse that delays the timing phase every 6 symbols is outputted as the AFC DOWN signal as shown in (C) of FIG. 26. In addition, all-"0" data that prevent the timing phase from advancing are outputted as the AFC UP signal as shown in (B) of FIG. 26. Consequently, "17" is periodically outputted from the frequency deviation eliminated data generating section 87 among "16" as shown in (D) of FIG. 26. The subtractor 86A subtracts the output of the frequency deviation eliminated data generating section 87 shown in (D) of FIG. 26 from the phase control data shown in (A) of FIG. 26 to output data shown in (E) of FIG. 26. Therefore, as shown in (F) of FIG. 26, the output of the adder 86B is a value obtained by accumulating the data shown in (E) of FIG. 26.

The data shown in (F) of FIG. 26 are affected by the delay time difference $\tau=3[\pi/16 \text{ radian}]$, so that the output shown in (F) of FIG. 26 with branch 2 selected are greater than the data shown in (F) with branch 1 selected. The averaging circuit 89 captures the output "0" of (F) of FIG. 26 immediately before switching from branch 1 to branch 2. The averaging circuit 90 captures the output "3" shown in (F) of FIG. 26 immediately before switching from branch 2 to branch 1. The averaging circuits 89 and 90 thus capture plural pieces of data to output an average value thereof.

In the above-mentioned example, the output of the averaging circuit 89 indicates approximate "0" while the output of the averaging circuit 90 indicates approximate "3". Consequently, the subtractor 91 subtracts the output of the averaging circuit 89 from the output of the averaging circuit 90 to output the delay time difference $\tau=$"3". In this example, the time delay setting signal output section 92 substitutes $\tau=3$ into the formulas (22) and (23) to output value $t1_i=1$ and $t2_i=-2$ for eliminating the delay time deviation. Substituting $t1_i$ and $t2_i$ obtained by the time delay setting signal output section 92 into ti of the formula (5) can obtain the number of shift register stages $m1_i$ and $m2_i$ that constitute the time delay sections 60A and 60B. The $m1_i$ and $m2_i$ each correspond to $m_i$ in the formula (5). Thus, the number of stages of each shift register is set to a desired value, the difference between the signal delay time in the detecting section 2A and that in the detecting section 2B is eliminated. Thus, in this example, the difference between the signal delay time in the detecting section 2A and that in the detecting section 2B that occurs with use of select-after-detect diversity is eliminated. This realizes a diversity receiving apparatus that can prevent bit error characteristic and synchronization characteristic from being deteriorated due to delay time difference. In addition to calculating the delay time difference as mentioned above, the timing recovery section 5A provides a following advantage. The phase detecting section 62 in the timing recovery section 5A can efficiently extract the symbol frequency component from the baseband reception phase data regardless of whether the input signal is of random pattern or preamble pattern. The filtering section 63 filters the symbol frequency component coming from the phase detecting section 62 through an integral filter to calculate a timing phase difference and a symbol frequency component quantity. At the same time, the filtering section is constituted such that the integral filter maintains the symbol frequency component quantity also after the timing phase control, thereby reducing the amount of jitter in the clock phase in steady state.

Use of a random walk filter together allows the circuit scale to be reduced as mentioned before. The phase control quantity determining section 65 determines whether the current time is in pull-in state, steady state or line disconnected state. Then, the phase control quantity determining section 65 can shorten the timing phase control interval for phase pull-in state and elongate the same for steady state, thereby increasing timing phase pull-in speed and lowering the jitter in steady state. Further, the phase control quantity determining section 65 can obtain a send/receive clock frequency deviation to perform predicted control at line disconnection or the like, thereby maintaining timing synchronization even during line disconnection.

Based on the functions of components constituting the timing recovery section 5A, the same can realize high-speed phase pull-in characteristic and low jitter for the input signal regardless whether the same is of random pattern or preamble pattern, thereby maintaining timing synchronization even in such a poor line condition that may cause line disconnection. Further, the above-mentioned components can be realized by simple digital circuitry, so that the timing recovery section 5A can be implemented by a digital circuit that is easily implemented on an LSI.

In the present embodiment, the number of branches of the diversity receiving apparatus K=2. It will be apparent that K may be any natural number higher than 2. The diversity receiving apparatus having K sets of branches receives signals by K sets of antennas and converts K sets of received signals to K sets of baseband phase signals respectively to output the converted signals. The diversity receiving apparatus comprises K sets of detecting sections for outputting K sets of received signal powers, K sets of time delay sections provided with K sets of delay times $t1_i$ through $tK_i$ for eliminating the delay time differences of the K sets of detecting sections, K sets of sampling sections for outputting K sets of baseband reception phase data sequence $Y_i$, a selective synthetic diversity section for selecting a value of the highest received signal power from among the K sets of baseband reception phase data sequence $Y_i$ to output the selected value and outputs a select-after-detect signal for indicating the branch selected (1 to K), a timing recovery section, and a Nyquist point extracting section. The time delay difference calculating section of the timing recovery section uses the select-after-detect signal and the phase control data to output delay times $t1_i$ to $tK_i$ for K sets of delay time differences.

In the present embodiment, the diversity receiving apparatus using $\pi/4$ shift QPSK modulating has been described. It will be apparent that the present embodiment is also applicable to diversity receiving apparatuses using other PSK modulating schemes such as QPSK modulating and BPSK modulating as well as other modulating schemes than PSK modulating. Namely, the present embodiment is applicable to any diversity receiving apparatus using a modulating scheme in which the phase jitter of a received signal has a periodicity and the timing phase is synchronized with that period to extract information data.

Embodiment 2

In the second embodiment, a diversity receiving apparatus based on the diversity for receiving signals by K=2 antennas. For the diversity scheme, any of selective synthetic diversity, equivalent gain diversity, and maximum ratio synthetic diversity can be used. A timing recovery section of this embodiment uses baseband reception phase data modulated by $\beta/4$ shift QPSK obtained by quadruple oversampling. In this second embodiment, an integral filtering section for initial pull-in and a random walk filtering for steady state are used for the filtering sections of the timing recovery section. In the first embodiment, the object of the present invention can be achieved without using the random walk filtering section. In the second embodiment, however, use of the random walk filtering section is indispensable.

Figure 27:
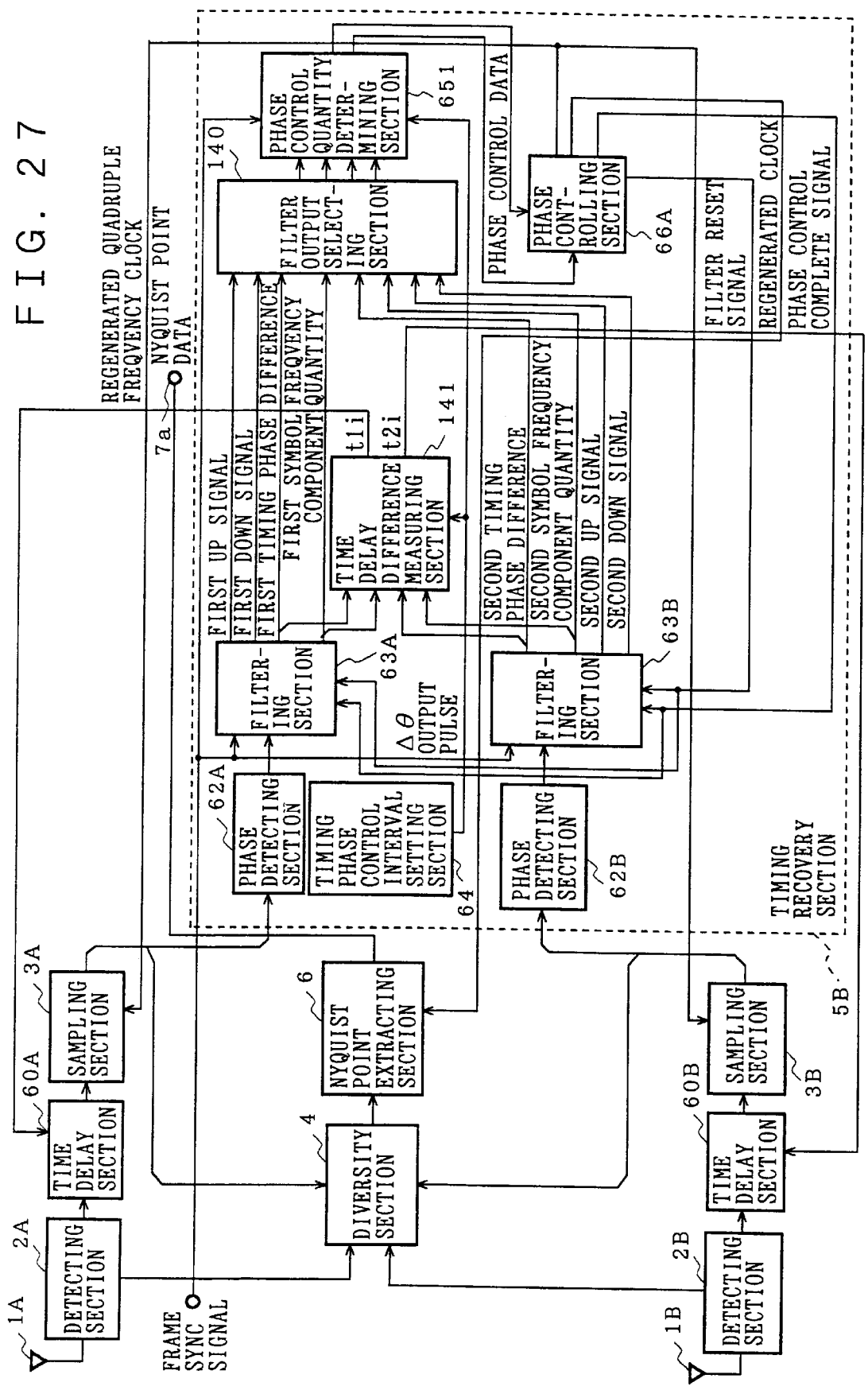
FIG. 27 is a block diagram illustrating the diversity communication apparatus practiced as a second preferred embodiment of the present invention.
Figure 28:
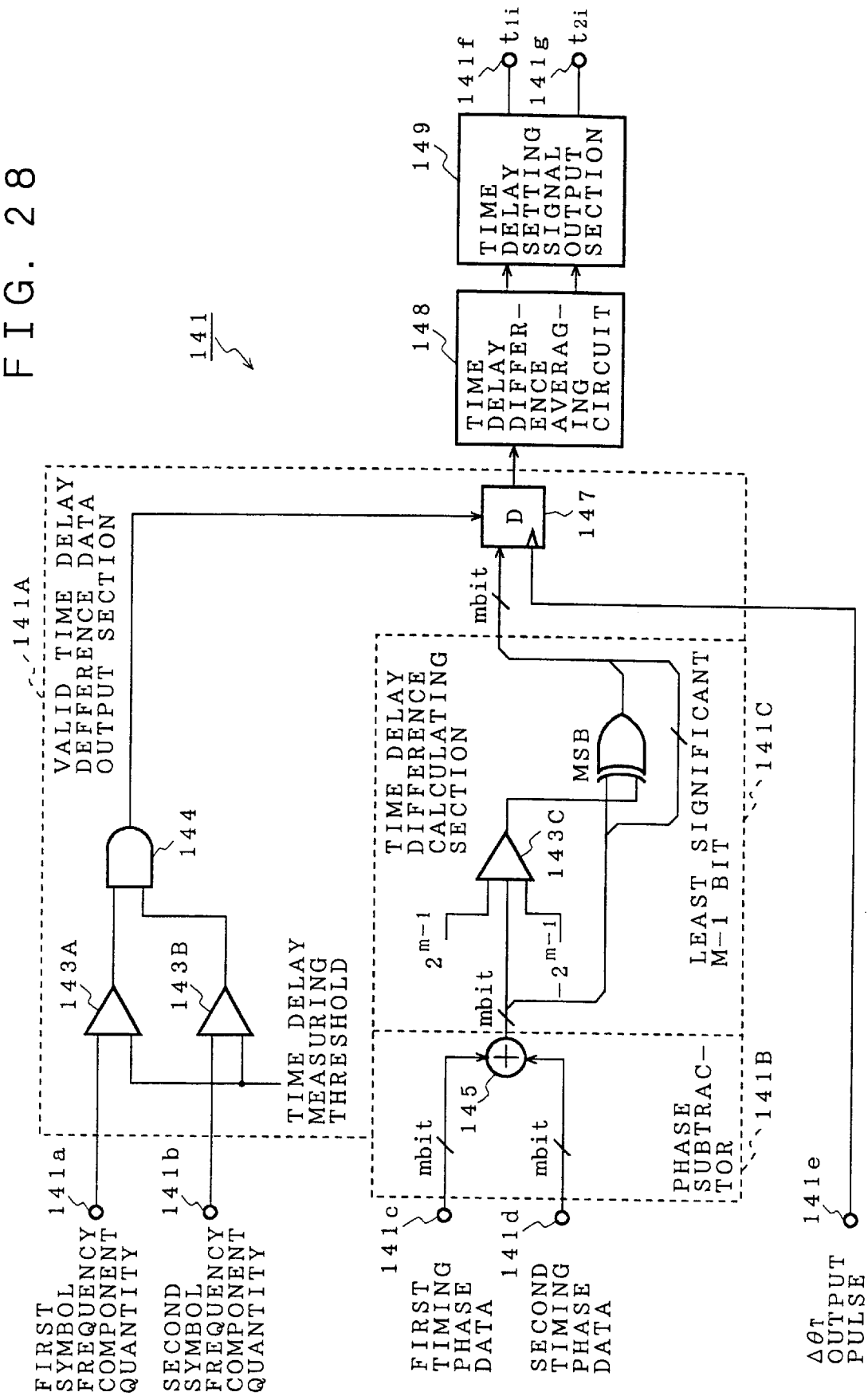
FIG. 28 is a block diagram illustrating a constitution of a time delay difference measuring section in the timing recovery section of FIG. 27.

FIG. 27 in which components similar to those of FIG. 1 are denoted by the same reference numerals shows a block diagram illustrating a constitution of a diversity communication apparatus including a timing recovery section 5B of this embodiment. In the figure, reference numeral 4 indicates a diversity section, 5B indicates a timing recovery section, 62A and 62B indicate phase detecting sections, 63A and 63B indicate filtering sections, 140 indicates a filter output selecting section, 651 indicates a phase control quantity determining section, 66A indicates a phase control section, and 141 indicates a time delay difference measuring section. FIG. 28 shows a block diagram illustrating a constitution of the time delay difference measuring section 141. In the figure, reference numeral 141a indicates a first symbol frequency component input terminal, 141b indicates a second symbol frequency component input terminal, 141c indicates a first timing phase difference data input terminal, 141d indicates a second timing phase data input terminal, 141A indicates a valid time delay difference data output section, 141B indicates a phase subtracting section, 141C indicates a time delay difference calculating section, 143A, 143B and 143C indicate comparators, 144 indicates an AND gate, 145 indicates a subtractor, 146 indicates an exclusive OR gate, 147 indicates a register, 148 indicates a time delay difference averaging circuit, 149 indicates a time delay setting signal output section, 141f indicates a first time delay setting signal output terminal, and 141g indicates a second time delay setting signal output terminal.

Figure 29:
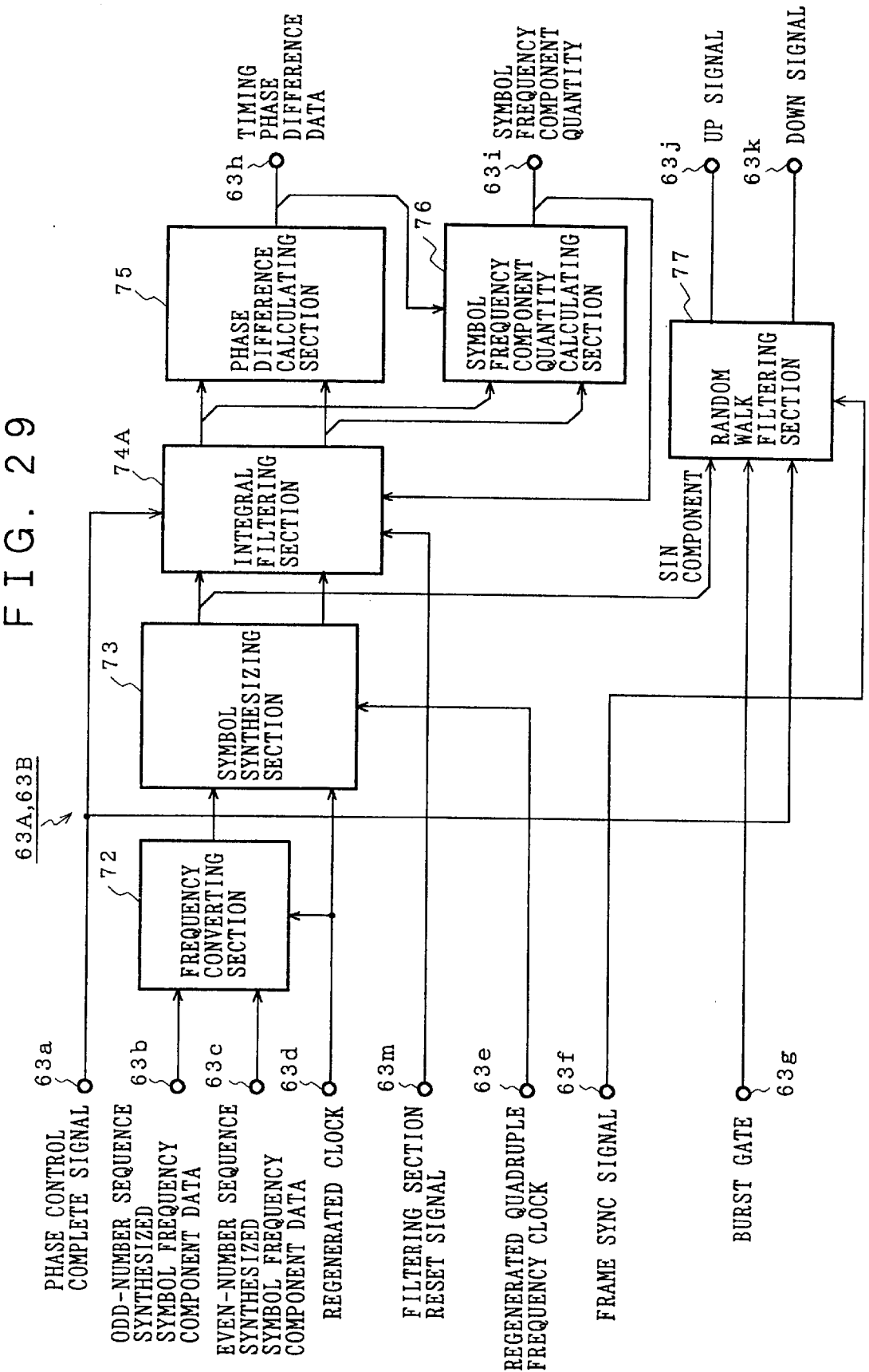
FIG. 29 is a block diagram illustrating a constitution of a filtering section in the timing recovery section of FIG. 27.
Figure 30:
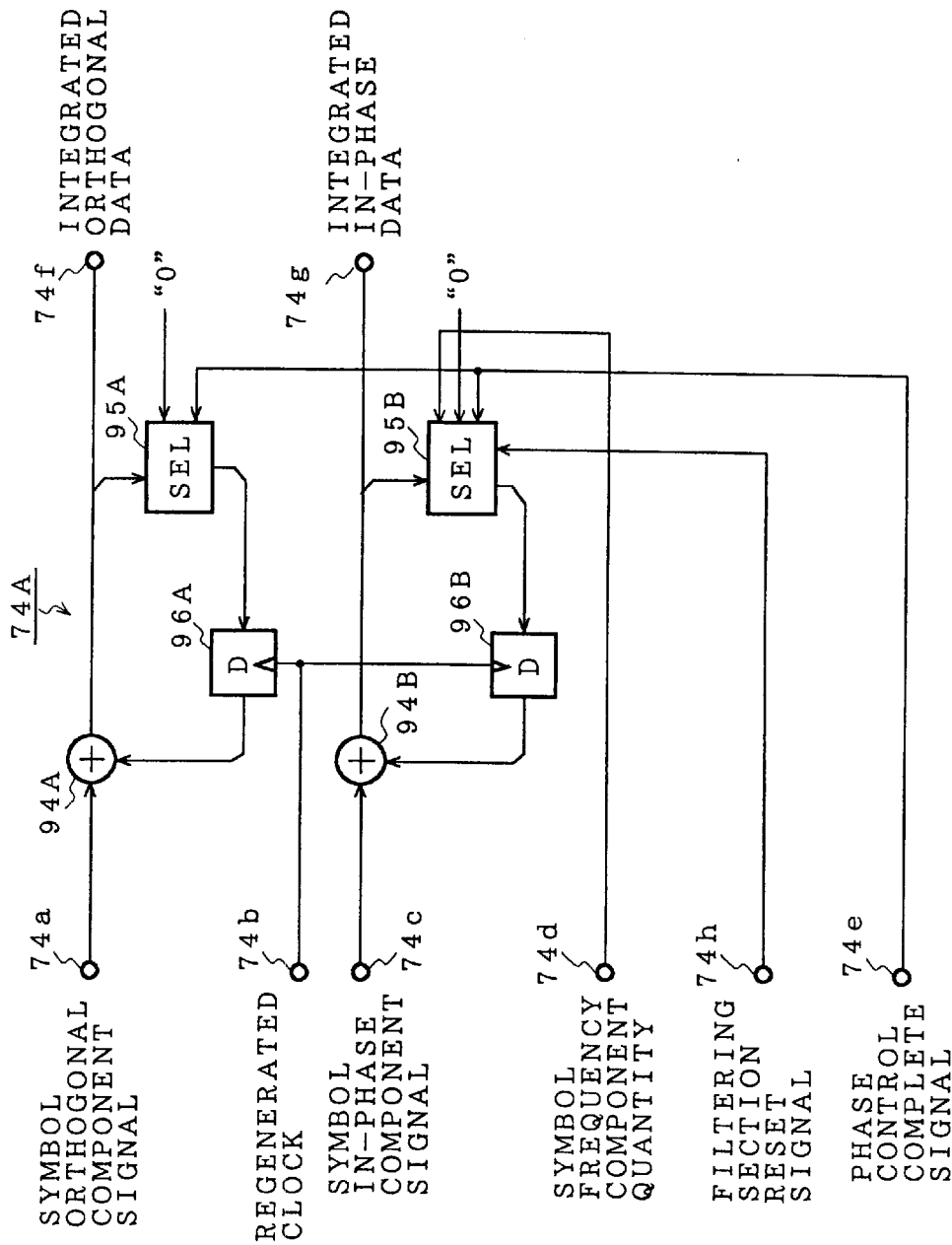
FIG. 30 is a block diagram illustrating a constitution of an integral filtering section in the filtering section of FIG. 29.

FIG. 29, in which components similar to those of FIG. 3 are denoted by the same reference numerals, shows a block diagram illustrating constitutions of the filtering sections 63A and 63B. In the figure, reference 63m indicates a filter reset signal input terminal and 74A indicates an integral filtering section. FIG. 30, in which components similar to those of FIG. 6 are denoted by the same reference numerals, shows a block diagram illustrating a constitution of the integral filtering section 74A in the second embodiment of the invention. In the figure, reference numeral 74h indicates a filter reset signal input terminal and 95C indicates a selector.

Figure 31:
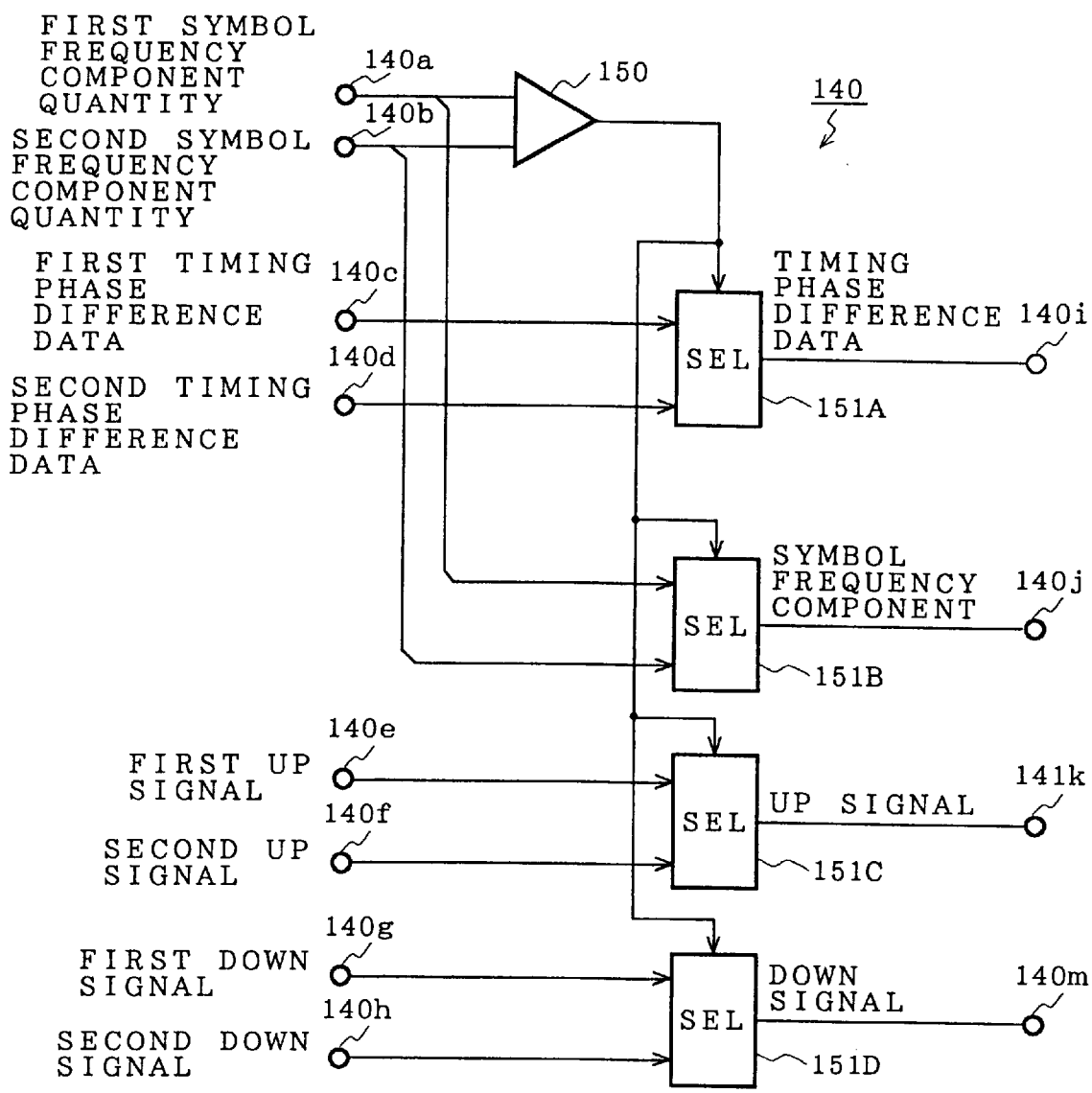
FIG. 31 is a block diagram illustrating a constitution of a filter output selecting section in the timing recovery section of FIG. 27.

FIG. 31 shows a block diagram illustrating a constitution of the filter output selecting section 140 of the second embodiment of the invention. In the figure, reference numeral 140a indicates a first symbol frequency component quantity input terminal, 140b indicates a second symbol frequency component quantity input terminal, 140c indicates a first timing phase difference input terminal, 140d indicates a second timing phase difference data input terminal, 140e indicates a first UP signal input terminal, 140f indicates a second UP signal input terminal, 140g indicates a first DOWN signal input terminal, 140h indicates a second DOWN signal input terminal, 150 indicates a comparator, 151A, 151B, 151C, and 151D indicate selectors, 141i indicates a timing phase difference data output terminal, 141j indicates timing phase difference data output terminal, 141j indicates a symbol frequency component quantity output terminal, 141k indicates an UP signal output terminal, and 141m indicates a DOWN signal output terminal.

The following describes operations of the second embodiment of the invention. First, the overall operation of the second embodiment will be described. The detecting section 2A, the time delay section 60, and the sampling section 3A performs the same operations as those performed by the counterpart of the first embodiment. Therefore, baseband reception phase data quadruple-oversampled of branch 1 and a received signal power of branch 1 are obtained. The detecting section 2B, the time delay section 60B, and the sampling section 3B performs the same operations as those performed by the counterpart of the first embodiment. Therefore, baseband reception phase data quadruple-oversampled of branch 2 and a received signal power of branch 2 are obtained.

The diversity section 4 uses baseband reception phase data outputted from the sampling sections 3A and 3B and received signal powers of each branch coming from the detecting sections 2A and 2B to perform signal processing by selective synthetic diversity, equivalent gain synthetic diversity or maximum ratio synthetic diversity, outputting the synthesized baseband reception phase data. The resolution of the baseband phase data is 5 bits like the first embodiment.

The timing recovery section 5B uses the baseband reception phase data outputted from the sampling sections 3A and 3B to perform timing regeneration and controls the regenerated quadruple frequency clock phase such that the baseband reception phase data at Nyquist point positions are sampled like the first embodiment. The timing recovery section also outputs a regenerated clock for extracting Nyquist point data from the baseband reception phase data after synthesis of the output of the diversity section 4.

Further, as with the first embodiment, the timing recovery section 5B calculates an input/output delay time difference between the detecting sections 2A and 2B to output delay time setting signals $t1_i$ and $t2_i$, for eliminating the delay time difference. The Nyquist point extracting section 6, as with the first embodiment, extracts, by using the regenerated clock coming from the timing recovery section 5B, Nyquist point data from the baseband reception phase data after synthesis outputted from the diversity section 4 and outputs the extracted Nyquist point data. The time delay sections 60A and 60B, as with the first embodiment, set the number of shift register stages to 1 to mx according to the delay time setting signals $t1_i$ and $t2_i$ respectively. In the initial state until the delay time is calculated, the number of shift register stages is set to mx/2. The relationship between the delay time setting signals $t1_i$ and $t2_i$ and the shift register stages setting values $m1_i$ and $m2_i$ is obtained from the above-mentioned formula (4).

The following describes operations of the timing recovery section 5B. The baseband reception phase data quadruple-oversampled outputted from the sampling section 3A are entered in the phase detecting section 62A. The constitution of the phase detecting section 62A is the same as the constitution of the phase detecting section 62 in the first embodiment of FIG. 2. Consequently, the phase detecting section 62A performs the same operation as with the first embodiment to output first even-number sequence synthesized symbol frequency component data and first odd-number sequence synthesized symbol frequency component data. The baseband reception phase data quadruple-oversampled outputted from the sampling section 3B is entered in the phase detecting section 62B. The constitution of the phase detecting section 62B is also the same as the constitution of the phase detecting section 62 of the first embodiment of FIG. 2. Consequently, the phase detecting section 62B performs the same operation as with the phase detecting section 62A to output second even-number sequence synthesized symbol frequency component data and second odd-number sequence synthesized symbol frequency component data.

The first even-number sequence synthesized symbol frequency component data and first odd-number sequence synthesized symbol frequency component data outputted from the phase detecting section 62A are entered in the filtering section 63A. The second even-number sequence synthesized symbol frequency component data and second odd-number sequence synthesized symbol frequency component data outputted from the phase detecting section 62B are entered in the filtering section 63B. The constitutions of the filtering sections 63A and 63B of FIG. 29 are generally similar to that of the filtering section 63 in the first embodiment of FIG. 3. The filtering sections 63A and 63B differ in constitution from the filtering section 63 in that the integral filtering section 74A has a constitution as shown in FIG. 30.

The integral filtering section 74 of FIG. 30 has no capability of infinite impulse response filter of the first embodiment but is an accumulator having a limiter. Consequently, this constitution lowers the phase following characteristic in steady state but reduces circuit scale. The following describes the operation of the integral filtering section 74A. A symbol orthogonal component entered in the input terminal 74a is accumulated by an accumulator composed of the adder 94a and the register 96A. Likewise, a symbol in-phase component entered in the input terminal 74c is accumulated by a accumulating circuit composed of the adder 94B and the register 96B. These accumulating operations are performed in the period of the regenerated clock entered in the input terminal 74b.

The selector 95A selects the output of the adder 94A at normal time to output the selected signal to the register 96A. If the phase control complete signal entered from the input terminal 74e indicates that phase control has been completed, the selector 95A outputs "0" to the register 96A. The selector 95C selects the output of the adder 94B at normal time to output the selected signal to the register 96B. If the phase control complete signal entered from the input terminal 74e indicates that phase control has been completed and the filter reset signal entered from the input terminal 74h instructs to reset the register 96B to "0", the selector 95C outputs "0" to the register 96B. If the phase control complete signal entered from the input terminal 74e indicates that phase control has been completed and the filter reset signal entered from the input terminal 74h does not instruct to reset the register 96B to "0", the selector 95C outputs a symbol frequency component quantity entered from the input terminal 74d to the register 96B.

The selectors 95A and 95C each have the limiter capability for overflow prevention. When outputs of the adders 94A and 94B have exceeded a predetermined stored threshold, the selectors 95A and 95C divide the values of adders 94A and 94B by a certain value D before outputting these values. If D is 2 to a power, then the dividing operation can be implemented by bit shifting. In this case, a dividing circuit can be implemented easily. As shown in FIG. 29, in each of the filtering section 63A and 63B, the phase difference calculating section 75 uses the integrated in-phase data and the integrated orthogonal data coming from the integral filtering section 74A to obtain timing phase difference data in the same manner as with the first embodiment. The symbol frequency component quantity calculating section 76 uses the integrated in-phase data and integrated orthogonal data coming from the integral filtering section 74A to obtain a symbol frequency component quantity in the same as with the first embodiment. The random walk filtering section 77 obtains the UP signal and the DOWN signal in the same manner as with the first embodiment and outputs the obtained signals.

The first timing phase difference data, first symbol frequency component quantity and first UP and DOWN signals coming from the filtering section 63A and the second timing phase difference data, second symbol frequency component quantity and second UP and DOWN signals coming from the filtering section 63B are all entered in the filter output selecting section 140. The filter output selecting section 140 outputs the output of the filtering section having the larger symbol frequency component quantity to the rear-stage phase control quantity determining section 651.

Because the output of the filtering section having the larger symbol frequency component quantity presents a surer value, selecting the output of the filtering section having the larger symbol frequency component quantity enhances the characteristic. The constitution of the filter output selecting section 140 is as shown in FIG. 31. The comparator 150 compares the first symbol frequency component quantity coming from the input terminal 140a with the second symbol frequency component quantity coming from the input terminal 140b to output logic "1" if the first symbol frequency component quantity is found greater than the second symbol frequency component quantity or logic "0" otherwise.

If the output of the comparator 150 is "1", the selector 151A selects the first timing phase difference data coming from the input terminal 140c as the timing phase difference data and outputs the selected data to the output terminal 140i. If the output of the comparator 150 is "0", the selector 151A selects the second timing phase difference data coming from the input terminal 140d as the timing phase difference data and outputs the selected data to the output terminal 140i. If the output of the comparator 150 is "1", the selector 151B selects the first symbol frequency component quantity coming from the input terminal 140a as the symbol frequency component quantity and outputs the selected quantity to the output terminal 140j. If the output of the comparator 150 is "0", the selector 151B selects the second symbol frequency component quantity coming from the input terminal 140b as the symbol frequency component quantity and outputs the selected quantity to the output terminal 140j.

The selector 151C, if the output of the comparator 150 is "1", selects the first UP signal coming from the input terminal 140e as the UP signal and outputs the selected signal from the output terminal 140k. The selector 151C, if the output of the comparator 150 is "0", selects the second UP signal coming from the input terminal 140f as the UP signal and outputs the selected signal from the output terminal 140k. The selector 151D, if the output of the comparator 150 is "1", selects the first DOWN signal coming from the input terminal 140g as the DOWN signal and outputs the selected signal from the output terminal 140m. The selector 151C, if the output of the comparator 150 is "0", selects the second DOWN signal coming from the input terminal 140h as the DOWN signal and outputs the selected signal from the output terminal 140m.

Using the above-obtained timing phase difference data, the symbol frequency component quantities, and UP and DOWN signals outputted from the filter output selecting section 140, the phase control quantity determining section 651 obtains the phase control data in the same manner as with the first embodiment. The phase control section 66A operates in the same manner as with the first embodiment to perform phase control based on the phase control data. In the first embodiment, the diversity section 4 compares the received signal power of branch 1 with the received signal power of branch 2 and the timing recovery section performs a timing recovery operation by using the received phase data having the greater received signal power. In the second embodiment, however, the filter output selecting section 140 compares the symbol frequency components quantities of the two filtering section outputs and determines the phase control data by using the filtering section output having the greater quantity to perform the timing recovery operation.

Because the detecting sections 2A and 2B are generally constituted by analog devices, use of low-cost devices the received signal powers outputted from the detecting sections 2A and 2B may cause a large error. In such a case, the data between the branches can be selected more correctly by selecting the data between the branches in the magnitude of the symbol frequency component quantity as with this second embodiment, rather than by selecting the data in the magnitude of the received signal power as with the first embodiment. Namely, each of the characteristics of the timing recovery section 5B of the second embodiment is better than each of the characteristics of the timing recovery section 5A of the first embodiment.

In the second embodiment, the output of the AND gate 81 coming from the phase control quantity determining section 651 of FIG. 4 is also entered in the phase control section 66A. The output of the AND gate 81 indicates whether the current point of time is in pull-in state or steady state. If the signal indicates steady state, the phase control section 66A outputs a filter reset signal for resetting to "0" the registers 96A and 96B in the integral filtering section 74A in the filtering section 63A and 63B. Subsequently, the phase control section 66A outputs the filter reset signal for resetting to "0" the registers 96A and 96B if the phase control complete signal indicates that clock phase control has been performed.

Thus, when the registers 96A and 96B in each integral filtering section 74A are reset to "0" every time the clock phase control in steady state is performed, the integral filtering section 74A can calculate the difference between the signal delay time in the detecting section 2A and the signal delay time in the detecting section 2B by using the accumulated symbol frequency component quantities and the timing phase difference data during the random walk filtering section 77 is performing phase control in steady state.

Figure 32:
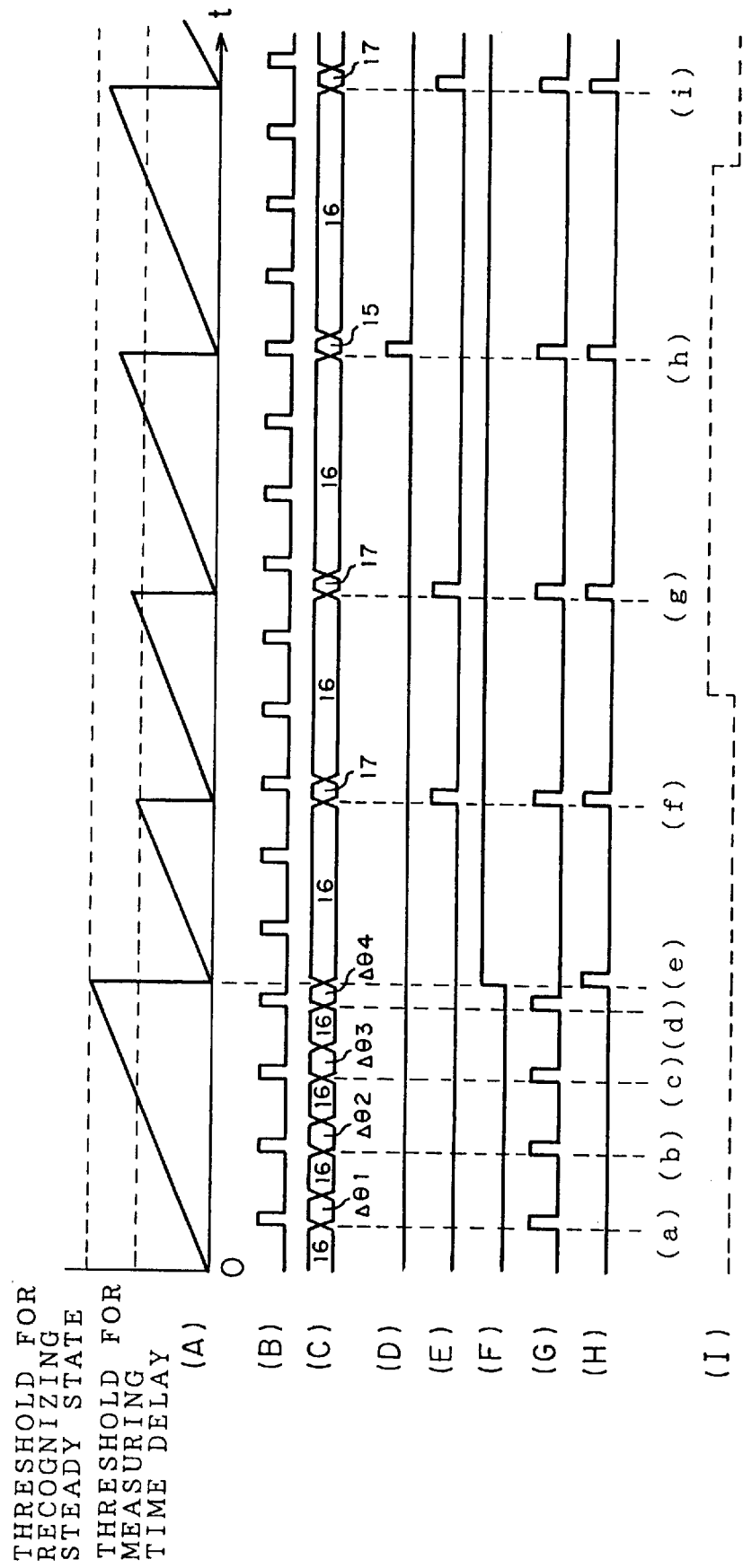
FIG. 32 is a timing chart for describing operations of the timing recovery section of FIG. 27.

FIG. 32 shows a timing chart indicating the overall operations of the second embodiment of the invention. FIGS. 33(A) through 33(D) and FIGS. 34(A) through 34(E) are characteristics diagrams for describing the operations of the second embodiment. These figures indicate the output of each integral filter at points (a) through (i) of FIG. 32 in the integrated orthogonal data (QS) of vertical axis and the integrated in-phase data (IS) of horizontal axis. The vector indicated by solid line indicates the output of the integral filtering section 74A in the filtering section 63 on the branch 1 side and the vector indicated by broken line indicates the output of the integral filtering section 74A in the filtering section 63B on the branch 2 side. The length of each of the vectors provides a symbol frequency component quantity.

When the baseband reception phase data coming from each branch are entered in the timing recovery section 5B and the same starts operating, the filtering sections 63A and 63B each output a symbol frequency component that increases gradually from 0 as shown in (A) of FIG. 32. (B) in FIG. 32 indicates the $\Delta\theta_T$ output pulse for indicating that the timing phase difference data $\Delta\theta_T$ have been outputted. Because the $\Delta\theta_T$ output pulse is outputted at point (a), the phase control using timing phase difference data $\Delta\theta_1$ is performed. The timing phase difference data $\Delta\theta_1$ are the timing phase difference $\Delta\theta_1$ at point (a). At this moment, if the output of the integral filtering section 73A in each of the filtering sections 63A and 63B is expressed in the vectors shown in FIG. 33(A), the first symbol frequency component quantity on the branch 1 side indicated by solid line is greater than the second symbol frequency component quantity on the branch 2 side indicated by broken line. Consequently, the timing phase difference data $\Delta\theta_1$ provide the first timing phase difference data proportional to the angle of the vector indicated by solid line as shown in FIG. 33(A). The symbol frequency component quantity provides the length of the vector indicated by solid line.

(C) in FIG. 32 indicates phase control data PD1. Immediately after time point (a), as shown in FIG. 32, phase control is performed by using the phase control data PD1 obtained from the formula (18) with the timing phase difference data $\Delta\theta_1$ regarded as $\Delta\theta_T'$ in the formula (18). Then, a rising pulse indicating that the phase control has been performed is outputted as the phase control complete signal indicated at (G) of FIG. 32. Immediately after time point (a), the symbol frequency component quantity is less than the threshold value for recognizing steady state, so that no rising pulse for resetting to "0" the registers 96A and 96B in the integral filtering section 74A appears in the filter reset signal indicated at (H) of FIG. 32. Consequently, the symbol frequency component quantity (the length of vector) accumulated in each integral filtering section 74A is not lost. As with the first embodiment, the vector directions indicated by the integral filtering section 74A are rotated in angle "0" direction (indicated by broken line of FIG. 33(A)).

Following time point (a), the symbol frequency component quantity increases gradually. Because the $\Delta\theta_T$ output pulse is outputted at time point (b), the phase control by timing phase difference data $\Delta\theta_2$ is performed. The timing phase difference data $\Delta\theta_2$ is the timing phase difference $\Delta\theta_1$ at time point (b). At this moment, if the output of the integral filtering section 74A in each of the filtering sections 63A and 63B is indicated by the vector as shown in FIG. 33(B), the second symbol frequency component quantity on the branch 2 side indicated by broken line is greater than the first symbol frequency component quantity on the branch 1 side indicated by solid line. Consequently, the timing phase difference data $\Delta\theta_2$ becomes the second timing phase difference data proportional to the angle of the vector indicated by broken line as shown in FIG. 33(B). At this moment, the symbol frequency component quantity becomes the length of the vector indicated by broken line.

Immediately after time point (b), phase control is performed by using phase control data PD2 obtained from the timing phase difference $\Delta\theta_2$. Then, as the phase control complete signal, a rising pulse indicating that the phase control has been performed is outputted. Immediately after time point (b), the symbol frequency component quantity is still lower than the threshold value for recognizing steady state, so that, in the filter reset signal indicated at (H) of FIG. 32, a rising pulse for resetting the registers 96A and 96B in each integral filtering section 74A to "0" is not outputted. Consequently, as with immediately after time point (a), the symbol frequency component quantity (the length of vector) accumulated in each integral filtering section 74A is not lost also at time point (b), the vectors indicated by each integral filtering section 74A being rotated in the direction of angle "0".

Figure 33:
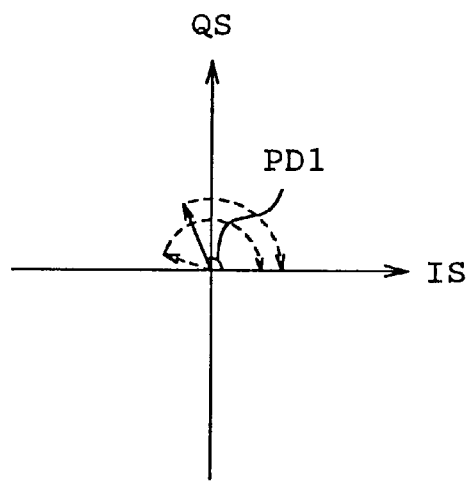
FIGS. 33(A) through 33(D) are characteristics diagrams for describing operations of the integral filtering section of FIG. 30.
Figure 33:
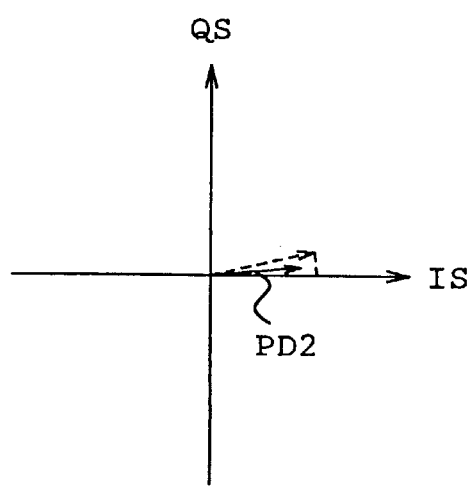
Figure 33:
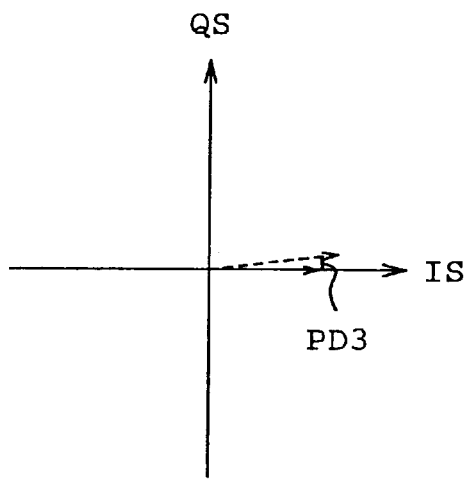
Figure 33:
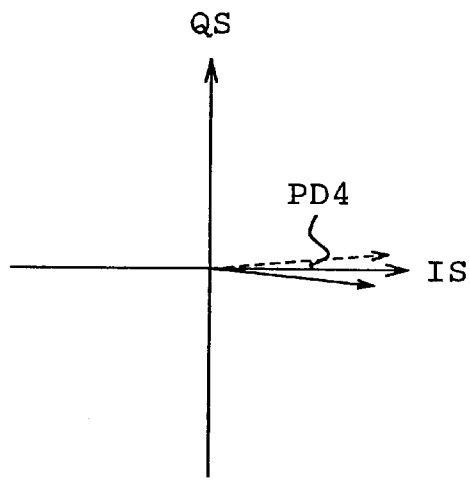
Figure 34:
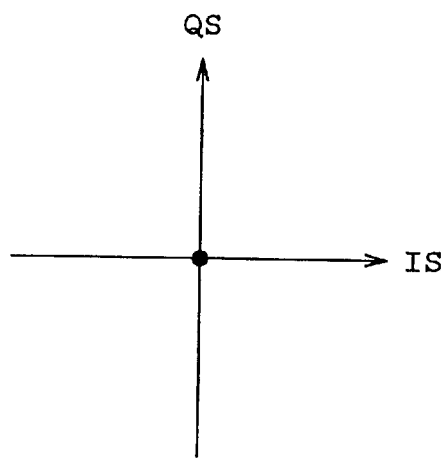
FIGS. 34(A) through 34(E) are other characteristics diagrams for describing operations of the integral filtering section of FIG. 30.
Figure 34:
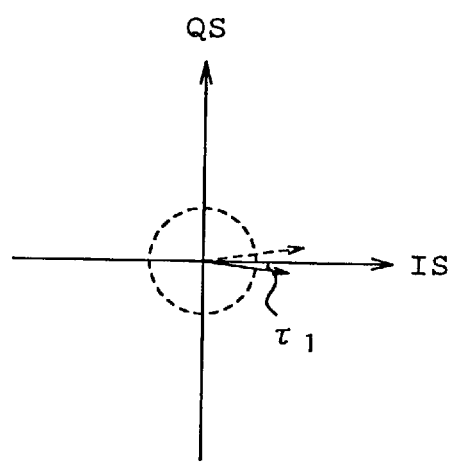
Figure 34:
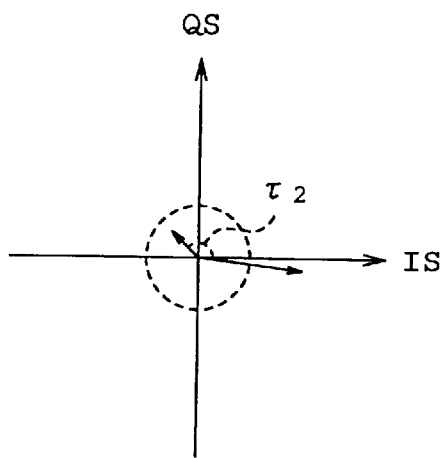
Figure 34:
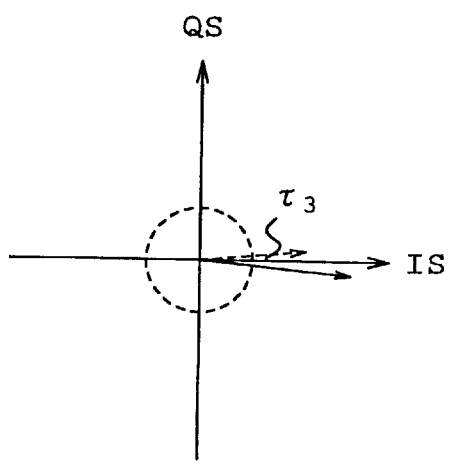
Figure 34:
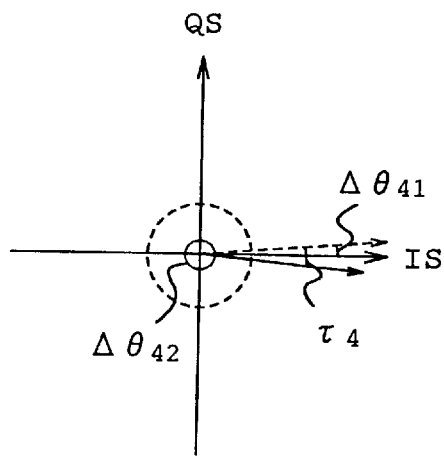

Also after time point (b), the symbol frequency component quantity increases gradually. At time points (c) and (d) at which the $\Delta\theta_T$ output pulse rises, the outputs of each integral filtering section 74A present the vectors as shown in FIGS. 33(A) and 33 (B). Consequently, the generally the same operation as mentioned above is performed, in which the vector on the branch 2 side indicated by broken line is selected, phase control based on phase control data PD3 and PD4 obtained by use of the timing phase difference data $\Delta\theta_3$ and $\Delta\theta_4$ is performed, and the symbol frequency component quantity is accumulated.

As shown in FIG. 32, the symbol frequency component quantity exceeds the threshold for recognizing steady state at time point (e). Therefore, the output of the AND gate 144 indicated at (F) of FIG. 32 changes from logic "0" to logic "1" that indicates steady state. At the same time, a rising pulse is generated in the filter reset signal, upon which the outputs of the integral filtering sections are reset to "0" as shown in (A) of FIG. 32. The phase control subsequent to time point (e) is performed by use of the UP signal and the DOWN signal. Therefore, resetting the outputs of the integral filtering section 74A to "0" causes no trouble in circuit operation. Starting from time point (e), the integral filtering section 74A accumulates the symbol frequency component quantity from "0" again.

As shown in (E) of FIG. 32, a rising pulse is generated in the DOWN signal at time point (f). Therefore, phase control data become "17", delaying the timing phase. Because the comparator 150 is outputting logic "0" as shown in (I) of FIG. 32, the DOWN signal is the signal coming from the branch 2 side, namely the second DOWN signal. Between time points (e) and (f), the symbol frequency component quantity is accumulated in each integral filtering section 74A in uncontrolled state in which no phase control is performed. It should be noted that, in uncontrolled state, sampling by a fixed clock is performed. If the output of each integral filtering section 74A immediately before time point (f) takes a value indicated in FIG. 34(B), measuring the angle difference of the vectors of FIG. 34(B) can obtain difference $\tau_1$ between the signal delay time in the detecting section 2A and the signal delay time in the detecting section 2B. Therefore, the time delay difference measuring section 141 of FIG. 27 can obtain the delay time difference $\tau_1$ by averaging the angle differences of the vectors indicated by each integral filtering section 74A immediately before starting of the phase control in steady state.

The reliability of this delay time difference is determined by the lengths of these two vectors. Therefore, in order to enhance the measuring accuracy of the delay time difference, the time delay difference measuring section 141 uses, for averaging, the obtained delay time difference data as a valid value only when the lengths of the two vectors, namely, the first symbol frequency component quantity and the second symbol frequency component quantity both have exceeded the predetermined threshold for measuring delay time. The vectors shown in (B) of FIG. 34 both have exceeded the threshold for delay time measurement indicated by broken line circle, so that the delay time difference $\tau_1$ is valid.

At time point (f) of FIG. 32, the timing phase control based on the DOWN signal is performed, so that, in the phase control complete signal indicated in (G) of FIG. 32, a rising pulse indicating that the phase control has been performed is generated. At the same time, because the phase control operation has been shifted to the operation in steady state, a rising pulse appears in the filter reset signal. Consequently, the outputs of each of the integral filtering sections are reset to "0" at time point (f) again as shown in (A) of FIG. 32.

As shown in FIG. 32, a rising pulse appears again in the DOWN signal at time point (g). Therefore, the phase control data become "17", delaying the timing phase. Because the comparator 150 is outputting logic "1" as shown in (I) of FIG. 32, this DOWN signal is the first DOWN signal coming from the branch 1 side. Starting from time point (f), the symbol frequency component quantity is accumulated from "0" in each integral filtering section 74A. If the output of each integral filtering section 74A takes a value shown in (C) of FIG. 34 immediately before time point (g), measuring the angle difference of the vectors shown in (C) of FIG. 34 can obtain difference $\tau_2$ between the signal delay period in the detecting section 2A and the signal delay period in the detecting section 2B. However, of the vectors shown in (C) of FIG. 34, the value of the vector of the branch 2 becomes lower than the threshold for delay time measurement indicated by broken line circle. Therefore, the delay time difference $\tau_2$ is determined invalid and is not used for averaging. At time point (g), the output of each integral filtering section 74A is reset to "0" again as shown in (A) of FIG. 32.

As shown in (D) of FIG. 32, a rising pulse appears again in the UP signal at time point (h). Therefore, the phase control data become "15", advancing the timing phase. Because the comparator 150 is outputting logic "1" as shown in (I) of FIG. 32, this UP signal is the first UP signal coming from the branch 1 side. Starting from time point (g), the symbol frequency component quantity is accumulated from "0" in each integral filtering section 74A. If the output of each integral filtering section 74A takes a value shown in FIG. 34(D) immediately before time point (h), measuring the angle difference of the vectors shown in FIG. 34(D) can obtain difference $\tau_3$ between the detecting section 2A and the detecting section 2B. Because the vectors shown in FIG. 34(D) are both in excess of the threshold for delay time measurement indicated by broken line circle, the delay time $\tau_3$ is valid and averaging is performed. At time point (h), the output of each integral filtering section 74A is reset to "0" again as shown in (A) of FIG. 32. As shown in (E) of FIG. 32, a rising pulse appears again in the UP signal at time point (i). Therefore, the phase control data become "17", delaying the timing phase. Because the comparator 150 is outputting logic "0" as shown in (I) of FIG. 32, this DOWN signal is the second DOWN signal coming from the branch 2 side. Starting from time point (h), the symbol frequency component quantity is accumulated from "0" in each integral filtering section 74A. If the output of each integral filtering section 74A takes a value shown in FIG. 34(E) immediately before time point.(i), measuring the angle difference of the vectors shown in FIG. 34(E) can obtain difference (4 between the signal delay time in the detecting section 2A and the signal delay time in the detecting section 2B. Because the vectors shown in FIG. 34(E) are both in excess of the threshold for delay time measurement indicated by broken line circle, the delay time $\tau_4$ is valid and used for averaging. At time point (i), the output of each integral filtering section 74A is reset to "0" again as shown in (A) of FIG. 32.

Thus, while performing the timing phase control in steady state based on the UP and DOWN signals, the time delay difference measuring section 141 can measure the difference between the delay time caused in the detecting section 2A and the delay time caused in the detecting section 2B. However, the delay times are measured by the vector angle difference; therefore, of two angle differences of angle difference Tθ [radian] and angle difference (2π−Tθ)[radian], value that is over −π[radian] and below π[radian] is the delay time difference. Consequently, in the second embodiment, the measurable delay time difference is in a range over-π[radian] and below π[radian]. The time delay difference measuring section 141 is implemented by the constitution of FIG. 28.

The calculation of the delay time difference will be described in detail. In the present embodiment, timing phase difference data is expressed in natural numbers 0 to 31. Therefore, a delay time difference falls in a range from −16 to 15. It is assumed that the first timing phase difference data outputted from the filtering section 63A on the branch 1 side is $\Delta\theta_{41}=2$, and the second timing phase difference data outputted from the filtering section 63B on the branch 2 side is $\Delta\theta_{42}=30$.

$\Delta\theta_{41}=2$ entered from the input terminal 141c in the time delay difference measuring section 141 and $\Delta\theta_{42}=30$ entered from the input terminal 141d are subtracted in the subtractor 145. Namely, the subtractor 145 outputs 2−30=−28. In the present embodiment, the after subtraction takes a value in a range of −31 to 31 in two's complement notation. The comparator 143c outputs "0" if the value after subtraction is in the range of −16 to 15 and "1" otherwise. The value after subtraction is entered in the register 147 without change if the output of the comparator 143c indicates logic "0"; if the output of the comparator 143c indicates logic "1", the value is entered in the register 147 with the most significant bit inverted. The value entered in the register 147 becomes delay time difference τ.

These operations are realized by entering the most significant bit of the output of the subtractor 145 and the output of the comparator 143c into the exclusive OR gate 146 and entering in the register 147 the data with the output of the exclusive OR gate being the most significant bit instead of the most significant bit of the output of the subtractor 145. If the output of the subtractor 145 is −28, the output of the comparator 143c becomes logic "1". Value "−28" represented as "100100" in binary notation becomes "4", which is represented as "00100" by inverting the most significant bit. The above-mentioned operation is expressed in the following formulas where the output of the subtractor 145 being Tθ', the input in the register 147, namely the delay time difference being τ:

$$if -16 \leq T\theta' < 16,$$

$$\tau = T\theta \quad (24a)$$

$$if -16 > T\theta'$$

$$\tau = 32 + T\theta',$$

$$if\ T\theta' \geq 16,$$

$$\tau = T\theta - 32 \quad (24b)$$

As mentioned above, only when the first symbol frequency component quantity and the second symbol frequency component quantity both exceed the threshold value for delay time measurement, the delay time difference data τi are used for averaging as the valid value. Consequently, the time delay difference measuring section 141 performs the following operation. The first symbol frequency component quantity entered from the input terminal 141a and the second symbol frequency component quantity entered from the input terminal 141b are compared with the threshold value for delay time measurement in the comparators 143A and 143B respectively. The comparators 143A and 143B each output logic "1" if the corresponding symbol frequency component quantity has exceeded the threshold value. The AND gate 144 uses the outputs of the comparators 143A and 143B as its inputs, so that the AND gate 144 outputs logic "1" only when the first symbol frequency component quantity and the second symbol frequency component quantity have both exceeded the threshold value for delay time measurement.

The register 147 outputs τ, which is the input data, to the time delay difference averaging circuit 148 in the rear stage only when the output of the AND gate presents logic "1". According to the above-mentioned operation, $\tau_1$, $\tau_3$ and $\tau_4$ are outputted to the time delay difference averaging circuit 148 in the rear stage. However, as for $\tau_2$, the symbol frequency component quantity 2 is not in excess of the threshold value for delay time measurement, so that the output of the AND gate 144 becomes logic "0" and $\tau_2$ is not outputted to the time delay difference averaging circuit 148 in the rear stage.

The time delay difference averaging circuit 148 averages the entered delay time difference data to output an average value $\tau_M$ of the delay time difference data and a signal that indicates completion of averaging. The time delay setting signal output section 149, when the signal indicating completion of averaging is entered from the time delay difference averaging circuit 148 of the preceding stage, operates in the same manner as the time delay setting signal output section 92 of the first embodiment. Namely, using the formulas (22) and (18), the output section 149 calculates $t1_i$ and $t2_i$ and output them. When $t1_i$, and $t2_i$, are outputted, the time delay sections 60A and 60B perform control such that the delay time difference using $t1_i$ and $t2_i$ is eliminated as with the first embodiment.

Figure 68:
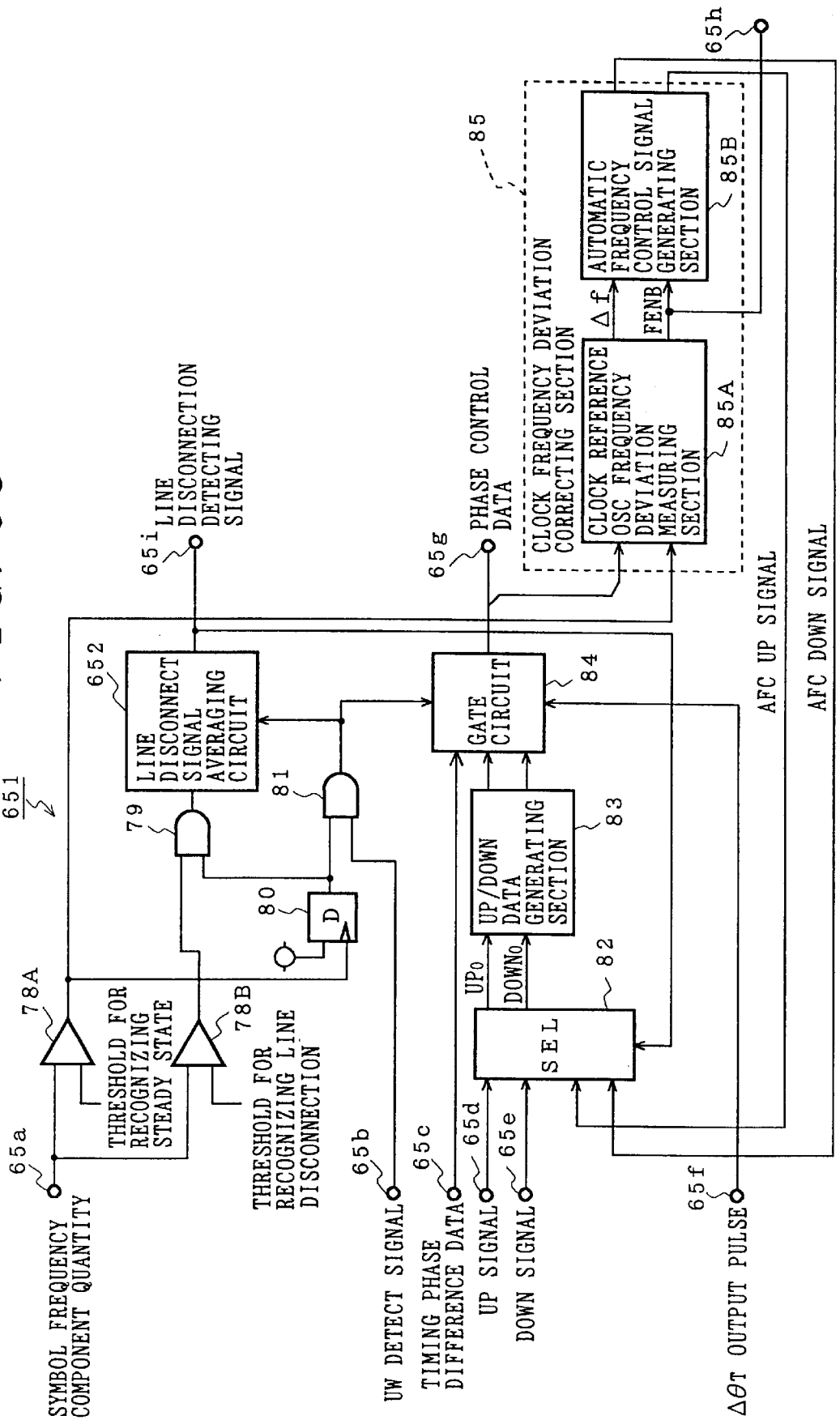
FIG. 68 is a block diagram illustrating a constitution of a phase control quantity determining section of FIG. 27.

The constitution of the phase control quantity determining section 651 is generally similar to the constitution of the phase control quantity determining section 65 of the first embodiment shown in FIG. 4. A difference lies in that the line disconnection signal averaging circuit 652 is provided which averages the output of the AND gate 79 when the AND gate 81 outputs "1" that indicates steady state at time point (e) of FIG. 32. As shown in FIG. 32, when steady state is resumed, the symbol frequency component quantity is reset to "0" by the filter reset signal every time phase control is performed. If the same operation as that of the first embodiment takes place, the symbol frequency component quantity goes below the threshold value for recognizing line disconnection every time phase control is performed, the comparator 78B in the phase control quantity determining section 651 erroneously determines that line disconnection has taken place. Therefore, the line disconnection signal averaging circuit for averaging the output of the AND gate 79 is provided in the phase control quantity determining section 651 of the second embodiment of FIG. 68.

If the output of the AND gate 79 is "1", an operation to reset the symbol frequency component quantity to "0" by phase control or a line disconnection may have taken place. If the symbol frequency component quantity has been reset to "1", the AND gate 79 outputs "1" less often. If the line disconnection has taken place, the AND gate 79 outputs "1" more often. Therefore, the line disconnection signal averaging circuit 652 obtains a ratio at which "1" is outputted. If the time in which the AND gate 79 outputs "1" exceeds a certain ratio, it is determined that line disconnection has taken place, outputting the signal indicating the occurrence of line disconnection. The selector 82 uses the output of the line disconnection signal averaging circuit 652 as a select signal. Arranging the line disconnection signal averaging circuit 652 in the rear stage of the AND gate 79 realizes a normal phase control operation during line disconnection in the second embodiment.

Thus, in the second embodiment, the difference in delay time between the detecting sections that occurs with diversity, thereby preventing the deterioration of bit error rate caused by delay time difference and the deterioration of synchronization characteristic. Further, because the timing recovery section 5B operates based on the two pieces of baseband reception phase data outputted from the sampling sections 3A and 3B instead of the output of the diversity section, any diversity scheme (selective synthetic diversity, equivalent gain synthetic diversity or maximum ratio synthetic diversity) can be used.

As with the first embodiment, the phase detecting sections 62A and 62B in the timing recovery section 5B can efficiently extract the symbol frequency component from the baseband reception phase data regardless whether the input signal is of random pattern or preamble pattern. The filtering sections 63A and 63B filter the symbol frequency components coming from the phase detecting sections 62A and 62B. The filter output selecting section 140 performs timing phase control based on the output of the filtering section 63A or 63B whichever has the larger symbol frequency component quantity. Therefore, the timing regenerator 5B can realize timing phase control more correctly than conventionally practiced. Further, because timing phase control is performed based on the timing phase difference data outputted from the integral filtering section 74A at the time of pull-in or based on the UP and DOWN signals outputted from the random walk filtering section 77 in steady state, the timing recovery section 5B can realize high-speed pull-in characteristic and low jitter characteristic.

Moreover, in steady state, the symbol frequency component quantity outputted from the integral filtering section 74A is used for reliability information while the phase control based on the random walk filtering section 77 is performed, so that the difference in delay time between the detecting sections 2A and 2B can be measured with precision. The phase control quantity determining section 651 detects line disconnection from the symbol frequency component quantity in steady state to perform predicted control at the time of line disconnection as with the first embodiment, so that timing synchronization can be maintained during line disconnection.

Thus, the timing recovery section 5B realizes high-speed pull-in characteristic and low jitter characteristic regardless whether the input signal is of random pattern or preamble pattern. Further, even in a poor line condition that may cause line disconnection occurs, timing synchronization can be maintained. It should be noted that the components constituting the timing recovery section 5B can be implemented by simple digital circuitry. That is, the timing recovery section 5B can be realized by digital circuitry than can be easily implemented on LSI.

In this second embodiment, the number of branches of the diversity receiving apparatus K=2. It will be apparent that K may be any natural number higher than 2. The diversity receiving apparatus having K sets of branches receives signals by K sets of antennas and converts K sets of received signals to K sets of baseband phase signals respectively to output the converted signals. The diversity receiving apparatus comprises K sets of detecting sections for outputting K sets of received signal powers, K sets of time delay sections provided with K sets of delay times $t1_i$ through $tK_i$, for eliminating the delay time differences of the K sets of detecting sections, K sets of sampling sections for outputting K sets of baseband reception phase data sequence $Y_i$, a diversity section for outputting determination data sequence by using K sets of baseband reception phase data sequence $Y_i$ and K sets of received signal powers, a timing recovery section, and a Nyquist point extracting section.

The timing recovery section comprises K sets of phase detecting sections, K sets of filtering sections, a time delay difference measuring section for outputting K sets of delay times $t1_i$ through $tK_i$ by using the timing phase difference data of K sets of filtering section outputs and symbol frequency component quantities, a filter output section for selecting the filtering section output having the greatest symbol frequency component quantity of the K sets of filtering section outputs, a phase control quantity determining section, a phase control section, and a timing phase control interval setting section.

In the present embodiment, the diversity receiving apparatus using π/4 shift QPSK modulating has been described. It will be apparent that the present embodiment is also applicable to diversity receiving apparatuses using other PSK modulating schemes such as QPSK modulating and BPSK modulating as well as other modulating schemes than PSK modulating. Namely, the present embodiment is applicable to any diversity receiving apparatus using a modulating scheme in which the phase jitter of a received signal has a periodicity and the timing phase is synchronized with that period to extract information data.

Embodiment 3

In the third embodiment, a diversity receiving apparatus based on the diversity for receiving signals by K=2 antennas. For the diversity scheme, any of selective synthetic diversity, equivalent gain diversity, and maximum ratio synthetic diversity can be used. A timing recovery section of this embodiment uses baseband reception phase data modulated by π/4 shift QPSK obtained by quadruple oversampling. The third embodiment realizes high-speed timing phase pull-in characteristic and low jitter characteristic without using a random walk filtering section in the filtering section of the timing recovery section.

Figure 35:
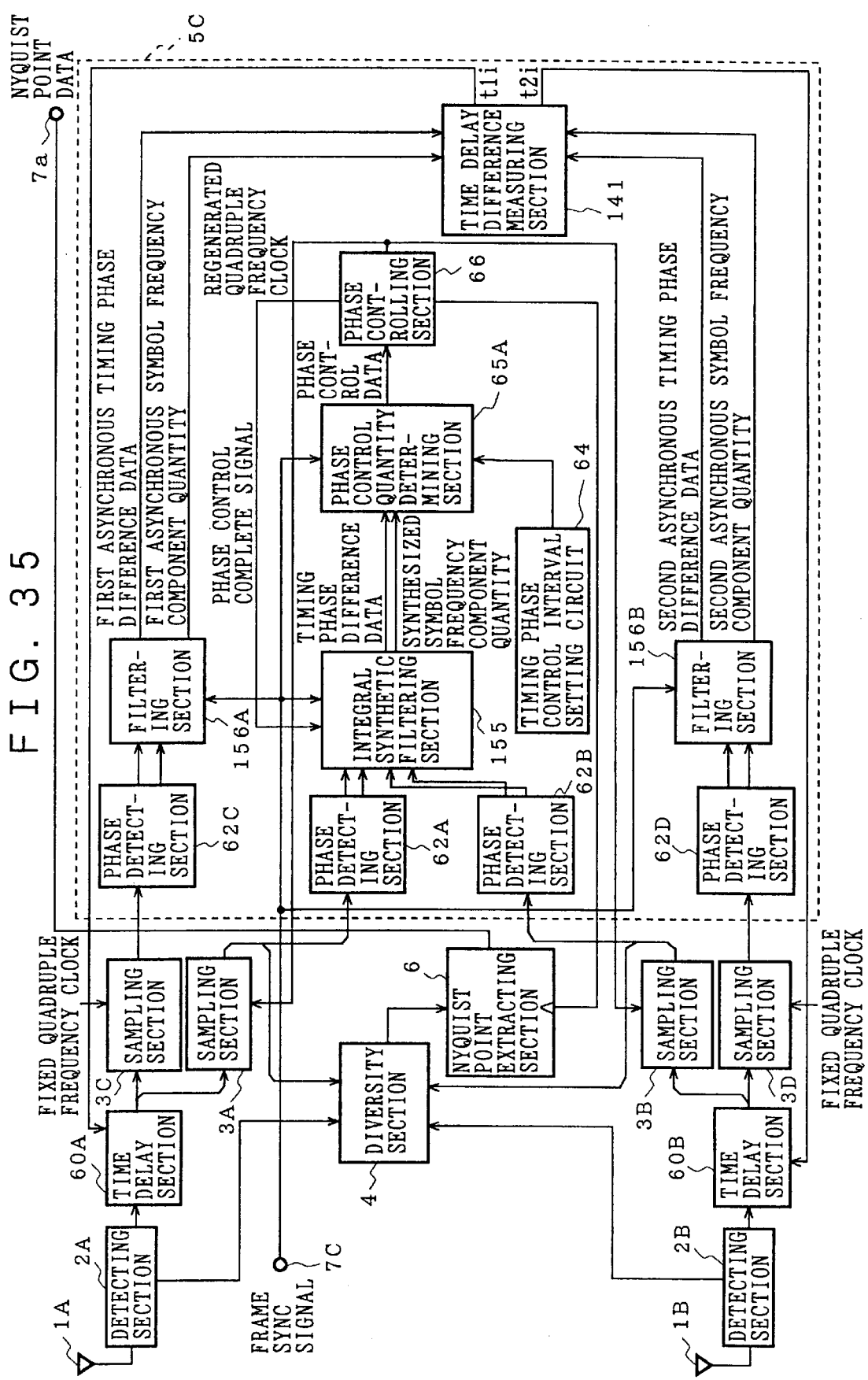
FIG. 35 is a block diagram illustrating a constitution of the diversity communication apparatus practiced as a third preferred embodiment of the present invention.

FIG. 35, in which component similar to those of FIG. 27 are denoted by the same reference numerals, shows a block diagram of a diversity communication apparatus including a timing recovery section 5C according to the third embodiment. In the figure, reference numerals 3A, 3B, 3C and 3D indicate sampling sections, 5C indicates the timing recovery section, 62A, 62B, 62C and 62D indicate phase detecting sections, 155 indicates an integral synthetic filtering section, 156A and 156B indicate filtering sections, and 65A indicates a phase control quantity determining section.

Figure 36:
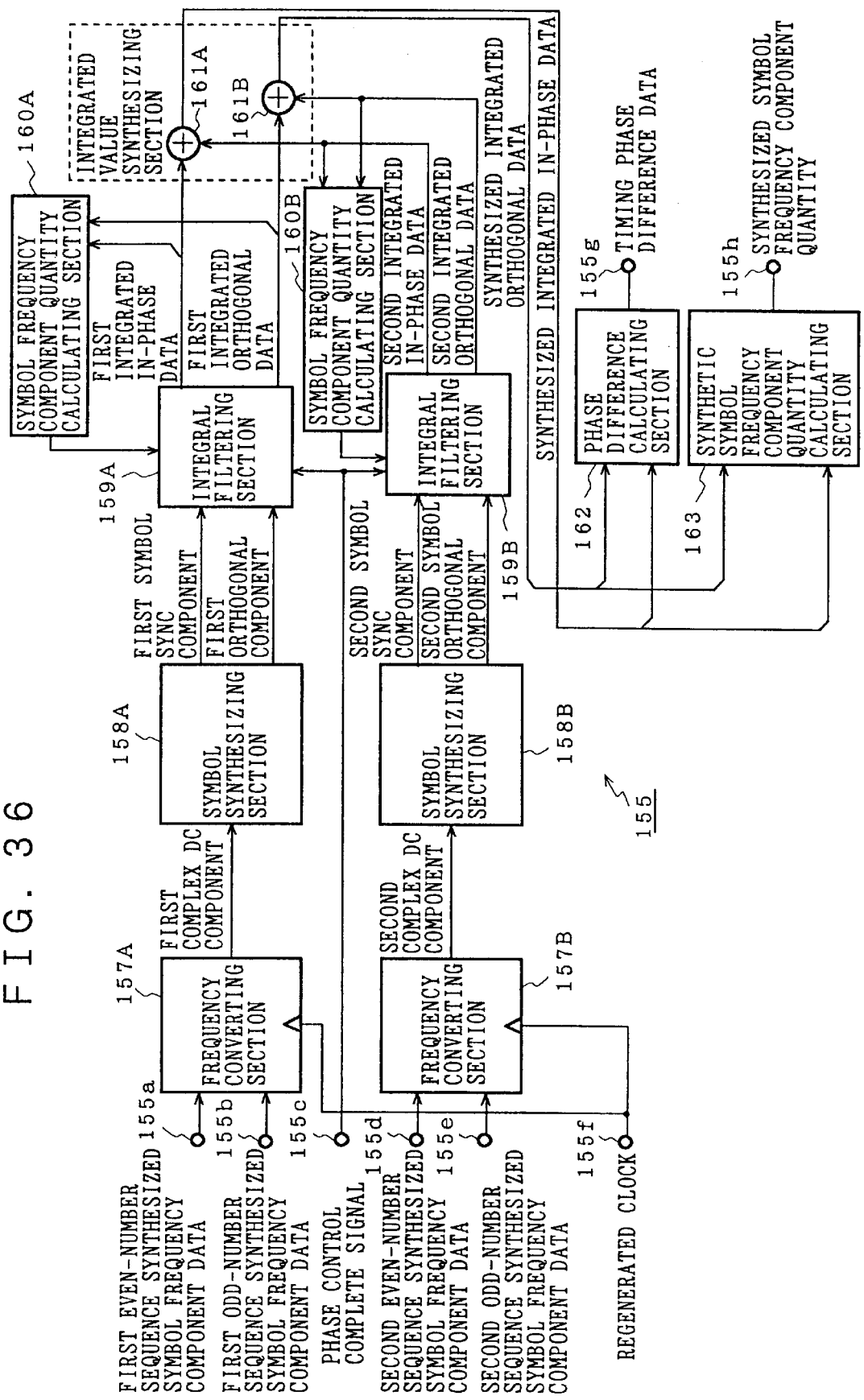
FIG. 36 is a block diagram illustrating a constitution of an integral synthesis filtering section in a timing recovery section of FIG. 35.

FIG. 36 is a block diagram illustrating a constitution of the integral synthetic filtering section 155. In the figure, reference numeral 155*a* indicates a first even-number sequence synthesized symbol frequency component data input terminal, 155*b* indicates a first odd-number sequence synthesized symbol frequency component data input terminal, 155*c* indicates a phase control complete signal input terminal, 155*d* indicates a second even-number sequence synthesized symbol frequency component data input terminal, 155*e* indicates a second odd-number sequence synthesized symbol frequency component data input terminal, 155*f* indicates a regenerated clock input terminal, 157A and 157B indicate frequency converting sections, 158A and 158B indicate symbol synthesizing sections, 159A and 159B indicate integral filtering sections, 160A and 160B indicate symbol frequency component quantity calculating sections, 161A and 161B indicate adders, 162 indicates a phase difference calculating section, 163 indicates a synthesized symbol frequency component quantity calculating section, 155*g* indicates a timing phase difference data output terminal, and 155*h* indicates a symbol frequency component quantity output terminal.

Figure 40:
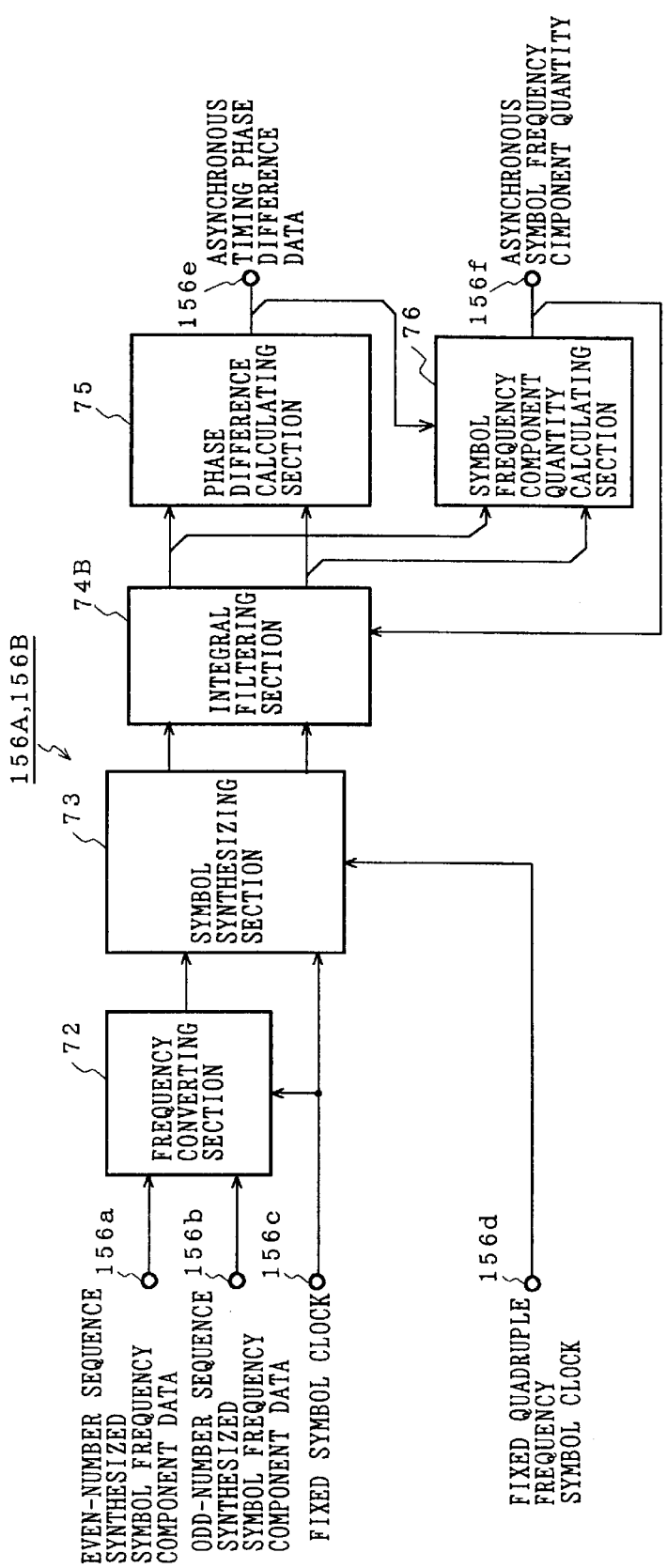
FIG. 40 is a block diagram illustrating a constitution of the filtering section in the timing recovery section of FIG. 35.

FIG. 40, in which components similar to those of FIG. 3 are denoted by the same reference numbers, is a block diagram illustrating a constitution of the filtering sections 156A and 156B in the third embodiment. In the figure, 156*a* indicates an asynchronous even-number sequence synthesized symbol frequency component data input terminal, 156*b* indicates an asynchronous odd-number sequence synthesized symbol frequency component data input terminal, 156*c* indicates a fixed symbol clock input terminal, 156*d* indicates a fixed quadruple symbol clock input terminal, 74B indicates an integral filtering section, 156*e* indicates an synchronous timing phase difference data output terminal, and 156*f* indicates an asynchronous symbol frequency component quantity output terminal.

Operations of the third embodiment of the invention will be described. First, the overall operation of the third embodiment will be described. As with the second embodiment, the detecting section 2A, the time delay section 60A, and the sampling section 3A provide quadruple-oversampled first baseband reception phase data of branch 1 and a received signal power of branch 1. The detecting section 2B, the time delay section 60B, and the sampling section 3B provide quadruple-oversampled second baseband reception phase data of branch 2 and a received signal power of branch 2. Resolution of the baseband phase data is 5 bits. As with the second embodiment, the diversity section 4 uses baseband reception phase data outputted from the sampling sections 3A and 3B and received signal powers of each branch coming from the detecting sections 2A and 2B to perform signal processing by selective synthetic diversity, equivalent gain synthetic diversity or maximum ratio synthetic diversity, outputting the synthesized baseband reception phase data sequence.

The sampling section 3C samples the received phase data outputted from the time delay section 60A by using a fixed clock for quadruple-oversampling generated by dividing the oscillator frequency of the receiving apparatus. Unlike the sampling section 3A, the sampling section 3C samples the received phase data by the fixed clock, so that the sampling section 3C outputs first asynchronous baseband reception phase data quadruple-oversampled and not in synchronization with Nyquist point. The sampling section 3D also samples the received phase data outputted from the time delay section 60B by using a fixed clock for quadruple-oversampling generated by dividing the oscillator frequency of the receiving apparatus to output second asynchronous baseband reception phase data quadruple-oversampled and not in synchronization with Nyquist point.

The timing recovery section 5C uses the baseband reception phase data outputted from the sampling sections 3A and 3B to perform timing regeneration and controls the regenerated quadruple frequency clock phase such that the baseband reception phase data at Nyquist point positions are sampled by the sampling sections 3A and 3B like the first embodiment. The timing recovery section 5C outputs a regenerated clock for extracting Nyquist point data from the synthesized baseband reception phase data outputted from the diversity section 4. Further, the timing recovery section 5C calculates a signal delay time difference between the detecting sections 2A and 2B by using the asynchronous baseband reception phase data coming from the sampling sections 3C and 3D to output delay time setting signals $t1_i$ and $t2_i$ for eliminating the delay time difference. The Nyquist point extracting section 6, as with the first embodiment, extracts, by using the regenerated clock coming from the timing recovery section 5C, Nyquist point data from the output of the diversity section 4 and outputs the extracted Nyquist point data.

The time delay sections 60A and 60B, as with the first embodiment, set the number of shift register stages to 1 to mx according to the delay time setting signals $t1_i$ and $t2_i$ respectively. In the initial state until the delay time is calculated, the number of shift register stages is set to mx/2. The relationship between the delay time setting signal $t_i$ and the shift register stages setting value $m_i$ is determined from the above-mentioned formula (4).

The following describes operations of the timing recovery section 5C. As with the second embodiment, quadruple-oversampled baseband reception phase data outputted from the sampling section 3A are entered in the phase detecting section 62A. The phase detecting section 62A outputs the first even-number sequence synthesized symbol frequency component data and the first odd-number sequence synthesized symbol frequency component data. The quadruple-oversampled baseband received phase data outputted from the sampling section 23 are entered in the phase detecting section 62B. The phase detecting section 62B outputs the second even-number sequence synthesized symbol frequency component data and the second odd-number sequence synthesized symbol frequency component data.

The integral synthetic filtering section 155 obtains timing phase data and a symbol frequency component quantity by using the first even-number sequence synthesized symbol frequency component data and the first odd-number sequence synthesized symbol frequency component data coming from the phase detecting section 62A and the second even-number sequence synthesized symbol frequency component data and the second odd-number sequence synthesized symbol frequency component data coming from the phase detecting section 62B. The following describes the operation to be performed by the integral synthetic filtering section 155 with reference to FIG. 36.

In FIG. 36, the first even-number sequence synthesized symbol frequency component data coming from the input terminal 155a and the first odd-number sequence synthesized symbol frequency component data coming from the input terminal 155b are entered in the frequency converting section 157A. The frequency converting section 157A performs generally the same operation as that of the frequency converting section 72 of the first embodiment to convert the symbol frequency component to a direct-current component, outputting first complex direct-current component data. The second even-number sequence synthesized symbol frequency component data coming from the input terminal 155d and the second odd-number sequence synthesized symbol frequency component data coming from the input terminal 155e are entered in the frequency converting section 157B. The frequency converting section 157B performs generally the same operation as that of the frequency converting section 72 of the first embodiment to convert the symbol frequency component to a direct-current component, outputting second complex direct-current component data.

The symbol synthesizing section 158A performs generally the same operation as that of the symbol synthesizing section 73 of the first embodiment to synthesize the first complex direct-current component data every symbol, outputting the first symbol in-phase component and the first symbol orthogonal component. The symbol synthesizing section 158B performs generally the same operation as that of the symbol synthesizing section 73 of the first embodiment to synthesize the second complex direct-current component data every symbol, outputting the second symbol in-phase component and the second symbol orthogonal component. The integral filtering section 159A filters the first symbol in-phase component and the first symbol orthogonal component through generally the same operation performed by the integral filtering section 74 of the first embodiment, outputting the first integrated in-phase data and the first integrated orthogonal data. The integral filtering section 159B filters the second symbol in-phase component and the second symbol orthogonal component through generally the same operation performed by the integral filtering section 74 of the first embodiment, outputting the second integrated in-phase data and the second integrated orthogonal data.

The symbol frequency component quantity calculating section 160A performs generally the same operation as that of the symbol frequency component quantity calculating section 76 of the first embodiment to calculate the first symbol frequency component quantity from the first integrated in-phase data and the first integrated orthogonal data.

The symbol frequency component quantity calculating section 160B calculates the second symbol frequency component quantity from the second integrated in-phase data and the second integrated orthogonal data. If the phase control complete signal coming from the input terminal 155c indicates that phase control has been performed, the integral filtering section 159A loads the first symbol frequency component quantity into the first integrated in-phase data to reset the first integrated orthogonal data "0" as with the integral filtering section 74 of the first embodiment. Likewise, if the phase control complete signal coming from the input terminal 155c indicates that phase control has been performed, the integral filtering section 159A loads the second symbol frequency component quantity into the second integrated in-phase data to reset the second integrated orthogonal data "0".

The adder 161A adds the first integrated in-phase data outputted from the integral filtering section 159A to the second integrated in-phase data outputted from the integral filtering section 159B to output the result to the phase difference calculating section 162 and the synthesized symbol frequency component quantity calculating section 163 as synthesized integrated in-phase data. The adder 161B adds the first integrated orthogonal data outputted from the integral filtering section 159A to the second integrated orthogonal data outputted from the integral filtering section 159B to output the result to the phase difference calculating section 162 and the synthesized symbol frequency component quantity calculating section 163 as synthesized integrated orthogonal data.

The phase difference calculating section 162 performs generally the same operation as that of the phase difference calculating section 75 of the first embodiment to calculate timing phase difference data from the synthesized integrated orthogonal data and the synthesized integrated in-phase data, outputting the result from the output terminal 155g. The synthesized symbol frequency component quantity calculating section 163 performs generally the same operation as that of the symbol frequency component quantity calculating section 76 of the first embodiment to calculate the symbol frequency component quantity from the synthesized integrated orthogonal data and the synthesized integrated in-phase data, outputting the result from the output terminal 155h.

The operation of the integral synthetic filtering section 155 will be described more specifically with reference to FIGS. 38(A) through 38(F). These figures show the initial pull-in operation of the timing recovery section 5C. In the figures, the vector between the first integrated in-phase data and the first integrated orthogonal data outputted from the integral filtering section 159A is indicated as "159A output" (refer to FIGS. 38(A) and 38(D)). The vector between the second integrated in-phase data and the second integrated orthogonal data outputted from the integral filtering section 159B is indicated as "159B output" (refer to FIGS. 38(B) and 38(E)). The vector between the synthesized integrated in-phase data outputted from the adder 161A and the synthesized integrated orthogonal data outputted from the adder 161B is indicated as "integrated value synthesizing section output" (refer to FIGS. 38(C) and 38(F)).

It is assumed that "159A output" and "159B output" immediately before the first phase control be given as shown in FIGS. 38(A) and 38(B). The "integrated value synthesizing section output" presents a value obtained by adding two values for every orthogonal component and in-phase component. Therefore, its vector becomes a sum of the vectors indicated in FIGS. 38(A) and 38(B). The angle of the vector of "integrated value synthesizing section output" becomes the first timing phase difference $\Delta\theta_{T1}$ and the length of the vector of "integrated value synthesizing-section output" becomes the symbol frequency component quantity. When the first phase control has been performed and the phase control complete signal comes, each symbol frequency component quantity is loaded into the integrated in-phase data of the integral filtering sections 159A and 159B and "0" is loaded into the integrated orthogonal data. Therefore, the vectors "159A output," "159B output," and "integrated value synthesizing section output" are rotated in the direction of the arrow indicated by broken line.

It is assumed that, subsequently, the symbol frequency component quantities be kept accumulated and "159A output" and "159B output" immediately before the second phase control be given as shown in FIGS. 38(D) and 38(E). Then, the vector indicated by "integrated value synthesizing section output" becomes the sum of the vectors indicated in FIGS. 38(D) and 38(E). The second timing phase difference becomes second timing phase difference $\Delta\theta_{T2}$ and the length of the vector of "integrated value synthesizing section output" becomes the symbol frequency component quantity. The timing recovery section 5C repeats these operations to pull in timing phase, upon which the apparatus is put in steady state.

Thus, based on the baseband reception phase data, the phase detecting sections 62A and 62B, the frequency converting sections 157A and 157B, the symbol synthesizing sections 158A and 158B, and the integral filtering sections 159A and 159B are provided for each branch independently, in which the integrated in-phase data and integrated orthogonal data of each branch are added to obtain timing phase difference. Therefore, even if the in-phase or integrated orthogonal data coming from one branch are lost by phasing or the like, the timing phase difference can be obtained from the in-phase and integrated orthogonal data coming from another branch. This constitution provides the timing recovery section 5C that is hardly affected by phasing and noise.

The phase control quantity determining section 65A uses the timing phase difference data and symbol frequency component quantity outputted from the integral synthesizing filtering section 155 to operate generally in the same manner as the phase control quantity determining section 65 of the first embodiment, determining phase control data. The interval of timing phase control is set by the timing phase control interval setting section 64 like the first embodiment. At the time interval thus set, the phase control data are outputted from the phase control quantity determining section 65A. Like the first embodiment, the phase control section 66 controls the clock phase by using the phase control data to output the phase control complete signal, the regenerated clock, and the regenerated quadruple frequency clock.

The following describes the phase detecting sections 62C and 62D and the filtering sections 156A and 156B provided for measuring a delay time difference. First asynchronous baseband reception phase data quadruple-oversampled coming from the sampling section 3C is entered in the phase detecting section 62C that operates on a fixed clock four times as high as the symbol rate. The phase detecting section 62C operates in generally the same manner as the phase detecting section 62A of the first embodiment by using the first asynchronous baseband reception phase data to output first asynchronous even-number sequence synthesized symbol frequency component data and first odd-number sequence synthesized symbol frequency component data which are not in synchronization with the Nyquist point of the received signal.

The quadruple-oversampled second asynchronous baseband reception phase data coming from the sampling section 3D are entered in the phase detecting section 62D operating on a fixed clock which frequency is four times as high as the symbol rate. Using the second asynchronous baseband reception phase data, the phase detecting section 62D generates second asynchronous even-number sequence synthesized symbol frequency component data and second odd-number sequence synthesized frequency component data. Based on the fixed symbol clock and the quadruple fixed symbol clock and operating like the filtering section 63 of the first embodiment, the filtering sections 156A and 156B obtain asynchronous timing phase difference data and asynchronous symbol frequency component quantity by using the asynchronous even-number sequence synthesized symbol frequency component data and the asynchronous odd-number sequence synthesized frequency component data coming from the phase detecting sections 62C and 62D.

The operations of the filtering sections 156A and 156B are basically the same as that of the filtering section 63 of the first embodiment. A difference lies in that no random walk filtering section is provided and each component operates on the fixed clock. As shown in FIG. 40, the frequency converting section 72 multiplies the asynchronous even-number sequence synthesized symbol frequency component data coming from the input terminal 156a and the asynchronous odd-number sequence synthesized symbol frequency component data coming from the input terminal 156b by the frequency component of the fixed symbol clock in generally the same manner as the first embodiment. The resultant data, namely an asynchronous complex direct-current component is entered in the symbol synthesizing section 73. The symbol synthesizing section 73 synthesizes each component for one symbol by using the fixed clock like the first embodiment.

As with the first embodiment, the integral filtering section 74B filters the asynchronous symbol in-phase component data and symbol orthogonal component data by using the fixed clock to output asynchronous integrated in-phase data and integrated orthogonal data. Unlike the integral filtering section 74 of the first embodiment, however, the integral filtering section 74B has no capabilities of loading the symbol frequency component quantity into the integrated in-phase data and loading "0" into the integrated orthogonal data at the time of phase control. Consequently, the vector rotation control based on the phase control complete signal is not performed. The integral filtering section 74B keeps accumulating symbol frequency components while maintaining a vector angle without being affected by phase control. The phase difference calculating section 75 performs generally the same operation as that of the first embodiment to obtain timing phase difference data $\Delta\theta H$ from the asynchronous integrated in-phase data and integrated orthogonal data. The symbol frequency component quantity calculating section 76 performs generally in the same manner as that of the first embodiment to obtain an asynchronous symbol frequency component from the asynchronous integrated in-phase data and integrated orthogonal data.

Figure 39:
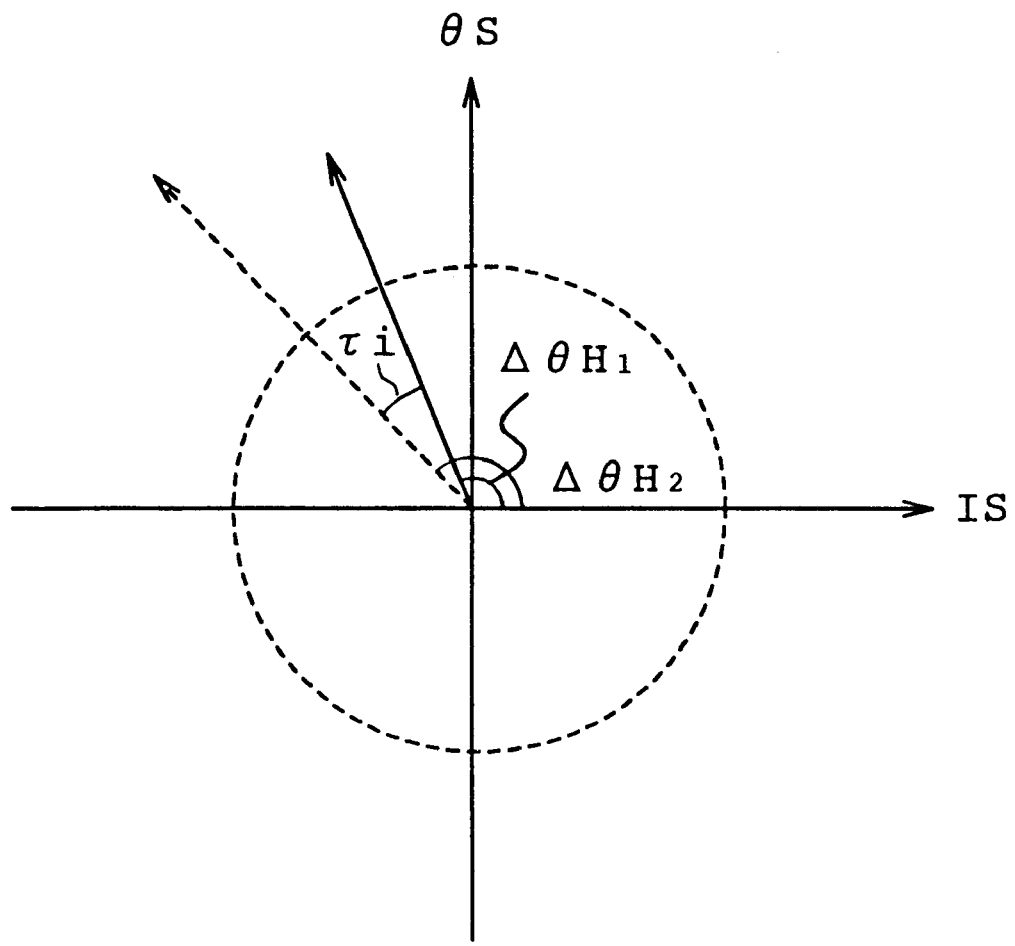
FIG. 39 is a characteristics diagram indicating a relationship between output and delay time difference of the filtering section the timing recovery section of FIG. 35.

The vector indicated by solid line of FIG. 39 is one example of the integrated in-phase data and integrated orthogonal data outputted from the filtering section 156A that operates based on the data coming from the phase detecting section 62C on the branch 1 side. The vector indicated by broken line of FIG. 39 is one example of the integrated in-phase data and integrated orthogonal data outputted from the filtering section 156B that operates based on the data coming from the phase detecting section 62D on the branch 2 side. If there is a match between the clock base oscillation frequency on the sending side and that on the receiving side, the vector angle of $\Delta\theta H_1$ [radian] and the vector angle of $\Delta\theta H_2$ [radian] of FIG. 39 maintain certain values.

If a deviation of fx [Hz] occurs between the clock base oscillation frequencies on the sending side and the receiving side, the vector angle between the above-mentioned angles becomes $\Delta\theta H_1 + 2\pi fxt$ [radian] (where t denotes time in seconds). Thus, even if a deviation occurs between the clock base oscillation frequencies on the sending side and the receiving side, the angle between the two vectors presents a constant value $TH\theta = \Delta\theta H_1 - \Delta\theta H_2$.

If a difference $\tau$ occurs between the signal delay time in the detecting section 2A and the signal delay time in 2B, the difference between $\Delta\theta H_1$ and $\Delta\theta H_2$ presents a value other than a constant value. Therefore, the delay time difference $\tau$ between the detecting section 2A and the detecting section 2B is obtained by measuring the angle difference $TH\theta$ ($=\Delta\theta H_1 - \Delta\theta H_2$) between the two vectors.

The time delay difference calculating section 141 operates in generally the same manner as the second embodiment to output delay time setting signals $t1_i$ and $t2_i$ by using the timing phase difference data $\Delta\theta H_1$ and symbol frequency component quantity outputted from the filtering section 156A and the timing phase difference data $\Delta\theta H_2$ and symbol frequency component quantity outputted from the filtering section 156B. Namely, in the time delay difference calculating section 141 of the present embodiment, the delay time difference $\tau$ is obtained by substituting $TH\theta = \Delta\theta H_1 - \Delta\theta H_2$ into the formula (24) instead of $T\theta'$. And $\tau$ is used for averaging as a valid value only when the symbol frequency component quantity outputted from the filtering section 156A and the symbol frequency component quantity outputted from the filtering section 156B have both exceeded a threshold value for delay time measurement. The $t1_i$ and $t2_i$ are obtained from the averaged value. When the $t1_i$ and $t2_i$ have been outputted, the delay sections 60A and 60B perform control to eliminate the delay time difference by using the $t1_i$ and $t2_i$ as with the first embodiment.

Thus, in the third embodiment, the delay time difference is measured by the phase detecting sections 62C and 62D and the filtering sections 156A and 156B operating on the fixed clock. Therefore, regardless of the timing phase control operation, the delay time difference can be obtained from the timing phase difference data $\Delta\theta H_1$ and $\Delta\theta H_2$ and each symbol frequency component quantity. Because the integrated in-phase data and integrated orthogonal data of each integral filter are not reset to "0" as with the second embodiment, the delay time difference can be measure more accurately in the third embodiment than in the second embodiment.

As mentioned and according to the third embodiment, the delay time difference between the detecting sections 2A and 2B that takes place when diversity is used can be obtained more accurately than in the second embodiment. Elimination of the delay time difference prevents deterioration of the bit error rate characteristic and deterioration of synchronization characteristic owing to the delay time difference. The timing recovery section 5C operates by using the two baseband reception phase data outputted from the sampling sections 3A and 3B without using the output of the diversity section 4 as with the second embodiment. Consequently, the timing recovery section 5C can surely operate for sure regardless of the scheme (selective synthetic, equivalent gain synthetic or maximum ratio synthetic) used in the diversity section 4.

The phase detecting sections 62A and 62B in the timing recovery section 5C can efficiently extract the symbol frequency component from the baseband reception phase data regardless whether the input signal is of random pattern or preamble pattern as with the first embodiment. The integral synthetic filtering section 155 has the frequency converting section 72, the symbol synthesizing section 73, and the integral filtering section 74B for each branch to synthesize the output of each integral filtering section 74B for each of the orthogonal and in-phase components, obtaining the timing phase difference data and the symbol frequency component quantity. Consequently, the timing recovery section 5C is hardly affected by phasing and noise. The phase control quantity determining section 65A detects line disconnection from the synthesized symbol frequency component quantity and, if line disconnection has been detected, performs predicted control as with the first embodiment. Consequently, timing synchronization can be maintained even during line disconnection.

Thus, the timing recovery section 5C realizes the high-speed phase pull-in characteristic and the low-jitter characteristic in steady state regardless of whether the input signal is of random pattern or preamble pattern. Further, even in a poor line condition that may cause line disconnection, timing synchronization can be maintained. It should be noted that the components constituting the timing recovery section 5C can be implemented by simple digital circuitry. That is, the timing recovery section 5C can be realized by digital circuitry than can be easily implemented on LSI.

In this third embodiment, the number of branches of the diversity receiving apparatus K=2. It will be apparent that K may be any natural number higher than 2. The diversity receiving apparatus having K sets of branches receives signals by K sets of antennas and converts K sets of received signals to K sets of baseband phase signals respectively to output the converted signals. The diversity receiving apparatus comprises K sets of detecting sections for outputting K sets of received signal powers, K sets of time delay sections provided with K sets of delay times $t1_1$ through $tK_i$ for eliminating the delay time differences of the K sets of detecting sections, K sets of sampling sections operating on the regenerated quadruple frequency clock for outputting K sets of baseband reception phase data sequence $Y_i$, K sets of sampling sections operating on the regenerated quadruple frequency clock for outputting K sets of asynchronous baseband reception phase data sequence $Q_i$, a diversity section for outputting determination data sequence by using K sets of baseband reception phase data sequence $Y_i$ and K sets of received signal powers, a timing recovery section, and a Nyquist point extracting section.

The timing recovery section comprises K sets of phase detecting sections operating on the fixed clock, K sets of filtering sections, K sets of phase detecting sections operating on the regenerated quadruple frequency clock, K sets of frequency converting sections, K sets of symbol synthesizing sections, K sets of integral filtering sections, K sets of symbol frequency component quantity calculating sections, a phase difference calculating section, a synthesized symbol frequency component calculating section, a phase control quantity determining section, a phase control section, and a timing phase control interval setting section.

In the present embodiment, the diversity receiving apparatus using π/4 shift QPSK modulating has been described. It will be apparent that the present embodiment is also applicable to diversity receiving apparatuses using other PSK modulating schemes such as QPSK modulating and BPSK modulating as well as other modulating schemes than PSK modulating. Namely, the present embodiment is applicable to any diversity receiving apparatus using a modulating scheme in which the phase jitter of a received signal has a periodicity and the timing phase is synchronized with that period to extract information data.

Embodiment 4

In the fourth embodiment, a diversity receiving apparatus is based on the diversity for receiving signals by K=2 antennas. For the diversity scheme, any of selective synthetic diversity, equivalent gain diversity, and maximum ratio synthetic diversity can be used. A timing recovery section of this embodiment uses baseband reception phase data modulated by π/4 shift QPSK obtained by quadruple oversampling. The third embodiment realizes high-speed timing phase pull-in characteristic and low jitter characteristic without using a random walk filtering section in the filtering section of the timing recovery section.

Figure 41:
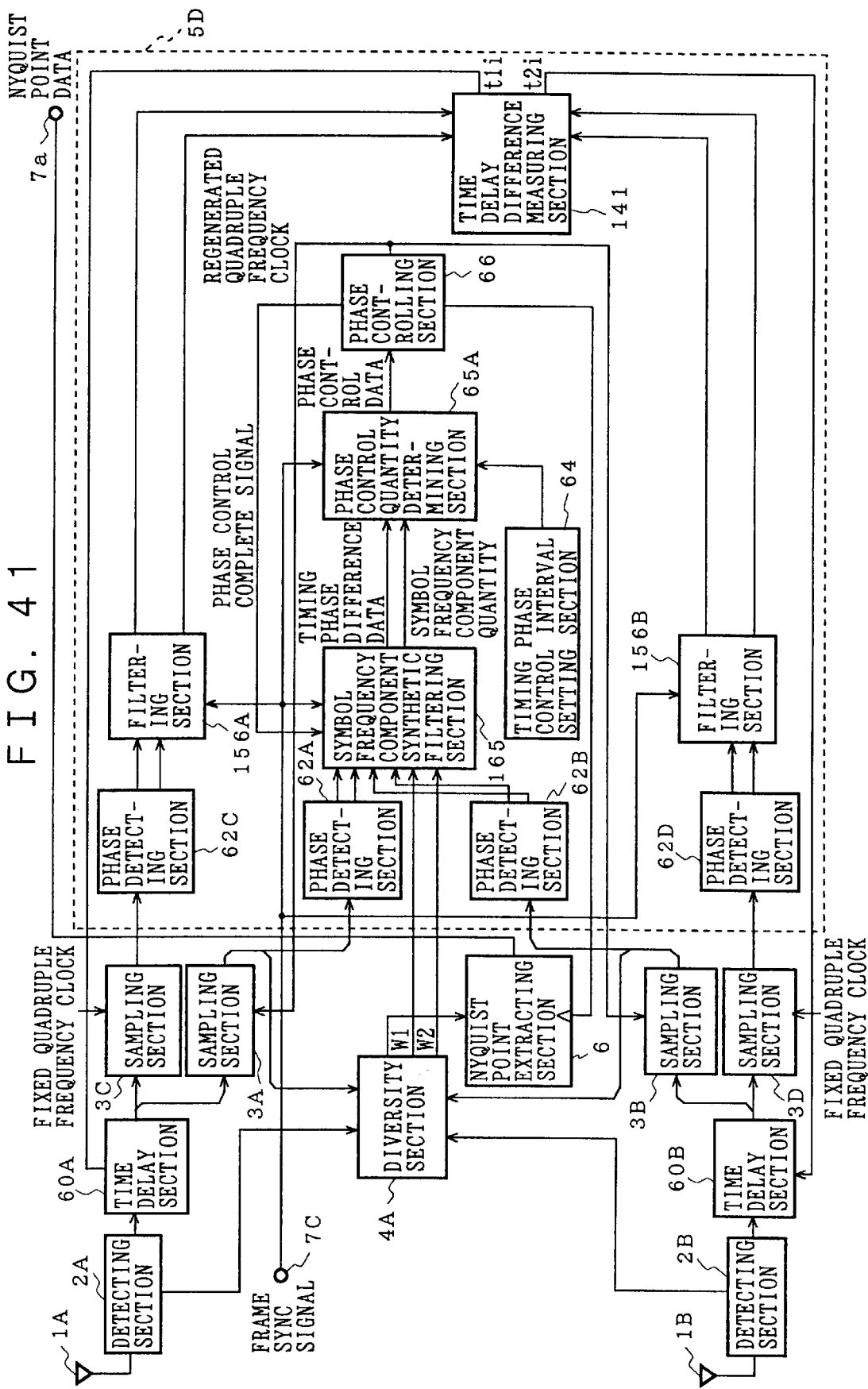
FIG. 41 s a block diagram illustrating a constitution of the diversity communication apparatus practiced as a fourth preferred embodiment of the present invention.
Figure 42:
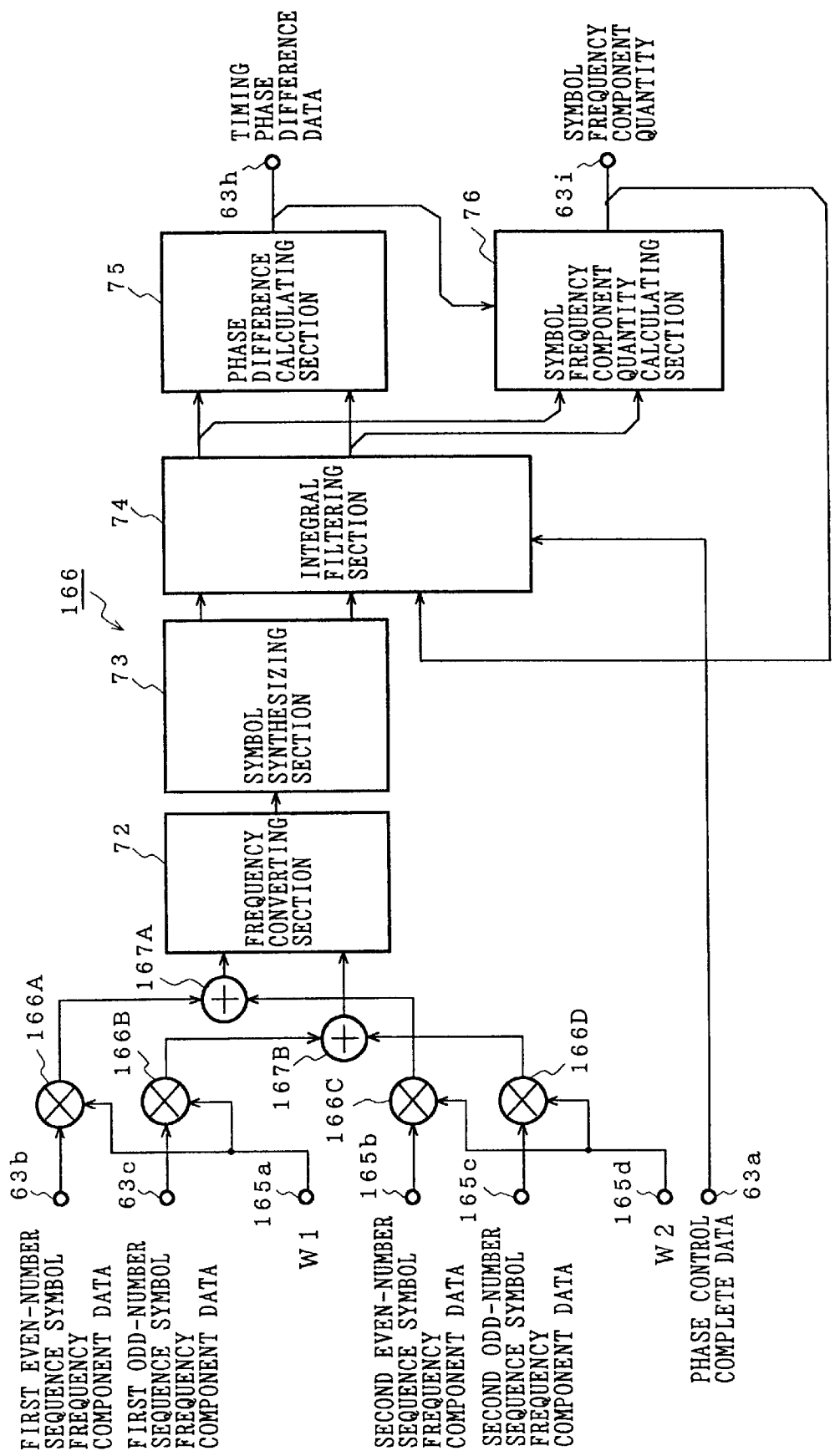
FIG. 42 is a block diagram illustrating a constitution of a symbol frequency component synthesis filtering section in a timing recovery section of FIG. 41.

FIG. 41, in which component similar to those of FIG. 35 are denoted by the same reference numerals, is a block diagram illustrating a constitution of a diversity communication apparatus including a timing recovery section 5D according to the fourth embodiment. In the figure, 4A indicates a diversity section. In the timing recovery section 5D, reference numeral 165 indicates a symbol frequency component synthetic filtering section. FIG. 42, in which component similar to those of FIG. 3 are denoted by the same reference numerals, is a block diagram illustrating a constitution of the symbol frequency component synthetic filtering section 165. In the figure, reference numeral 165a indicates a branch 1 side weight factor $W_1$ input terminal, 165b indicates a second even-number sequence synthesized symbol frequency component data input terminal, 165c indicates a second odd-number sequence synthesized symbol frequency component data input terminal, 156d indicates a brand 2 side weight factor $W_2$ input terminal, 166A, 166B, 166C and 166D indicate multipliers, and 167A and 167B indicate adders.

Operations to be performed by the fourth embodiment will be described. Like the second embodiment, through a detecting section 2A, a time delay section 60A, and a sampling section 3A, quadruple-oversampled first baseband reception phase data of branch 1 and a first received signal power of branch 1 are obtained. Through a detecting section 2B, a time delay section 60B, and a sampling section 3B, quadruple-oversampled second baseband reception phase data of branch 2 and a second received signal power of brand 2 are obtained. A resolution of the baseband phase data is 5 bits.

The diversity section 4A uses baseband reception phase data outputted from the sampling sections 3A and 3B and received signal powers of each branch coming from the detecting sections 2A and 2B to perform signal processing by selective synthetic diversity, equivalent gain synthetic diversity or maximum ratio synthetic diversity, outputting the synthesized baseband reception phase data. The diversity section 4A also uses the received signal power of branch 1 to obtain reliability of the first baseband reception phase data to output the obtained reliability as the factor $W_1$. Likewise, the diversity section 4A uses the received signal power of branch 2 to obtain reliability of the first baseband reception phase data to output the obtain reliability as the factor $W_2$. The higher $W_1$ and $W_2$ indicate more reliable baseband reception phase data respectively. It should be noted that, the factors $W_1$ and $W_2$ may be obtained by any information that provides the reliability of the baseband reception phase data of each branch without using the received signal power.

As with the third embodiment, the sampling section 3C samples the received phase data outputted from the time delay section 60A by using a fixed clock for quadruple-oversampling generated by dividing the oscillator frequency of the receiving apparatus, outputting first asynchronous baseband reception phase data quadruple-oversampled and not in synchronization with Nyquist point. The sampling section 3D also samples the received phase data outputted from the time delay section 60B by using a fixed clock for quadruple-oversampling generated by dividing the oscillator frequency of the receiving apparatus to output second asynchronous baseband reception phase data quadruple-oversampled and not in synchronization with Nyquist point.

The timing recovery section 5D performs timing regeneration by using the baseband reception phase data outputted from the sampling sections 3A and 3B and the factors $W_1$ and $W_2$ outputted from the diversity section to control the quadruple regenerating clock phase such that the baseband reception phase data at Nyquist point positions are sampled in the sampling sections 3A and 3B as with the first embodiment. Further, the timing recovery section 5D generates a regenerated clock for extracting Nyquist point data from the synthesized baseband reception phase data coming from the diversity section 4A. In addition, as with the third embodiment, the timing recovery section 5D calculates the difference between the signal delays times in the detecting sections 2A and 2B by using the asynchronous baseband reception phase data coming from the sampling sections 3C and 3D, outputting delay time setting signals $t1_i$ and $t2_i$ for eliminating the delay time difference.

The Nyquist point extracting section 6, as with the first embodiment, extracts, by using the regenerated clock coming from the timing recovery section 5D, Nyquist point data from the output of the diversity section 4A and outputs the extracted Nyquist point data. The time delay sections 60A and 60B, as with the first embodiment, set the number of shift register stages to 1 to mx according to the delay time setting signals $t1_i$ and $t2_i$ respectively.

The following describes operations of the timing recovery section 5D according to the fourth embodiment of the invention. As with the third embodiment, quadruple-oversampled baseband reception phase data outputted from the sampling section 3A are entered in the phase detecting section 62A. The phase detecting section 62A outputs the first even-number sequence synthesized symbol frequency component data and the first odd-number sequence synthesized symbol frequency component data. The quadruple-oversampled baseband received phase data outputted from the sampling section 3B are entered in the phase detecting section 62B. The phase detecting section 62B outputs the second even-number sequence synthesized symbol frequency component data and the second odd-number sequence synthesized symbol frequency component data.

The symbol frequency component synthetic filtering section 165 obtains timing phase difference data and a symbol frequency component quantity by using the first even-number sequence synthesized symbol frequency component data and first odd-number sequence synthesized symbol frequency component data outputted from the phase detecting section 62A, the second even-number sequence synthesized symbol frequency component data and second odd-number sequence synthesized frequency component data outputted from the phase detecting section 62B, and the factors $W_1$ and $W_2$ outputted from the diversity section 5A.

In what follows operations of the symbol frequency component synthetic filtering section 165 with reference to FIG. 42. In FIG. 42, the multipliers 166A and 166B multiply the first even-number sequence synthesized symbol frequency component data coming from the input terminal 63b and the first odd-number sequence synthesized symbol frequency component data coming from the input terminal 63c by the factor $W_1$ that indicates reliability of the received phase data of branch 1 entered from the input terminal 165a. The multipliers 166C and 166D multiply the second even-number sequence synthesized symbol frequency component data coming from the input terminal 165b and the second odd-number sequence synthesized symbol frequency component data coming from the input terminal 165c by the factor $W_2$ that indicates reliability of the received phase data of branch 2 entered from the input terminal 165d. The adder 167B adds the output of the multiplier 166B to the output of the multiplier 166D to output the result as total odd-number sequence symbol frequency component data.

Figure 43:
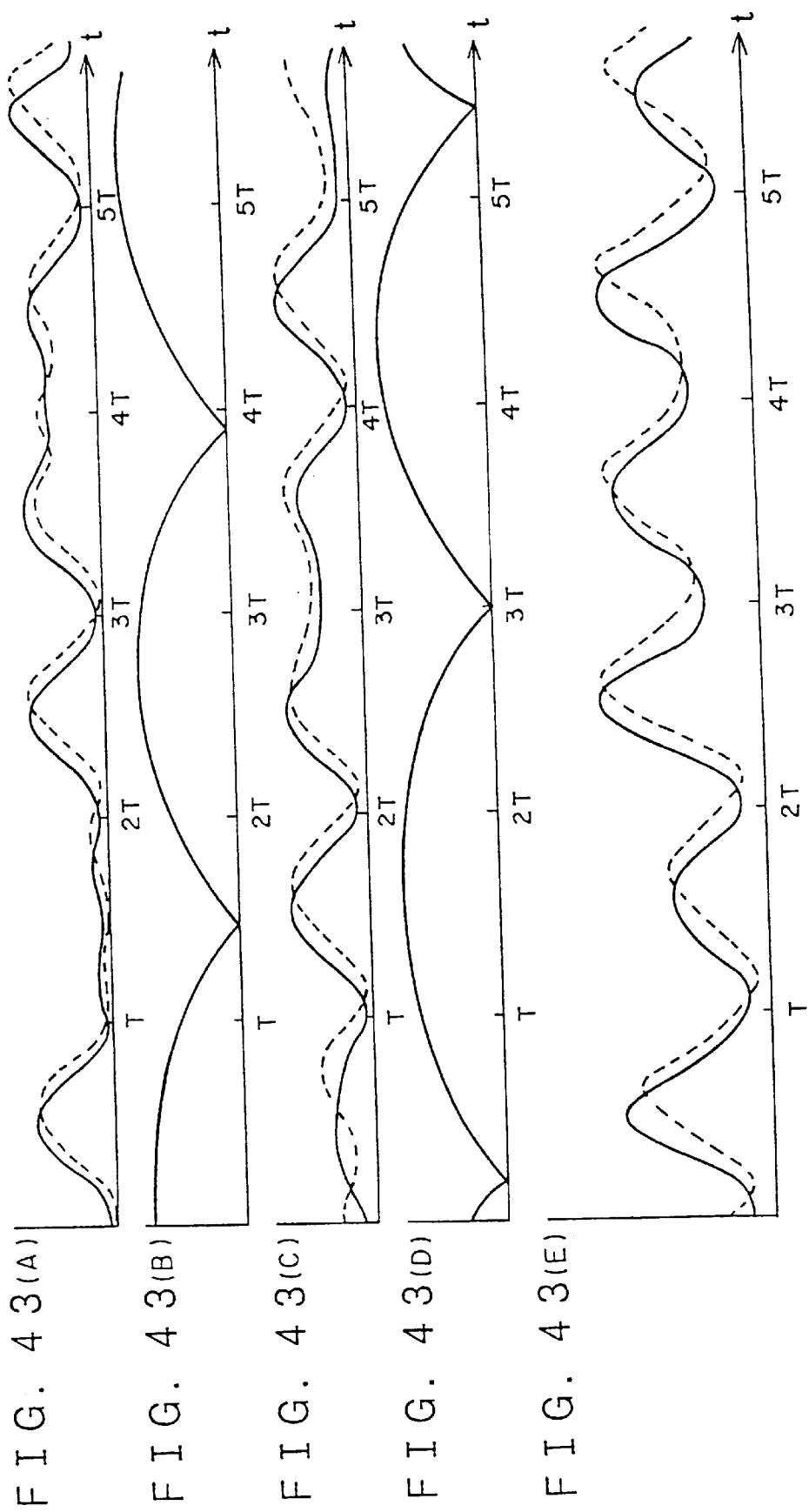
FIG. 43 is a timing chart for describing operations of the symbol frequency component synthesis filtering section in the timing recovery section of FIG. 42.

The operations of the symbol frequency component synthetic filtering section 165 so far will be described in detail with reference to FIG. 43. In FIG. 43, (A) indicates an output of the phase detecting section 62A on the branch 1 side. (B) indicates the factor $W_1$ on the branch 1 side. (C) indicates an output of the phase detecting section 62B on the branch 2 side. (D) indicates the factor $W_2$ on the branch 2 side. If the signals become as shown in (A) through (D) of FIG. 43, the total odd-number sequence symbol frequency component data outputted from the adder 167B become as shown by broken line of (E) of FIG. 43. The total even-number sequence symbol frequency component data outputted from the adder 167A become as shown by solid line of (E) of FIG. 43. It should be noted that, in (A) and (C), the solid line indicates the even-number sequence synthesized symbol frequency component data outputted from each comparator, while the broken line indicates the odd-number sequence synthesized symbol frequency component data outputted from each comparator. The scale along the time axis in the figure denotes a unit of symbol period, T indicating a symbol period.

This example shows that the even-number sequence synthesized symbol frequency component data and odd-number sequence synthesized symbol frequency component data outputted from the comparators in the phase detecting sections 62A and 62B are partially distorted by noise and phasing. Intrinsically, these symbol frequency component data should draw a correct sine wave at symbol period T. At locations where the even-number sequence synthesized symbol frequency component data and the odd-number synthesized symbol frequency component data are distorted, factors $W_1$ and $W_2$ indicate relatively low values, indicating that the reliability of the received signal is low.

The output of the phase detecting section 62A on the branch 1 side indicated in (A) of FIG. 43 is distorted at times 0, 3T, and 5T to 6T at which the value of factor $W_2$ drops. However, even if the output of the phase detecting section 62A on the branch 1 side and the output of the phase detecting section 62B on the branch 2 side are partially distorted, the distortion can be mitigated by synthesizing both the outputs. (E) of FIG. 43 indicates the total even-number sequence symbol frequency component data and the total odd-number sequence symbol frequency component data obtained by simply adding the output of the detector shown in (A) to the output of the detector shown in (C), without using the weight factors $W_1$ and $W_2$. When a comparison is made between the signal of (E) and each of the outputs of (A) and (C), it is seen that the signal of (E) has a mitigated distortion and has an enough symbol frequency component. If the addition is performed after weighting each of the outputs of (A) and (C) by factors $W_1$ and $W_2$, the distortion is mitigated still further, providing a clear symbol frequency component.

As described above, the symbol frequency component synthetic filtering section 165 provides diversity effect simply by adding the detector outputs together without performing weighting by factors $W_1$ and $W_2$. Consequently, the distortion may be mitigated to a certain degree without using factors $W_1$ and $W_2$. In this case, the accuracy of the generated symbol frequency component is somewhat lower than that of the symbol frequency component weighted by factors $W_1$ and $W_2$. However, as shown in FIG. 42, the input terminals 165*a* and 165*d* and the multipliers 166A through 165D are no longer required, so that reduction in circuit scale can be achieved. Further, in this case, the adder 167A may only add the first even-number sequence synthesized symbol frequency component data to the second even-number sequence synthesized symbol frequency component data and the adder 167B may only add the first odd-number sequence synthesized symbol frequency component data to the second odd-number sequence synthesized symbol frequency component data.

The frequency converting section 72 outputs complex direct-current component data by using the total even-number sequence symbol frequency component data outputted from the adder 167A and the total odd-number sequence symbol frequency component data outputted from the adder 167B. As with the first embodiment, the symbol synthesizing section 73 synthesizes the complex direct-current component every one symbol to generate a symbol in-phase component and a symbol orthogonal component. The integral filtering section 74 filters the symbol in-phase component and the symbol orthogonal component to generate integrated in-phase data and integrated orthogonal data. The phase difference calculating section 75 calculates timing phase difference data from the integrated orthogonal data and the integrated in-phase data to output the result from the output terminal 63*h*. The symbol frequency component quantity calculating section 76 uses the integrated in-phase data and the integrated orthogonal data to calculate the symbol frequency component quantity and output the same from the output terminal 63*i*.

The timing phase difference and symbol frequency component quantity outputted from the symbol frequency component synthetic filtering section 165 are entered in the phase control quantity determining section 64A. The phase control quantity determining section 64A determines phase control data as with the third embodiment. The phase control data are entered in the phase control section 66 at a time interval set by the timing phase control interval setting section 64. As with the first embodiment, the phase control section 66 controls the clock phase based on the phase control data to output a phase control complete signal, a regenerated clock, and a regenerated quadruple frequency clock.

The operation for measuring a delay time difference is the same as that in the third embodiment. Namely, $t1_i$ and $t2_i$, are generated by the phase detecting sections 62C and 62D, the filtering section 156A and 156B, and the time delay difference measuring section 141. As with the first embodiment, the time delay sections 60A and 60B uses $t1_i$ and $t2_i$ to perform control such that the delay time difference is eliminated. Thus, in the fourth embodiment too, the delay time difference is measured by the phase detecting sections 62C and 62D and the filtering sections 156A and 156B for delay time difference measurement which operate on a fixed clock as with the third embodiment. Therefore, the delay time difference can be obtained based on timing phase difference data $\Delta\theta H_1$ and $\Delta\theta H_2$ and each symbol frequency component quantity regardless of the timing phase control operation.

In the second embodiment, the integrated in-phase data and integrated orthogonal data of each integral filter are reset to "0" every time timing phase control is performed. In the fourth embodiment, however, these data are not reset. Consequently, as compared with the second embodiment, the delay time difference can be measured more accurately. In the third embodiment, the two phase detecting sections and the integral synthetic filtering 155 obtain the timing phase difference data and the symbol frequency component quantity by using the two pieces of baseband reception phase data outputted from the sampling sections 3A and 3B. In the fourth embodiment, however, the two phase detecting sections and the symbol frequency component synthetic filtering section 165 obtain the timing phase difference data and the symbol frequency component quantity. The integral synthetic filtering section 155 and the symbol frequency component synthetic filtering section 165 both realize the diversity effect. As seen from the comparison between FIG. 36 and FIG. 42, the circuit scale of the symbol frequency component synthetic filtering section 165 is about ½ of that of the integral synthetic filtering section 155. Namely, the circuit scale of the fourth embodiment is smaller than that of the third embodiment.

Thus, the fourth embodiment can obtain the delay time difference between the detecting sections that is caused by diversity more accurately than the second embodiment. Consequently, the deterioration of bit error rate characteristic and synchronization characteristic that is caused by delay time difference can be prevented more efficiently in the fourth embodiment. Further, this timing recovery section 5D is applicable to any diversity scheme (selective synthetic, equivalent gain synthetic or maximum ratio synthetic) used for the diversity section 4A.

As with the first embodiment, the phase detecting sections 62A and 62B in the timing recovery section 5D can efficiently extract a symbol frequency component from the baseband reception phase data regardless whether the input signal is of random pattern or preamble pattern. The symbol frequency component synthetic filtering section 165 synthesizes the symbol frequency components coming from the branches and then obtains the timing phase difference data and the symbol frequency component quantity by the operation similar to that of the filtering section of the first embodiment. Consequently, the fourth embodiment can realize the diversity effect while reducing the circuit scale. In other words, like the third embodiment, the fourth embodiment can realize the timing recovery section 5D that is hardly affected by phasing and noise. Further, like the third embodiment, the phase control quantity determining section 64A detects line disconnection and performs predicted control at the time of line disconnection as with the first embodiment, allowing to maintain timing synchronization even during line disconnection.

Thus, the timing recovery section 5D realizes high-speed phase pull-in characteristic and low jitter characteristic in steady state regardless whether the input signal is of random pattern or preamble pattern. Further, even in a poor line condition that may cause line disconnection occurs, timing synchronization can be maintained. It should be noted that the components constituting the timing recovery section 5D can be implemented by simple digital circuitry. That is, the timing recovery section 5D can be realized by digital circuitry than can be easily implemented on LSI.

In this fourth embodiment, the number of branches of the diversity receiving apparatus K=2. It will be apparent that K may be any natural number higher than 2. The diversity receiving apparatus having K sets of branches receives signals by K sets of antennas and converts K sets of received signals to K sets of baseband phase signals respectively to output the converted signals. The diversity receiving apparatus comprises K sets of detecting sections for outputting K sets of received signal powers, K sets of time delay sections provided with K sets of delay times $t1_i$ through $tK_i$ for eliminating the delay time differences of the K sets of detecting sections, K sets of sampling sections for outputting K sets of baseband reception phase data sequence $Y_i$, a diversity section for outputting determination data sequence and K sets of weighting factors $W_1$ and $W_2$ by using K sets of baseband reception phase data sequence $Y_i$ and K sets of received signal powers, a timing recovery section, and a Nyquist point extracting section.

The timing recovery section 5D comprises K sets of phase detecting sections, K sets of filtering sections, K sets of phase detecting sections operating on a fixed clock, a frequency converting section, a symbol synthesizing section, an integral filtering section, a symbol frequency component quantity calculating section, a phase difference calculating section, a phase control quantity determining section, a phase control section, and a timing phase control interval setting section.

In the present embodiment, the diversity receiving apparatus using π/4 shift QPSK modulating has been described. It will be apparent that the present embodiment is also applicable to diversity receiving apparatuses using other PSK modulating schemes such as QPSK modulating and BPSK modulating as well as other modulating schemes than PSK modulating. Namely, the present embodiment is applicable to any diversity receiving apparatus using a modulating scheme in which the phase jitter of a received signal has a periodicity and the timing phase is synchronized with that period to extract information data.

Embodiment 5

Figure 44:
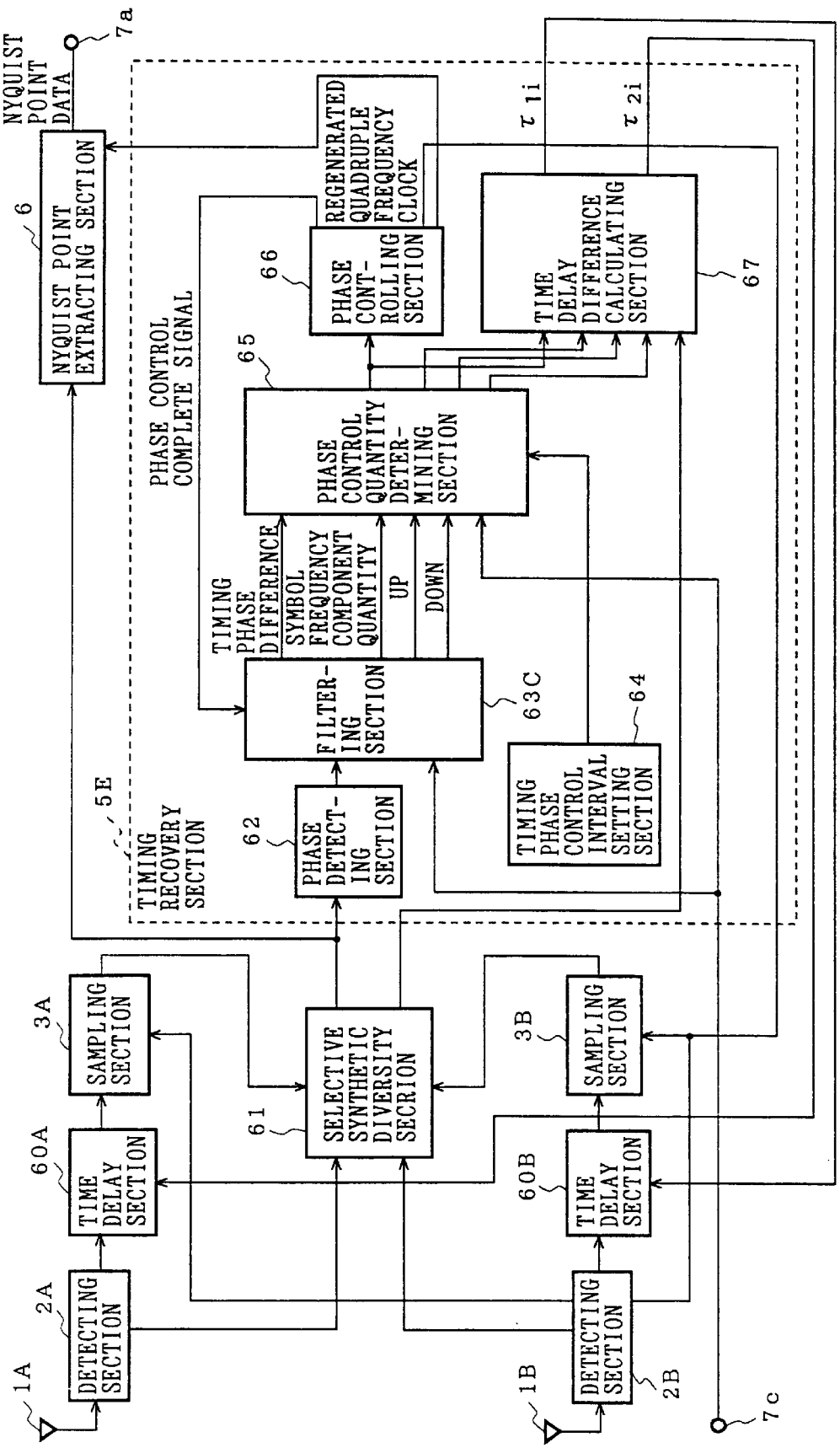
FIG. 44 is a block diagram illustrating a constitution of a diversity communication apparatus practiced as a fifth preferred embodiment of the present invention.
Figure 45:
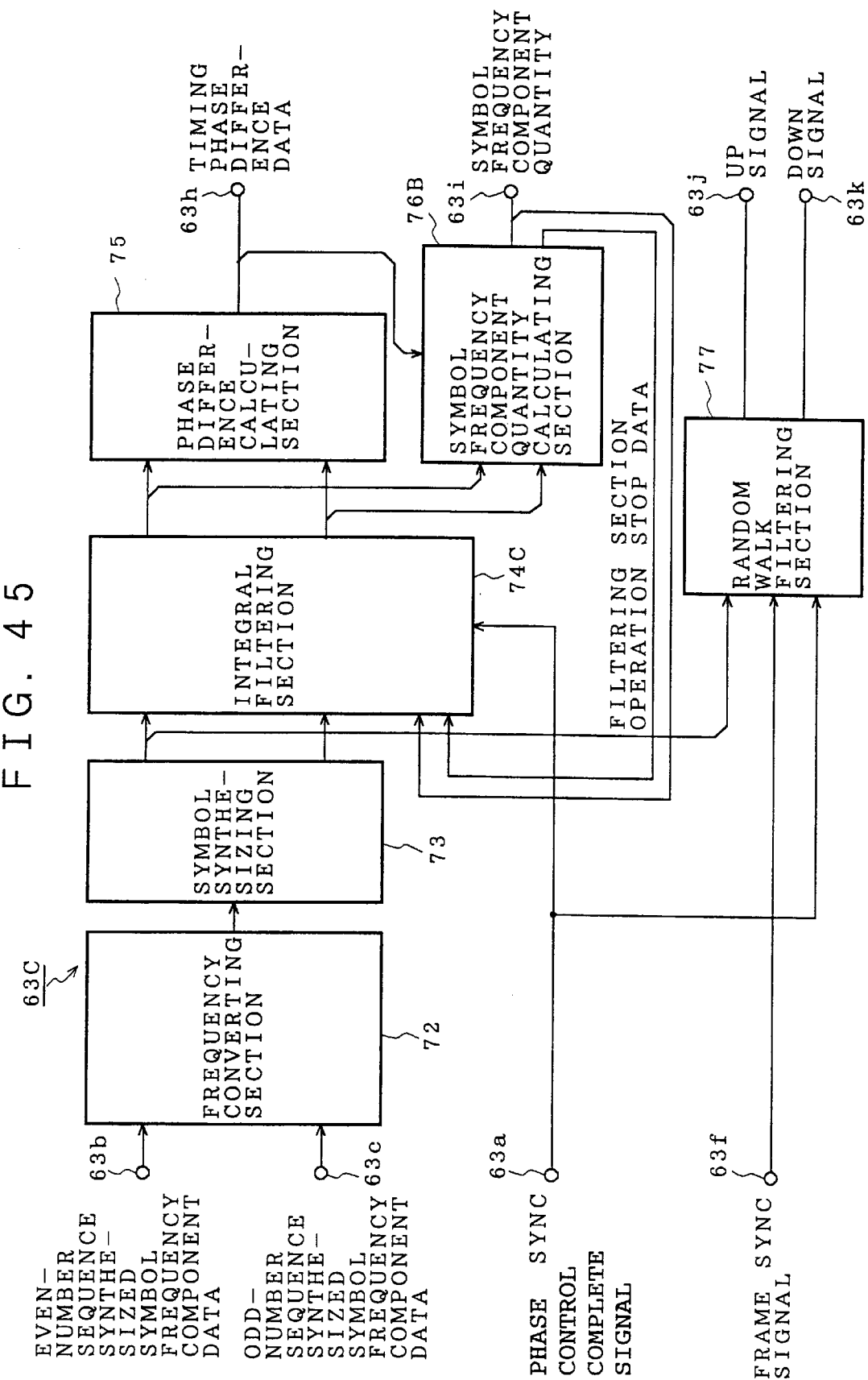
FIG. 45 is a block diagram illustrating a filtering section in the timing recovery section of FIG. 44.

In the fifth embodiment, a diversity receiving apparatus based on the diversity for receiving signals by K=2 antennas. A timing recovery section of this embodiment uses baseband reception phase data modulated by π/4 shift QPSK obtained by quadruple oversampling. FIG. 44, in which components similar to those of FIG. 1 are denoted by the same reference numerals, is a block diagram illustrating a constitution of a timing recovery section 5E according to the present embodiment. In the figure, reference numeral 63C indicates a filtering section. FIG. 45 is a block diagram illustrating a constitution of the filtering section 63C. In the figure, reference numeral 74C indicates an integral filtering section and 76B indicates a symbol frequency component quantity calculating section.

Figure 46:
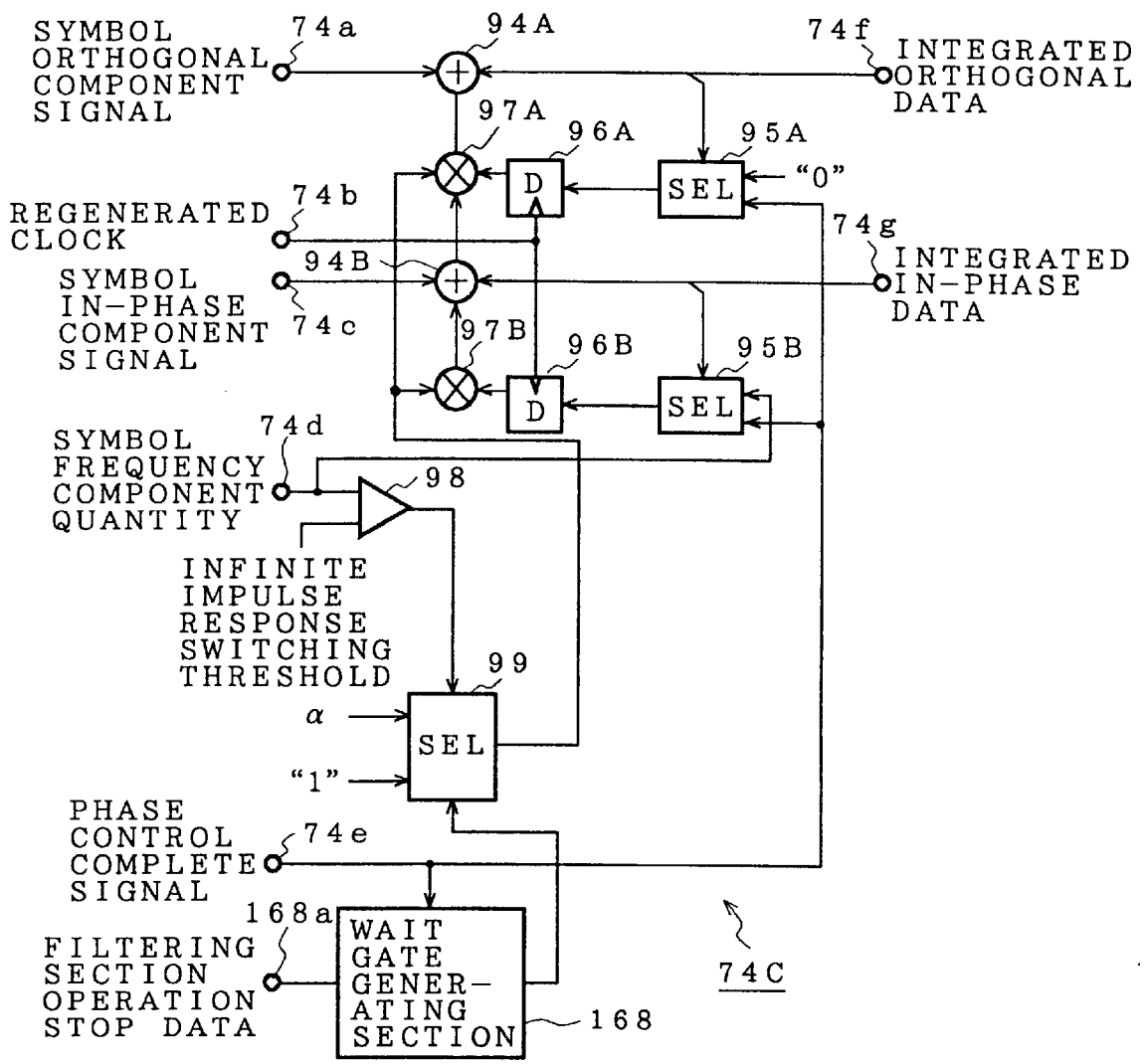
FIG. 46 is a block diagram illustrating a constitution of an integral filtering section in the filtering section of FIG. 45.
Figure 47:
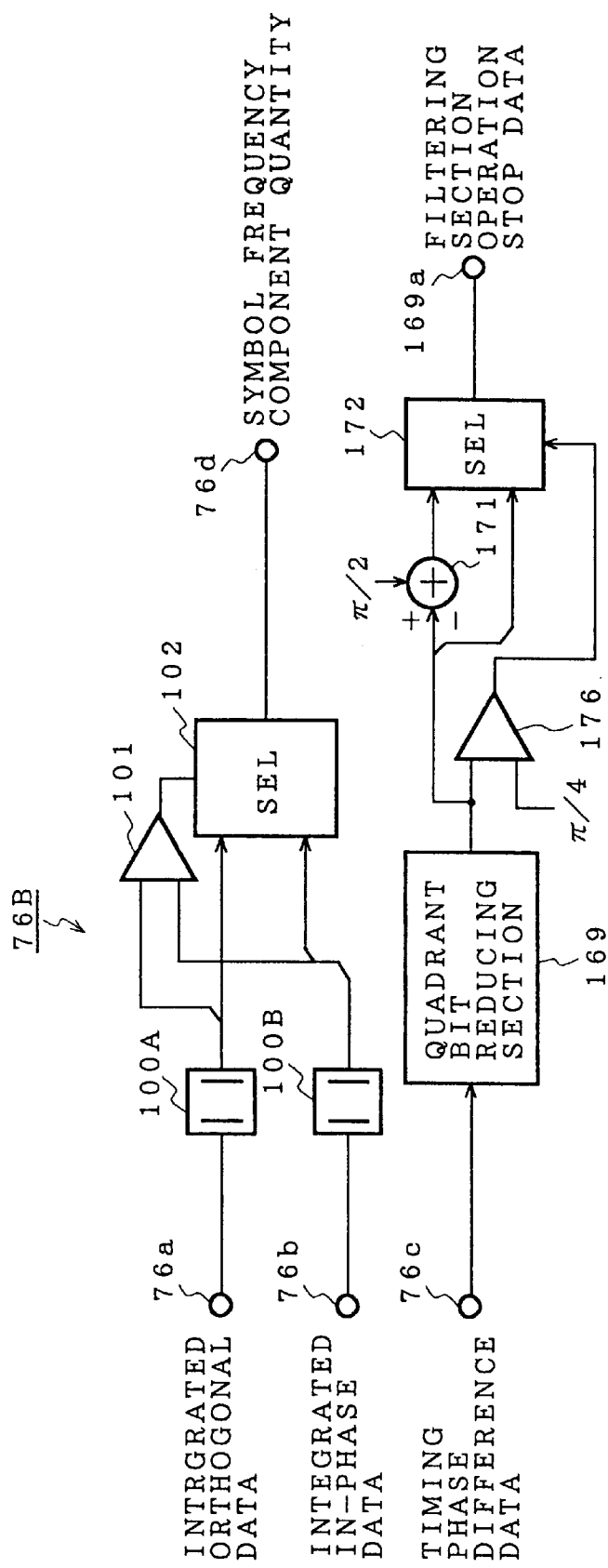
FIG. 47 is a block diagram illustrating a constitution of a symbol frequency component quantity calculating section in the filtering section of FIG. 45.

FIG. 46, in which components similar to those of FIG. 6 are denoted by the same reference numerals, is a block diagram illustrating a constitution of the integral filtering section 74C in the fifth embodiment. In the figure, reference numeral 168a indicates a filter operation stop data input terminal and 168 indicates a wait gate generating section. FIG. 47, in which components similar to those of FIG. 8 are denoted by the same reference numerals, is a block diagram illustrating a constitution of the symbol frequency component quantity calculating section 76B. In the figure, reference numeral 169 indicates a quadrant bit reducing section, 170 indicates a comparator, 171 indicates a subtractor, 172 indicates a selector, and 169a indicates a filter operation stop data output terminal.

The following describes operations of the fifth embodiment. First, the overall operation of the third embodiment will be described. As with the first embodiment, the detecting section 2A, the time delay section 60A, and the sampling section 3A provide quadruple-oversampled first baseband reception phase data of branch 1 and a received signal power of branch 1. The detecting section 2B, the time delay section 60B, and the sampling section 3B provide quadruple-oversampled second baseband reception phase data of branch 2 and a received signal power of branch 2. Resolution of the baseband phase data is 5 bits.

As with the first embodiment, the a selective synthetic diversity section 61 uses baseband reception phase data coming from the sampling sections 3A and 3B and received signal powers of the branches coming from the detecting sections 2A and 2B to perform signal processing based on selective synthetic diversity, thereby outputting the selected baseband reception phase data sequence and a select-after-detect signal.

As with the first embodiment, the timing recovery section 5E performs timing regeneration by using the baseband reception phase data sequence and select-after-detect signal coming from the selective synthetic diversity section 61 to control the regenerated quadruple frequency clock phase such that the baseband reception phase data at Nyquist point positions are sampled. The timing recovery section 5E also generates a regenerated clock for extracting Nyquist point data from the synthesized baseband reception phase data outputted from the selective synthetic diversity section 61. Further, the timing recovery section 5E operates in the same way as the first embodiment to calculate a difference in the signal delay period between the detecting sections 2A and 2B, thereby outputting delay time interval setting signals $t1_i$ and $t2_i$ for eliminating the delay time difference.

The Nyquist point extracting section 6 extracts Nyquist point data from the output of the selective diversity section 61 by using the regenerated clock coming from the timing recovery section 5E, as with the first embodiment. In order to eliminate the delay time difference, the time delay sections 60A and 60B set the number of shift register stages to 1 to mx according to the delay time setting signals $t1_i$ and $t2_i$ after calculation of the delay time, as with the first embodiment.

In what follows, operations of the timing recovery section 5E will be described. Like the first embodiment, the synthesized baseband reception phase data coming from the selective synthetic diversity section 61 are entered in the phase detecting section 62. The phase detecting section 62 outputs even-number sequence synthesized symbol frequency component data and odd-number sequence synthesized symbol frequency component data. The filtering section 63C obtains timing phase difference data, a symbol frequency component quantity, an UP signal and a DOWN signal by using the even-number sequence synthesized symbol frequency component data and odd-number sequence synthesized symbol frequency component data given from the phase detecting section 62 to output the obtained results.

Operations of the filtering section 63C will be described with reference to FIG. 45. In FIG. 45, the even-number sequence synthesized symbol frequency component data coming from the input terminal 63b and the odd-number sequence synthesized symbol frequency component data coming from the input terminal 63c are entered in the frequency converting section 72. The frequency converting section 72 outputs a complex direct-current component data by performing the same operation as that performed in the first embodiment. As with the first embodiment, the symbol synthesizing section 73 synthesizes the complex direct-current component every symbol to output a symbol in-phase component and a symbol orthogonal component. The integral filtering section 74C filters the symbol in-phase component and the symbol orthogonal component to output integrated in-phase data and integrated orthogonal data. The symbol frequency component quantity calculating section 76B calculates a symbol frequency component quantity by using the integrated in-phase data and the integrated orthogonal data to output the result from the output terminal 63i. Also, the symbol frequency component quantity calculating section 76B sends to the integral filtering section 74C the filter operation stop data for stopping an infinite impulse filtering operation and making the filtering section 74C perform an accumulating operation.

The following describes operations of the symbol frequency component quantity calculating section 76B with reference to FIG. 47. As with the first embodiment, the selector 102 outputs data coming from the input terminal 76a with the integrated orthogonal data converted to an absolute value or data coming from the input terminal 76b with the integrated in-phase data converted to an absolute value, whichever is greater. In the first embodiment, the output of the selector 102 is multiplied by a weight obtained by the timing phase difference data to obtain the symbol frequency component quantity having no calculation error. However, each of the portions for weighting requires a large circuit scale. In the fifth embodiment, no portion for weighting is provided. The operation of the integral filtering section 74C is controlled by using the timing phase difference data with the output of the selector 102 used as the symbol frequency component quantity. As a result, as compared with the first embodiment, a relatively small circuit scale can suppress the calculation error in the symbol frequency component quantity in the fifth embodiment.

The following describes operations of the integral filtering section 74C using the timing phase difference data with reference to FIGS. 47 and 48. As described in the description of the first embodiment, the error in the symbol frequency component quantity coming from the selector 102 can be obtained by using the timing phase difference data. Timing phase difference data $\Delta\theta$ indicating a data range of 0 to $2\pi$ [radian] is expressed in 5 bits of 0 to 31 as with the first embodiment. Let the original symbol frequency component quantity be A, then the relation between the remainder from the division of $\Delta\theta$ by $\pi/2$ [radian], namely mod($\Delta\theta$, $\pi/2$) and the symbol frequency component quantity outputted from the selector 102 is as shown in FIG. 48. As seen from FIG. 48, the symbol frequency component quantity outputted from the selector 102 will not present a value greater than the original symbol frequency component A. When mod($\Delta\theta$, $\pi/2$)=4, a value (A×cos($\pi/4$)) indicating a largest error from A is presented.

The timing phase difference data $\Delta\theta$ is converted by the quadrant bit reducing section 169 of FIG. 47 into mod($\Delta\theta$, $\pi/2$). The comparator 170 compares mod($\Delta\theta$, $\pi/2$) with $\pi/4$. In the fifth embodiment, $\pi/4$ is equivalent to "4". If mod($\Delta\theta$, $\pi/2$) is greater than $\pi/4$, the subtractor 171 outputs data obtained by subtracting mod($\Delta\theta$, $\pi/2$) from $\pi/2$. In the fifth embodiment, $\pi/2$ is equivalent to "8". Otherwise, the subtractor 171 outputs a signal for selecting mod($\Delta\theta$, $\pi/2$). The selector 172 selects the signal outputted from the comparator 170 as a select signal. Then, the selector outputs the selected data from the output terminal 169a as filter operation stop data. Therefore, in the fifth embodiment, the relationship between mod($\Delta\theta$, $\pi/2$) and the filter operation stop data is as shown in FIG. 48.

When phase control has been performed based on the timing phase difference data $\Delta\theta$, the symbol frequency component quantity coming from the selector 102 is loaded in the in-phase integral component data and "0" is loaded in the orthogonal integral component data in the integral filtering section 74C by the phase control complete signal as with the first embodiment. Because of a calculation error, the symbol frequency component quantity presents a value smaller than the original component quantity A. The selector 102 outputs such a symbol frequency component quantity to the integral filtering section 74C. The symbol frequency component quantity after phase control becomes cos(x$\pi$/16) (where x denotes filter operation stop data) times the symbol frequency component quantity before phase control. Consequently, if the filter operation stop data x is not 0, the symbol frequency component quantity is lost at the time of phase control.

In the integral filtering section 74C of FIG. 46, if the symbol frequency component quantity does not exceed the threshold value for infinite impulse response switching, processing is performed in which the outputs of the registers 96A and 96B are accumulated. In the first embodiment, if the symbol frequency component quantity exceeds the threshold value for infinite impulse response switching, switching is made such that the integral filtering section 74C performs an infinite impulse filtering operation in which the outputs of the registers 96A and 96B are multiplied by a (<0) every symbol to be accumulated. However, unlike the first embodiment, an accumulation may be continued without the multiplication by a (<0) in the fifth embodiment. If the symbol frequency component quantity is lost at the time of phase control, the accumulation without the multiplication by a (<0) for the time equivalent to the time constant of the infinite impulse filter equivalent to the lost symbol frequency component quantity even if the symbol frequency component quantity has exceeded the threshold value for infinite impulse response switching.

That is, in the fifth embodiment, every time phase control is performed, the time constant TW [symbols] of the infinite impulse filter equivalent to a loss cos(x$\pi$/16) of the symbol frequency component quantity is calculated. In the infinite impulse filter using a, TW that satisfies cos(x$\pi$/16)=$a^{TW}$ may only be calculated.

TW is obtained from the formula (25) below.

$$TW = \log_a(x\pi/16) \tag{25}$$

For example, if a =0.98, then TW is a value shown in FIG. 48. Then, every time phase control is performed, the multiplication by a is interrupted for a period of time equivalent to TW [symbol]. Consequently, the simple accumulating operation is continued in the integral filtering section 74C, so that the loss of the symbol frequency component quantity at the time of phase control is compensated.

In the integral filtering section 74C, the filter operation stop data x entered from the input terminal 168a is entered in the wait gate generating section 168. The wait gate generating section 168 calculates TW from the filter operation stop data x. Then, the wait gate generating section 168 generates a gate signal that outputs logic "1" for TW [symbols] after phase control as shown in (D) of FIG. 49. When the output of the wait gate generating section 168 presents logic "1", the selector 99 outputs "1"; when the output of the wait gate generating section 168 presents logic "0", the selector 99 outputs "a". Thus, the integral filtering section 74C switches between accumulating operation and the infinite impulse filtering operation. It should be noted that the conversion from x to TW can be realized by use of a ROM. For example, if a =0.98, a ROM may only be prepared that outputs "0, 1, 4, 9, 17" as TW when the filter operation stop data of FIG. 48 "0, 1, 2, 3, 4" are entered.

Figure 49:
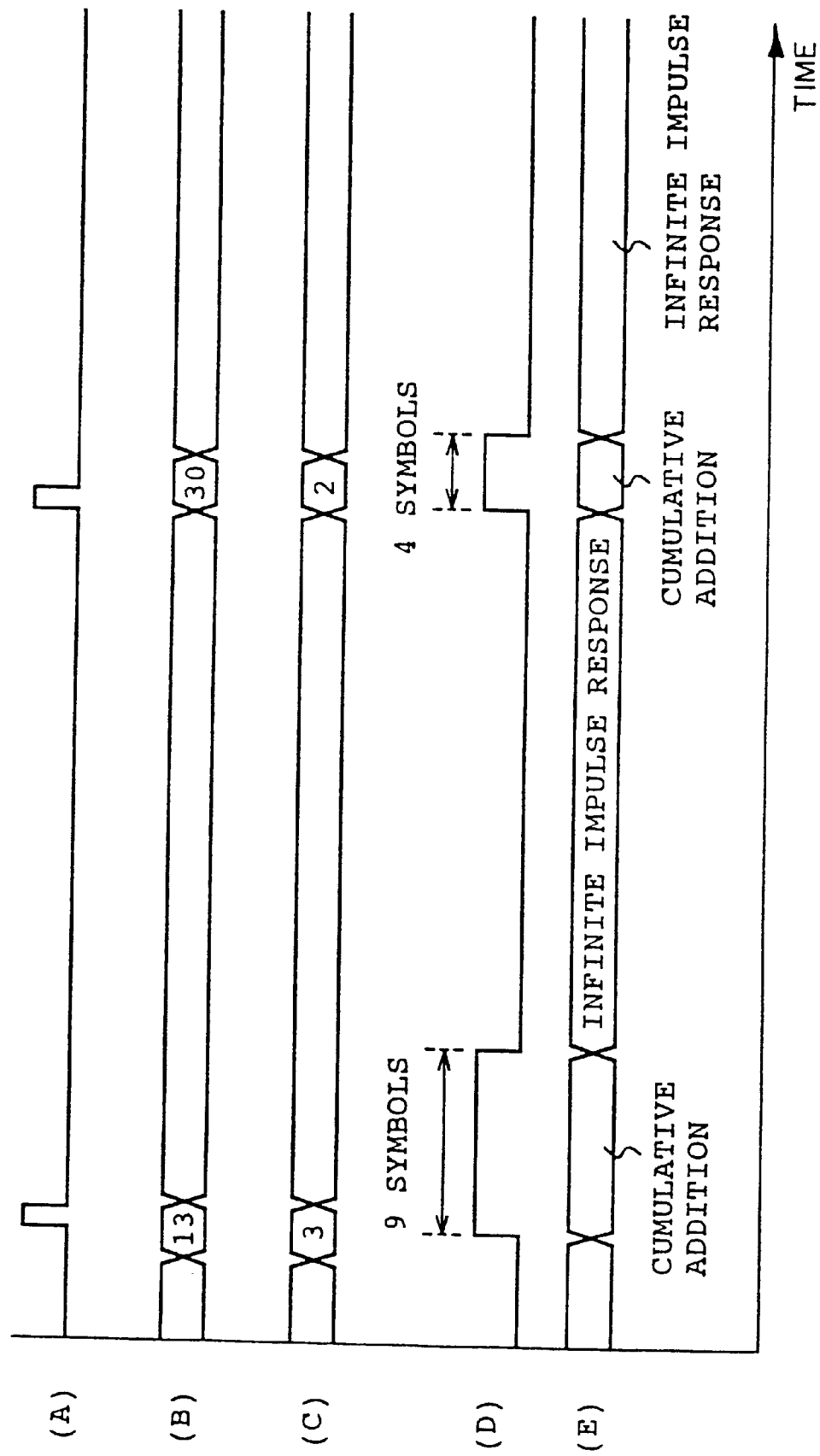
FIG. 49 is a timing chart for describing operations of the integral filtering section of FIG. 46.

(A) through (E) of FIG. 49 indicate the operations of the integral filtering section 74C when phase control using timing phase difference data "13" is performed first and then phase control using timing phase difference data "30" is performed in a state in which the symbol frequency component quantity has sufficiently exceeded the infinite impulse response switching threshold. First, the symbol frequency component quantity calculating section 76B obtains filter operation stop data "3" from the timing phase difference data "13" (refer to (B) and (C) of FIG. 49). The wait gate generating section 168 obtains "TW=9" from the filter operation stop data "3" to output a signal indicating logic "1" for 9 [symbols] (refer to (D) of FIG. 49). Then, during the time when logic "1" is present for 9 [symbols], the integral filtering section 74C performs an accumulating operation. The integral filtering section 74C keeps performing the infinite impulse filtering operation until second phase control is performed. At the time of second phase control, the symbol frequency component quantity calculating section 76B obtains filter operation stop data "2" from the timing phase difference data "30". The wait gate generating section 168 obtains "TW=4" from the filter operation stop data "2" to output a signal indicating logic "1" for 4 [symbols]. During the time when logic "1" is present for 4 [symbols], the integral filtering section 74C keeps performing the accumulating operation. Then, the integral filtering section performs an infinite impulse filtering operation during the time when the wait gate generating section 168 outputs logic "0".

Thus, in the filtering section 63C according to the fifth embodiment, the integral filtering section 74C temporarily switches the infinite impulse filtering operation to the accumulating operation according to the symbol frequency component quantity lost at phase control to compensate the loss. Therefore, without using the weighting section 103 having large circuit scale as shown in FIG. 8, the increase in jitter and the deterioration in synchronization characteristics due to the error in calculating symbol frequency component quantities can be avoided. The phase difference calculating section 75 calculates timing phase difference data from the integrated orthogonal data and the integrated in-phase data as with the first embodiment to output the result from the output terminal 63h. The random walk filtering section 77 operates in generally the same manner as with the first embodiment to output an UP signal from the output terminal 63j and a DOWN signal from the output terminal 63k.

The timing phase difference data, symbol frequency component quantity, and UP and DOWN signals outputted from the filtering section 63C are entered in the phase control quantity determining section 65. The phase control quantity determining section 65 determines phase control data as with the first embodiment. Then, the phase control quantity determining section outputs the determined phase control data at a time interval set by the timing phase control interval setting section 64. The phase control section 66 controls the clock phase based on the phase control data as with the first embodiment to output a phase control complete signal, a regenerated clock, and a regenerated quadruple frequency clock.

The operation for measuring the difference in the delay time between the detecting sections 2A and 2B is the same as that performed in the first embodiment. Namely, the time delay difference calculating section 67 outputs t1$_i$ and t2$_i$ by using the phase control data, AFC UP signal, AFC DOWN signal, line disconnection detect signal and frequency deviation measurement complete signal outputted from the phase control quantity determining section 65 and the select-after-detect signal outputted from the selective synthetic diversity section 61. The time delay sections 60A and 60B perform an operation for eliminating the delay time difference based on t1$_i$ and t2$_i$.

Thus, in the fifth embodiment, as with the first embodiment, the difference in delay time between the detecting sections caused by select-after-detect diversity is eliminated, thereby implementing the diversity receiving apparatus that can prevent the deterioration of bit error rate characteristic and synchronization characteristic caused by the delay time difference. The phase detecting section 62A in the timing recovery section 5E can efficiently extract the symbol frequency component from the baseband reception phase data regardless whether the input signal is of random pattern or preamble pattern, as with the first embodiment. The filtering section 63C can obtain with precision the timing phase difference data and the symbol frequency component quantity by avoiding the adverse effect due to the error in symbol frequency component quantity by a circuit scale smaller than that of the filtering section of the first embodiment. As with the first embodiment, the phase control quantity determining section 65 detects line disconnection and, if line disconnection is found, performs predicted control to maintain timing synchronization during line disconnection.

Thus, the timing recovery section 5E realizes high-speed phase pull-in characteristic and low jitter characteristic in steady state regardless whether the input signal is of random pattern or preamble pattern. Further, even in a poor line condition that may cause line disconnection, the timing recovery section 5E can maintain timing synchronization. It should be noted that the components constituting the timing recovery section 5E can be implemented by simple digital circuitry. That is, the timing recovery section 5E can be realized by digital circuitry than can be easily implemented on LSI.

In this fifth embodiment, the number of branches of the diversity receiving apparatus K=2. It will be apparent that K may be any natural number higher than 2. The diversity receiving apparatus having K sets of branches receives signals by K sets of antennas and converts K sets of received signals to K sets of baseband phase signals respectively to output the converted signals. The diversity receiving apparatus comprises K sets of detecting sections for outputting K sets of received signal powers, K sets of time delay sections given with delay times t1$_i$ and tK$_i$ for eliminating K sets of delay time differences, K sets of sampling sections operating on the regenerated quadruple frequency clock for outputting K sets of baseband reception phase data sequence Y$_i$, a selective synthetic diversity section for selectively outputs a value having the highest received signal power from the K sets of baseband reception phase data sequence Y$_i$, a timing recovery section, and a Nyquist point extracting section.

The time delay difference calculating section in the timing recovery section outputs the select-after-detect signal for indicating which branch (1 to k) has been selected and the delay times t1$_i$ to tK$_i$ for eliminating K sets of delay time differences by using phase control data.

In the present embodiment, the diversity receiving apparatus using π/4 shift QPSK modulating has been described. It will be apparent that the present embodiment is also applicable to diversity receiving apparatuses using other PSK modulating schemes such as QPSK modulating and BPSK modulating as well as other modulating schemes than PSK modulating. Namely, the present embodiment is applicable to any diversity receiving apparatus using a modulating scheme in which the phase jitter of a received signal has a periodicity and the timing phase is synchronized with that period to extract information data.

As described and according to the present invention, a data sequence including j symbol frequency components not affected by carrier frequency deviation can be extracted by signal processing including simple addition and subtraction from the received phase data sequence $Y_i$ (i being a natural number 2 or higher) obtained by X-times-oversampling (X being a natural number 4 or higher) the received PSK signal. Further, synthesizing the data sequence including j symbol frequency components provides two data sequences including symbol frequency components having $\pi/4$ phase difference in radian and a good S/N ratio and not affected by carrier frequency deviation. In addition, use of the data sequence including two symbol frequency components for timing regeneration implements the timing recovery apparatus that is hardly affected by noise and not affected by carrier frequency deviation.

Further, by frequency-converting data sequence including two symbol frequency components having a phase difference of $\pi/4$ in radian into one complex direct-current component enhances the S/N ratio. Low pass-filtering the direct-current component through integral filtering means can obtain a symbol frequency component quantity and a timing phase difference. When phase control is performed such that the timing phase difference is canceled, resetting the integrated orthogonal data of the integral filtering means to zero and setting the symbol frequency component quantity to the integrated in-phase data can synchronize the symbol clock phase with a Nyquist point while maintaining the symbol frequency components accumulated in the integral filter. Consequently, a timing recovery apparatus of feedback type having high-speed phase pull-in characteristic and low-jitter characteristic in steady state.

Still further, by the signal processing including a simple accumulating operation, a timing recovery apparatus can be realized having integral filtering means capable of quickly accumulating symbol frequency components without causing an overflow.

Yet further, filtering the symbol orthogonal component signal and the symbol in-phase component signal by an infinite impulse response filter after accumulating the symbol frequency component can realize a timing recovery apparatus having integral filtering means indicating good phase follow characteristic.

Additionally, a timing recovery apparatus is provided which can realize phase difference calculating means for calculating timing phase difference data by using integrated orthogonal data and integrated in-phase data by means of signal processing including linear approximation processing based on simple accumulation.

Still additionally, phase difference calculating means is realized by signal processing including linear approximation processing based on simple accumulation and by simple nonlinear conversion processing. A timing recovery apparatus is realized in which timing phase difference data having less errors than before are obtained from the phase difference calculating means.

Yet additionally, a timing recovery apparatus is provided that can realize symbol frequency component quantity calculating means with a simple constitution composed of comparators and selectors by using integrated orthogonal data and integrated in-phase data.

Moreover, a timing recovery apparatus is realized that can obtain the symbol frequency component quantity having less calculation errors by multiplying a value obtained by simple signal processing through comparator and selector by a weight obtained from timing phase difference data.

Still moreover, a timing recovery apparatus is realized in which an operation by infinite impulse filtering means is stopped during a period corresponding to the number of symbols obtained by simple means based on timing phase difference data to perform an accumulating operation, thereby preventing the reduction in the symbol frequency component quantity of the filter in timing phase control caused by the calculation error of the symbol frequency component and, at the same time, reducing the clock jitter.

Yet moreover, a timing recovery apparatus of feedback type is realized in which integral filtering means of a small time constant is used only at clock phase pull-in and random walk filter means is used which can be constituted by simple means including an UP/DOWN counter in steady state, thereby realizing a small hardware scale. The random walk filter according to the present invention operates by using the sign bit of a symbol orthogonal component signal having good S/N ratio, thereby realizing a timing recovery apparatus providing better clock phase follow characteristic and low-jitter characteristic than those in a timing recovery apparatus using a conventional random walk filter.

Furthermore, a timing recovery apparatus is realized in which resetting integrated orthogonal data and integrated in-phase data of integral filtering means to zero in phase control in steady state allows use of the integral filtering means also in steady state to monitor the symbol frequency component quantity and timing phase difference data accumulated during non-control of clock phase for knowing line condition.

Still furthermore, a timing recovery apparatus is realized in which a send/receive clock base oscillation frequency deviation is measured using phase control data and, if line disconnection is detected, the symbol clock is made to follow the phase jitter caused by the clock base oscillation frequency deviation by using the measured value, thereby maintaining clock synchronization even in a poor condition that may cause line disconnection.

Yet furthermore, a timing recovery apparatus is realized having clock base oscillation frequency deviation measuring means for measuring a clock base oscillation frequency deviation with precision by simple signal processing including an accumulating operation based on phase control data.

Besides, a timing recovery apparatus is provided in which further high-speed timing phase pull-in characteristic and low-jitter characteristic can be realized by switching the period of timing phase control interval setting signal between timing pull-in state and steady state.

Still further, a diversity communication apparatus is realized in which the delay time difference of K sets of baseband phase signals are calculated by the timing recovery apparatus and the obtained delay time difference is made zero by K sets of time delay means to prevent the deterioration of bit error rate characteristic and timing synchronization characteristic that may be caused when a filter having a large group delay difference is used.

Yet further, a diversity communication apparatus is realized in which, of K pieces of timing phase difference data, K sets of UP signals, and K sets of DOWN signals obtained by K sets of phase detecting means and K sets of filtering means having random walk filtering, the timing phase difference data, UP signal, and DOWN signal having the greatest symbol frequency component quantities are selected to be used for timing phase control, thereby performing timing regeneration based on data of high reliability. This constitution also enhances pull-in and jitter characteristics. Also, a diversity communication apparatus is realized having time delay difference measuring means for measuring with precision the difference between the delay times of K sets of baseband phase signals.

Further, a diversity communication apparatus is realized in which K sets of asynchronous sampling units are provided for time delay difference measuring means and, by measuring the delay time difference of baseband phase signals by using K sets of asynchronous received phase data sequences, the delay time difference can be quickly measured with precision without being affected by the clock phase control by the timing recovery apparatus.

Still further, if K sets of integrated orthogonal data and K sets of integrated in-phase data obtained from K sets of phase detecting means, K sets of frequency converting means, K sets of symbol synthesizing means, and K sets of integral filtering means are synthesized to calculate a timing phase difference to be used for timing phase control, timing regeneration can be performed with data having high S/N ratio. In this case, the pull-in and jitter characteristics can be enhanced still further. Also, a diversity communication apparatus is realized in which the delay time difference of K sets of baseband phase signals can be obtained through simple signal processing including addition and subtraction.

Yet further, if K pieces of even-number sequence synthesized symbol frequency component data are all added, K pieces of odd-number sequence synthesized symbol frequency component data are all added, and the resultant two added values are used for timing phase control by calculating timing phase difference data through one frequency converting means, one symbol synthesizing means, and one integral filtering means, a diversity communication apparatus with reduced hardware scale can be realized.

Furthermore, if K sets of received signal powers are multiplied by each of K pieces of even-number sequence synthesized symbol frequency component data to be added and the resultant added value is outputted as even-number sequence total data, and K sets of received signal powers are multiplied by each of K sets of odd-number synthesized symbol frequency component data to be added and the resultant added value is outputted as odd-number sequence total data, a diversity communication apparatus presenting more excellent clock synchronization characteristic.

Still furthermore, if determination data sequence coming from selective synthetic diversity means is used, the timing recovery apparatus calculates the delay time difference of K sets of baseband phase signals, and K sets of time delay means make zero the delay time difference of the baseband phase signals, a select-after-detect diversity communication apparatus is realized in which the bit error rate characteristic and timing synchronization characteristic are not deteriorated by use of a filter having a large group delay difference.

What is claimed is:

1. A timing recovery apparatus comprises:
   phase difference means for generating, based on a received phase data sequence $Y_i$ (i being natural number 2 or higher) obtained by sampling a received signal by an X-times (X being natural number 4 or higher) oversampling clock, j differential data sequences $Z_{ij}$ ($=Y_i-Y_{i-j}$) composed of differential data which represent differences between pieces of received phase data separated from each other by j samples (j being natural number 1 or higher);
   phase jitter quantity calculating means for converting each differential data range of j differential data sequences $Z_{i1}$ to $Z_{ij}$ to a range of $\pm 2\pi$ to $\pm \pi$ in radian notation to obtain an absolute value thereof and outputting at least one of phase jitter data sequences $W_{i1}$ to $W_{ij}$ including j symbol frequency components; and
   phase detecting means having
      an even-number sample synthesizing section which inputs each of phase jitter data sequences from said phase jitter quantity calculating means, synthesizes even-number phase jitter data sequences after delaying the even-number phase jitter data sequences such that phases of symbol frequency components included in said even-number phase jitter data sequences are matched to each other, and outputs a synthesized signal as even-number sequence synthesized symbol frequency component data, and
      an odd-number sample synthesizing section which inputs each of phase jitter data sequences from said phase jitter quantity calculation means, synthesizes odd-number phase jitter data sequences after delaying the odd-number phase jitter data sequences such that phases of symbol frequency components included in said odd-number phase jitter data sequences are matched to each other, and outputs a synthesized signal as odd-number sequence synthesized symbol frequency component data.

2. A timing recovery apparatus according to claim 1 further comprises:
   frequency converting means for adding a value obtained by multiplying the even-number sequence synthesized symbol frequency component data by a complex symbol frequency component on the receiving side to a value obtained by multiplying the odd-number sequence synthesized symbol frequency component data by a complex symbol frequency component on the receiving side delayed by $\pi/4$ radians to generate a complex direct-current component;
   symbol synthesizing means for synthesizing an orthogonal component and in-phase component of said complex direct-current component for one symbol each to generate a symbol orthogonal component signal and a symbol in-phase component signal for each symbol;
   integral filtering means for filtering said symbol orthogonal component signal and said symbol in-phase component signal and outputting integrated orthogonal data and integrated in-phase data;
   phase difference calculating means for calculating a timing phase difference between a Nyquist point and a symbol clock in a receiver by use of said integrated orthogonal data and said integrated in-phase data and outputting a calculated phase difference as timing phase difference data;
   filtering means including symbol frequency component quantity calculating means for calculating the symbol frequency component quantity accumulated by said integral filtering means;
   timing phase control interval setting means for outputting a signal of U (being natural number 1 or higher) symbol period as a timing phase control interval setting signal;
   phase control quantity determining means for latching the timing phase difference data outputted from said filtering means in the period of said timing phase control interval setting signal and outputting a latched data as a phase control signal; and
   phase control means for dividing a base oscillation clock of the receiver to output the symbol clock and a X-times oversample clock and, if said phase control data has been entered, controlling phase of said symbol clock and phase of said X-times oversample clock phase by said phase control data, resetting said integrated orthogonal data in said integral fingering means to zero, and setting said symbol frequency component quantity to said integrated in-phase data.

3. A timing recovery apparatus according to claim 2 wherein the integrating filtering means comprises:

limiter accumulating means for, if said symbol frequency component quantity is below an accumulation threshold value, accumulating said symbol orthogonal component signal and said symbol in-phase component signal respectively so as to generate integrated orthogonal data and integrated in-phase data and, if said symbol frequency component quantity exceeds said accumulation threshold value, dividing accumulated values of said symbol orthogonal component signal and said symbol in-phase component signal by D (D being natural number 2 or higher) respectively so as to generate said integrated orthogonal data and said integrated in-phase data.

4. A timing recovery apparatus according to claim 2 wherein the integral filtering means comprises:

accumulating means for, if said symbol frequency component quantity is below an infinite impulse response switching threshold value, accumulating said symbol orthogonal component signal and said symbol in-phase component signal respectively so as to generate integrated orthogonal data and integrated in-phase data; and infinite impulse filtering means for, if said symbol frequency component quantity exceeds said infinite impulse response switching threshold value, filtering said symbol orthogonal component signal and said symbol in-phase component signal through an infinite impulse response filter respectively.

5. A timing recovery apparatus according to claim 2 wherein the phase difference calculating means comprises:

integrated data absolute value converting means for outputting an absolute value of said integrated orthogonal data and an absolute value of said integrated in-phase data as orthogonal integrated absolute value data and in-phase integrated absolute value data respectively;

compared data calculating means for, if an exclusive-OR value of a most significant bit of said integrated orthogonal data and a most significant bit of said integrated in-phase data is logic "0", multiplying said orthogonal integrated absolute value data by x (x being natural number 1 or higher) and, if said exclusive-OR is logic "1", multiplying said in-phase integrated absolute value data by x (x being natural number 1 or higher) so as to generate a phase difference calculation threshold value, and adding said in-phase integrated absolute value data to said orthogonal integrated absolute value data so as to generate total absolute value data;

in-first-quadrant-range phase data calculating means for accumulating said total absolute value data and, if a result of the accumulation exceeds said phase difference calculation threshold value, outputting the number of times the accumulation of the total absolute value data was made at that moment as in-first-quadrant-range phase data; and quadrant indication bit adding means for generating data indicating a quadrant from the most significant bit of said integrated orthogonal data and the most significant bit of said integrated in-phase data and adding the quadrant indicating data thus generated to the highest position of said in-first-quadrant-range phase data so as to generate said timing phase difference data.

6. A timing recovery apparatus according to claim 5 wherein the in-first-quadrant-range phase data calculating means comprises:

phase data non-linearly converting means for performing non-linear conversion on the number of additions at a time when the number of additions of the total absolute value data exceeded the phase difference calculation threshold value to output non-linearly converted data as the in-first-quadrant-range phase data.

7. A timing recovery apparatus according to claim 2 wherein the symbol frequency component quantity calculating means comprises:

absolute value comparing means for outputting the larger one of an absolute value of the integrated orthogonal data and an absolute value of the integrated in-phase data as the symbol frequency component quantity.

8. A timing recovery apparatus according to claim 2 wherein the symbol frequency component quantity calculating means comprises:

absolute value comparing means for outputting the larger one of an absolute value of the integrated orthogonal data and an absolute value of the integrated in-phase data as compared integrated absolute value data;

quadrant bit deleting means for outputting the timing phase difference data without most significant two bits indicating a quadrant as phase data without quadrant bits;

weighting data calculating means for, if the phase data without quadrant bits is below a value equivalent to $\pi/4$ radians, outputting said phase data without quadrant bits as weighting data and, if said phase data without quadrant bits is greater than the value equivalent to $\pi/4$ radians, outputting a value obtained by subtracting said phase data without quadrant bits from a value equivalent to $\pi/2$ radians as weighting data; and weighting means for multiplying said compared integrated absolute value data by a value equivalent to a cosine value obtained when said weighting data is indicated in radians and outputting a multiplied value as the symbol frequency component quantity.

9. A timing recovery apparatus according to claim 2 wherein the symbol frequency component quantity calculating means comprises:

absolute value comparing means for outputting the larger one of an absolute value of the integrated orthogonal data and an absolute value of the integrated in-phase data as compared integrated absolute value data;

quadrant bit deleting means for outputting the timing phase difference data without most significant two bits indicating a quadrant as phase data without quadrant bits; and filter operation stop data calculating means for, if said phase data without quadrant bits is below a value equivalent to $\pi/4$ radians, outputting said phase data without quadrant bits as filter operation stop data and, if said phase data without quadrant bits is greater than a value equivalent to $\pi/4$ radians, outputting a value obtained by subtracting said phase data without quadrant bits from a value equivalent to $\pi/2$ radians as filter operation stop data, wherein said filtering means comprises:

filter operation stopping means for, if timing phase control has been performed, stopping an infinite impulse filtering operation for a time set based on said filter operation stop data to perform an accumulating operation.

10. A timing recovery apparatus according to claim 2 wherein the filtering means comprises:

random walk filtering means for, if the symbol frequency component quantity exceeds a threshold value for recognizing steady state, operates an up/down counter set to filter constant N by using a sign bit of the symbol orthogonal component signal to output an up signal for advancing the symbol clock phase when said up/down counter reaches 2N or a down signal for delaying the symbol clock phase when said up/down counter reaches 0 and, after outputting said up signal or said down signal, set said up/down counter to said filter constant N again; and wherein said phase control quantity determining means comprises:

steady-state time phase control means that, when said symbol frequency component quantity exceeds said threshold value for recognizing steady state, does not use said timing phase difference data from said filtering means for phase control data, when an instruction for advancing said symbol clock phase by said up signal is generated, outputs phase control data for advancing said symbol clock phase, and, when an instruction for delaying said symbol clock phase by said down signal is generated, outputs phase control data for delaying said symbol clock phase.

11. A timing recovery apparatus according to claim 10 wherein the phase control means comprises:

integrated data resetting means for, when the symbol frequency component quantity exceeds the threshold value for recognizing steady state, resetting the integrated orthogonal data and integrated in-phase data of said integral filtering means to zero when controlling the symbol clock phase and the X-times oversample clock phase.

12. A timing recovery apparatus according to claim 2 wherein the phase control quantity determining means comprises:

clock base oscillation frequency deviation measuring means for, when the symbol frequency component quantity exceeds a threshold value for recognizing steady state, measuring a deviation between send/receive clock base oscillation frequencies by using the phase control data and, when the measurement is complete, outputting a frequency deviation measurement complete signal indicating measurement completion and a symbol time until occurrence of a deviation in the clock phase for τ1 digit by clock frequency deviation as frequency deviation corrected data;

automatic frequency control signal generating means for generating, by use of said frequency deviation corrected data, an AFC up signal for advancing the symbol clock phase and an AFC down signal for delaying the symbol clock signal; and signal off-time phase control means for outputting the phase control data for advancing the symbol clock phase by said AFC up signal if an instruction for advancing the symbol clock phase is generated when said symbol frequency component quantity goes below a threshold value for recognizing line disconnection state and said frequency deviation measurement complete signal indicates measurement completion and outputting the phase control data for delaying the symbol clock phase if an instruction for delaying the symbol clock phase by said AFC down signal is generated.

13. A timing recovery apparatus according to claim 12 wherein the clock base oscillation frequency deviation measuring means comprises:

measuring time display means for operating an up counter by symbol clock to output an up counter value as measuring time data;

phase control data accumulating means for accumulating phase control data to output an accumulated value as phase control accumulated data;

frequency deviation measurement dividing means for dividing said measuring time data by said phase control accumulated data;

corrected data output means for resetting said up counter when said measuring time data exceeds a threshold value for recognizing a frequency deviation measurement and latching the division result outputted from said frequency deviation measurement dividing means so as to output the latched division result as corrected data; and corrected data averaging means for averaging said corrected data and outputting the averaging result as frequency deviation corrected data.

14. A timing recovery apparatus according to claim 2 wherein the timing phase control interval setting means comprises:

control interval setting signal varying means for varying a frequency of the timing phase control interval setting signal between timing pull-in time and steady state time.

* * * * *